(12) United States Patent
Wada et al.

(10) Patent No.: US 8,170,602 B2
(45) Date of Patent: May 1, 2012

(54) INFORMATION ACQUISITION DEVICE, INFORMATION PROVIDING DEVICE, AND INFORMATION PROVIDING SYSTEM

(75) Inventors: Toshiaki Wada, Tokyo (JP); Kenji Nakano, Tokyo (JP)

(73) Assignee: Olympus Corporation, Tokyo (JP)

( * ) Notice: Subject to any disclaimer, the term of this patent is extended or adjusted under 35 U.S.C. 154(b) by 1082 days.

(21) Appl. No.: 10/576,236

(22) PCT Filed: Oct. 18, 2004

(86) PCT No.: PCT/JP2004/015368
§ 371 (c)(1),
(2), (4) Date: Apr. 14, 2006

(87) PCT Pub. No.: WO2005/039076
PCT Pub. Date: Apr. 28, 2005

(65) Prior Publication Data
US 2007/0032193 A1  Feb. 8, 2007

(30) Foreign Application Priority Data

Oct. 17, 2003 (JP) .................................. 2003-357483
Oct. 17, 2003 (JP) .................................. 2003-357484

(51) Int. Cl.
*H04B 7/00* (2006.01)
*H04M 1/00* (2006.01)
*H04N 5/225* (2006.01)
*H04N 5/232* (2006.01)

(52) U.S. Cl. ................. 455/550.1; 455/41.2; 455/552.1; 455/556.1; 348/207.1; 348/211.1

(58) Field of Classification Search ........ 455/41.1–41.3, 455/550.1, 552.1–553.1, 556.1–556.2; 348/207.99, 348/207.1, 211.2, 231.99, 231.1–231.3, 211.1
See application file for complete search history.

(56) References Cited

U.S. PATENT DOCUMENTS 5,634,144 A * 5/1997 Mauro et al. .................... 396/57
(Continued)

FOREIGN PATENT DOCUMENTS

DE 297 19 230 2/1998
(Continued)

OTHER PUBLICATIONS

Notice of Rejection Grounds for Japanese Patent Application No. 2003-357483, mailed Apr. 7, 2009 (6 pgs.) with translation (4 pgs.).
(Continued)

*Primary Examiner* — Simon Nguyen
(74) *Attorney, Agent, or Firm* — John C. Pokotylo; Straub & Pokotylo

(57) ABSTRACT

An information acquisition device for acquiring digital Information includes: a first transmission unit (14) having directivity and transmitting by wireless an information request signal to be transmitted in a direction of the directivity; an information addition unit (13) adding at least one piece of address information to the information request signal to be transmitted; a reception unit (15) receiving a radio signal transmitted by wireless in response to the information request signal transmitted by the first transmission unit, and acquiring information contained in the signal; an information storage unit (16) which is built in the information acquisition device or attached to the device as removable from the device, and can store all or a part of information acquired by the reception unit; and an operation unit (11) issuing an instruction to start an information requesting operation. The reception unit (15) has no directivity or has broader directivity than the first transmission unit.

37 Claims, 66 Drawing Sheets

U.S. PATENT DOCUMENTS

| | | | |
|---|---|---|---|
| 6,396,537 B1* | 5/2002 | Squilla et al. | 348/239 |
| 6,970,189 B1* | 11/2005 | Bernstein et al. | 348/211.2 |
| 6,999,112 B2* | 2/2006 | Seaman et al. | 348/207.1 |
| 7,092,369 B2* | 8/2006 | Fuccello et al. | 370/328 |
| 7,139,529 B2* | 11/2006 | Rekimoto et al. | 455/41.3 |
| 7,139,594 B2* | 11/2006 | Nagatomo | 455/566 |
| 7,161,623 B2* | 1/2007 | Kuno | 348/211.3 |
| 7,415,287 B2* | 8/2008 | Ueno | 455/557 |
| 7,895,274 B2* | 2/2011 | Kondo et al. | 709/206 |
| 2002/0032005 A1* | 3/2002 | Yoshida | 455/41 |
| 2002/0032732 A1* | 3/2002 | Shigehara | 709/204 |
| 2003/0036391 A1 | 2/2003 | Jordan | |
| 2003/0110216 A1 | 6/2003 | Althin et al. | |
| 2003/0210904 A1* | 11/2003 | Tatsumi et al. | 396/310 |
| 2004/0029552 A1* | 2/2004 | Miki et al. | 455/344 |
| 2004/0053637 A1* | 3/2004 | Iida | 455/550.1 |
| 2004/0109063 A1* | 6/2004 | Kusaka et al. | 348/207.1 |
| 2004/0169731 A1 | 9/2004 | Shiiyama | |
| 2010/0015962 A1* | 1/2010 | Reber | 455/414.3 |

FOREIGN PATENT DOCUMENTS

| | | |
|---|---|---|
| JP | 4-309153 | 10/1992 |
| JP | 2000-115845 | 4/2000 |
| JP | 2001-024665 | 1/2001 |
| JP | 2001-156723 | 6/2001 |
| JP | 2002-311867 | 10/2002 |
| JP | 2003-22227 | 1/2003 |
| JP | 2003-122710 | 4/2003 |
| JP | 2003-177025 | 6/2003 |
| JP | 2003-186787 | 7/2003 |
| JP | 2003-224677 | 8/2003 |
| JP | 2003-271607 | 9/2003 |

OTHER PUBLICATIONS

Notice of Rejection Ground for Japanese Patent Application No. 2003-357484, mailed Dec. 1, 2009 (2 pgs.), with translation (2 pgs.).

Supplementary European Search Report for European Patent Application No. 04792537.5, mailed Feb. 18, 2011 (3 pgs.).

* cited by examiner

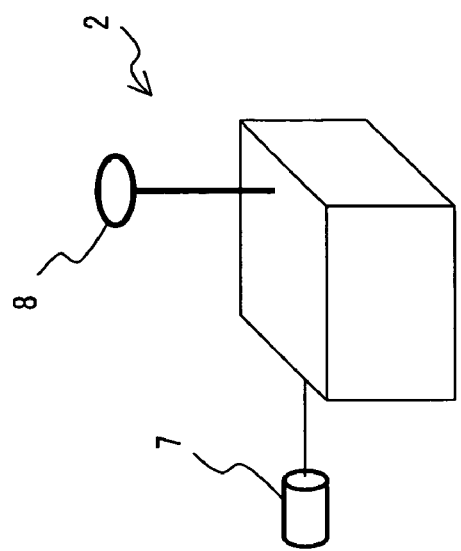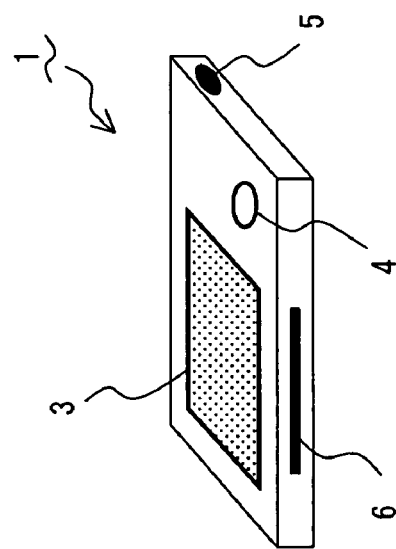
FIG. 1

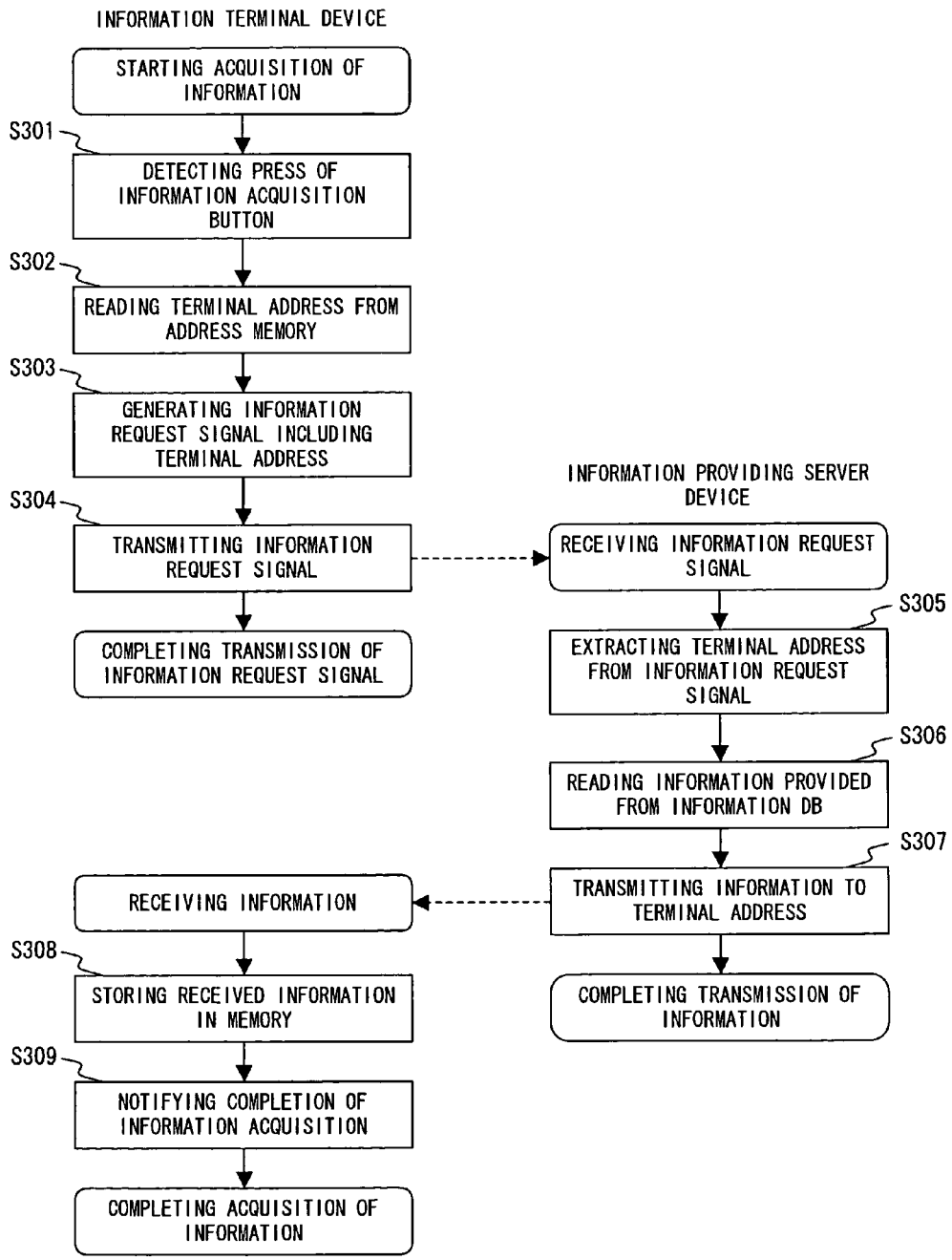
F I G. 3

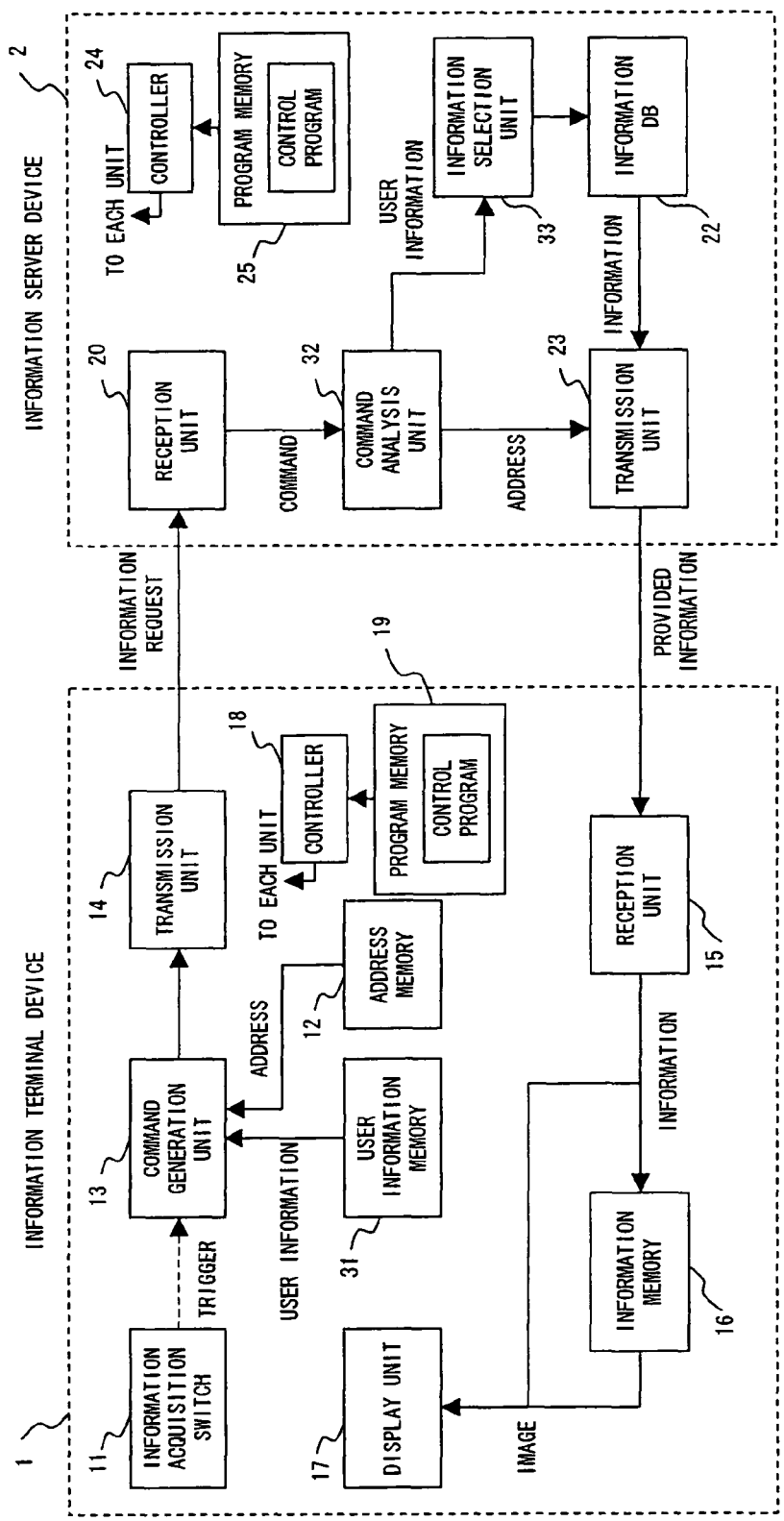
F I G. 4

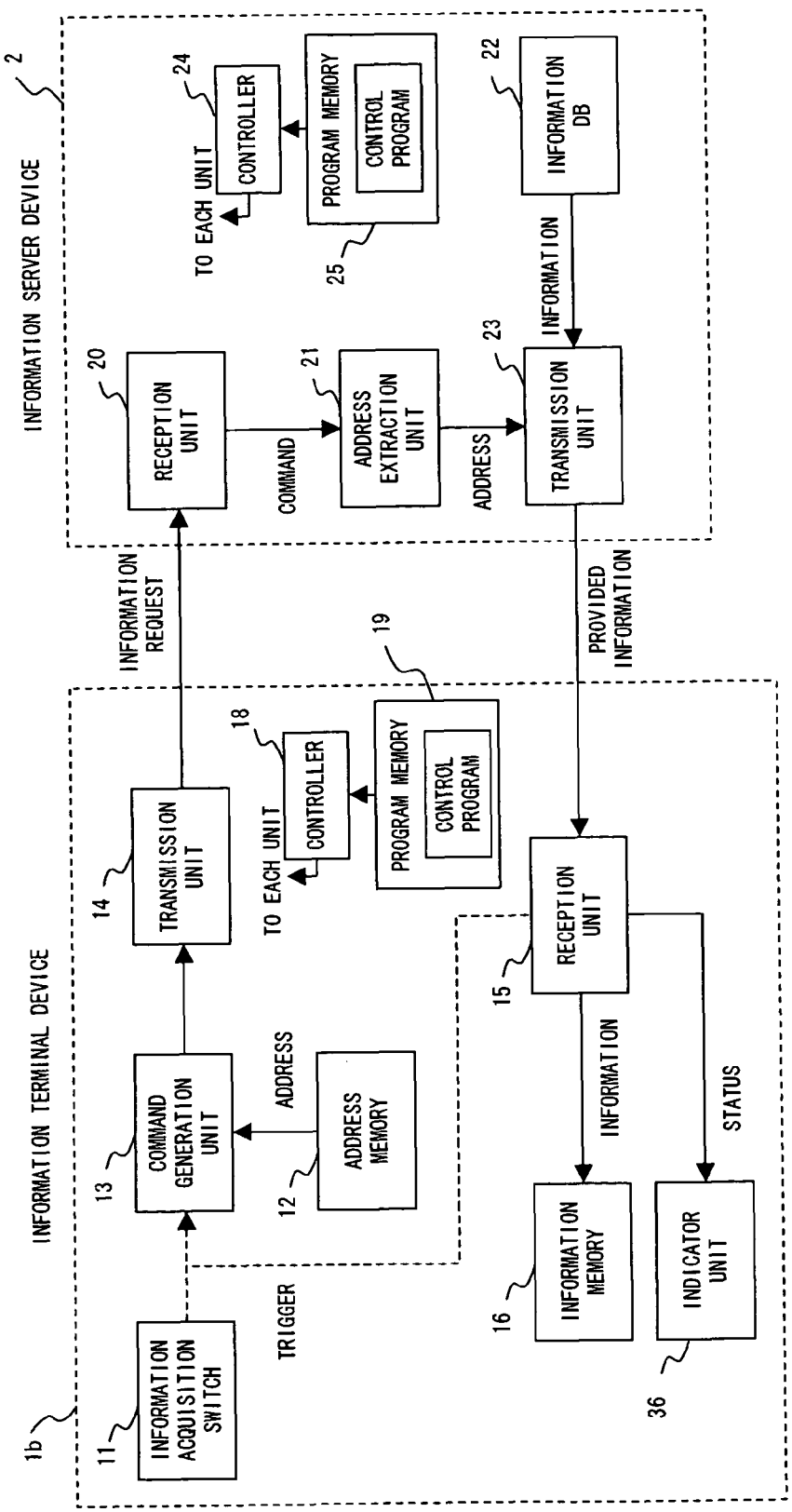
F I G. 6

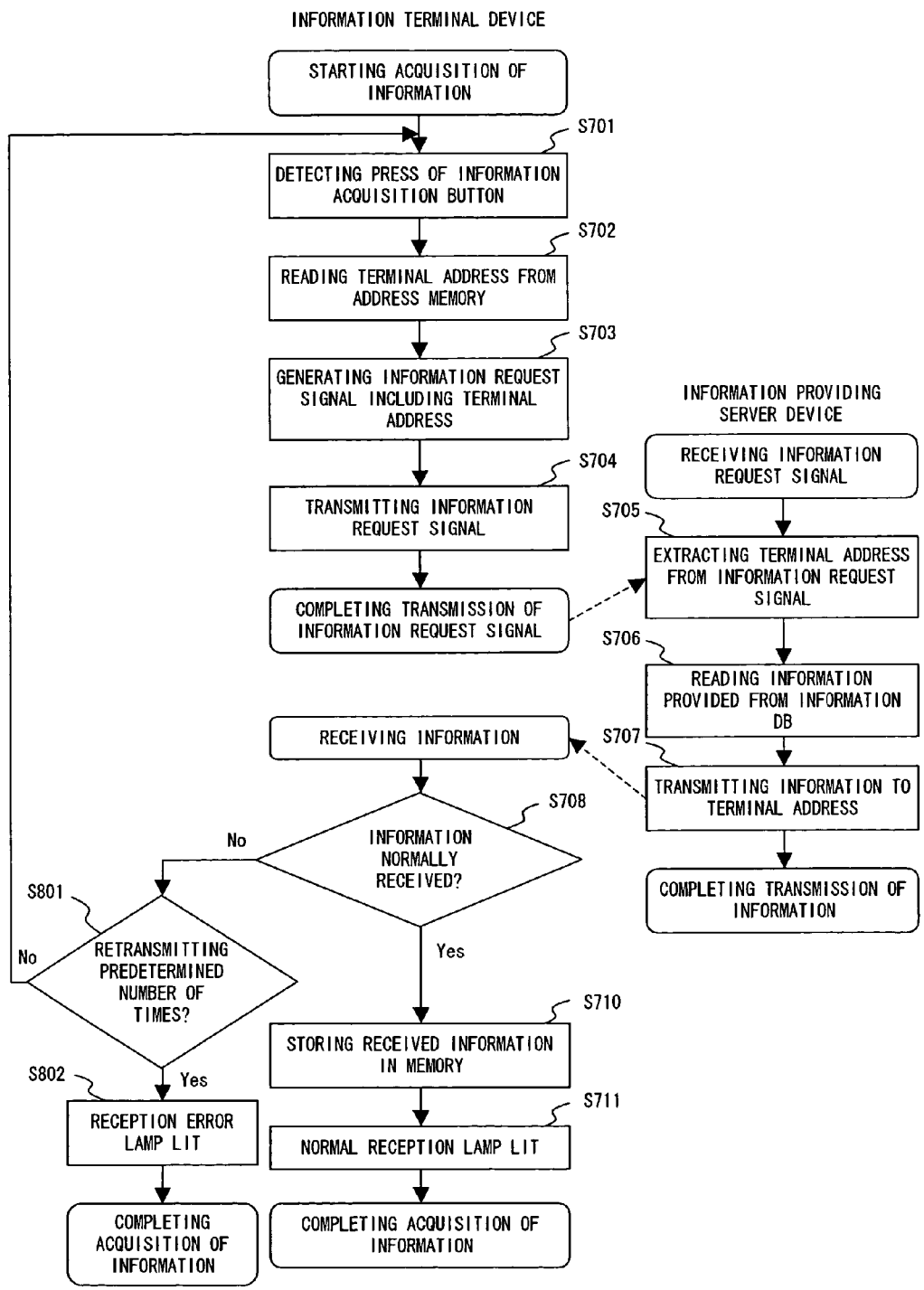
F I G. 8

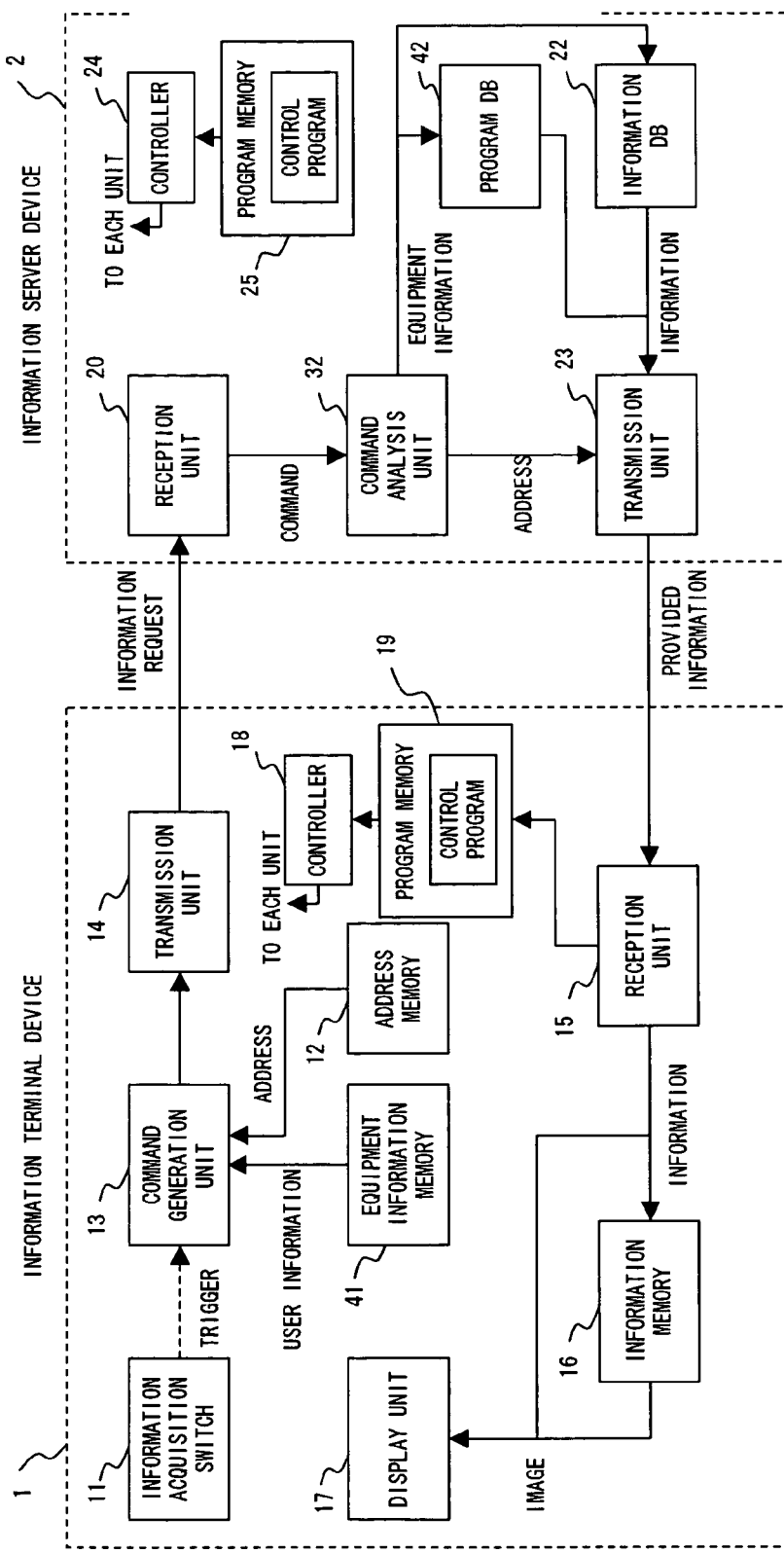
F I G. 9

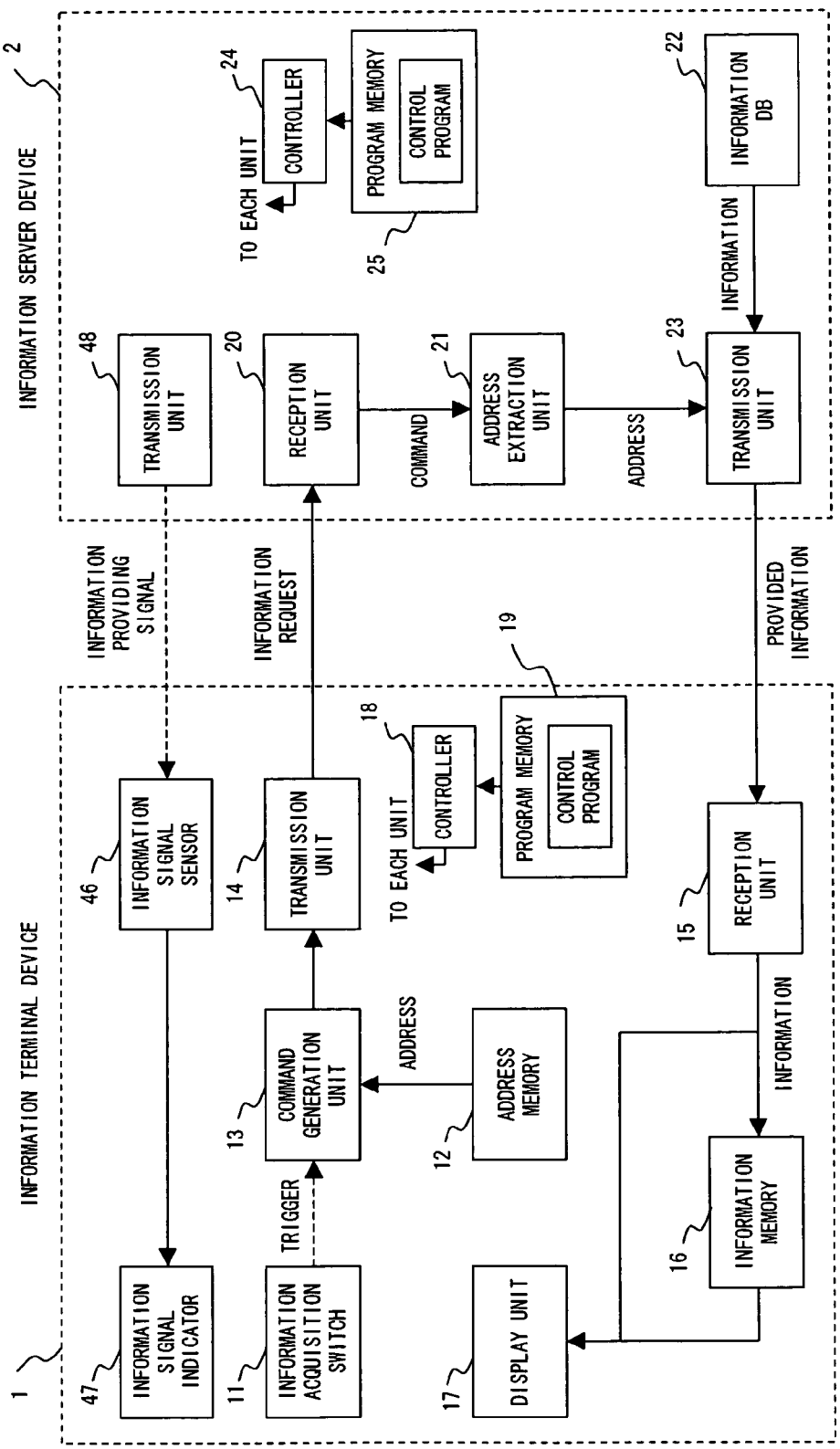
F I G. 1 1

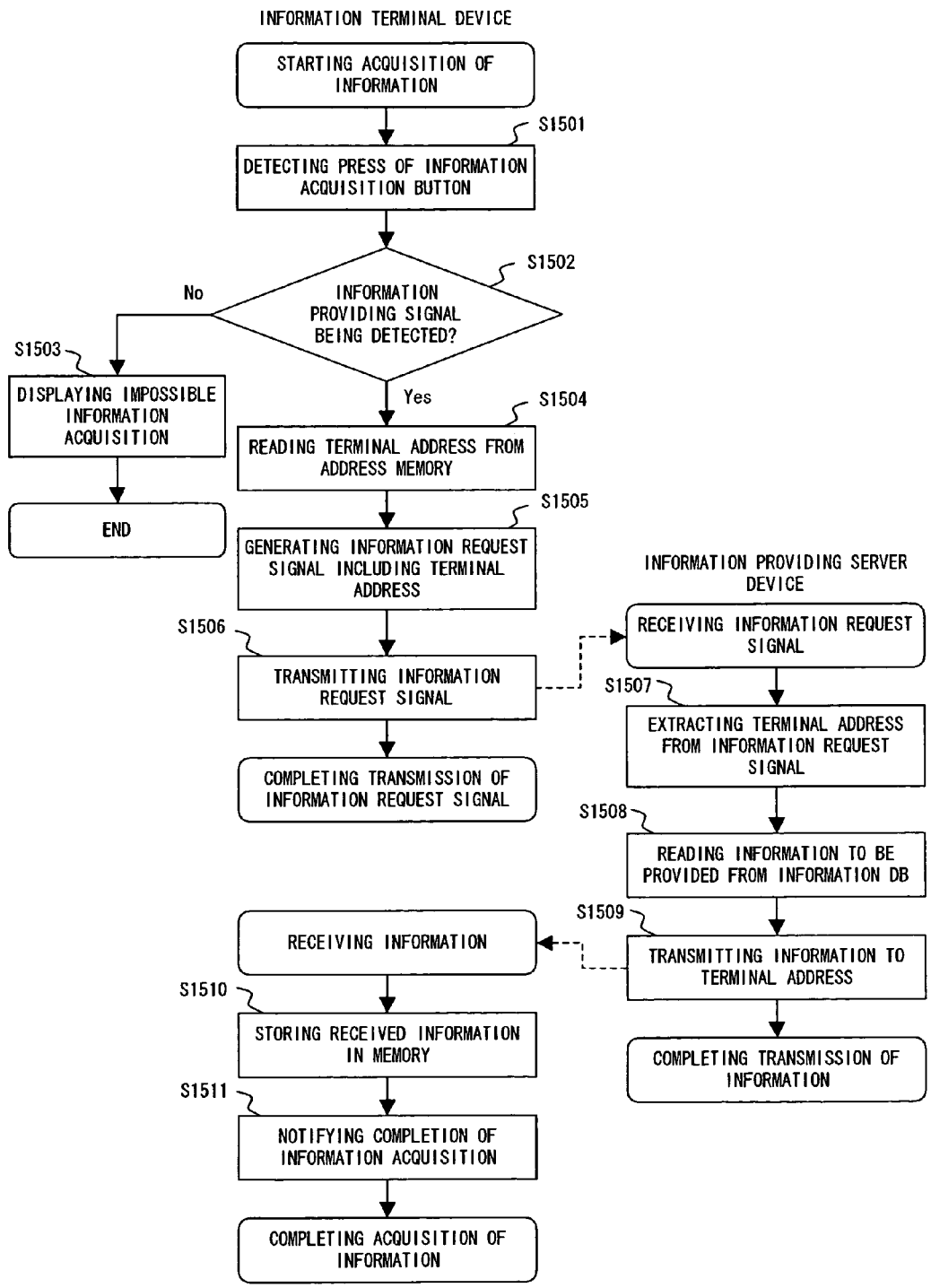
F I G. 1 4

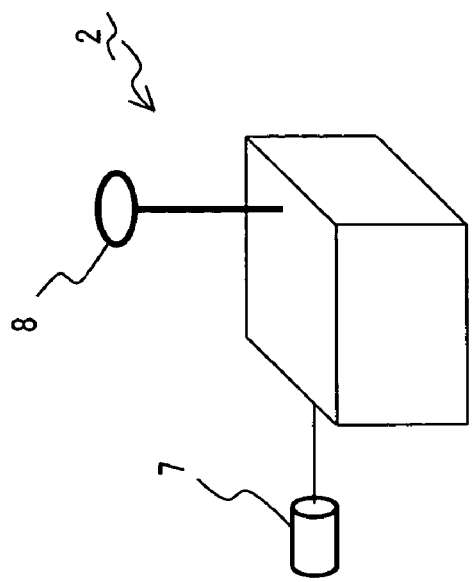
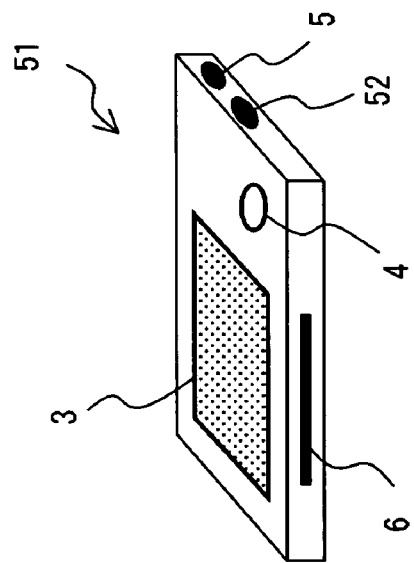
FIG. 15

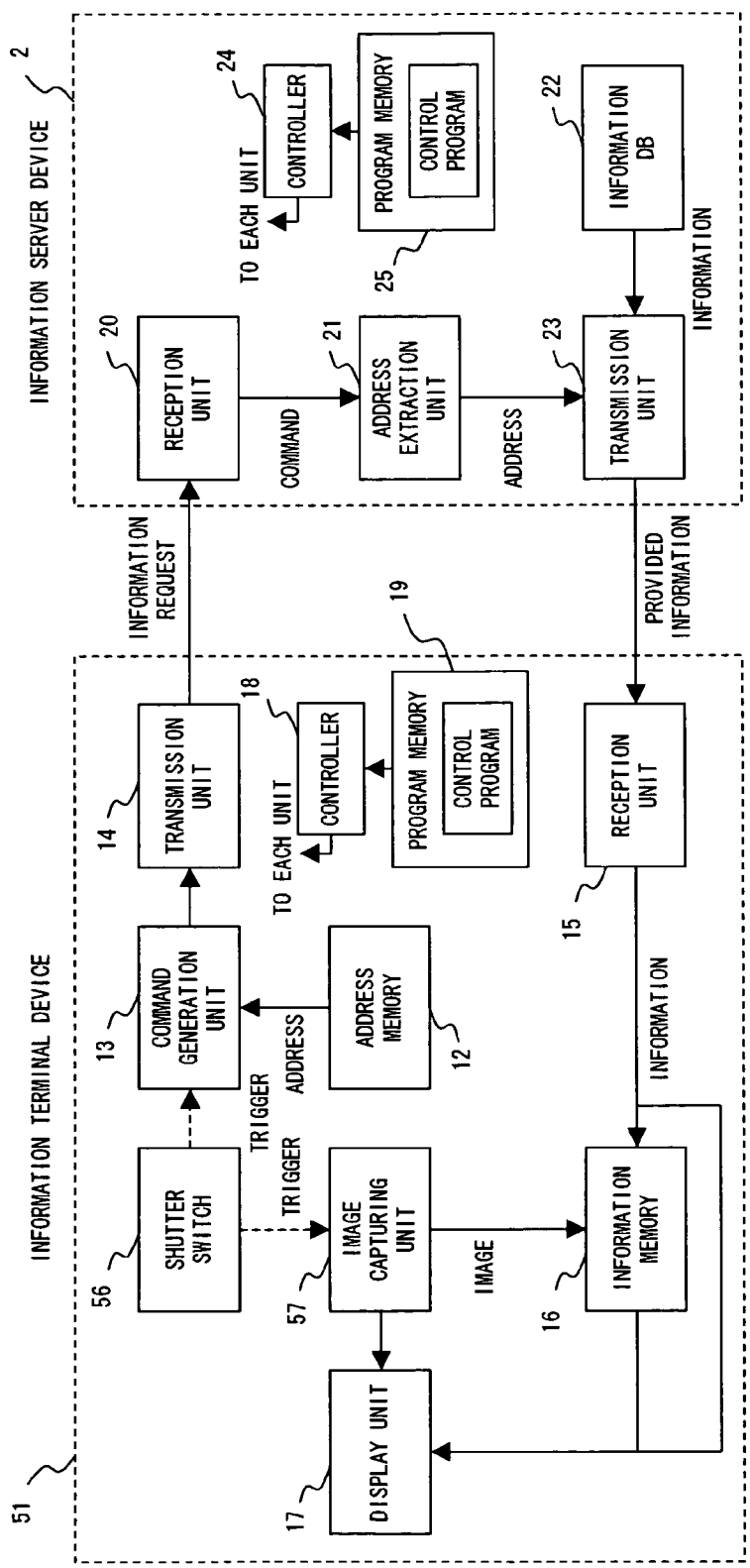
F I G. 16

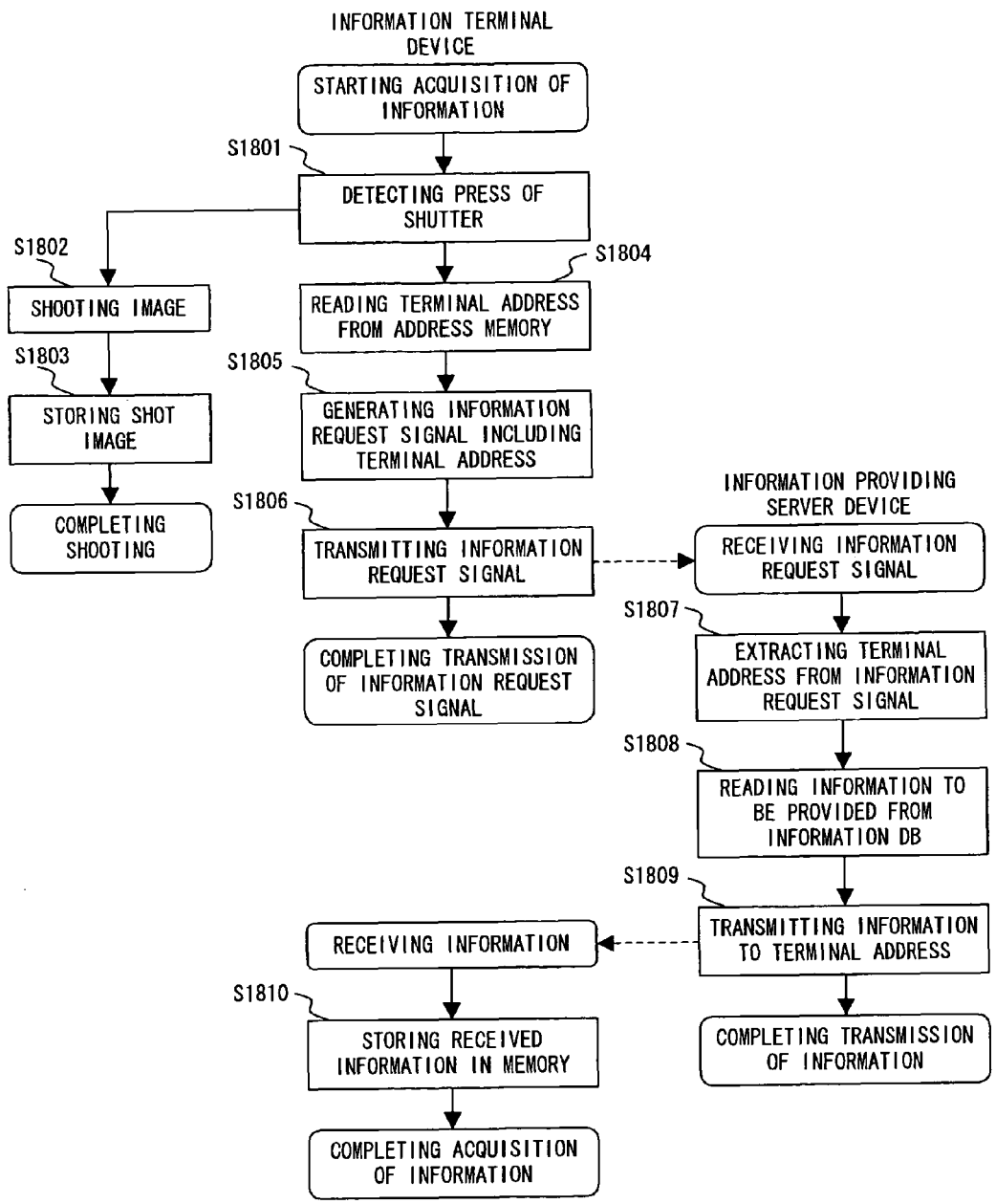
F I G. 1 9

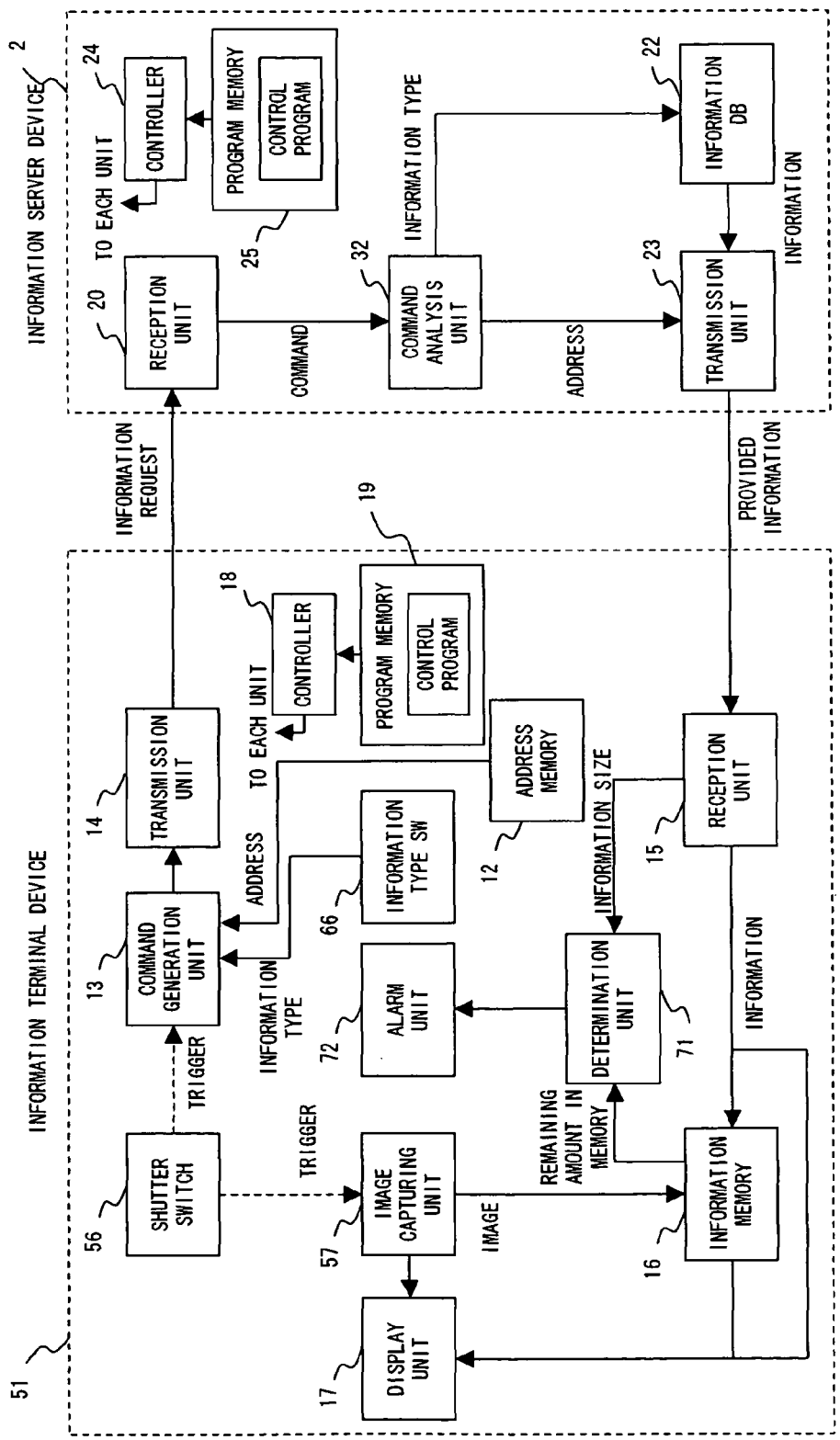
F I G. 24

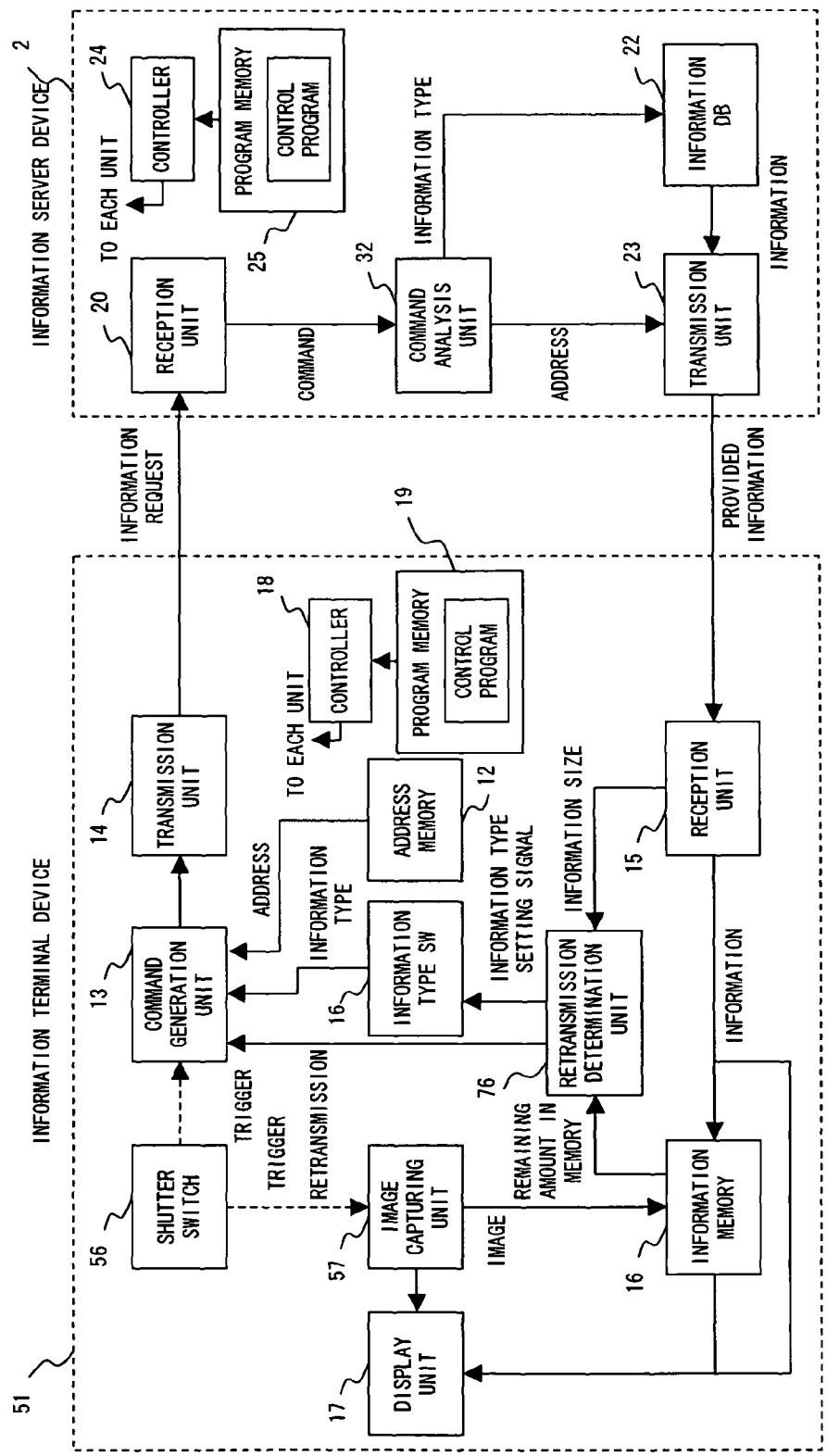
F I G. 2 6

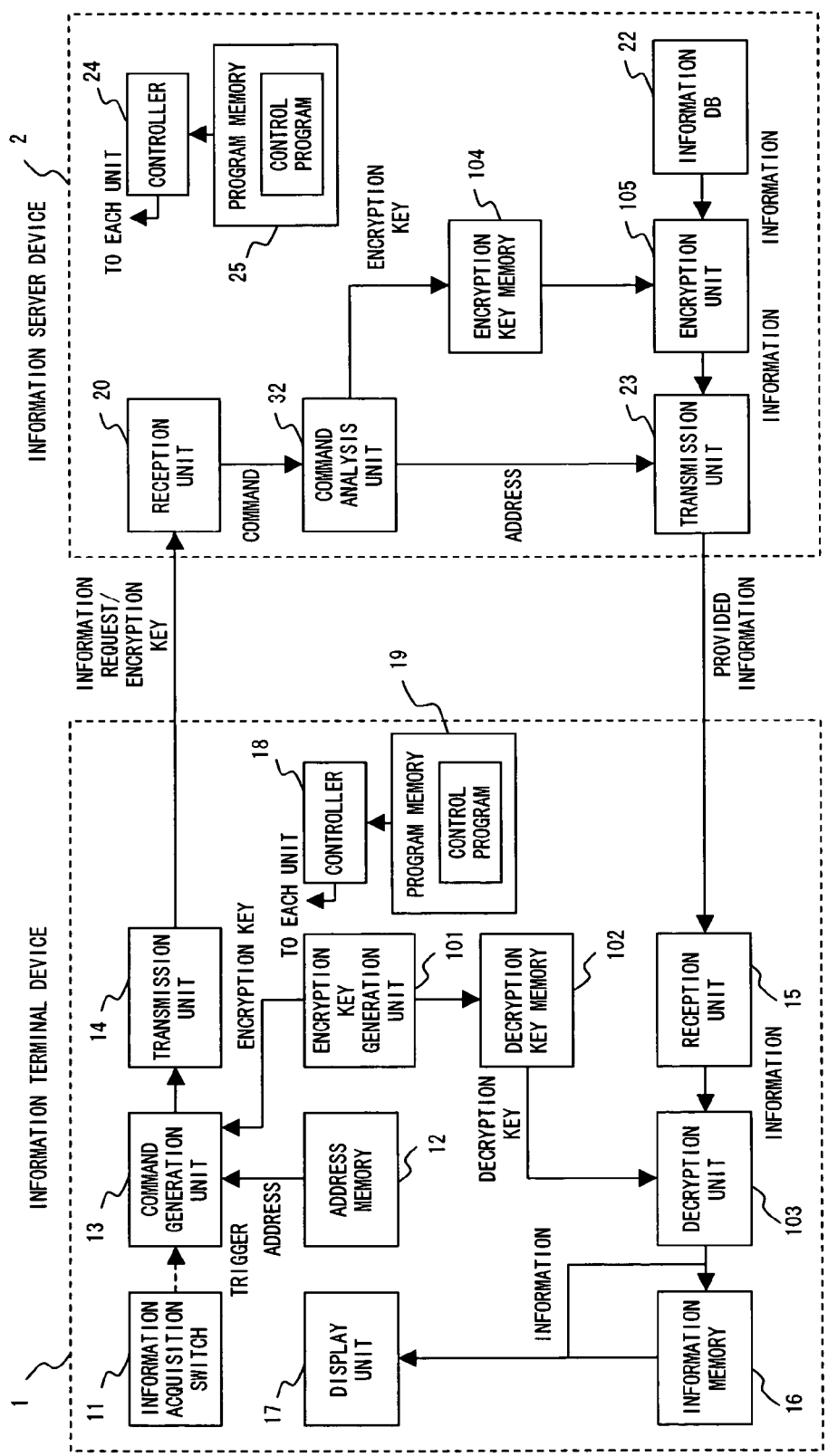
F I G. 3 6

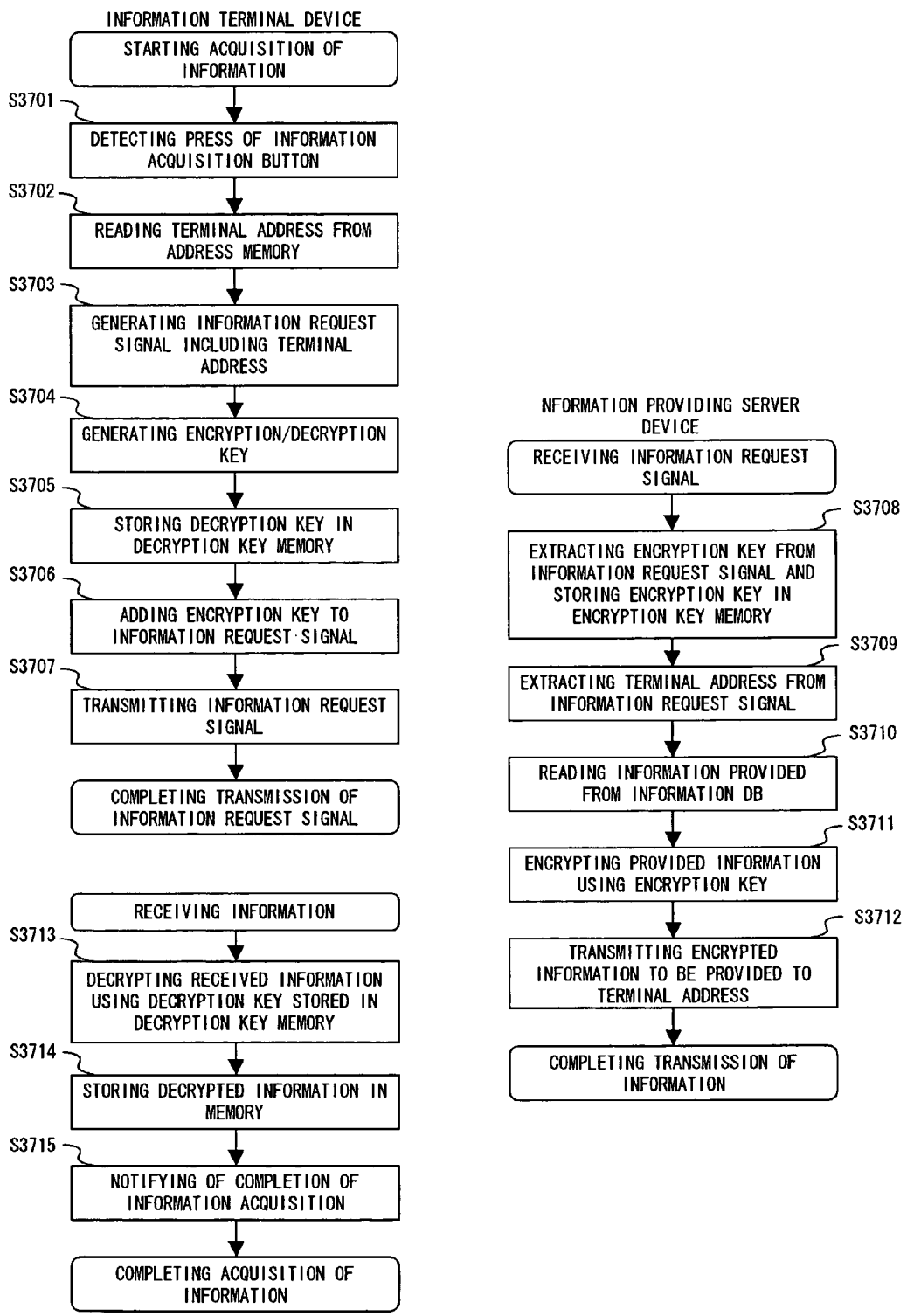
F I G. 3 7

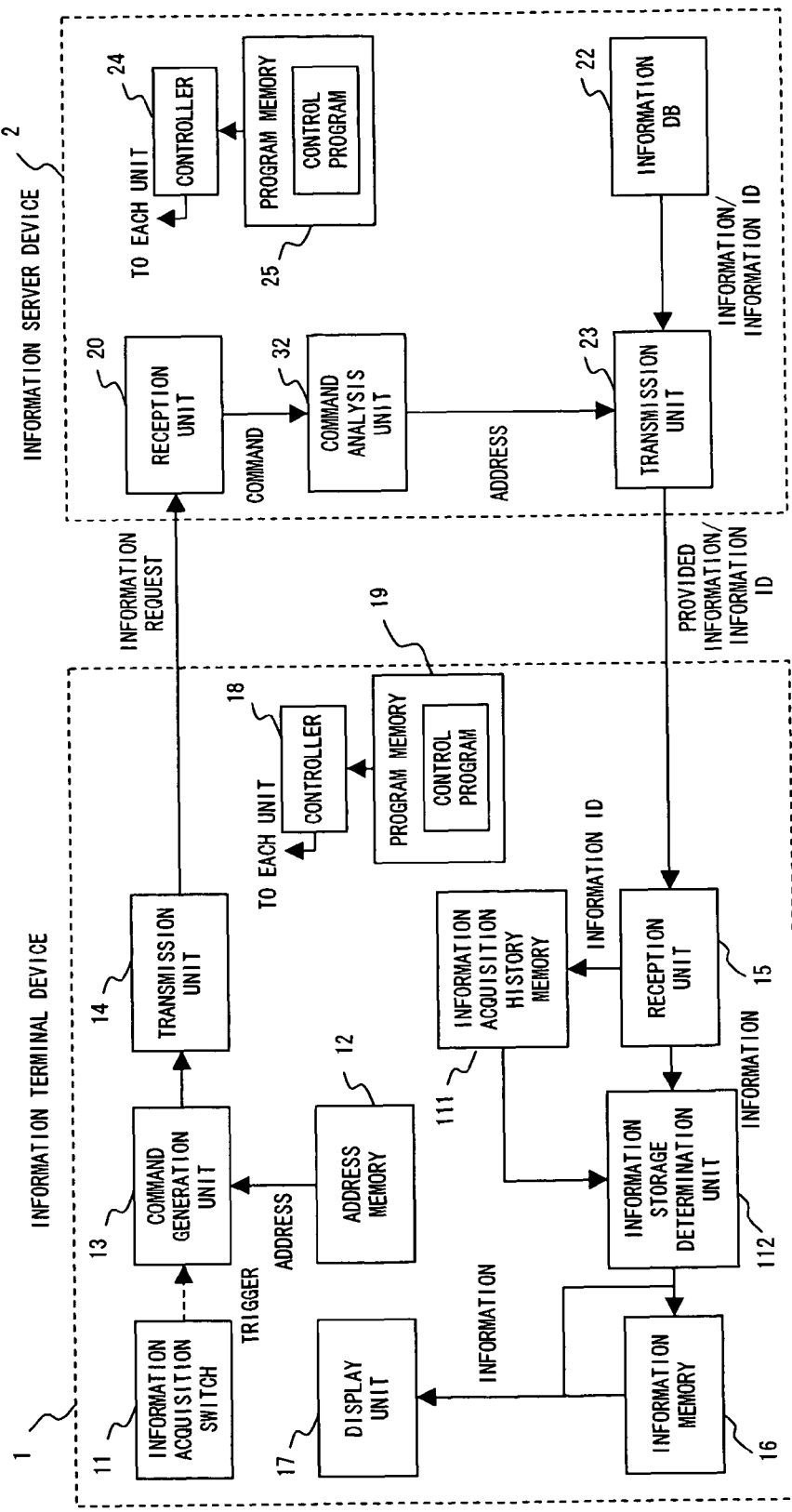
F I G. 38

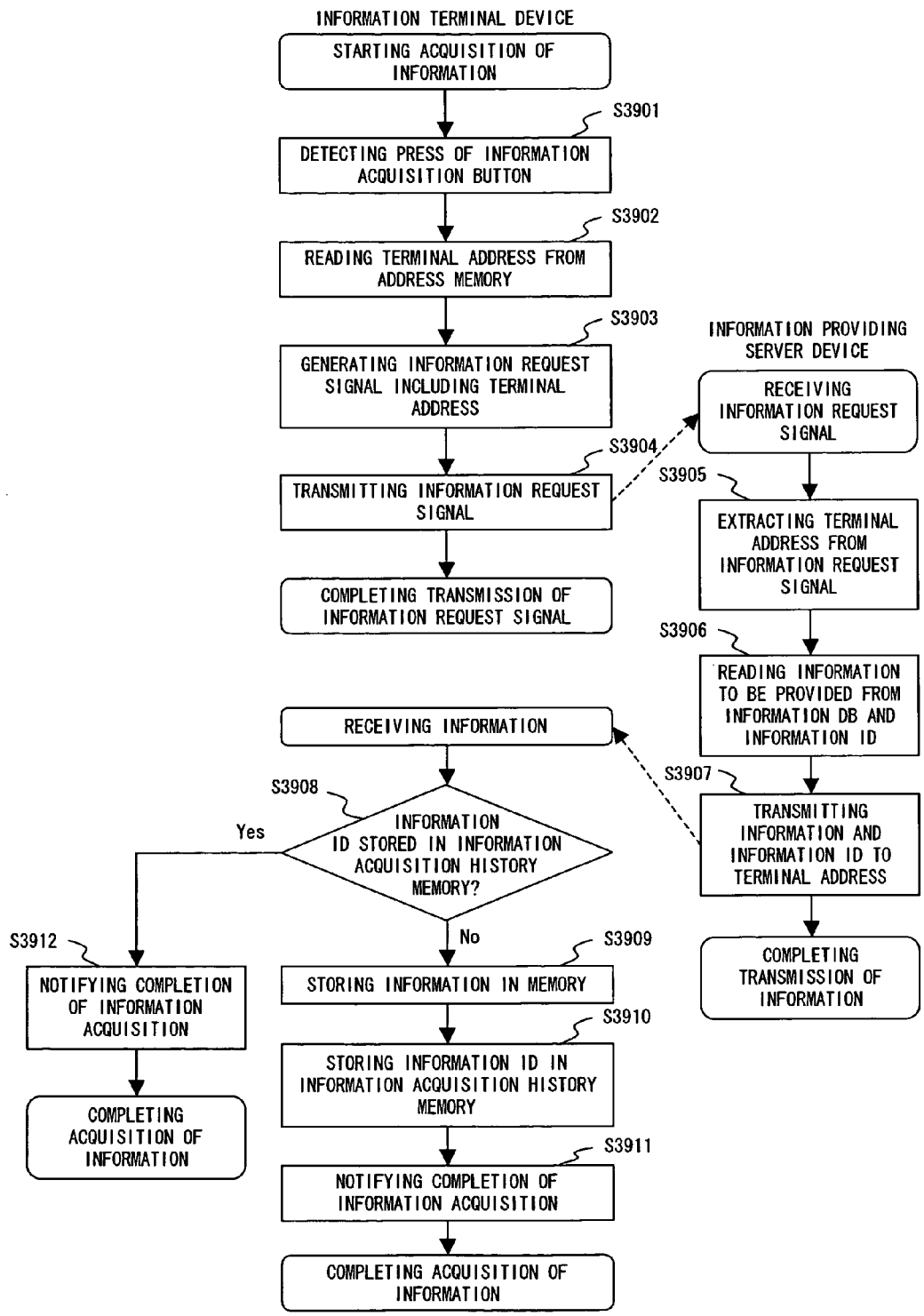
F I G. 39

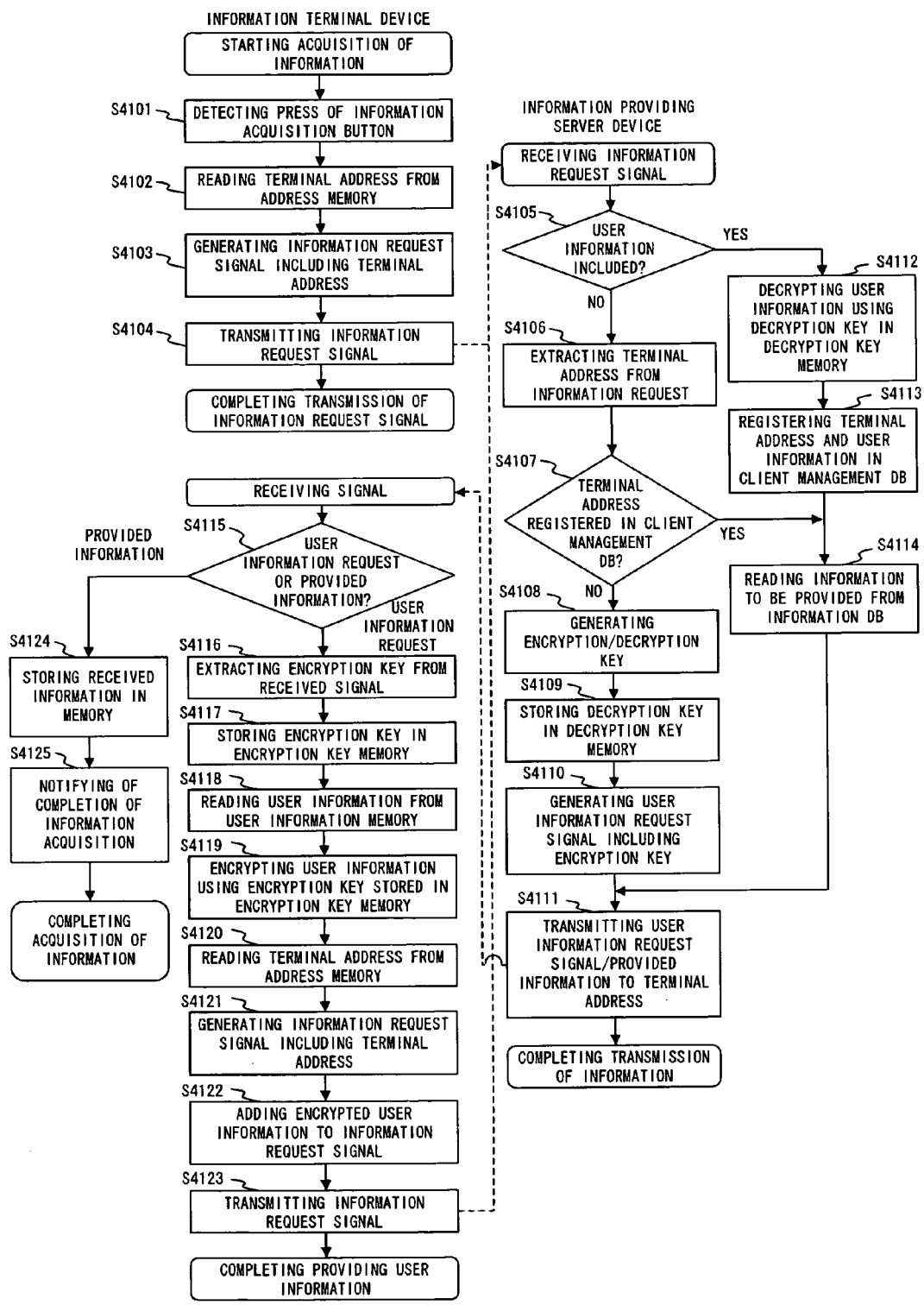
F I G. 4 1

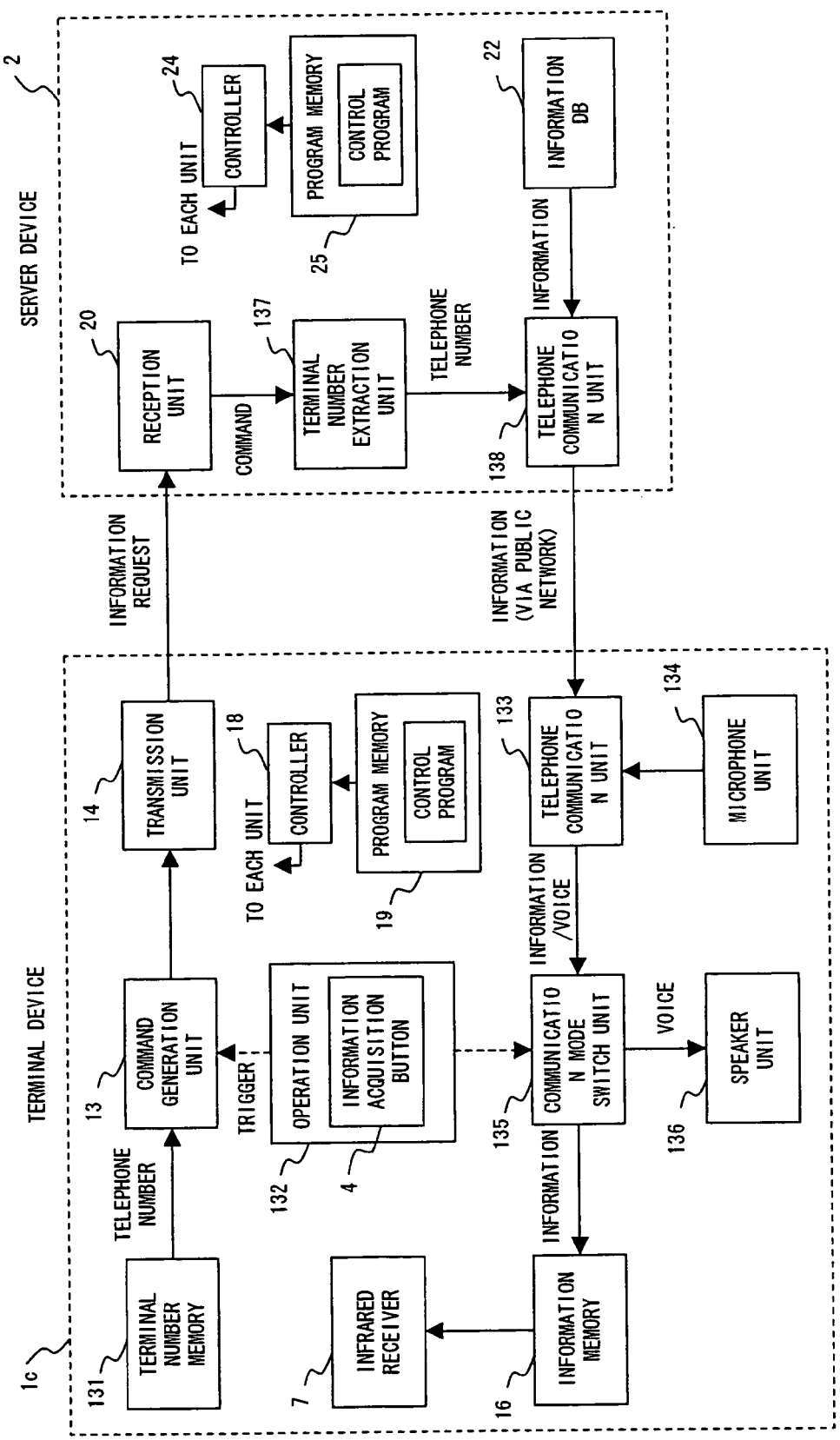
F I G. 44

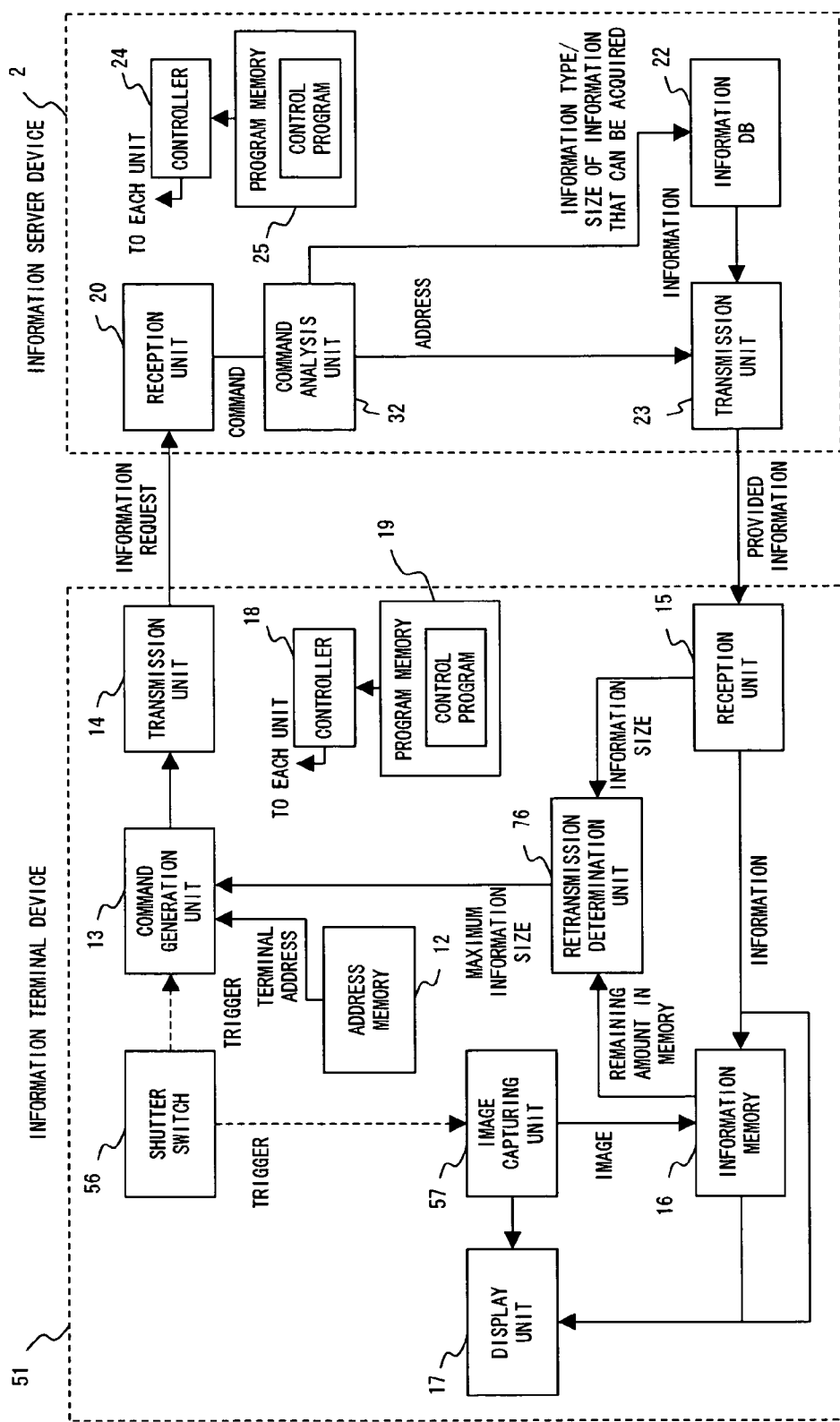
F I G. 50

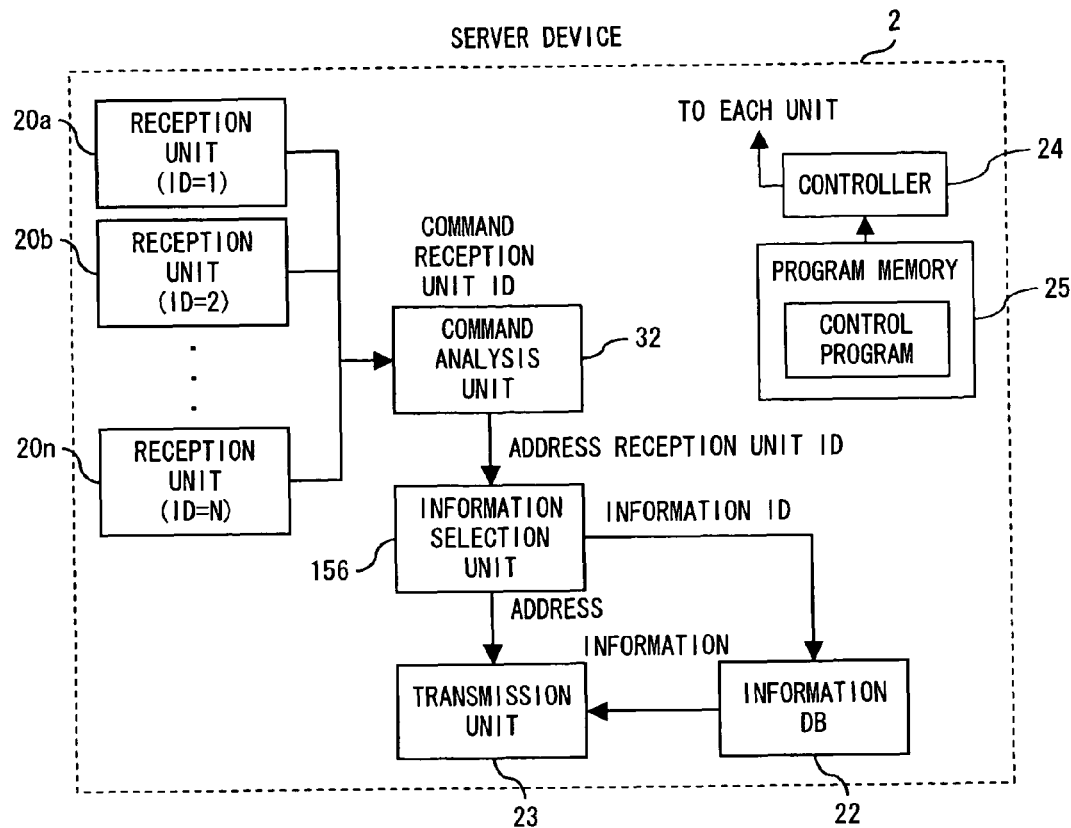
F I G. 51A
| RECEPTION UNIT ID | PROVIDED INFORMATION ID |
|---|---|
| 1 | Info-1 |
| 2 | Info-1 |
| 3 | Info-2 |
| 4 | Info-2 |
| 5 | Info-2 |
| 6 | Info-3 |
| ⋮ | ⋮ |
| N | Info-M |
F I G. 51B

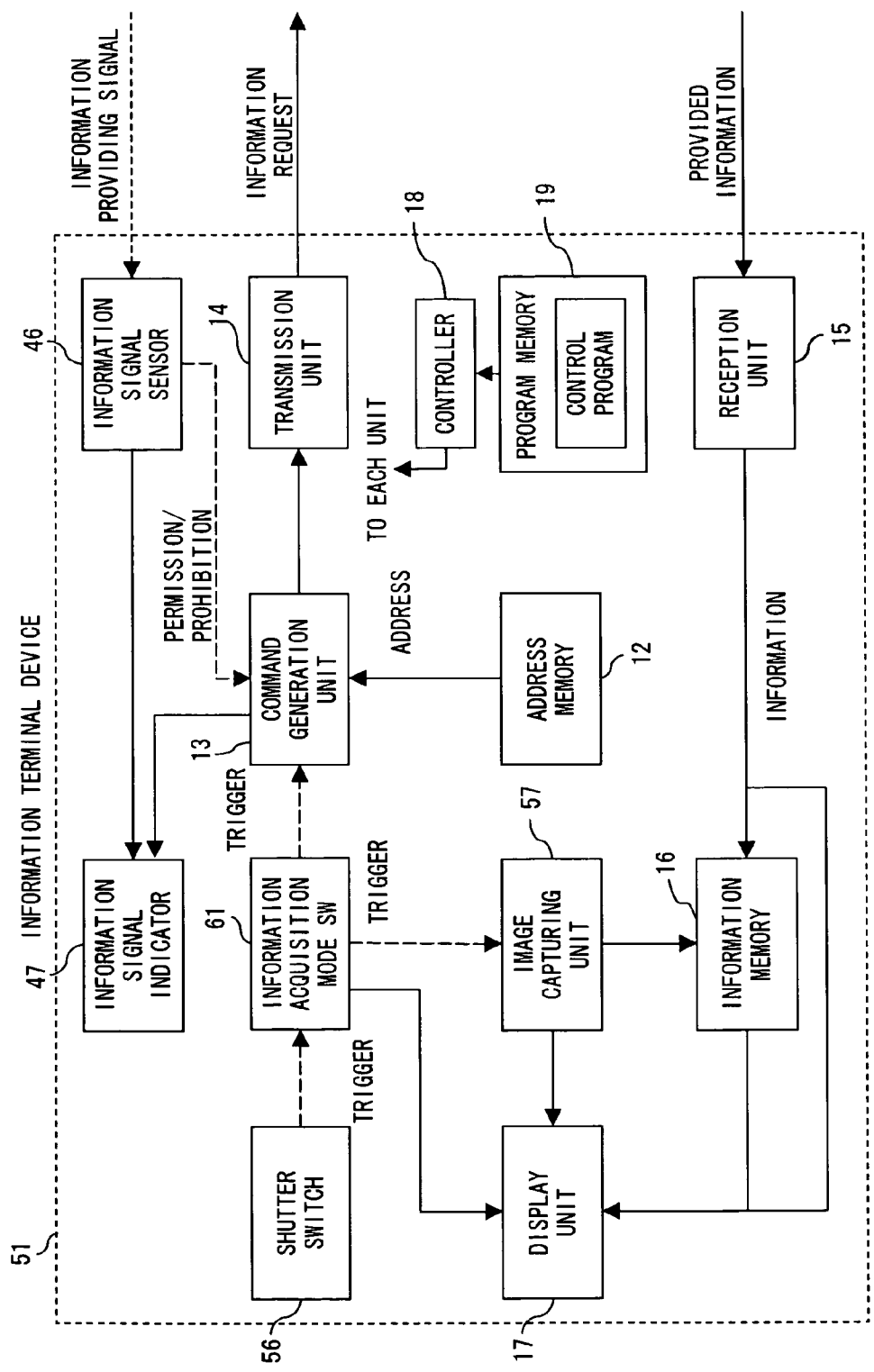
F I G. 5 3

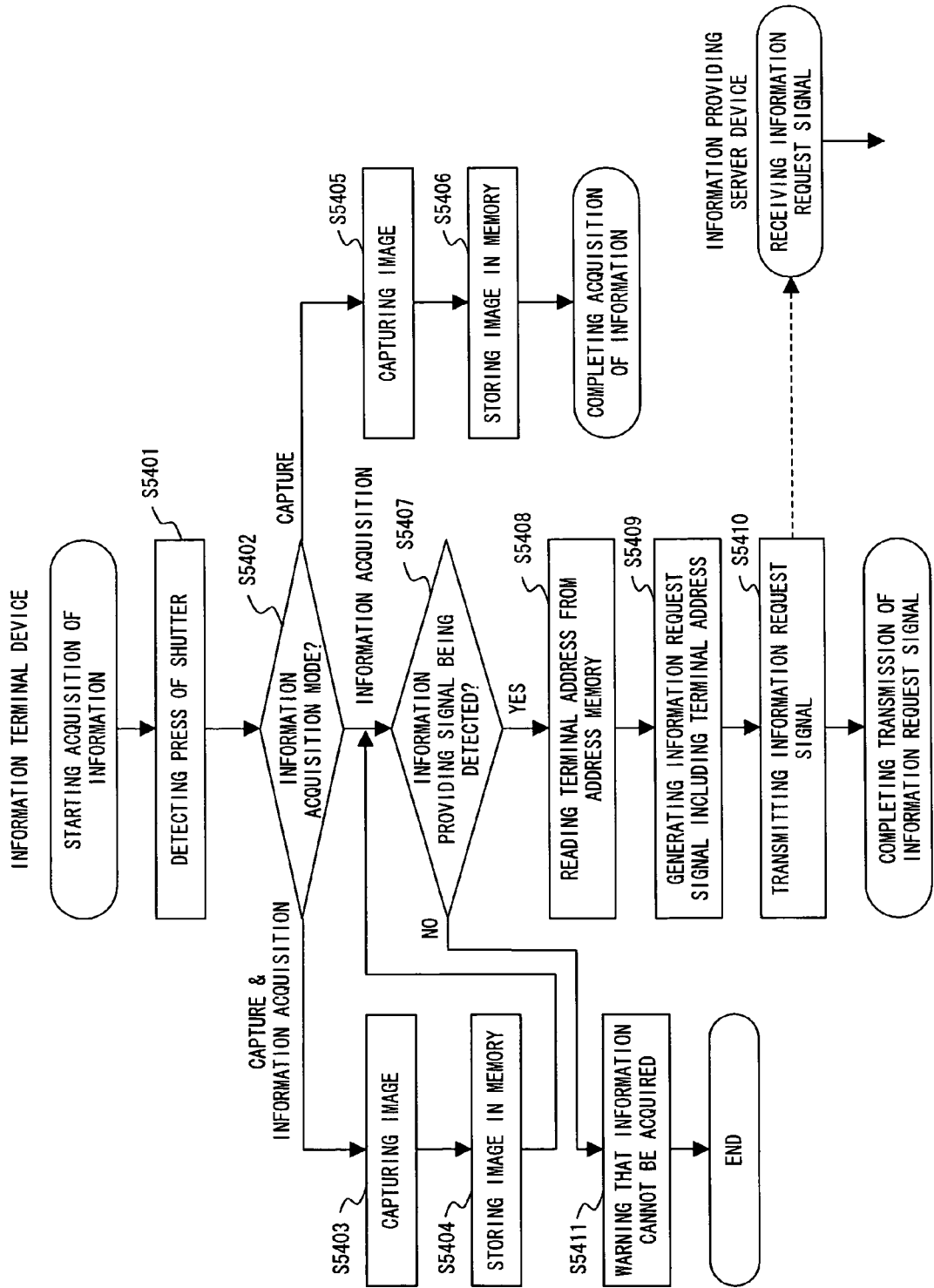
F I G. 54

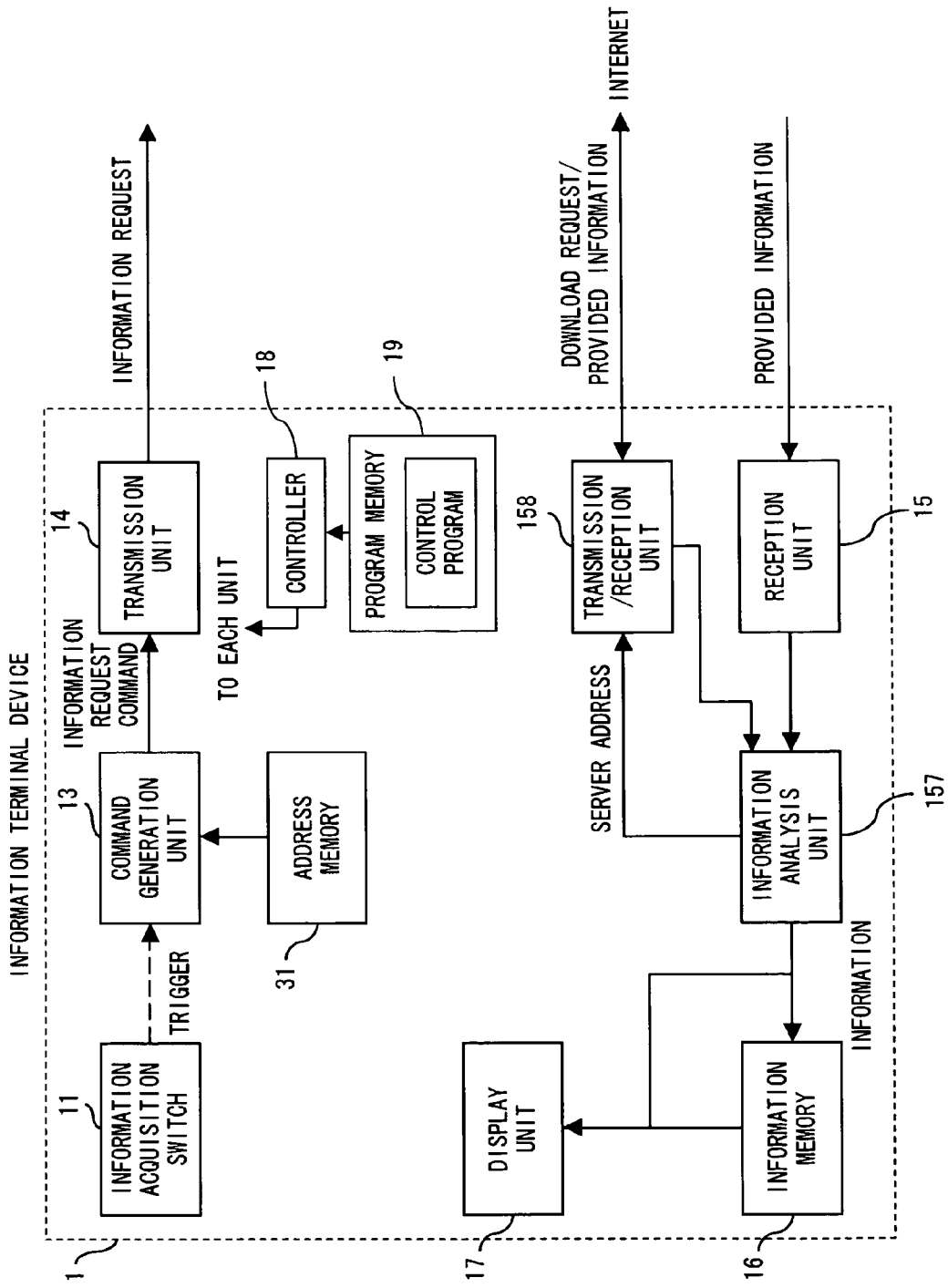
F I G. 5 5

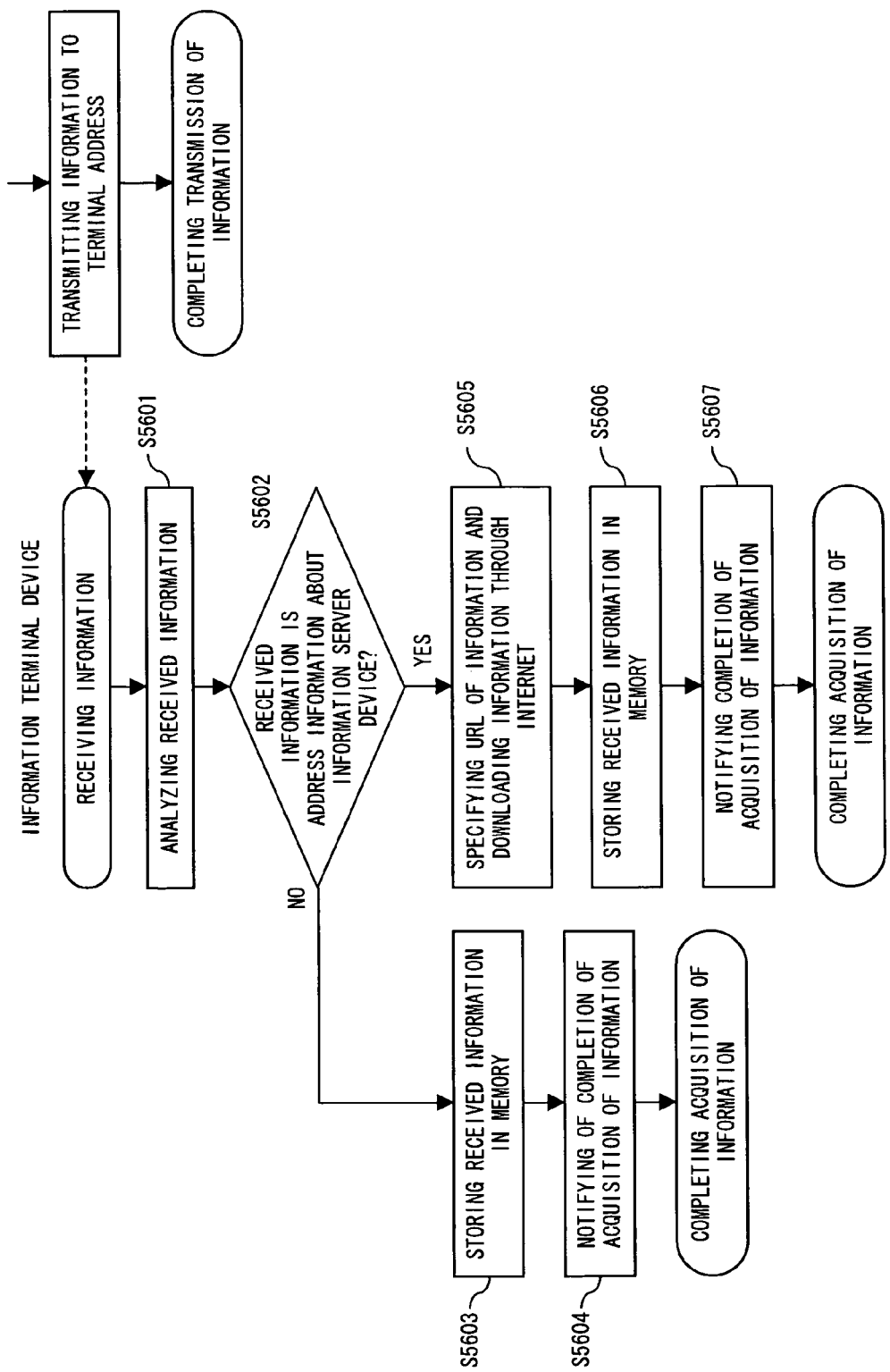
F I G. 5 6

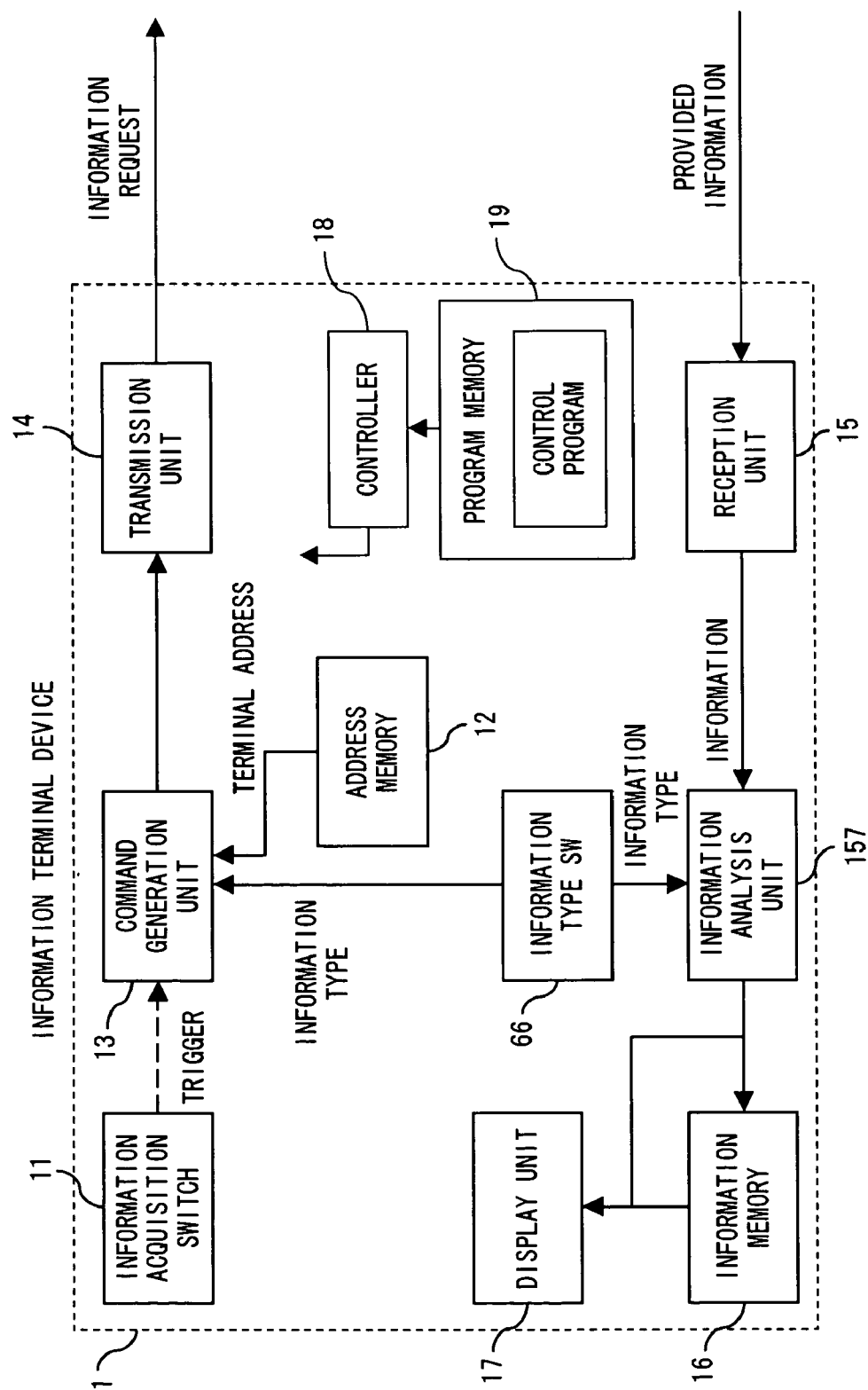
F I G. 5 7

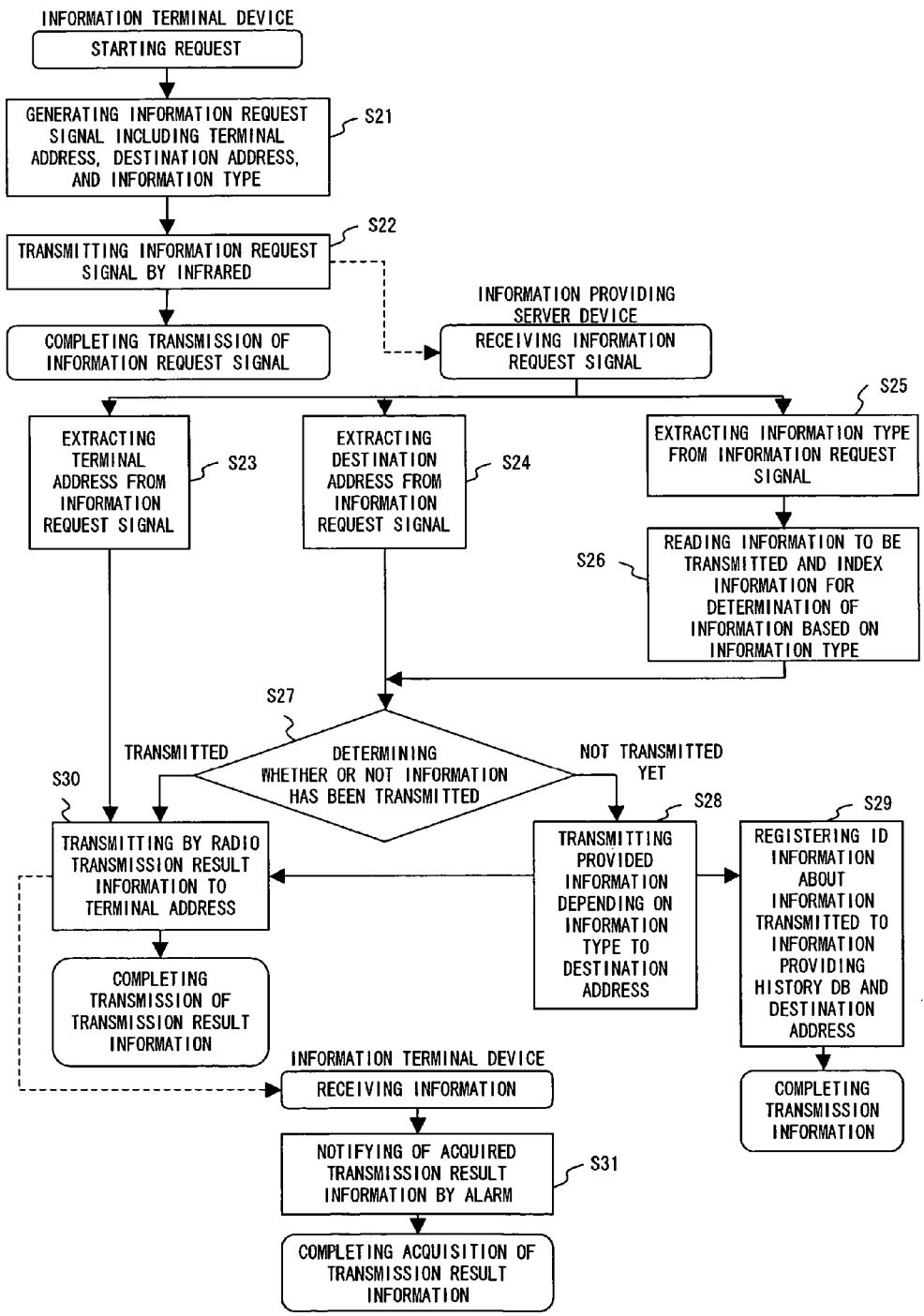
F I G. 63

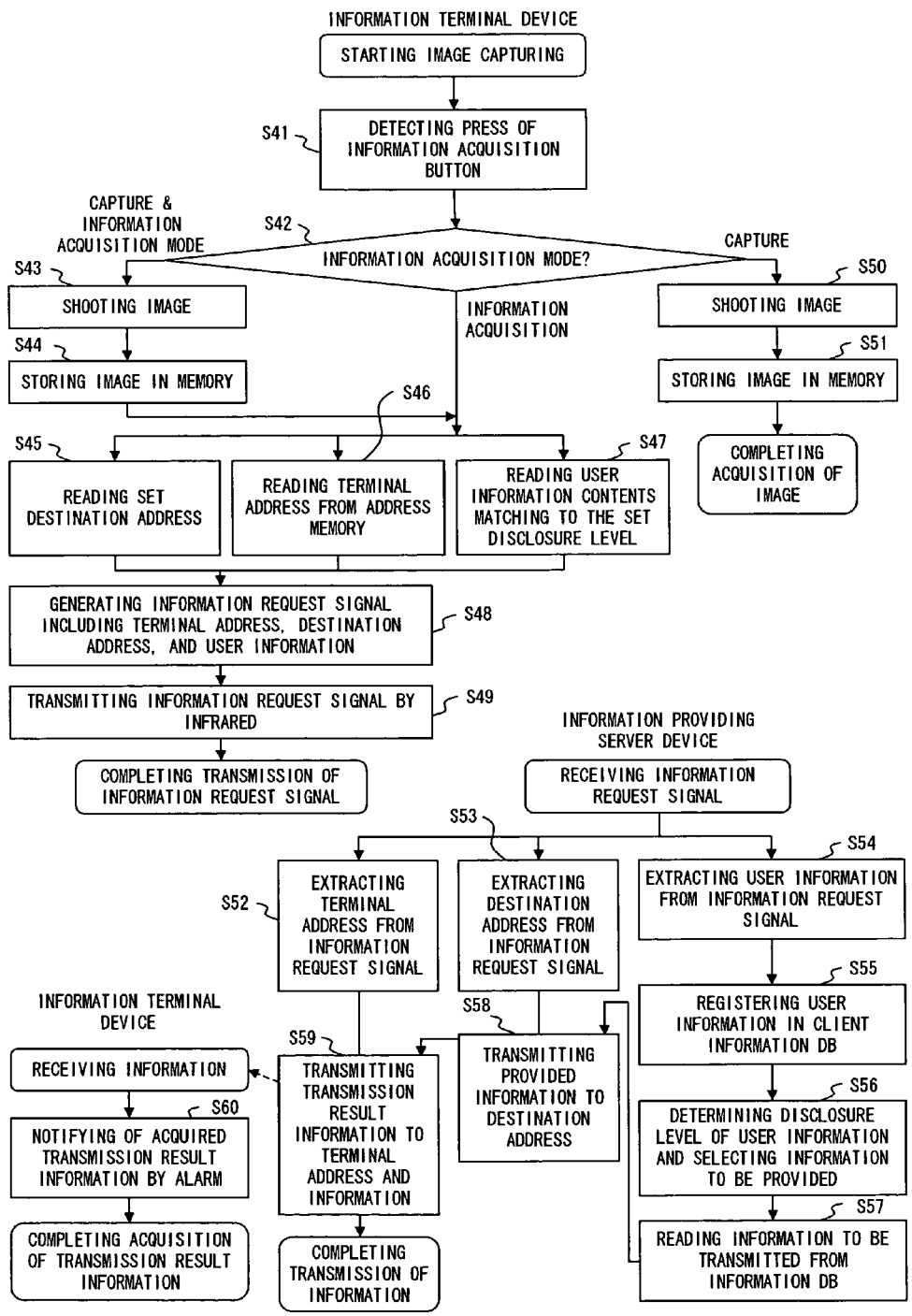
F I G. 65

INFORMATION ACQUISITION DEVICE, INFORMATION PROVIDING DEVICE, AND INFORMATION PROVIDING SYSTEM

TECHNICAL FIELD

The present invention relates to an information acquisition device for acquiring information, an information providing device for providing information, and an information providing system including the devices.

BACKGROUND ART

Conventionally, a device for acquiring information can be a radio, television, etc. for receiving a broadcast, a telephone, a FAX, etc. for directly accessing a specific information source. Recently, with the widespread use of the Internet, digital information such as text, audio, images, etc. can be acquired from all over the world using a PC (personal computer), etc. only by specifying a URL (uniform resource locator) of a predetermined Web site.

Furthermore, there is a common method of acquiring information without using the communication media by participating in an event such as an exhibition, a seminar, etc. In these festivals, information is provided as printed matters such as a catalog, a written material, etc.

A patent document 1 proposes a system of acquiring information using a mobile information terminal for use by each visitor at an event place.

When information is acquired over a communication network such as the Internet, a telephone network, etc., it is necessary for a user to acquire information for designation of an information source such as an URL of a Web site, a telephone number, etc., and it is a laborious operation to acquire such information.

On the other hand, in an event place, an exhibiter, etc. has to estimate a large number of visitors and prepare a large number of materials. Therefore, the load of the cost of the free materials has been considerably heavy for exhibiters. When a visitor collects information, he or she searches for and collects paper printed materials from a number of exhibiter booths, and brings them home. Therefore, the visitor requires a long time and much labor. Additionally, to store the collected materials as files, the file storage space has to be prepared. Although electronic file storage has been devised, but the labor for the electronic process also needs much work.

The system proposed in the patent document 1 is realized by totally managing the mobile information terminals, etc. provided for each visitor by the organizer of the event. Using the terminal, desired information can be acquired as electronic data. However, if a terminal is not controlled by the system, the system is unavailable.

The present invention has been developed to solve the above-mentioned problems, and aims at providing an information acquisition device capable of easily and freely acquiring information without specific management or information for designating by an information requester an information source such as an URL, a telephone number, etc., an information providing device capable of providing information for one or more unspecified information requesters located close to one another, and an information providing system including the devices.

Patent Document 1: Japanese Published Patent Application No. 2000-115845

DISCLOSURE OF THE INVENTION

The information acquisition device according to the first aspect of the present invention is configured as an information acquisition device which acquires digital information functioning by executing a control program stored in program memory, and includes: a first transmission unit having directivity and transmitting by wireless an information request signal to be transmitted in a direction of the directivity; an information addition unit adding at least one piece of address information to the information request signal to be transmitted; a reception unit receiving a radio signal transmitted by wireless in response to the information request signal transmitted by the first transmission unit, and acquiring information contained in the signal; an information storage unit which is built in the information acquisition device or attached to the device as removable from the device, and can store all or a part of information acquired by the reception unit; and an operation unit issuing an instruction to start an information requesting operation. The reception unit has no directivity or has broader directivity than the first transmission unit.

The information acquisition device according to the second aspect of the present invention is based on the first aspect, and is configured such that the first transmission unit transmits by wireless a signal using an electromagnetic wave including light and a sound wave including ultrasonic.

The information acquisition device according to the third aspect of the present invention is based on the second aspect, and configured such that an address added by the information addition unit to an information request signal is an own address as an address of the reception unit of the information acquisition device.

The information acquisition device according to the fourth aspect of the present invention is based on the third aspect, and configured such that the address added by the information addition unit to an information request signal includes an address different from the address of the reception unit of the information acquisition device.

The information acquisition device according to the fifth aspect of the present invention is based on the third aspect, and configured to further include an information presentation unit presenting all or a part of information stored in the information storage unit or information acquired by the reception unit.

The information acquisition device according to the sixth aspect of the present invention is based on the fifth aspect, and is configured to further include an information transmission unit externally transmitting information stored in the information storage unit or the information acquired by the reception unit.

The information acquisition device according to the seventh aspect of the present invention is based on the sixth aspect, and is configured to further include a selection unit selecting the information stored in the information storage unit. The information transmission unit externally transmits the information selected by the selection unit.

The information acquisition device according to the eighth aspect of the present invention is based on the sixth aspect, and is configured such that the information transmission unit transmits information to an address indicating a predetermined destination.

The information acquisition device according to the ninth aspect of the present invention is based on the fifth aspect, and is configured to further include a setting unit setting information relating to a type of information received and acquired by the reception unit. The information addition unit further adds information relating to a type of information set by the setting unit to the signal to be transmitted.

The information acquisition device according to the tenth aspect of the present invention is based on the ninth aspect, and is configured to further include an information screen unit screening the information received by the reception unit. The information to be acquired is screened by the information screen unit from the information received by the reception unit, and the screened information is stored in the information storage unit.

The information acquisition device according to the eleventh aspect of the present invention is based on the tenth aspect, and is configured such that screening standards of the information screened by the information screen unit designate a type of information set by the setting unit, and only the information of the type set by the setting unit is stored in the information storage unit.

The information acquisition device according to the twelfth aspect of the present invention is based on the ninth aspect, and is configured such that the information relating to the type of identification relates to at least one of a size of information, a type of information, a style of information, a file format of information, and a content of information.

The information acquisition device according to the thirteenth aspect of the present invention is based on the ninth aspect, and is configured such that the information relating to a type of information refers to information indicating the same target and a different type of information size.

The information acquisition device according to the fourteenth aspect of the present invention is based on the thirteenth aspect, and is configured such that the information relating to a type of information includes information relating to at least one piece of common information, summary information obtained by summarizing the common information, and address information in a network containing information.

The information acquisition device according to the fifteenth aspect of the present invention is based on the fifth aspect, and is configured to further include: a server address extraction unit extracting a server address designating an information providing source contained in the information acquired by the reception unit; and a second transmission unit transmitting a signal in a style different from a style of the first transmission unit.

The information acquisition device according to the sixteenth aspect of the present invention is based on the fifteenth aspect, and is configured such that the second transmission unit transmits by wireless a signal using an electromagnetic wave including light and a sound wave including ultrasonic, and the signal transmitted by wireless from the second transmission unit has no directivity or has broader directivity than the signal transmitted by the first transmission unit.

The information acquisition device according to the seventeenth aspect of the present invention is based on the sixteen aspect, and is configured such that when the information received by the reception unit is address information in a network in which the information exists, the second transmission unit transmits an information request signal to the server address extracted by the server address extraction unit.

The information acquisition device according to the eighteenth aspect of the present invention is based on the sixteenth aspect, and is configured to further include: a selection unit selecting at least an information item from the information presented by the information presentation unit; and an ID information addition unit adding information ID designating information corresponding to the information item selected by the selection unit to the signal to be transmitted. The first transmission unit or the second transmission unit transmits the signal to be transmitted.

The information acquisition device according to the nineteenth aspect of the present invention is based on the fifth aspect, and is configured to further include a warning unit giving a warning when the information acquired by the reception unit is incomplete or when it is determined that information cannot be completely acquired.

The information acquisition device according to the twentieth aspect of the present invention is based on the sixteenth aspect, and is configured such that the first transmission unit or the second transmission unit retransmits the signal to be transmitted when the information acquired by the reception unit is incomplete or when it is determined that information cannot be completely acquired.

The information acquisition device according to the twenty-first aspect is based on the nineteenth aspect, and is configured such that the warning unit gives a warning when a size of the information acquired by the reception unit exceeds a predetermined size or a free storage capacity of the information storage unit.

The information acquisition device according to the twenty-second aspect is based on the nineteenth aspect, and is configured such that the warning unit gives a warning when the information received and acquired by the reception unit relates to a size of continually transmitted information, and the size of the information exceeds a predetermined size or a free storage capacity of the information storage unit.

The information acquisition device according to the twenty-third aspect is based on the twentieth aspect, and is configured such that when the information acquired by the reception unit exceeds a predetermined size or a free storage capacity of the information storage unit, the information is automatically changed to the information relating to a type of information of a smaller size, the information addition unit adds the information relating to the type of information to the signal to be transmitted, and the first transmission unit or the second transmission unit retransmits the added signal to be transmitted.

The information acquisition device according to the twenty-fourth aspect is based on the fifth aspect, and is configured to further include an information size setting unit setting a maximum value of a size of information that can be received and acquired by the reception unit. The information addition unit further adds information relating to the maximum value of the size of the information that can be acquired and is set by the information size setting unit to the signal to be transmitted.

The information acquisition device according to the twenty-fifth aspect is based on the twenty-fourth aspect, and is configured such that the information size setting unit automatically sets the maximum value of the size of the information that can be acquired based on the free storage capacity of the information storage unit.

The information acquisition device according to the twenty-sixth aspect is based on the fifth aspect, and is configured to further include a user information storage unit storing information relating to a user of the information acquisition device. The information addition unit further adds the information relating to the user which is stored in the user information storage unit to the signal to be transmitted.

The information acquisition device according to the twenty-seventh aspect is based on the fifth aspect, and is configured to further include an equipment information storage unit storing equipment information about the information acquisition device. The information addition unit further adds the equipment information about the information acquisition device stored in the equipment information storage unit to the signal to be transmitted.

The information acquisition device according to the twenty-eighth aspect is based on the twenty-seventh aspect, and is configured such that the equipment information contains at least one or more of a maker name of the information acquisition device, a model number, a product serial number, and version information about firmware.

The information acquisition device according to the twenty-ninth aspect is based on the fifth aspect, and is configured to further include an information acquisition history storage unit storing information designation information designating the information received by the reception unit; and an acquired information determination unit determining whether or not information newly received by the reception unit is acquired according to the information designation information about the newly received information. The information storage unit stores information determined by the acquired information determination unit that the information has not been acquired in the information received by the reception unit.

The information acquisition device according to the thirtieth aspect is based on the twenty-ninth aspect, and is configured such that the information designation information stored in the information acquisition history storage unit is information containing at least one of an address of a device which transmits the signal received by the reception unit and the information ID assigned to the information received by the reception unit.

The information acquisition device according to the thirty-first aspect is based on the fifth aspect, and is configured to further include a detection unit detecting that there is an information providing device capable of providing information for the information acquisition device in the direction of the directivity.

The information acquisition device according to the thirty-second aspect is based on the thirty-first aspect, and is configured such that the detection unit further includes: an issued signal reception unit receiving an issued signal from the information providing device; and a notification unit notifying of detection that there is the information providing device when the issued signal is received by the issued signal reception unit.

The information acquisition device according to the thirty-third aspect is based on the thirty-first aspect, and is configured such that when the detection unit does not detect presence of the information providing device, an information acquiring operation is not performed.

The information acquisition device according to the thirty-fourth aspect is based on the fifth aspect, and is configured such that a program update unit extracting a control program, and updating all or a part of the control program stored in the program memory to be updated based on the control program when the control program of the information acquisition device is contained in the signal received by the reception unit.

The information acquisition device according to the thirty-fifth aspect is based on the thirty-fourth aspect, and is configured to include: an unreasonable program check unit detecting whether or not an unreasonable program is contained in the information acquired by the reception unit; an unreasonable program warning unit giving a warning when it is detected by the unreasonable program check unit that an unreasonable program is contained in the information acquired by the reception unit; and an unreasonable program deletion unit deleting acquired information when it is detected by the unreasonable program check unit that an unreasonable program is contained in the information acquired by the reception unit.

The information acquisition device according to the thirty-sixth aspect is based on the fifth aspect, and is configured to further include an encryption unit encrypting all or a part of the information added by the information addition unit to the signal to be transmitted using an encryption key contained in the information received and acquired by the reception unit.

The information acquisition device according to the thirty-seventh aspect is based on the thirty-sixth aspect, and is configured such that the information addition unit further adds the encryption key request information to the signal to be transmitted.

The information acquisition device according to the thirty-eighth aspect is based on the fifth aspect, and is configured to further include: an encryption key generation unit generating an encryption key and a decryption key; and a decryption unit decrypting encrypted information contained in the signal received by the reception unit using the decryption key. The information addition unit adds an encryption key generated by the encryption key information generation unit to the signal to be transmitted.

The information acquisition device according to the thirty-ninth aspect is based on the fifth aspect, and is configured such that the reception unit further includes a communication unit using a public network capable of receiving, regenerating, and communicating common voice through the public network.

The information acquisition device according to the fortieth aspect is based on the fifth aspect, and is configured to further include an image capturing unit obtaining image data by capturing a subject image in the same direction as the directivity direction of the signal transmitted by the first transmission unit. The information storage unit stores the image data captured by the image capturing unit in addition to the information acquired by the reception unit. The information presentation unit presents all or a part of the information or image data stored in the information storage unit, the information acquired by the reception unit, or the image data captured by the image capturing unit.

The information acquisition device according to the forty-first aspect is based on the fortieth aspect, and is configured to further include: a mode setting unit setting at least one of a mode of acquiring only information, a mode of acquiring only an image, and a mode of acquiring both information and an image; and a mode switch unit switching a mode set by the mode setting unit.

The information acquisition device according to the forty-second aspect is based on the fortieth aspect, and is configured to further include an information transmission unit externally transmitting the information or image data stored in the information storage unit, the information acquired by the reception unit, or the image data captured by the image capturing unit.

The information acquisition device according to the forty-third aspect is based on the forty-second aspect, and is configured to further include a selection unit selecting the information or the image data stored in the information storage unit. The information transmission unit external transmits the information or the image data selected by the selection unit.

The information acquisition device according to the forty-fourth aspect is based on the forty-third aspect, and is configured such that the information transmission unit transmits information to an address indicating a predetermined destination.

The information acquisition device according to the forty-fifth aspect is based on the fortieth aspect, and is configured to further include a setting unit setting information relating to a type of information received and acquired by the reception unit. The information addition unit further adds information relating to a type of information set by the setting unit to the signal to be transmitted.

The information acquisition device according to the forty-sixth aspect is based on the forty-fifth aspect, and is configured to further include an information screen unit screening the information received by the reception unit. The information to be acquired is selected by the information screen unit from the information received by the reception unit, and the screened information is stored in the information storage unit.

The information acquisition device according to the forty-seventh aspect is based on the forty-sixth aspect, and is configured such that screening standards of the information screened by the information screen unit designate a type of information set by the setting unit, and only the information of the type set by the setting unit is stored in the information storage unit.

The information acquisition device according to the forty-eighth aspect is based on the forth-fifth aspect, and is configured such that the information relating to the type of information relates to at least one of a size of information, a type of information, a style of information, a file format of information, a content of information and a field of information.

The information acquisition device according to the forty-ninth aspect is based on the forth-fifth aspect, and is configured such that the information relating to a type of information refers to information indicating the same target and a different type of information size.

The information acquisition device according to the fiftieth aspect is based on the forth-ninth aspect, and is configured such that the information relating to a type of information includes information relating to at least one piece of common information, summary information obtained by summarizing the common information, and address information in a network containing information.

The information acquisition device according to the fifty-first aspect is based on the fortieth aspect, and is configured to further include: a server address extraction unit extracting a server address designating an information providing source contained in the information acquired by the reception unit; and a second transmission unit transmitting a signal in a style different from a style of the first transmission unit.

The information acquisition device according to the fifty-second aspect is based on the fifty-first aspect, and is configured such that the second transmission unit transmits by wireless a signal using an electromagnetic wave including light and a sound wave including ultrasonic, and the signal transmitted by wireless from the second transmission unit has no directivity or has broader directivity than the signal transmitted by the first transmission unit.

The information acquisition device according to the fifty-third aspect is based on the fifty-second aspect, and is configured such that when the information received by the reception unit is the address information in a network in which the information exists, the second transmission unit transmits an information request signal to the server address extracted by the server address extraction unit.

The information acquisition device according to the fifty-fourth aspect is based on the fifty-second aspect, and is configured to further include: a selection unit selecting at least an information item from the information presented by the information presentation unit; and an ID information addition unit adding information ID designating information corresponding to the information item selected by the selection unit to the signal to be transmitted. The first transmission unit or the second transmission unit transmits the signal to be transmitted.

The information acquisition device according to the fifty-fifth aspect is based on the fortieth aspect, and is configured to further include a warning unit giving a warning when the information acquired by the reception unit is incomplete or when it is determined that information cannot be completely acquired.

The information acquisition device according to the fifty-sixth aspect is based on the fifty-second aspect, and is configured such that the first transmission unit or the second transmission unit retransmits the signal to be transmitted when the information acquired by the reception unit is incomplete or when it is determined that information cannot be completely acquired.

The information acquisition device according to the fifty-seventh aspect is based on the fifty-fifth aspect, and is configured such that the warning unit gives a warning when a size of the information acquired by the reception unit exceeds a predetermined size or a free storage capacity of the information storage unit.

The information acquisition device according to the fifty-eighth aspect is based on the fifty-fifth aspect, and is configured such that the warning unit gives a warning when the information received and acquired by the reception unit relates to a size of continually transmitted information, and the size of the information exceeds a predetermined size or a free storage capacity of the information storage unit.

The information acquisition device according to the fifty-ninth aspect is based on the fifth-eighth aspect, and is configured such that when the size of the information acquired by the reception unit exceeds a predetermined size or a free storage capacity of the information storage unit, the information is automatically changed to the information relating to a type of information of a smaller size, the information addition unit adds the information relating to the type of information to the signal to be transmitted, and the first transmission unit or the second transmission unit retransmits the added signal to be transmitted.

The information acquisition device according to the sixtieth aspect is based on the fortieth aspect, and is configured to further include an information size setting unit setting a maximum value of a size of information that can be received and acquired by the reception unit. The information addition unit further adds information relating to the maximum value of the size of the information that can be acquired and is set by the information size setting unit to the signal to be transmitted.

The information acquisition device according to the sixty-first aspect is based on the sixtieth aspect, and is configured such that the information size setting unit automatically sets the maximum value of the size of the information that can be acquired based on the free storage capacity of the information storage unit.

The information acquisition device according to the sixty-second aspect is based on the fortieth aspect, and is configured to further include a user information storage unit storing information relating to a user of the information acquisition device. The information addition unit further adds the information relating to the user and stored in the user information storage unit to the signal to be transmitted.

The information acquisition device according to the sixty-third aspect is based on the fortieth aspect, and is configured to further include an equipment information storage unit storing equipment information about the information acquisition device. The information addition unit further adds the equipment information stored in the equipment information storage unit to the signal to be transmitted.

The information acquisition device according to the sixty-fourth aspect is based on the sixty-third aspect, and is configured such that the equipment information contains at least one or more of a maker name of the information acquisition device, a model number, a product serial number, and version information about firmware.

The information acquisition device according to the sixty-fifth aspect is based on the fortieth aspect, and is configured to further include: an information acquisition history storage unit storing information designation information designating the information received by the reception unit; and an acquired information determination unit determining whether or not information newly received has been acquired already according to the information designation information about the newly received information received by the reception unit. The information storage unit stores information determined by the acquired information determination unit that the information has not been acquired in the information received by the reception unit.

The information acquisition device according to the sixty-sixth aspect is based on the sixty-fifth aspect, and is configured such that the information designation information stored in the information acquisition history storage unit is information containing at least one of an address of a device which transmits the signal received by the reception unit and the information ID assigned to the information received by the reception unit.

The information acquisition device according to the sixty-seventh aspect is based on the fortieth aspect, and is configured to further include a detection unit detecting that there is an information providing device capable of providing information for the information acquisition device in the direction of the directivity.

The information acquisition device according to the sixty-eighth aspect is based on the sixty-seventh aspect, and is configured such that the detection unit further includes: an issued signal reception unit receiving an issued signal from the information providing device; and a notification unit notifying of detecting that there is the information providing device when the issued signal is received by the issued signal reception unit.

The information acquisition device according to the sixty-ninth aspect is based on the sixty-seventh aspect, and is configured such that when the detection unit does not detect presence of the information providing device, an information acquiring operation is not performed.

The information acquisition device according to the seventieth aspect is based on the sixty-seventh aspect, and is configured such that when the detection unit does not detect existence of the information providing device, and when the mode setting unit sets a mode of acquiring both information and an image, an image is captured only as in the mode of acquiring only an image.

The information acquisition device according to the seventy-first aspect is based on the fortieth aspect, and is configured to further include a program update unit extracting a control program, and updating all or a part of the control program stored in the program memory to be updated based on the control program when the control program of the information acquisition device is contained in the signal received by the reception unit.

The information acquisition device according to the seventy-second aspect is based on the seventy-first aspect, and is configured to further include: an unreasonable program check unit detecting whether or not an unreasonable program is contained in the information acquired by the reception unit; an unreasonable program warning unit giving a warning when it is detected by the unreasonable program check unit that an unreasonable program is contained in the information acquired by the reception unit; and an unreasonable program deletion unit deleting acquired information when it is detected by the unreasonable program check unit that an unreasonable program is contained in the information acquired by the reception unit.

The information acquisition device according to the seventy-third aspect is based on the fortieth aspect, and is configured to further include an encryption unit encrypting all or a part of the information added by the information addition unit to the signal to be transmitted using an encryption key contained in the information received and acquired by the reception unit.

The information acquisition device according to the seventy-fourth aspect is based on the seventy-third aspect, and is configured such that the information addition unit further adds the encryption key request information to the signal to be transmitted.

The information acquisition device according to the seventy-fifth aspect is based on the fortieth aspect, and is configured to further include: an encryption key generation unit generating an encryption key and a decryption key; and a decryption unit decrypting encrypted information contained in the signal received by the reception unit using the decryption key. The information addition unit adds an encryption key generated by the encryption key information generation unit to the signal to be transmitted.

The information acquisition device according to the seventy-sixth aspect is based on the fortieth aspect, and is configured such that the reception unit further includes a communication unit using a public network capable of receiving, regenerating, and communicating common voice through the public network.

The information providing device according to the seventy-seventh aspect is an information providing device capable of providing information at an information request from the information acquisition device according to at least one of the aspects 1 through 76, and is configured to include: an information database storing information to be provided; a first information reception unit receiving a request signal transmitted by wireless from the first transmission unit having the directivity of the information acquisition device; a request extraction unit extracting a destination address for designation of a destination of information from the request signal received by the first information reception unit; and a first information transmission unit transmitting by wireless the information to be provided read at the request signal from the information database to a destination address according to the address information extracted by the request extraction unit.

The information providing device according to the seventy-eighth aspect is based on the seventy-seventh aspect, and is configured such that the destination address extracted by the request extraction unit is an own address as an address of a reception unit receiving the provided information of the information acquisition device, and the first information transmission unit transmits by wireless the information to be provided read from the information database at the request signal to the own address.

The information providing device according to the seventy-ninth aspect is based on the seventy-eighth aspect, and is configured to further include a second information reception unit receiving the signal transmitted by wireless from the second transmission unit of the information acquisition device in addition to the first information reception unit. The first information transmission unit transmits the address of second information reception unit to the destination address extracted by the request extraction unit.

The information providing device according to the eightieth aspect is based on the seventy-eighth aspect, and is configured to further include an ID information extraction unit extracting information ID designating information from the request signal received by the first information reception unit or the second information reception unit. When the ID information extraction unit extracts the information ID from the request signal, the first information transmission unit transmits by wireless the information corresponding to the information ID stored in the information database, and when the ID information extraction unit does not extract the information ID from the request signal received by the first information reception unit, the first information transmission unit transmits by wireless predetermined information stored in the information database.

The information providing device according to the eighty-first aspect is based on the eightieth aspect, and is configured such that when the information ID is not extracted from the request signal received by the first information reception unit, the first information transmission unit transmits by wireless index information about information which can be provided and stored in the information database.

The information providing device according to the eighty-second aspect is based on the seventy-seventh aspect, and is configured to further include an information type extraction unit extracting the information relating to the type of the requested information from the request signal received by the first information reception unit. The first information transmission unit transmits by wireless the information read from the information database according to the information relating to the type of information extracted by the information type extraction unit.

The information providing device according to the eighty-third aspect is based on the seventy-seventh aspect, and is configured to further include an encryption unit encrypting the information transmitted by the first information transmission unit.

The information providing device according to the eighty-fourth aspect is based on the seventy-seventh aspect, and is configured to further include a signal transmission unit transmitting by wireless a signal for notification that information can be provided.

The information providing device according to the eighty-fifth aspect is based on the seventy-seventh aspect, and is configured such that the first information reception unit includes a plurality of reception units and an information selection unit selecting information to be provided corresponding to each reception unit. The first information transmission unit transmits the information stored in the information database selected by the information selection unit.

The information providing device according to the eighty-sixth aspect is based on the seventy-eighth aspect, and is configured to further include: an equipment information extraction unit extracting equipment information about the information acquisition device from the request signal received by the first information reception unit; and a program information database storing a control program controlling and operating a device. The first information transmission unit transmits a control program corresponding to the equipment information stored in the program information database according to the equipment information extracted from the request signal.

The information providing device according to the eighty-seventh aspect is based on the seventy-seventh aspect, and is configured such that the request extraction unit further extracts user information from a signal received by the first information reception unit, and the first information transmission unit transmits the information to be provided read corresponding to the user information from the information database to the address extracted by the request extraction unit.

The information providing device according to the eighty-eighth aspect is based on the eighty-seventh aspect, and is configured to further include: a user information determination unit determining a level of the user information from the user information extracted by the request extraction unit; and a user information database storing the user information extracted by the request extraction unit. The information transmitted by the first information transmission unit to the destination address extracted by the request extraction unit is read from the information database corresponding to the level of the user information determined by the user information determination unit.

The information providing device according to the eighty-ninth aspect is based on the seventy-eighth aspect, and is configured to further include: an encryption key information generation unit generating an encryption key and a decryption key; and a decryption unit decrypting encrypted information contained in the signal received by the first information reception unit or the second information reception unit by the decryption key. The first information transmission unit transmits an encryption key generated by the encryption key information generation unit to the destination address according to the address information extracted by the request extraction unit.

The information providing device according to the ninetieth aspect is based on the seventy-seventh aspect, and is configured to further include: an information providing history database storing a destination address when the first information transmission unit transmits information to be provided to the destination address; and a determination unit determining whether or not a destination address extracted by the request extraction unit is stored in the information providing history database. The first information transmission unit transmits or does not transmit predetermined information read from the information database to a destination address extracted from the request extraction unit depending on a determination result by the determination unit.

The information providing device according to the ninety-first aspect is based on the seventy-seventh aspect, and is configured such that the destination address to which the first information transmission unit transmits information to be provided and ID information about the information to be provided for designation of the information to be provided are associated with and stored in the information providing history database; the determination unit determines whether or not the destination address extracted by the request extraction unit and the ID information about the information to be provided read from the information database are associated with and stored in the information providing history database, and the first information transmission unit transmits or does not transmit request information read from the information database to a destination address extracted from the request extraction unit depending on a determination result by the determination unit.

The information providing device according to the ninety-second aspect is based on the seventy-seventh aspect, and is configured to further include a second information transmission unit different from the first information transmission unit. The request extraction unit extracts an own address from the signal received by the first information reception unit and a second address different from the own address. The second information transmission unit transmits the information to be provided read from the information database and the information extracted from the request extraction unit using the second address as a destination address. The first information transmission unit transmits, to the own address, transmission result information notifying that the information to be provided has been transmitted to the destination address of the information extracted by the request extraction unit.

The information providing device according to the ninety-third aspect is based on the ninety-second aspect, and is configured such that when a destination address designating a destination of information different from the own address is not contained in the signal received by the first information reception unit, the first information transmission unit transmits the information to be provided to the own address extracted by the request extraction unit.

The information providing device according to the ninety-fourth aspect is based on the seventy-seventh aspect, and is configured to further include: a third information transmission unit different from the first information transmission unit; and a third information reception unit receiving a returned signal in response to a signal transmitted by the third information transmission unit. The request extraction unit extracts request information contained in the signal received by the first information reception unit. The third information transmission unit transmits a second request signal containing the information request to a predetermined address. The third information reception unit receives a returned signal in response to the second request signal. The first information transmission unit transmits the information contained in the returned signal received by the third information reception unit to the destination address.

The information providing device according to the ninety-fifth aspect is based on the ninety-fourth aspect, and is configured such that: the request extraction unit further extracts information relating to a type of information from the signal received by the first information reception unit; the third information transmission unit transmits a information request signal containing the information relating to the type of information to a second information providing device capable of providing information corresponding to the information relating to the type of information when the information corresponding to the information relating to the type of information extracted by the request extraction unit is not stored in the information database; and when the information corresponding to the information relating to the type of information transmitted by the second information providing device is received by the third information reception unit, the first information transmission unit transmits the information corresponding to the information relating to the type of information to the destination address extracted by the request extraction unit.

The information providing device according to the ninety-sixth aspect is based on the ninety-fourth aspect, and is configured such that: the request extraction unit further extracts the equipment information about a source of the signal received by the first information reception unit; when the information corresponding to the equipment information extracted by the request extraction unit is stored in the information database, the third information transmission unit transmits the information read from the information database corresponding to the equipment information and predetermined information read from the information database to the destination address extracted by the request extraction unit; or when the information corresponding to the equipment information extracted by the request extraction unit is not stored in the information database, the third information transmission unit transmits the information request signal containing the equipment information to the second information providing device capable of providing the information corresponding to the equipment information; and when the information corresponding to the equipment information transmitted by the second information providing device is received by the third information reception unit, the first information transmission unit transmits the information corresponding to the equipment information and the predetermined information read from the information database to the destination address extracted by the request extraction unit.

The information providing device according to the ninety-seventh aspect is based on the ninety-fifth aspect, and is configured to further include a device designation unit designating a second information providing device capable of providing information corresponding to the information relating to the type of information. The third information transmission unit transmits the information relating to the type of information to the second information providing device designated by the device designation unit.

The information providing device according to the ninety-eighth aspect is based on the ninety-sixth aspect, and is configured to further include a device designation unit designating a second information providing device capable of providing information corresponding to the equipment information. The third information transmission unit transmits the equipment information to the second information providing device designated by the device designation unit.

The information providing device according to the ninety-ninth aspect is based on the ninety-eighth aspect, and is configured such that the equipment information contains at least one or more of a maker name of the terminal equipment, a model number, a product serial number, and version information about firmware.

The information providing device according to the hundredth aspect is based on the seventy-seventh aspect, and is configured to further include an information modifying unit modifying the information transmitted by the first information transmission unit.

The information providing device according to the hundred-first aspect is based on the seventy-seventh aspect, and is configured such that the information modifying unit compresses or encrypts information.

The information providing system according to the hundred-second aspect is an information providing system having an information acquisition device which acquires digital information functioning by executing a control program stored in program memory, and an information providing device capable of providing information according to an information request from the information acquisition device. The information acquisition device includes: a first transmission unit having directivity and transmitting by wireless an information request signal to be transmitted in a direction of the directivity; an information addition unit adding at least one piece of address information to the information request signal to be transmitted; a reception unit having no directivity or having directivity broader than the first transmission unit, receiving a radio signal transmitted by wireless in response to the information request signal transmitted by the first transmission unit, and acquiring information contained in the signal; an information storage unit which is built in the information acquisition device or attached to the device as removable from the device, and can store all or a part of information acquired by the reception unit; and an operation unit issuing an instruction to start an information requesting operation. The information providing device includes: an information database storing information to be provided; a first information reception unit receiving a request signal transmitted by wireless from the first transmission unit having the directivity of the information acquisition device; a request extraction unit extracting a destination address for designation of a destination of information from the request signal received by the first information reception unit; and a first information transmission unit transmitting by wireless the information to be provided read at the request signal from the information database to a destination address according to the address information extracted by the request extraction unit. The reception unit and the first information transmission unit have no directivity or have broader directivity than the first transmission unit.

The information providing method according to the hundred-third aspect is an information providing method in an information providing system having an information acquisition device which acquires digital information and an information providing device capable of providing information at an information request from the information acquisition device. The information acquisition device performs: adding to an information request signal at least an address specifying a destination of information; transmitting by wireless the added information request signal as a signal having directivity in a directivity direction; the information providing device performs: receiving an information request signal transmitted by wireless in the directivity direction; extracting the address from the received information request signal; and transmitting by wireless information read at the information request signal from an information database storing information to be provided to the extracted address.

The information acquisition program according to the hundred-fourth aspect is an information acquisition program which is a computer program executed by an information acquisition device having: an information storage unit which is built in or freely attached and removed and stores information; a first transmission unit having directivity and transmitting by wireless an information request signal to be transmitted in a directivity direction; and a reception unit having no directivity or having broader directivity than the first transmission unit. An information request signal to be transmitted is generated. At least one piece of address information is added to the generated information request signal. The information request signal to which at least one piece of address information is added is transmitted from the first transmission unit in the directivity direction. The reception unit receives a radio signal transmitted by wireless in response to the information request signal transmitted from the first transmission unit. The storage unit stores all or a part of information contained in the signal.

The information providing program according to the hundred-fifth aspect is an information providing program as a computer program executed by a information providing device capable of providing information at an information request for at least one of the information acquisition device of aspect 1 through 76, including: an information database storing information to be provided; a first information reception unit receiving a request signal transmitted by wireless from a first transmission unit having the directivity of any information acquisition device at least according to claims 1 through 76; and a first information transmission unit transmitting information. A destination address designating a destination of information is extracted from the request signal received by the first information reception unit. The information to be provided read according to the request signal from the information database is transmitted by wireless from the first information transmission unit to the destination address according to the extracted address information.

In addition to the above-mentioned aspects, the present invention can be configured as an information providing system by combining the information acquisition device and the information providing device, can be configured as an information acquiring method or an information acquiring program of the information acquisition device, and can be configured as an information providing method or an information providing program of the information providing device.

BRIEF DESCRIPTION OF THE DRAWINGS

FIG. 1 shows an example of a terminal device and a server device included in an information providing system according to an embodiment 1 of the present invention;

FIG. 3 is a flowchart of an operation example of a terminal device and a server device in the first configuration example;

FIG. 4 shows the second example of a configuration;

FIG. 6 shows the third example of a configuration;

FIG. 8 is a flowchart of an operation example of a terminal device and a server device in the third configuration example;

FIG. 9 shows the fourth example of a configuration;

FIG. 11 shows the fifth example of a configuration;

FIG. 14 is a flowchart of an operation example of a terminal device and a server device in the sixth configuration example;

FIG. 15 shows an example of a terminal device having the function of capturing an image and a server device included in an information providing system;

FIG. 16 shows the seventh example of a configuration;

FIG. 19 is a flowchart of an operation example of a terminal device having the function of capturing an image and a server device in the seventh configuration example;

FIG. 24 shows the tenth example of a configuration;

FIG. 26 shows the eleventh example of a configuration;

FIG. 36 is a block diagram showing the fifteenth example of a configuration;

FIG. 37 is a flowchart of an operation example of a terminal device and a server device in the fifteenth configuration example;

FIG. 38 is a block diagram showing the sixteenth example of a configuration;

FIG. 39 is a flowchart of an operation example of a terminal device and a server device in the sixteenth configuration example;

FIG. 41 is a flowchart of an operation example of a terminal device and a server device in the seventeenth configuration example;

FIG. 44 is a block diagram showing the nineteenth example of a configuration;

FIG. 50 shows a variation example of the configuration shown in FIG. 26;

FIG. 51A shows a server device relating to the twenty-first configuration example;

FIG. 51B shows a correspondence example of a reception unit and information to be provided;

FIG. 53 shows a terminal device relating to the twenty-second configuration example;

FIG. 54 is a flowchart of the operation starting from a press of a shutter button up to the transmission of an information request signal, etc. as an operation example of the terminal device according to the twenty-second configuration example;

FIG. 55 shows a terminal device relating to the twenty-third configuration example;

FIG. 56 is a flowchart of the operation performed when information is received from the server device 2 as a destination of the information request signal transmitted by the terminal device as an operation example of the terminal device relating to the twenty-third configuration example;

FIG. 57 shows a terminal device relating to the twenty-fourth configuration example;

FIG. 63 is a flowchart of an operation example of a terminal device and a server device as the twenty-sixth configuration example;

FIG. 65 is a flowchart of an operation example of a terminal device and a server device as the twenty-seventh configuration example;

BEST MODE FOR CARRYING OUT THE INVENTION

Figure 2:
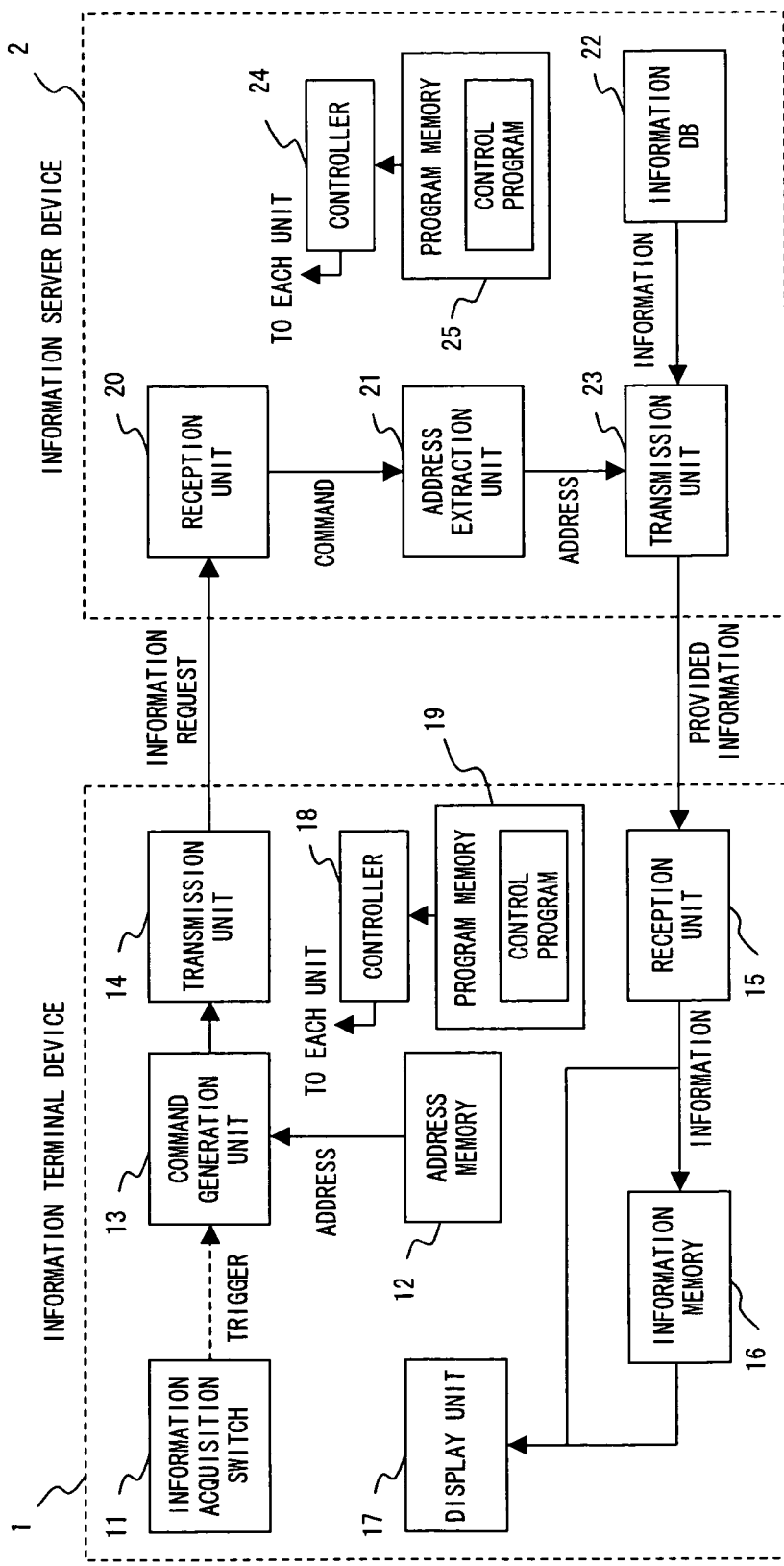
FIG. 2 shows the first example of a configuration.

The embodiments of the present invention are described below by referring to the attached drawings.

Embodiment 1

FIG. 1 shows an example of a portable information terminal device (hereinafter referred to simply as a terminal device) and an information providing server device (hereinafter referred to simply as a server device) included in an information providing system according to an embodiment 1 of the present invention.

In FIG. 1, a terminal device 1 acquires information from a predetermined server device 2, has a display 3 for displaying acquired information, etc., an information acquisition button 4 for issuing an instruction to start an information acquiring operation, and other components on the top surface of the device, has an infrared emitter 5 for transmitting by wireless an information request signal (infrared signal) and other components on the side surface of the device, and has a built-in antenna 6 for receiving information transmitted by wireless to the terminal device 1 and other components inside the device. The terminal device 1 is configured such that a signal to be transmitted by wireless from the infrared emitter 5 has the directivity in the direction of the infrared emitter 5, and a signal is transmitted by wireless in the direction of the infrared emitter 5 as the directivity direction.

In the present specifications, the term "wireless" is used to mean no use of a transmission line such as cable, optical fiber, etc.

The server device 2 provides information in response to an information request, stores information which can be provided in advance, and includes an infrared receiver 7 for receiving an information request signal (infrared signal) transmitted by wireless, an antenna 8 for transmitting to an address, etc. of an information requester by wireless the information extracted in response to the information request from the information stored in advance, and other components. The signal transmitted by wireless from the server device 2 can have directivity or no directivity. When it has directivity, the directivity is broader than the infrared emitter 5. The built-in antenna 6 of the terminal device 1 has no directivity or has directivity broader than the infrared emitter 5.

In the present system, the terminal device 1 is carried by a person requesting information (hereinafter referred to as an information requester), and the server device 2 is provided for a person who provides information (hereinafter referred to as an information provider).

An information provider requests to provide information widely for unspecified users such as an exhibitor participating a exhibition, a lecturer of a seminar, a sponsor of an exhibition, a seminar, etc., an eating place, a shop, etc. In this case, an exhibitor provides information about an exhibited article, etc., a lecturer provides information about the contents of a lecture, etc., a sponsor provides information about the contents of an event, etc., an eating place provides information about table availability, a recommended item, etc., a shop provides information about a bargain, etc.

In the present system, the basic operations performed when an information requester uses the terminal device 1 to acquire desired information from the server device 2 provided for an information provider are described below. First, the information requester presses the information acquisition button 4 with the infrared emitter 5 of the terminal device 1 directed to the infrared receiver 7 of the server device 2 which provides desired information. Then, the information request signal including the address of the terminal device 1 is transmitted by wireless from the infrared emitter 5 of the terminal device 1 to the server device 2. When the infrared receiver 7 of the server device 2 receives the information request signal, the information to be provided corresponding to the information request is extracted from the information stored in advance, and the information is transmitted by wireless to the address of the terminal device 1 of the information requester through the antenna 8. When the terminal device 1 receives the information through the built-in antenna 6, the information is stored and displayed on the display 3 as necessary. In this operation, the information requester can acquire desired information.

For example, in an exhibition, etc., when the server device 2 for providing information about an exhibited article, etc. is implemented for the exhibition booth of each exhibitor, and when an information requester is acquiring information about an exhibited article at the exhibition booth of a desired exhibitor, the information requester presses the information acquisition button 4 with the infrared emitter 5 of the terminal device 1 carried with the information requester directed to the infrared receiver 7 of the server device 2 provided by the exhibited article, thereby successfully acquiring the information.

For example, in place where a seminar is held, when the server device 2 for providing information about the contents of a lecture, etc. is provided, and when an information requester is acquiring information about the contents (for example, OHP data) of a lecture, etc. of a desired lecturer, the information requester only has to press the information acquisition button 4 with the infrared emitter 5 of the terminal device 1 directed to the lecturer stand into which the infrared receiver 7 of the server device 2 is incorporated. The information request signal issued from the infrared emitter 5 is received by the infrared receiver 7, and desired information is transmitted from the antenna 8 of the server device 2 to the terminal device 1 of the information requester.

For example, when the server device 2 for providing information about table availability (image of the current state in the place, etc.) and a recommended item is mounted in front of each eating place such as a restaurant, etc., and an information requester is acquiring the information about the table availability, etc. in front of a predetermined restaurant, the information can be successfully acquired by pressing the information acquisition button 4 with the infrared emitter 5 of the terminal device 1 carried by the information requester directed to the infrared receiver 7 incorporated into the information board mounted in front of the restaurant.

Thus, according to the present system, information can be distributed to unspecified general users close to a specific spot, and it is not necessary for an information requester to be informed in advance of the information designating an information provider such as a URL, a telephone number, etc., and the information can be easily and freely acquired without performing operations such as inputting information for designating a destination for acquisition of information, connecting to a network, etc. Furthermore, since it is not necessary to perform special management such as managing the terminal device 1, etc., a system can be applied widely to various fields. In addition, since a signal of narrow directivity is transmitted when an information request signal is transmitted from the terminal device 1, and information is received using an antenna having no directivity or almost no directivity in receiving a signal transmitted using an antenna having no directivity or almost no directivity when provided information is received, the information request signal can be transmitted exactly to a target product although a number of exhibited articles are arranged in an exhibition. Therefore, when information is received, the terminal device 1 can be directed to anywhere, and can be distant from the place of a product. When provided information is received, a signal is transmitted by wireless with no directivity from the server device 2 to the destination address of the terminal device 1. Accordingly, the terminal device 1 of a receiver can be placed anywhere within the range of the signal.

Described below in detail are the configuration and operation of the above-mentioned terminal device 1 and server device 2.

First described is the configuration of the terminal device 1 and the server device 2 as the first configuration example. This configuration example is a basic configuration of the terminal device 1 and the server device 2 included in the present system.

FIG. 2 shows the first configuration example.

In FIG. 2, the terminal device 1 includes: an information acquisition switch 11 which is turned on by a press of the information acquisition button 4 and outputs a trigger signal to a command generation unit 13; address memory 12 storing own address information (hereinafter referred to simply as an own address or a terminal address) indicating the own address of the terminal device 1; a command generation unit 13 for reading a terminal address from the address memory 12 when a trigger signal is input, and generating an information request signal including the terminal address; a transmission unit 14 for transmitting by wireless the information request signal generated by the command generation unit 13; a reception unit 15 for receiving a signal transmitted by wireless to the own address of the terminal device 1 through the built-in antenna 6, and acquiring the information contained in the signal; information memory 16 storing the information acquired by the reception unit 15; a display unit 17 for displaying on the display 3 all or a part of the information acquired by the 15, or all or a part of the information read from the information memory 16; and other components. The transmission unit 14 has directivity, and transmits by wireless a signal in the direction of the infrared emitter 5 as the directivity direction. The transmission unit 14 includes the infrared emitter 5, and the reception unit 15 includes the built-in antenna 6.

The terminal device 1 is also provided with a controller (CPU) 18, program memory 19 storing a control program, and other components. By the controller 18 executing the control program stored in the program memory 19, the operations (an operation of acquiring digital information, etc.) of the entire terminal device 1 are controlled.

On the other hand, the server device 2 includes: a reception unit 20 for receiving an information request signal transmitted by wireless through the infrared receiver 7; an address extraction unit 21 for extracting a terminal address from the information request signal received by the reception unit 20; an information DB (database) 22 storing information to be provided; a transmission unit 23 for transmitting by wireless a signal including the information read from the information DB 22 according to the information request signal to a terminal address extracted by the address extraction unit 21 through the antenna 8; and other components. The reception unit 20 includes the infrared receiver 7, and the transmission unit 23 includes the antenna 8.

The server device 2 is also provided with a controller (CPU) 24, program memory 25 storing a control program, and other components, and the operations of the entire server device 2 are controlled by executing the control program stored in the program memory 25.

FIG. 3 is a flowchart of an operation example of the terminal device 1 and the server device 2 in the first configuration example.

In FIG. 3, the processes in S301 through S304 and in S309 through S309 refer to the operations of the terminal device 1, and the processes in S305 through S307 refer to the operations of the server device 2.

First in S301, the infrared emitter 5 of the terminal device 1 is directed to the infrared receiver 7 of the server device 2, and a press of the information acquisition button 4 is detected. Thus, a trigger signal generated by turning on the information acquisition switch 11 is input to the command generation unit 13. In S302, a terminal address is read from the address memory 12 by the command generation unit 13. In S303, an information request signal including the terminal address read in the preceding step is generated. In S304, the information request signal to which the terminal address is added is transmitted by wireless by the transmission unit 14. In the processes in S301 through S304, the transmission of the information request signal by the terminal device 1 is completed.

When the information request signal transmitted by wireless from the terminal device 1 is received by the reception unit 20 of the server device 2, the address extraction unit 21 extracts a terminal address from the information request signal in S305. In S306, the information provided from the information DB 22 is read. In S307, the transmission unit 23 transmits by wireless a signal including the read information to the terminal address extracted in S305. In the processes in S305 through S307, the transmission of the signal including the information to be provided by the server device 2 is completed.

When the reception unit 15 of the terminal device 1 receives the signal including the provided information transmitted by wireless from the server device 2, the provided information is stored in the information memory 16, and the information is acquired in S308. In S309, a notification of the completion of the acquisition of information is issued. The notification is issued by turning on, turning off, or blinking the LED (not shown in the attached drawings) provided for the terminal device 1 or displaying the notification on the display 3, etc. Otherwise, from the start of replaying a confirmation tone by an audio alarm (not shown in the attached drawings) or receiving a signal until the storage of the provided information in the information memory 16, the LED can be turned on or blinked, and when the acquisition of information is completed, the LED can be turned off. Thus, for example, the information requester can be prevented from leaving an area where information can be received from the display 3 before the acquisition of information. In the processes in S308 and S309, the acquisition of information by the terminal device 1 is completed.

A signal informing that the acquisition of information has been completed can be transmitted to the server device 2 from the terminal device 1. Using the signal, the server device 2 can confirm that information is normally presented.

In the operation with the above-mentioned first configuration example, it is not necessary for the information requester to obtain the information designating an information provider such as a URL, a telephone number, etc. That is, desired information can be easily and freely acquired.

With the first configuration example, when the reception unit 15 receives provided information, all or part of the provided information can be displayed on the display 3. As necessary, all or part of the provided information stored in the information memory 16 can be displayed. Also in the configuration example, a trigger signal as an output of the information acquisition switch 11 is input to the command generation unit 13, but the trigger signal can be configured to be input to the controller 18, and the controller can output a signal of the acquisition of information to the command generation unit 13.

Also with the first configuration example, the address memory 12 can store in addition to the own address of the terminal device 1 at least one piece of other address information different from the own address of the terminal device 1 (hereinafter referred to simply as another address), the command generation unit 13 generates an information request signal including at least one of another addresses different from the own address of the terminal device 1 read from the address memory 12 in addition to the own address, and the transmission unit 14 can transmit by wireless the information request signal. In reply, the reception unit 20 of the server device 2 can receive the information request signal, the address extraction unit 21 can extract the address from the information request signal, and the transmission unit 23 can transmit by wireless the signal including the information to be presented to the address. Thus, the provided information can be transmitted to another destination designated by the address other than that of the terminal device 1 of the information requester.

Described below is the configuration of the terminal device 1 and the server device 2 as the second configuration example. In the configuration example, the terminal device 1 transmits an information request signal to which user information is added, and the server device 2 restricts the information to be provided depending on the presence/absence of the user information.

FIG. 4 shows the second configuration example.

In FIG. 4, the terminal device 1 is different from the terminal device 1 with the first configuration (refer to FIG. 2)

only in that it is newly provided with user information memory 31 storing user information about a user (information requester), but otherwise it is the same as the device with the first configuration. However, the command generation unit 13 in the second configuration example generates an information request signal including a terminal address read from the address memory 12 when a trigger signal is input, and adds the user information read from the user information memory 31 to the information request signal.

On the other hand, the server device 2 is different from the server device 2 with the first configuration in that it is provided with a command analysis unit 32 for analyzing a received signal and extracting a terminal address and user information from the signal in place of the address extraction unit 21, and an information selection unit 33 for selecting information to be provided according to the extracted user information. Otherwise, the device with the first configuration is the same as the device with the second configuration.

Figure 5:
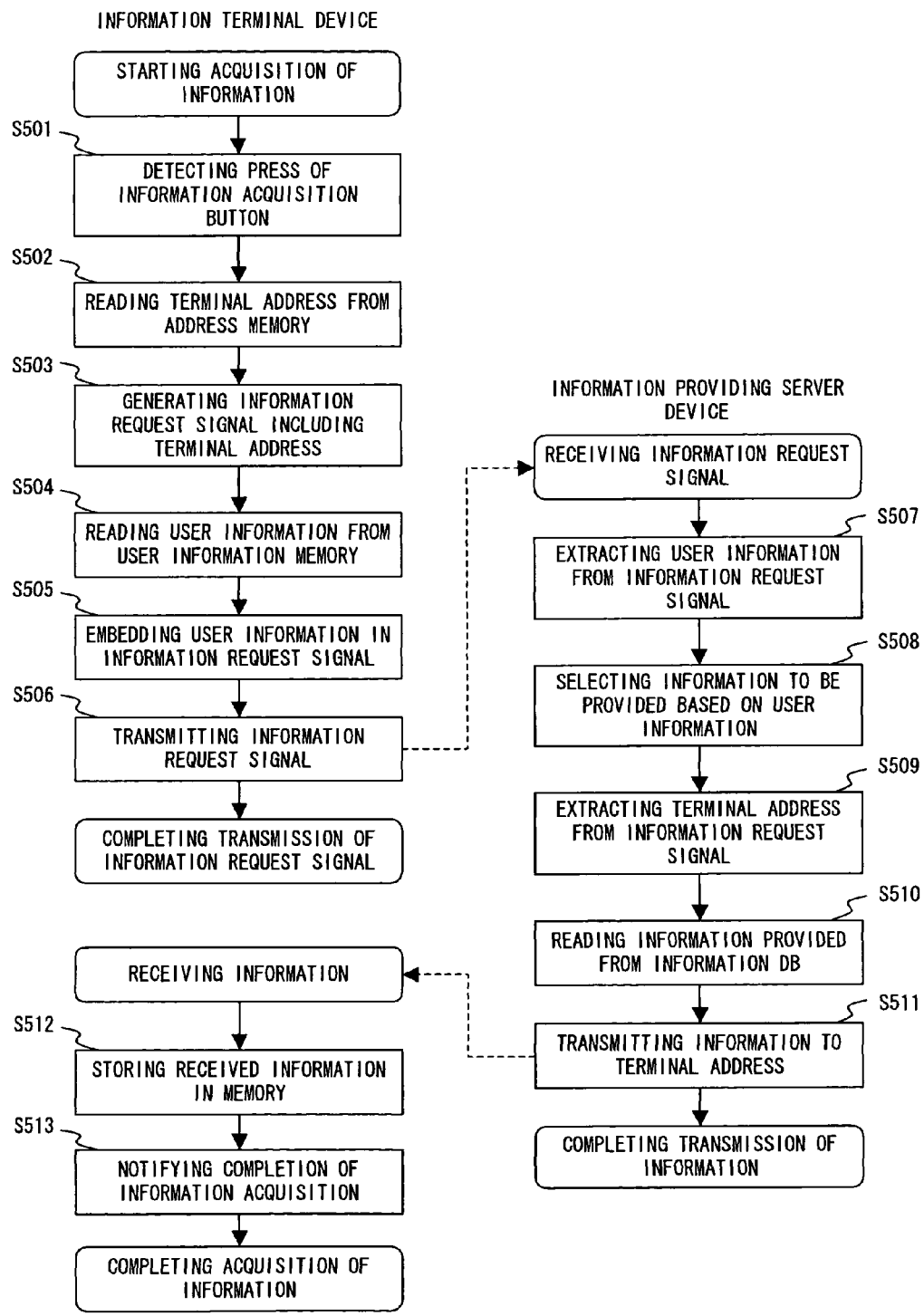
FIG. 5 is a flowchart of an operation example of a terminal device and a server device in the second configuration example.

FIG. 5 is a flowchart of an operation example of the terminal device 1 and the server device 2 in the second configuration example.

In FIG. 5, the processes in S501 through S506 and in S512 through S513 refer to the operations of the terminal device 1, and the processes in S507 through S511 refer to the operations of the server device 2.

First, in S501 through S503, the same processes as the processes in S301 through S303 shown in FIG. 3 are performed. In S504, user information is read from the user information memory 31. In S505, the user information is added to (embedded in) the information request signal. In S506, the information request signal obtained in the preceding step is transmitted by wireless by the transmission unit 14. In the processes in S501 through S506, the terminal device 1 completes the transmission of the information request signal.

When the information request signal transmitted by wireless by the terminal device 1 is received by the reception unit 20 of the server device 2, the command analysis unit 32 extracts the user information from the information request signal in S507. In S508, information provided by the information selection unit 33 is selected according to the extracted user information. In S509, the command analysis unit 32 extracts a terminal address from the information request signal. In S510, the information selected by the information selection unit 33 is read from the information DB 22. For example, when the sex of a user is included in the user information, the information for females is provided for female users and the information for males is provided for male users. When user information includes user age information, information is prepared for child users not to use difficult kanji or to use pictorial information, thus reading information from the information DB 22. The contents of information to be provided can be changed depending on whether or not user information is added to the information request signal. For example, when product information is provided in an exhibition, and when user information is added, detailed information is selected and read. When user information is not added (for example, when an information request signal is transmitted from the terminal device 1 relating to the first configuration example (refer to FIG. 2), etc.), information about common contents is selected and read. There can be a device for recording user information extracted by the command analysis unit 32. In S511, the transmission unit 23 transmits by wireless a signal including the read information to the extracted terminal address. In the processes in S507 through S511, the server device 2 completes the transmission of the signal including the information to be provided.

Then, when the signal including the information to be provided transmitted by wireless from the server device 2 is received by the reception unit 15, the processes in S308 through S309 shown in FIG. 3 are performed in S512 through S513. The information is completely acquired by the terminal device 1 in the processes in S512 through S513.

By the operation according to the second configuration example, an information provider can select and provide the optimum information based on the information about the information requester as a user of the terminal device 1, and the information requester can acquire useful information for the requester. Additionally, depending on the contents of the information about an information requester or the presence/absence of the information, the information to be provided can be restricted. For example, the present configuration example is preferable in an exhibition for enterprises where detailed materials are presented instead of an exhibitor receiving a card (information about an information requester) from a visitor.

The terminal device 1 can have equipment memory storing equipment information and transmit the equipment information stored therein to an information provider, and the information provider can select and provide the information to be provided according to the equipment information. In this case, the latest information or related information about the terminal device 1 can be easily provided/acquired. Using the user information and equipment information as relevant information required to select information to be provided, a signal requesting one or both of them from the server device 2 can be transmitted from the transmission unit 23 of the server device 2 to the terminal device 1.

Described below is the configuration of the terminal device 1 and the server device 2 as the third configuration example of the present invention. The present configuration example has the function of giving a warning and transmitting again an information request signal when the terminal device 1 does not normally receive provided information. However, the terminal device 1 according to the present example is somewhat different from the device shown in FIG. 1 in appearance. Therefore, the terminal device 1 according to the present configuration example is defined as a terminal device 1b, and the terminal device 1b is described below.

Figure 48:
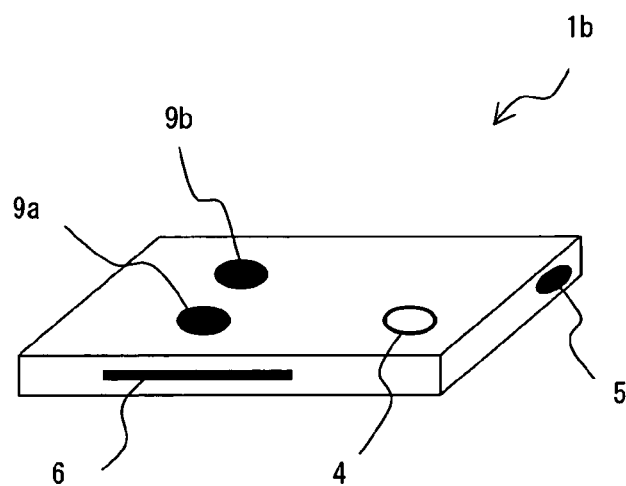
FIG. 48 shows an example of a terminal device having no display which is the third configuration example.

FIG. 48 shows an example of a terminal 1b.

As shown in FIG. 48, the terminal device 1b is provided with a normal reception lamp 9a for notification of normal reception and a reception error lamp 9b for notification of a reception error in place of the display 3 of the terminal device 1 shown in FIG. 1. Other configuration is the same as the configuration of the terminal device 1 shown in FIG. 1.

FIG. 6 shows a configuration example of the terminal device 1b and the server device 2 as the third configuration example.

In FIG. 6, the terminal device 1b is different from the terminal device 1 according to the first configuration example (refer to FIG. 2) in that when the reception unit 15 normally receives provided information or when it does not normally receive the provided information (incomplete reception of provided information), an indicator unit 36 notifying the status is newly mounted and the display unit 17 is omitted. Otherwise, the configuration of the terminal device 1b is the same as the configuration of the terminal device 1. However, the terminal device 1b according to the third configuration example generates a trigger signal although the reception unit 15 does not normally receive provided information, and the signal is input to the command generation unit 13. The indicator unit 36 controls, that is, turns on, turns off, blinks, etc.

the normal reception lamp 9*a* and the reception error lamp 9*b* depending on the signal reception status of the reception unit 15.

On the other hand, the server device 2 has the same configuration as the server device 2 according to the first configuration example.

Figure 7:
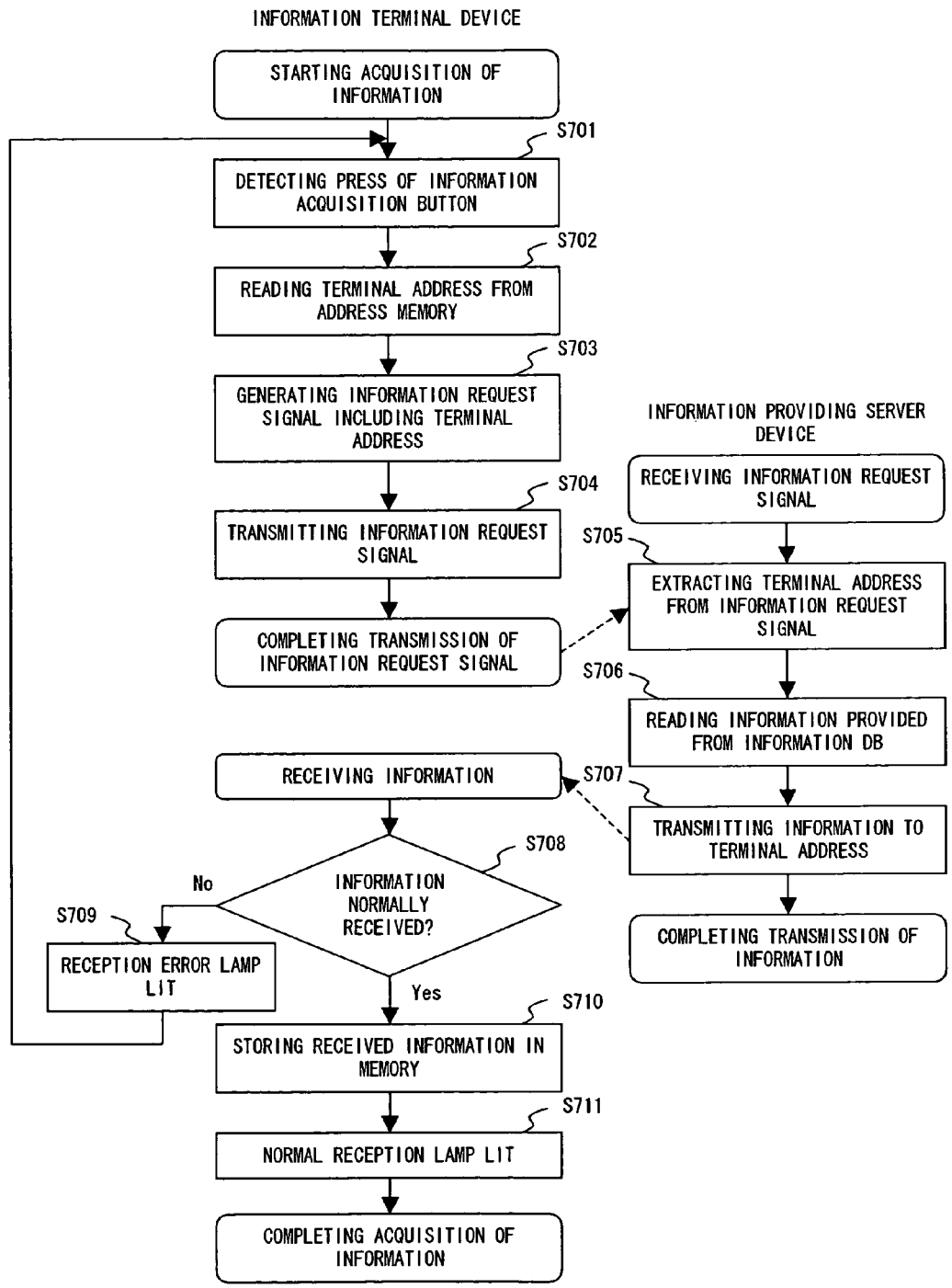
FIG. 7 is a flowchart of an operation example of a terminal device and a server device in the third configuration example.

FIGS. 7 and 8 are flowcharts of the operation examples of the terminal device 1*b* and the server device 2 as the third example.

FIG. 7 shows the operation of giving an error warning and transmitting again an information request signal by a press of the information acquisition button 4 after provided information from the server device 2 is not normally received.

In FIG. 7, the processes in S701 through S704 and S708 through S711 refer to the operation of the terminal device 1*b*, and the processes in S705 through S707 refer to the operation of the server device 2.

In S701 through S704, the processes almost the same as the processes in S301 through S304 shown in FIG. 3 are performed. Only the difference is that, in S701, when it is detected that the information acquisition button 4 is pressed, and when the normal reception lamp 9*a* and the reception error lamp 9*b* is turned on, they are turned off. In the processes in S701 through S704, the terminal device 1*b* completes the transmission of an information request signal.

Then, when the information request signal transmitted by wireless from the terminal device 1*b* is received by the reception unit 20 of the server device 2, the processes in S305 through S307 shown in FIG. 3 are performed in the subsequent S705 through S707. The server device 2 completes the transmission of a signal including information to be provided in the processes in S705 through S707.

When the reception unit 15 of the terminal device 1*b* receives a signal including information to be provided transmitted by wireless from the server device 2, it is determined in S708 whether or not the information to be provided is normal (whether or not information to be provided is complete), that is, whether or not information to be provided has been normally received. When the determination result is YES, control is passed to S710. When the determination result is NO, control is passed to S709. In S709, the indicator unit 36 lights the reception error lamp 9*b* for a predetermined time, and control is returned to S701. By lighting the reception error lamp 9*b*, an information requester can be informed that the provided information has not been normally received. In this case, a user performs an information acquiring operation, and the processes are repeated from S701. When the user does not perform the information acquiring operation, the information, the information acquiring process is terminated without acquiring the information. It is also possible to allow a user to perform a resetting process by operating a button not shown in the attached drawings so that the normal reception lamp 9*a* and the reception error lamp 9*b* can be returned to the turned-off state as a reset state. On the other hand, in S710, the process in S308 shown in FIG. 3 is performed. In S711, the normal reception lamp 9*a* is lit for a predetermined time as an information acquisition completion notification. The terminal device 1*b* completes acquiring information in the processes in S708 through S711.

By the operation shown in FIG. 7, the provided information not normally received is prevented from not being acquired.

FIG. 8 shows an operation of automatically retransmitting an information request signal a predetermined number of times when provided information from the server device 2 has not been normally received, and giving an information reception error warning when the information cannot be normally received although the retransmission is repeated the predetermined number of times. In FIG. 8, the processes in S801 through S802 refer to the processes of the terminal device 1*b*.

As shown in FIG. 8, when the determination result in S708 is NO, that is, the provided information has not been normally received, control is passed to S801, it is determined whether or not the information request signal has been retransmitted a predetermined number of times. If the determination result is NO, control is returned to S702, and the information request signal is retransmitted. If the determination result in S801 is YES, control is passed to S802, and the reception error lamp 9*b* is lit, thereby giving an information reception error warning and terminating the flowchart. Other processes are as shown in FIG. 7.

In the operation shown in FIG. 8, when provided information is unsuccessfully received, a re-request signal is automatically retransmitted. Therefore, the probability that information can be acquired in one operation (a press of the information acquisition button 4) of a user can be enhanced. When an information reception error warning is given, the warning means that information acquisition has failed a number of times, and the user does not have to repeat the information acquiring operation again. In the present configuration example, as shown in FIG. 6, an information re-request signal is configured to be transmitted from the transmission unit 14 which first transmits an information request signal, but the information re-request signal also can be transmitted from a transmission/reception unit 126 different from a transmission unit 41 as in a communication terminal device 51 shown in FIG. 42 described later.

In the operation of the third configuration example, normally received provided information can be constantly stored in the information memory 16.

Described below is the configuration of the terminal device 1 and the server device 2 with a configuration different from the fourth configuration example. In the present configuration example, the terminal device 1 transmits an information request signal to which equipment information is added, and server device 2 transmits an update program corresponding to the equipment information and the information to be provided.

FIG. 9 shows the fourth configuration example.

In FIG. 9, the terminal device 1 is only different from the terminal device 1 according to the second configuration example (FIG. 4) in that it is provided with the equipment information memory 41 storing the equipment information about the terminal device 1 in place of the user information memory 31. Other configurations are the same. Equipment information refers to information designating a terminal device and its control program such as the product number and the serial number of the terminal device 1, the version information about a control program, etc. The information acquired in the fourth configuration example is a program operating and controlling the terminal device 1 transmitted from the server device 2, updating all or part of the control program stored in the program memory 19 of the terminal device 1. That is, the control program can be updated and acquired based on the acquired update program.

The server device 2 is only different from the server device 2 according to the second configuration example in that it is provided with a program DB 42 storing an update program according to each piece of equipment information in place of the information selection unit 33. Otherwise, the configurations are the same. The command analysis unit 32 extracts a terminal address and equipment information from an information request signal, and the transmission unit 23 transmits an update program corresponding to the equipment information and information to be provided according to an information request.

Figure 10:
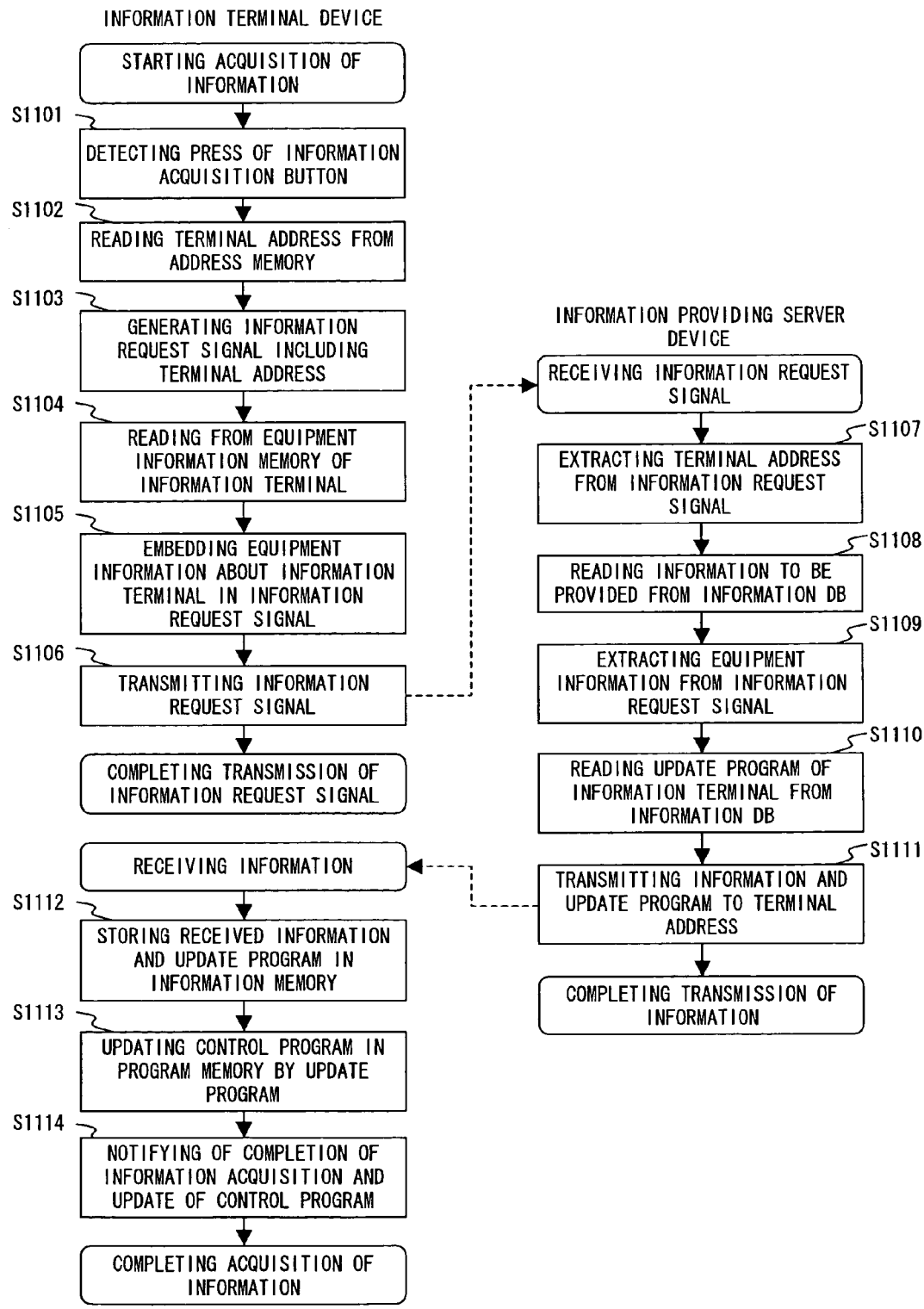
FIG. 10 is a flowchart of an operation example of a terminal device and a server device in the fourth configuration example.

FIG. 10 is a flowchart of an operation example of the terminal device 1 and the server device 2 in the fourth configuration example.

In FIG. 10, the processes in S1101 through 1106 and S1112 through S1114 refer to the operations of the terminal device 1, and the processes in S1107 through S1111 refer to the operations of the server device 2.

First, in S1101 through S1103, the processes in S501 through S503 shown in FIG. 5 are performed. Then, in S1104, equipment information is read from the equipment information memory 41. In S1105, the equipment information is added to (embedded in) the information request signal generated in S1103. In S1106, the process in S506 of FIG. 5 is performed. In the processes in S1101 through S1106, the terminal device 1 completes the transmission of an information request signal.

When the reception unit 20 of the server device 2 receives the information request signal transmitted by wireless from the terminal device 1, the processes in S509 through S510 shown in FIG. 5 are performed in S1107 through S1108. In S1109, the command analysis unit 32 extracts equipment information from the information request signal. In S1110, an update program corresponding to the extracted equipment information is read from the program DB 42. In S1111, the transmission unit 23 transmits by wireless a signal including the read information to be provided and update program to the extracted terminal address. The server device 2 completes the transmission of the signal including the information to be provided in the processes in S1107 through S1111.

Then, when the signal including the provided information and update program transmitted by wireless from the server device 2 is received by the reception unit 15 of the terminal device 1, the received information and the update program are stored in the information memory 16 in S1112. The update program can be all or part of the control program stored in the program memory 19. In S1113, all or part of the control program stored in the program memory 19 is updated by the update program stored in the information memory 16 in S1112. Thus, when the update program is contained in the signal transmitted from the server device 2, the control program is updated based on the update program. In S1114, a notification that the information acquisition and the update of the control program have been completed is issued. The notification is issued by turning on, turning off, or blinking the LED (not shown in the attached drawings) provided for the terminal device 1. Thus, an information requester can be informed that the control program has been updated. The terminal device 1 completes the acquisition of information in the processes in S1112 through S1114. It is not necessary to store the update program received by the terminal device 1 in the information memory 16, but the control program in the program memory 19 can be updated by the update program. Only the update program can be transmitted from the server device 2 to the terminal device.

By the operation according to the fourth configuration example, the control program of the terminal device 1 can be automatically updated.

The terminal device 1 with the fourth configuration example can further include: an unreasonable program detection unit for detecting whether or not an unreasonable program such as a so-called computer virus, etc. is contained in the information received by the 15; an unreasonable program warning unit for giving a warning when the unreasonable program is detected; and an information deletion unit for deleting the received information when the unreasonable program is detected, and can be configured to delete the received information after giving a warning when an unreasonable program is detected in the received information.

In the operation of the terminal device 1 according to the present configuration example, the process of requesting a user of the terminal device to confirm the update of the control program of the terminal device 1 stored in the program memory 19 before the process of updating the control program with the received update program in S1113 can be added.

Described below is the configuration of the terminal device 1 and the server device 2 in the fifth configuration example. The present configuration example has the configuration in which the terminal device 1 has the function of detecting that there is the infrared receiver 7 of the server device 2 capable of providing information for the terminal device 1 in the directivity direction of the infrared emitter 5.

FIG. 11 shows the fifth configuration example.

In FIG. 11, the terminal device 1 is only different from the terminal device 1 according to the first configuration example (FIG. 2) in that it further includes: an information signal sensor 46 for detecting that there is the infrared receiver 7 of the server device 2 capable of providing information for the terminal device 1 in the directivity direction of the infrared emitter 5, and detecting an information providing signal issued from the server device 2 when there is the server device 2 in the directivity direction; and an information signal indicator 47 for notifying a user (information requester) that there is the server device 2 capable of providing information for the terminal device 1 in the directivity direction of the infrared emitter 5 when the information signal sensor 46 detects an information providing signal. Other configurations are the same.

On the other hand, the server device 2 is different from the server device 2 according to the first configuration example in that it newly includes a transmission unit 48 for continuously issuing (transmitting by wireless) an information providing signal notifying that information can be provided. Otherwise, the configurations are the same.

Figure 12:
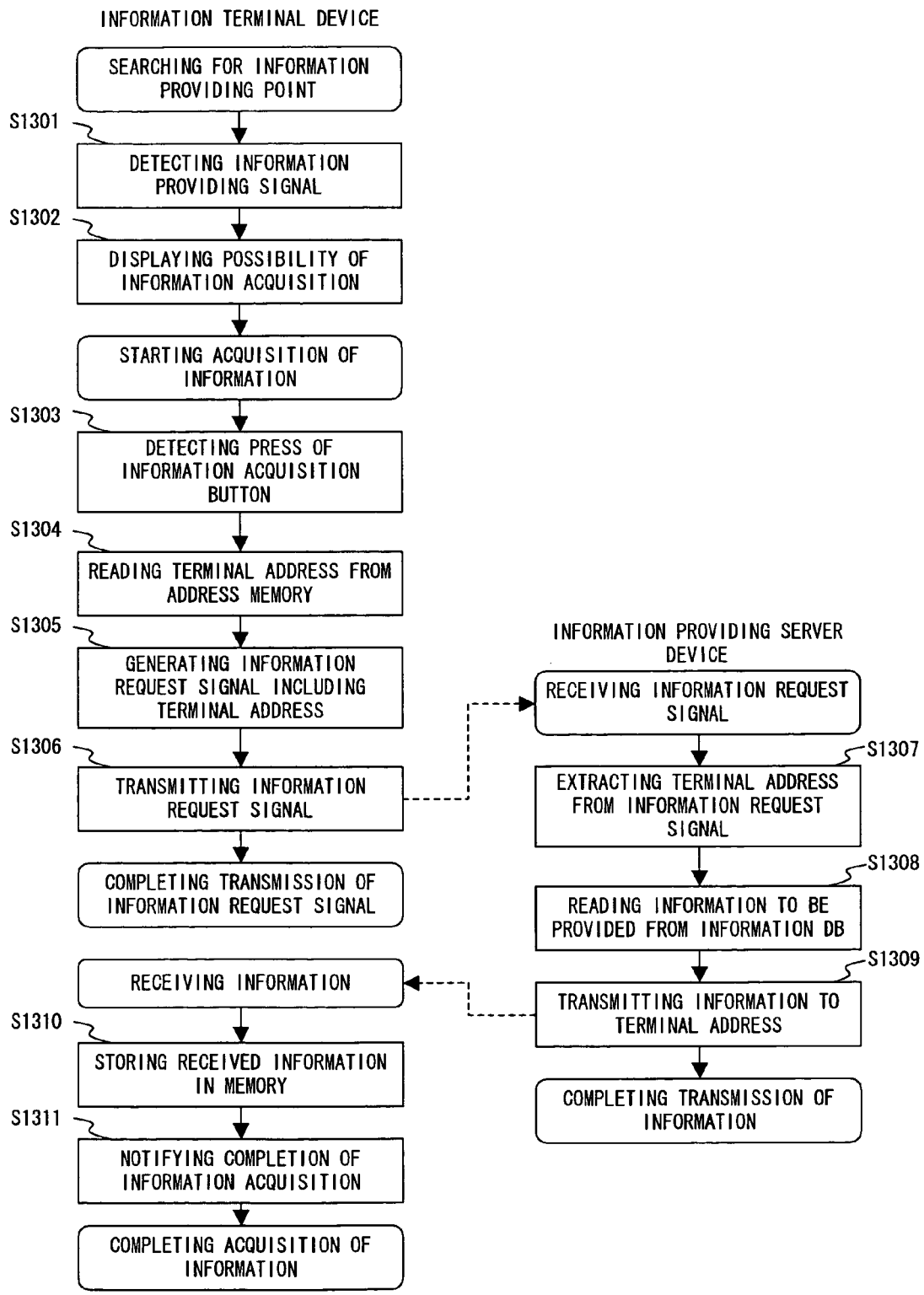
FIG. 12 is a flowchart of an operation example of a terminal device and a server device in the fifth configuration example.

FIG. 12 is a flowchart of the operation example of the terminal device 1 and the server device 2 in the fifth configuration example.

In FIG. 12, the processes in S1301 through S1306 and S1310 through S1311 refer to the operations of the terminal device 1, and the processes in S1307 through S1309.

First, the processes in S1301 through S1302 as the process (information providing point search) of detecting the presence of the server device 2 capable of providing information for the terminal device in the directivity direction of the infrared emitter 5 is performed. In S1301, the information providing signal issued from the predetermined server device 2 is detected by the information signal sensor 46. In S1302, the information signal indicator 47 notifies that there is the server device 2 capable of providing information for the terminal device 1 in the directivity direction of the infrared emitter 5.

In S1303 through S1306, the processes in S301 through S304 shown in FIG. 3 are performed. The terminal device 1 completes the transmission of the information request signal in the processes in S1303 through S1306.

When the information request signal transmitted by wireless from the terminal device 1 is received by the reception unit 20 of the server device 2, the processes in S305 through S307 shown in FIG. 3 are performed in S1307 through S1309. The server device 2 completes the transmission of information to be provided in the processes in S1307 through S1309.

When a signal including the provided information transmitted by wireless from the server device 2 is received by the reception unit 15 of the terminal device 1, the processes in S308 through S309 shown in FIG. 3 are performed in S1310 through S1311. The terminal device 1 completes the acquisition of information in the processes in S1310 through S1311.

By the operation according to the fifth configuration example, the information requester can be informed whether or not there is the server device 2 around which is able to provide information by confirming the information signal indicator 47 with the information signal sensor 46 directed around.

To emit a signal indicating that there is the infrared receiver 7 of the server device 2 in the directivity direction of the infrared emitter 5 of the terminal device 1, for example, an infrared emitter having directivity and emitting a signal from the transmission unit 48 is provided around the infrared receiver 7, and the emission direction is made to match the light receiving direction of the infrared receiver 7. The variance of the directivity direction can be adjusted by the optical element such as a lens, etc. By appropriately selecting an available frequency, the shape and the arrangement of an antenna and an oscillator for an electromagnetic wave, ultrasonic, etc., the directivity with desired variance can be obtained. An electromagnetic field can also be used. For example, a signal coil is arranged to encompass the information providing range, and a pickup coil is used as the information signal sensor 46. A magnetic field is generated when an electric current passes through a signal coil, and the magnetic field is detected by the pickup coil. To avoid a mistaken detection by a magnetic necklace, etc. the current passing the signal coil is modulated by a predetermined pattern, and the information signal sensor 46 determines using the detected magnetic field pattern whether or not it is a magnetic field from the server device 2.

Described below is the configuration of the terminal device 1 and the server device 2 in the sixth configuration example. The present configuration example has the function of transmitting no information request signal when the terminal device 1 detects that there is no infrared receiver 7 of the server device 2 capable of providing information for the terminal device 1 in the directivity direction of the infrared emitter 5.

Figure 13:
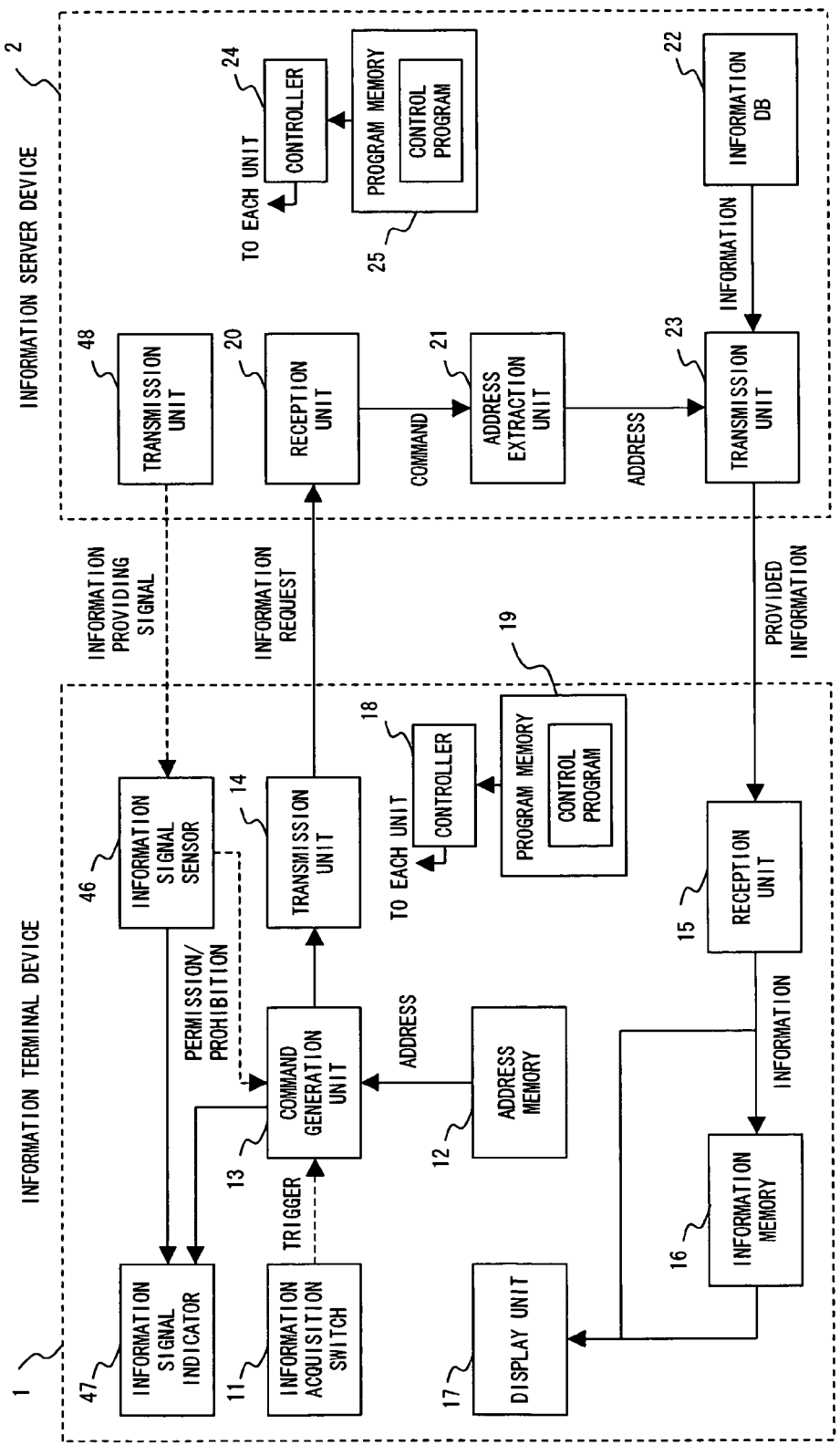
FIG. 13 shows the sixth example of a configuration.

FIG. 13 shows the sixth configuration example.

In FIG. 13, the terminal device 1 has the same configuration as the terminal device 1 according to the fifth configuration example (FIG. 11). However, the terminal device 1 according to the present configuration example permits generation of an information request signal only when the information signal sensor 46 detects an information providing signal. That is, when the information signal sensor 46 detects an information providing signal, permission information is output to the command generation unit 13, and the generation of an information request signal is permitted. When the information signal sensor 46 detects no information providing signal, prohibition information is output to the command generation unit 13, and the generation of an information request signal is prohibited. When the information signal sensor 46 detects an information providing signal, the permission information is output to the command generation unit 13, the command generation unit 13 generates an information request signal when the permission information is input. When the permission information is not input to the command generation unit 13, the command generation unit 13 does not generate an information request signal. The information signal indicator 47 notifies a user that the information signal sensor 46 has detected the information providing signal, and notifies that information cannot be obtained if the information signal sensor 46 has not detected the information providing signal when the information acquisition switch 11 is pressed.

On the other hand, the server device 2 has the same configuration as the server device 2 in the fifth configuration example.

FIG. 14 is a flowchart of the operation example of the terminal device 1 and the server device 2 in the sixth configuration.

In FIG. 14, the processes in S1501 through S1506 and S1510 through 1511 refer to the operations of the terminal device 1, and the processes in S1507 through S1509 refer to the operation of the server device 2.

First, in S1501, the process in S1303 shown in FIG. 12 is performed. In S1502, it is determined whether or not an information providing signal from the server device 2 is being detected. If the determination result is YES, the generation of an information request signal is permitted, and control is passed to S1504. When the determination result is NO, control is passed to S1503, and the notification that information cannot acquired is issued to a user by the information signal indicator 47, thereby terminating the present flowchart. In S1504 through S1506, the processes in S1304 through S1306 in FIG. 12 are performed. The terminal device 1 completes the transmission of an information request signal in the processes in S1501 through S1506.

When the information request signal transmitted by wireless from the terminal device 1 is received by the reception unit 20 of the server device 2, the processes in S1307 through S1309 shown in FIG. 12 are performed in S1507 through S1509. The server device 2 completes the transmission of information to be provided in the processes in S1507 through S1509.

When the signal including the provided information transmitted by wireless by the server device 2 is received by the reception unit 15 of the terminal device 1, the processes in S1310 through S1311 shown in FIG. 12 are performed in S1510 through S1511. The terminal device 1 completes the acquisition of information in the processes in S1510 through S1511.

If the information acquisition button 4 is pressed when there is no server device 2 capable of providing information for the terminal device 1 in the directivity direction of the infrared emitter 5 in the operation according to the sixth configuration example, then no information request signal is transmitted, thereby avoiding useless processes.

The permission/prohibition information output from the information signal sensor 46 of the terminal device 1 can be input to the 14 and the transmission can be prohibited, or the trigger signal can be prohibited even when the information acquisition button 4 is pressed.

An information providing signal is designed to include information about the contents (for example, the type of information to be provided, etc.) of the information provided by the server device 2, and the terminal device 1 detects the signal using the information signal sensor 46. When the detected information providing signal includes the information about the type of provided information, the information can be presented to a user. For example, the information signal indicator 47 is configured by a plurality of lamps, each lamp indicates a specific type of provided information, and a specific lamp of the information signal indicator 47 is turned on according to the type information about the provided information contained in the signal detected by the information signal sensor 46. Furthermore, the type of the provided information detected by the information signal sensor 46 can be displayed on the display unit 17.

Described below are the terminal device with an image capturing function and the server device included in the information providing system according to an embodiment of the present invention. The image capturing function refers to a function of enabling a static image and moving pictures to be obtained.

FIG. 15 shows an example of the terminal device with an image capturing function and a server device included in the present system.

In FIG. 15, the communication terminal device 51 with an image capturing function includes the image capturing function in the terminal device 1 shown in FIG. 1, and is provided with a taking lens 52 on the side of the device provided with the infrared emitter 5. With the configuration the direction of the taking lens 52 (optical axis direction of the taking lens, image taking direction) matches the directivity direction of the infrared emitter 5. The information acquisition button 4 on the upper surface of the device is to issue an instruction to start an operation of acquiring information, and can be used also as a shutter button for issuing an instruction to start an image capturing operation. Therefore, when the information acquisition button 4 is pressed, an information obtaining operation and an image capturing operation can be started. The display 3 displays an image, etc. obtained by capturing it. Other configurations are the same as the configuration shown in FIG. 1. The server device 2 is also explained above by referring to FIG. 1.

Described below in detail are the configurations and operations of the above-mentioned communication terminal device 51 with an image capturing function.

First, the configuration of the communication terminal device 51 with an image capturing function and the server device 2 in the seventh configuration example is explained below. The present configuration example relates to the basic configuration of the communication terminal device 51 with an image capturing function and the server device 2 included in the present system.

FIG. 16 shows the seventh configuration example.

In FIG. 16, the communication terminal device 51 includes: a shutter switch 56 which is turned on by pressing the information acquisition button 4 as a shutter button and outputs a trigger signal to the command generation unit 13 and an image capturing unit 57; the image capturing unit 57 for capturing a subject image and acquire the image data (image data relative to the still image or the moving image) through the taking lens 52 when the trigger signal is input, and other components. The address memory 12, the command generation unit 13, the transmission unit 14, the reception unit 15, the information memory 16, the display unit 17, the controller 18, and the program memory 19 are the same as those of the terminal device 1 relating to the first configuration example (FIG. 2). The information memory 16 relating to the seventh configuration example stores image data captured by the image capturing unit 57. The display unit 17 can display on the display 3 an image based on the image data captured by the image capturing unit 57 or the image data stored in the information memory 16.

The server device 2 has the same configuration as the server device 2 relating to the first configuration example.

Figure 17:
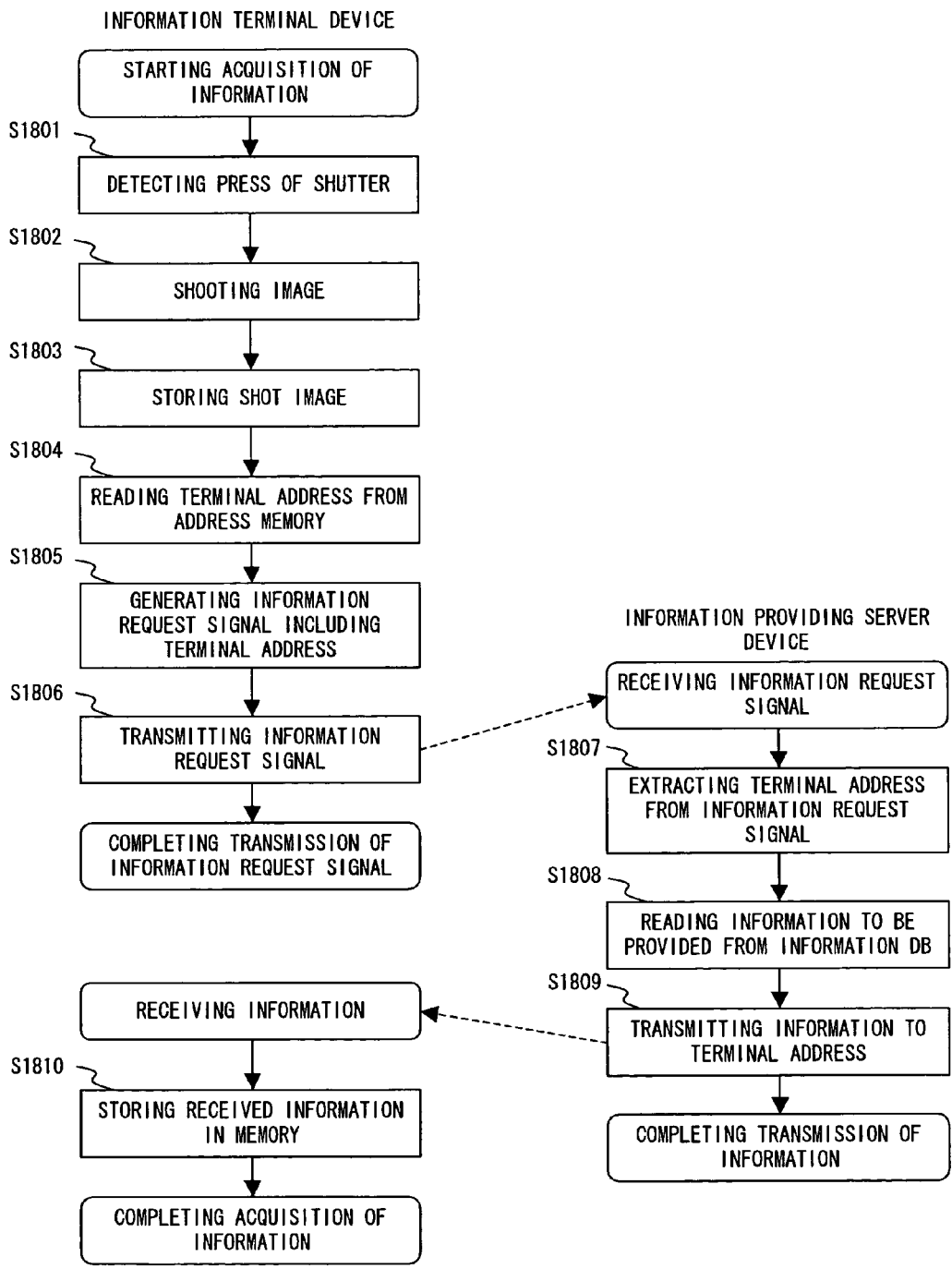
FIG. 17 is a flowchart of an operation example of a terminal device having the function of capturing an image and a server device in the seventh configuration example.
Figure 18:
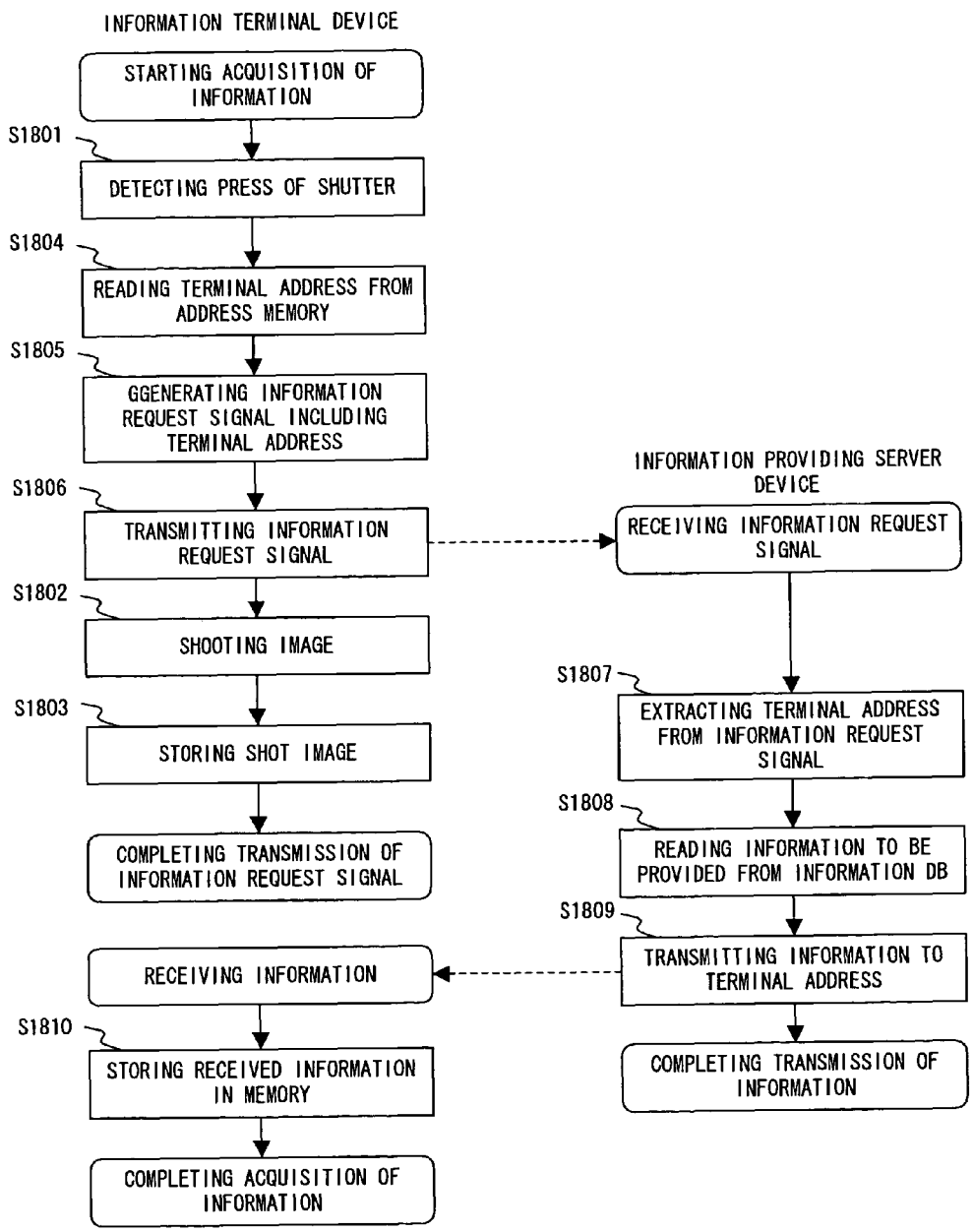
FIG. 18 is a flowchart of an operation example of a terminal device having the function of capturing an image and a server device in the seventh configuration example.

FIGS. 17, 18, and 19 are flowcharts showing an operation example of the communication terminal device 51 with an image capturing function and the server device 2 in the seventh configuration example.

In FIGS. 17 through 19, the processes in S1801 through S1806 refer to the operations of the communication terminal device 51, and the processes in S1807 through S1809 refer to the operation of the server device 2.

FIG. 17 shows the operation of performing an image capturing processes in S1802 through S1803 and performing an information request signal transmitting processes in S1804 through S1806 when the information acquisition button 4 as a shutter button is pressed.

In FIG. 17, first in S1802, it is detected that the taking lens 52 of the communication terminal device 51 is directed to a subject and the information acquisition button 4 as a shutter button is pressed. Thus, the shutter switch 56 is turned on and a trigger signal is input to the image capturing unit 57 and the command generation unit 13. In this example, the server device 2 is assumed to be mounted in the direction of the taking lens 52, that is, the directivity direction of the infrared emitter 5. In S1802, the image capturing unit 57 captures (shoots) a subject image. In S1803, the captured image data is stored in the information memory 16. In the 1804 through S1806, the processes in S302 through S304 shown in FIG. 3 are performed. The communication terminal device 51 completes the acquisition of an image and the transmission of an information request signal by the processes of S1801 through S1806.

When the information request signal transmitted by wireless by the communication terminal device 51 is received by the reception unit 20 of the server device 2, the processes in S305 through S307 shown in FIG. 3 are performed in S1807 through S1809. The server device 2 completes the transmission of a signal including information to be provided in the processes in S1807 through S1809.

When the signal including the provided information transmitted by wireless from the server device 2 is received by the reception unit 15 of the communication terminal device 51, the provided information is stored in the information memory 16 in S1810. At this time, to facilitate the management of identification, the information to be provided can be associated with the image data stored in S1802 and stored. In this case, the reduced image of the image stored in S1802 is displayed on the display 3, and the reduced image is selected, thereby referring to the associated information is capable. The communication terminal device 51 completes the acquisition of information in the process in S1810.

On the other hand, FIG. 18 shows the operation of performing the process of transmitting an information request signal in S1804 through S1806, and then performing the process of shooting an image in S1802 through S1803 when the information acquisition button 4 as a shutter button is pressed. Other processes in S1807 through S1810 are similar to the processes in S1807 through S1810 when in FIG. 17.

FIG. 19 shows the operation of performing the process of capturing an image in S1802 through S1803, and the process of transmitting an information request signal in S1804 through S1806 in parallel when the information acquisition button 4 as a shutter button is pressed. Other processes in S1807 through S1810 are the same as the processes in S1807 through S1810 in FIG. 17.

In the operation according to the seventh configuration example, an information requester can simultaneously acquire captured image and information by pressing the information acquisition button 4 as a shutter button with the taking lens 52 directed to a subject including the server device 2.

Furthermore, in the present configuration example, an image captured by the image capturing unit 57 and the information received by the 15 are stored in the information memory 16, but the memory storing a shot image and the memory storing received information can be stored in the dedicated memory. Furthermore, the information memory 16 or the memory dedicated for information or for the image as described above can be designed to be attachable to and removable from the communication terminal device 51.

Explained below is the configuration of the communication terminal device 51 with an image capturing function and the server device 2 in the eighth configuration example. The present configuration example is the communication terminal device 51 further including the function of switching an information acquisition mode.

Figure 20:
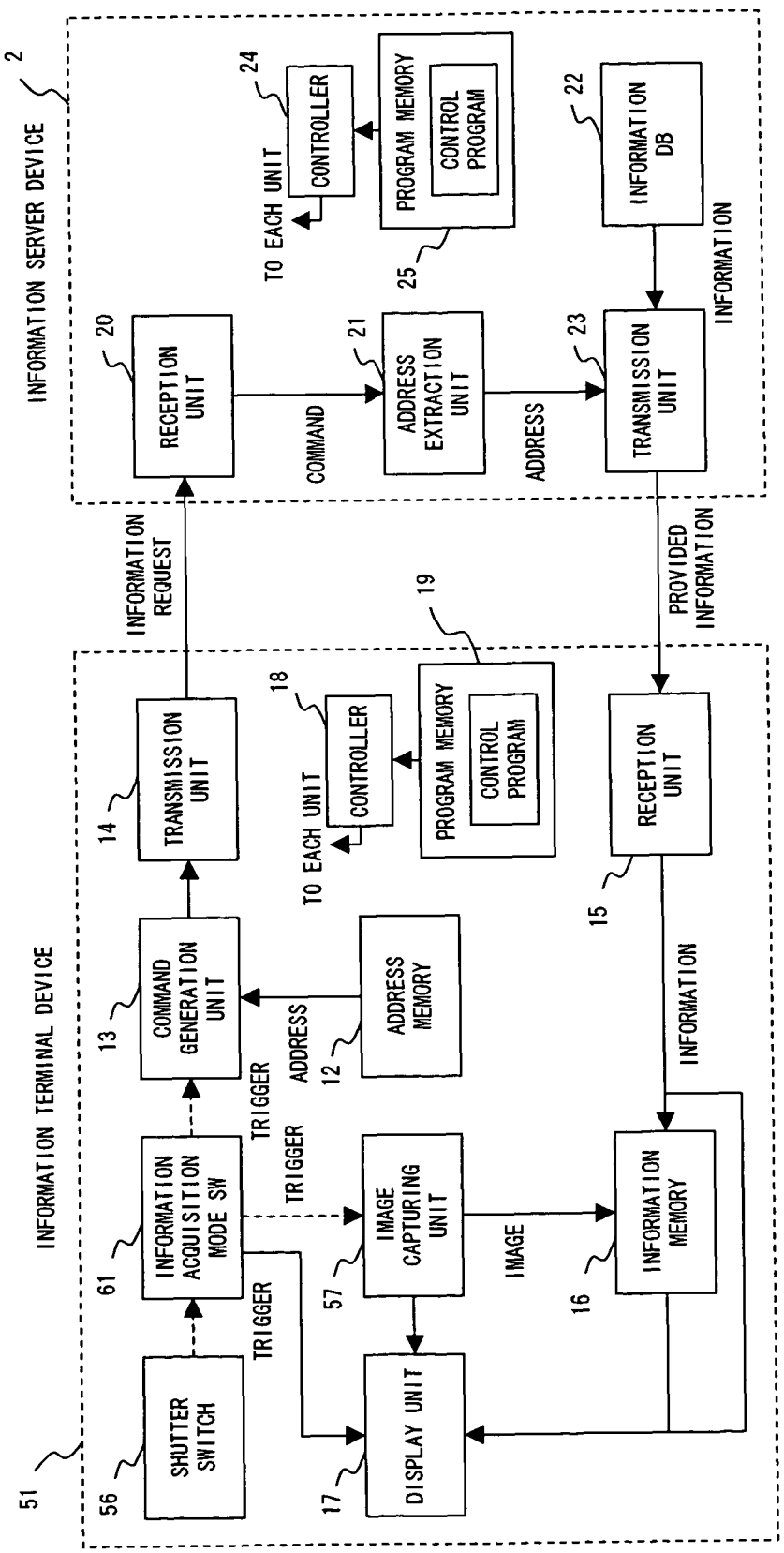
FIG. 20 shows the eighth example of a configuration.

FIG. 20 shows the eighth configuration example.

In FIG. 20, the communication terminal device 51 is different from the communication terminal device 51 relating to the seventh configuration example (FIG. 16) in that it further includes an information acquisition mode SW (switch) 61 for outputting a trigger signal to the command generation unit 13, the image capturing unit 57, or both of the command generation unit 13 and the image capturing unit 57 depending on the information acquisition mode directed and set by a user (information requester) when the trigger signal is input. Other configurations are the same. However, the display unit 17 in the eighth configuration example is designed to display on the display 3 the set information acquisition mode. The communication terminal device 51 in the eighth configuration example is configured such that the information acquisition mode can be set and switched depending on the operation of the user of the information acquisition mode SW 61.

On the other hand, the server device 2 is the same in configuration as the server device 2 relating to the seventh configuration example.

Figure 21:
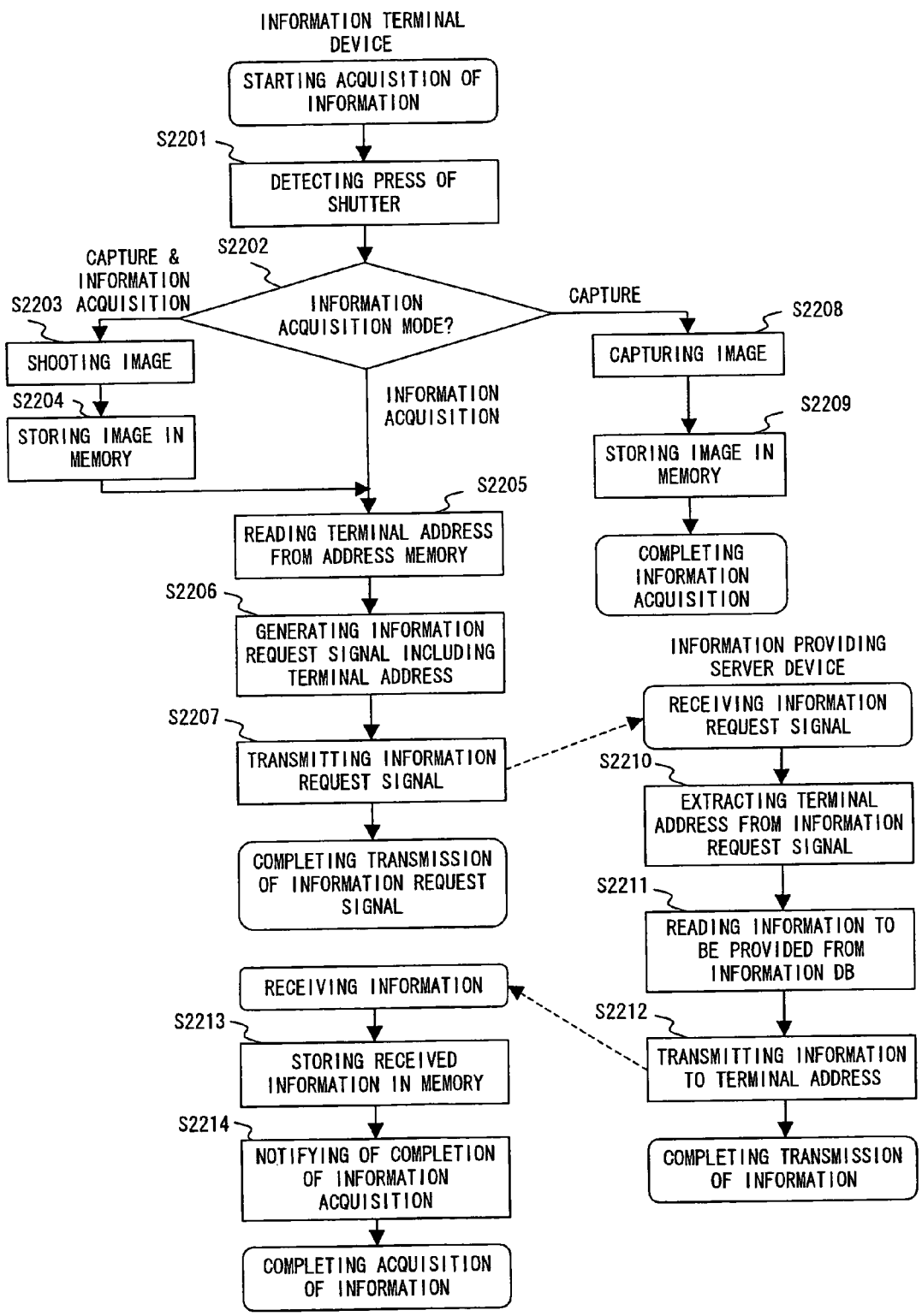
FIG. 21 is a flowchart of an operation example of a terminal device having the function of capturing an image and a server device in the eighth configuration example.

FIG. 21 is a flowchart of the operation example of the communication terminal device 51 with an image capturing function and the server device 2 in the eighth configuration example.

In FIG. 21, the processes in S2201 through S2209 and S2213 through S2214 refer to the operation of the communication terminal device 51, and the processes in S2210 through S2212 refer to the operation of the server device 2.

First, in S2201, a press of the information acquisition button 4 as a shutter button with the taking lens 52 of the communication terminal device 51 directed to a subject is detected. Thus, the shutter switch 56 is turned on, a trigger signal is input to the information acquisition mode SW 61, and the trigger signal is input to one or both of the image capturing unit 57 and the command generation unit 13 depending on the set information acquisition mode. In S2202, the information acquisition mode set in the information acquisition mode SW 61 is determined. When the determination result is "capture & information acquisition mode" indicating an image capturing operation and an information acquiring operation, control is passed to S2203. When the determination result is "information acquisition mode" indicating only an information acquiring operation, control is passed to S2205. When the determination result is "capture mode" directing only an image capturing operation, control is passed to S2208.

When the setting of the information acquisition mode SW 61 is "capture & information acquisition mode", a trigger signal is input to the command generation unit 13 and the image capturing unit 57, and the image capturing unit 57 captures a subject image in S2203. In this example, it is assumed that the server device 2 is mounted in the direction of the taking lens 52, that is, in the directivity direction of the infrared emitter 5. In S2204, the captured image data is stored in the information memory 16, and control is passed to S2205. In the subsequent S2205 through S2207, the processes in S1804 through S1806 shown in FIG. 17 are performed. In the processes in S2203 through S2207, the communication terminal device 51 completes the acquisition of an image and the transmission of the information request signal.

When the setting of the information acquisition mode SW 61 is "information acquisition mode", a trigger signal is input to the command generation unit 13, and the process is executed from S2205. The processes in the subsequent S2205 through S2207 are the same as the above-mentioned example. The communication terminal device 51 completes the transmission of an information request signal in the processes in S2204 through S2207.

When the setting of the information acquisition mode SW 61 is "capture mode", a trigger signal is input to the image capturing unit 57. In S2208, the image capturing unit 57 captures a subject image. In S2209, the captured image data is stored in the information memory 16. The communication terminal device 51 completes the acquisition of an image in the processes in S2208 through S2209, When the information request signal transmitted by wireless by the communication terminal device 51 is received by the reception unit 20 of the server device 2, the processes in S305 through S307 shown in FIG. 3 are performed in S2210 through S2212. The transmission of the signal including the information to be provided by the server device 2 is completed in the processes in S2210 through S2212.

When the signal including the provided information transmitted by wireless from the server device 2 is received by the reception unit 15, the processes in S308 through S309 are performed on S2213 through S2214. When the present operation is performed with the "capture & information acquisition mode", the information to be provided can be associated with the image data stored in the process in S2204 and stored in S2213 to facilitate the management. The communication terminal device 51 completes the acquisition of information in the processed in S2213 through S2214.

An information requester can acquire only a captured image, acquire only information to be provided, or acquire both a captured image and information to be provided by indicating and setting a predetermined information acquisition mode depending on the situation in the operation according to the eighth configuration example.

The configuration example of the communication terminal device 51 with an image capturing function and the server device 2 in the ninth configuration example is explained below. In the present configuration example, the communication terminal device 51 has the function of selecting an information type in addition to the function of switching the information acquisition mode.

Figure 22:
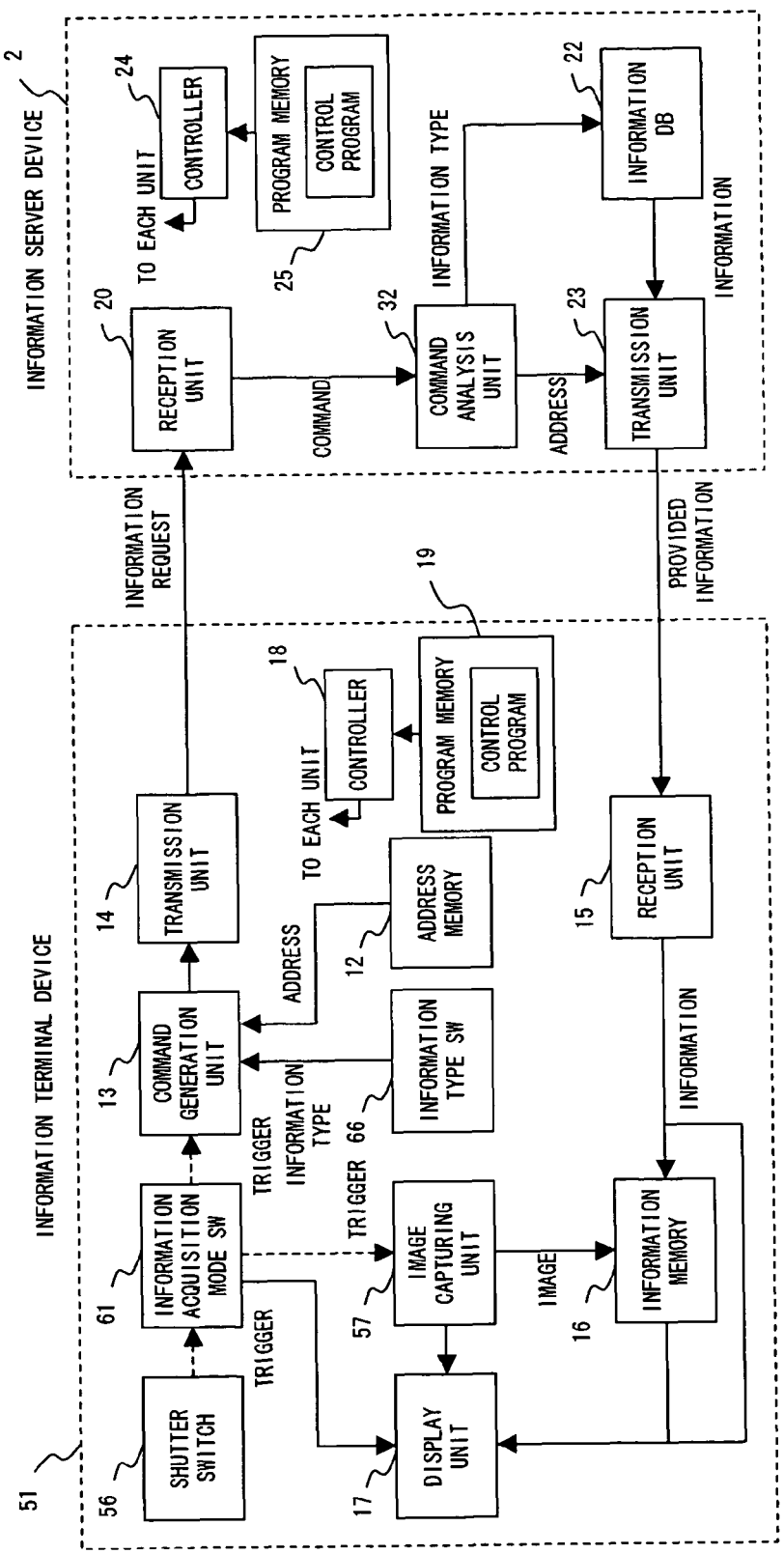
FIG. 22 shows the ninth example of a configuration.

FIG. 22 shows the ninth configuration example.

In FIG. 22, the communication terminal device 51 is different from the communication terminal device 51 relating to the eighth configuration example (FIG. 20) in that it newly includes an information type SW 66 for selecting an information type identification code (information relating to the type of information, type information) corresponding to the information type indicated and set in advance by a user (information requester), and other configurations are the same. However, the command generation unit 13 relating to the ninth configuration example generates an information request signal including the terminal address read from the address memory 12 when a trigger signal is input, and the information type identification code selected by the information type SW 66 is added to the information request signal.

The information type can be, for example, (1) type different in size (data capacity, data size) of information such as common information, summary information obtained by summarizing the common information, address information on the network containing information (information such as a URL, etc. for the access to information), (2) type different in presentation type of information such as pay information, free information, etc., (3) type different in information type such as image information, picture information, audio information, text information, etc., (4) type different in file format of information such as JPEG, TEXT, etc., (5) type different in contents of information such as restaurant menu information, timetable information, etc., (6) type different in field of information such as technical information, sales information, enterprise information, etc.

On the other hand, the server device 2 is different from the server device 2 relating to the eighth configuration example in that it further includes a command analysis unit 32 for analyzing a received signal and extracting a terminal address and an information type identification code from the signal, and other configurations are the same. However, the information DB 22 stores in advance information, etc. corresponding to each information type identification code, and the information read from the information DB 22 is information corresponds to the information type identification code extracted from the command analysis unit 32.

Figure 23:
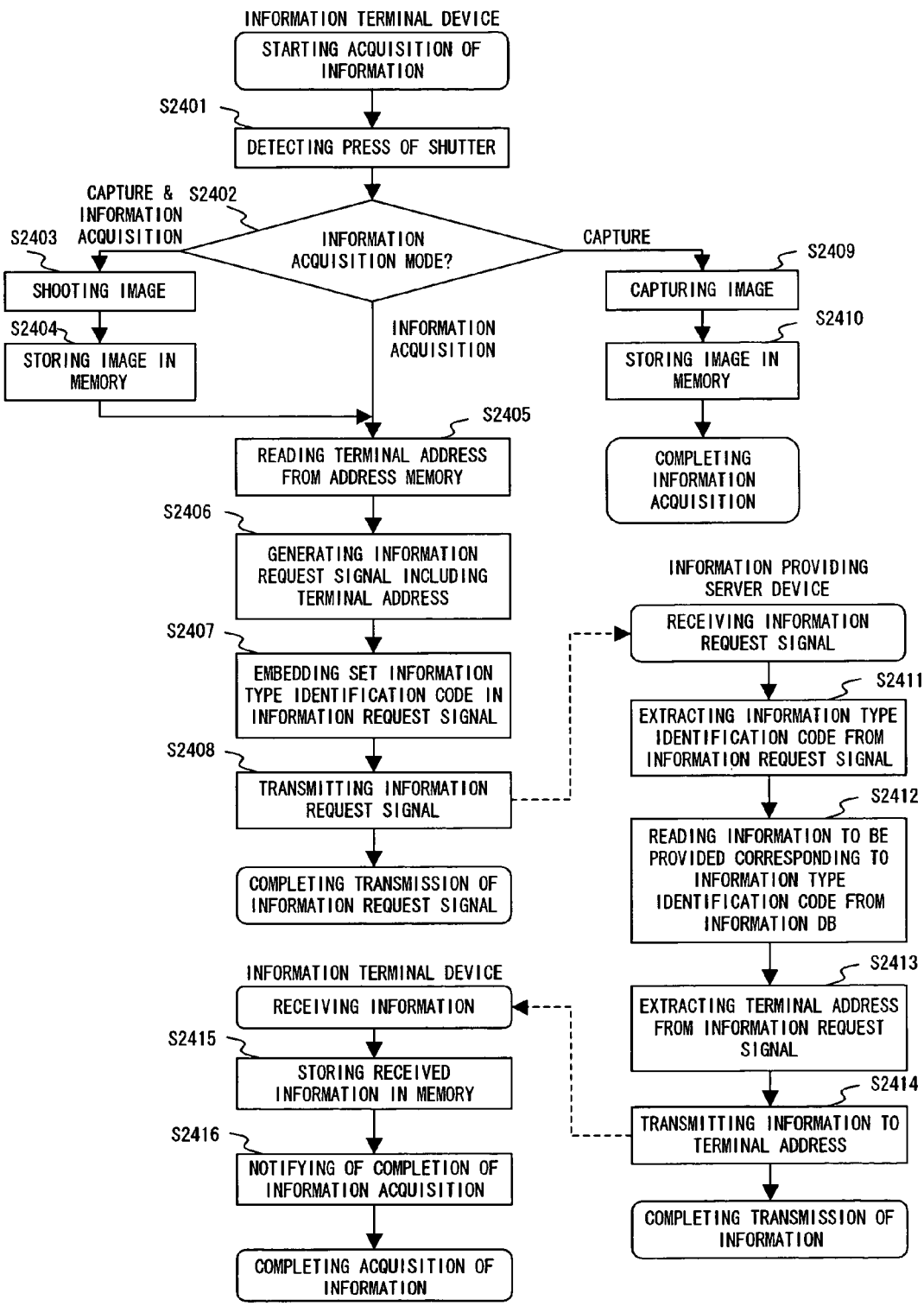
FIG. 23 is a flowchart of an operation example of a terminal device having the function of capturing an image and a server device in the ninth configuration example.

FIG. 23 is a flowchart of the operation example of the communication terminal device 51 with an image capturing function and the server device 2 in the ninth configuration example.

In FIG. 23, the processes in S2401 through S2410 and S2415 through S2416 refer to the operations of the communication terminal device 51, and the processes in S2411 through S2414 refer to the operations of the server device 2.

First, in S2401 through S2402, the processes in S2201 through S2202 are performed, control is passed to S2403 in the "capture & information acquisition mode", control is passed to S2405 in the "information acquisition mode", and control is passed to S2409 in the "capture mode".

In the "capture & information acquisition mode", the processes in S2203 through S2206 in FIG. 21 are performed in S2403 through S2406. In S2407, the information type identification code selected by the information signal sensor 46 is added to (embedded in) the generated information request signal in S2407. In S2408, the process in S2207 in FIG. 21 is performed. The communication terminal device 51 completes the acquisition of an image and the transmission of an information request signal in the processes in S2403 through S2408.

Otherwise, in the "information acquisition mode", the processes in S2405 through S2408 are described above.

The communication terminal device 51 completes the transmission of the information request signal in the processes in S2405 through S2408.

In the "capture mode", the processes in S2208 through S2209 in FIG. 21 are performed in S2409 through S2410. The communication terminal device 51 completes the acquisition of an image in the processes in S2409 through S2410.

When the information request signal transmitted by wireless from the communication terminal device 51 is received by the reception unit 20 of the server device 2, the command analysis unit 32 extracts an information type identification code from the information request signal in S2411. In S2412, the information corresponding to the information type identification code as providing information is read from the information DB 22. In S2413 and S2414, the processes in S2210 through S2212 in FIG. 21 are performed. The server device 2 completes the transmission of signal including the information to be provided in the processes in S2411 through S2414.

When the signal including the provided information transmitted by wireless from the server device 2 is received by the reception unit 15 of the communication terminal device 51, the processes in S22213 and S2214 shown in FIG. 21 are performed in S2415 and S2416. In S2415, when the "capture & information acquisition mode" is set and the operation is performed, the information to be provided can be associated with the image data stored in the process in S2404 and then stored to facilitate the management. The display 3 completes the acquisition of information in the processes in S2415 and S2416.

An information requester can acquire the information depending on the indicated and set information type in the operation according to the ninth configuration example. Therefore, for example, when the information requester requests to shorten the communication time required in acquiring information, it can be realized by indicating and setting as information type not common information but summary information or address information on a network containing the information. When address information (information such as a URL, etc.) is acquired by indicating and setting the address information, detailed information can be acquired by accessing information according to the address information later. When the type of acquiring information is definite, the information type SW 66 is selected to acquire only the target type, thereby reducing acquiring unnecessary information. In this case, a plurality of selected types of information can be acquired.

Described below is the configuration of the communication terminal device 51 with an image capturing function and the server device 2 in the tenth configuration example. Considering that an available capacity of the information memory 16 easily decreases by storing image data obtained by shooting an image, the present configuration example has a configuration in which the communication terminal device 51 further has the function of giving a warning when the size of received information is larger than the available capacity of the information memory 16 in addition to the function of selecting an information type.

FIG. 24 shows the tenth configuration example.

In FIG. 24, the communication terminal device 51 omits the information acquisition mode SW 61, and a trigger signal generated when the shutter switch 56 is turned on is output to the command generation unit 13 and the image capturing unit 57. It is different from the communication terminal device 51 relating to the ninth configuration example (FIG. 22) in that it newly includes: a determination unit 71 for comparing the size of the provided information such as the provided information received by the reception unit 15 or the header information, etc. as a part of the provided information obtained according to the information which can be designated with the available capacity of the information memory 16, and determining whether or not information can be stored in the information memory 16; and an alarm unit 72 for giving a warning when it is impossible, and other configurations are the same. The alarm unit 72 gives a warning by displaying a warning on the display 3, giving a warning tone, or turning on, off, or blinking an LED (not shown in the attached drawings), etc.

The server device 2 is the same as the server device 2 according to the ninth configuration example in configuration.

Figure 25:
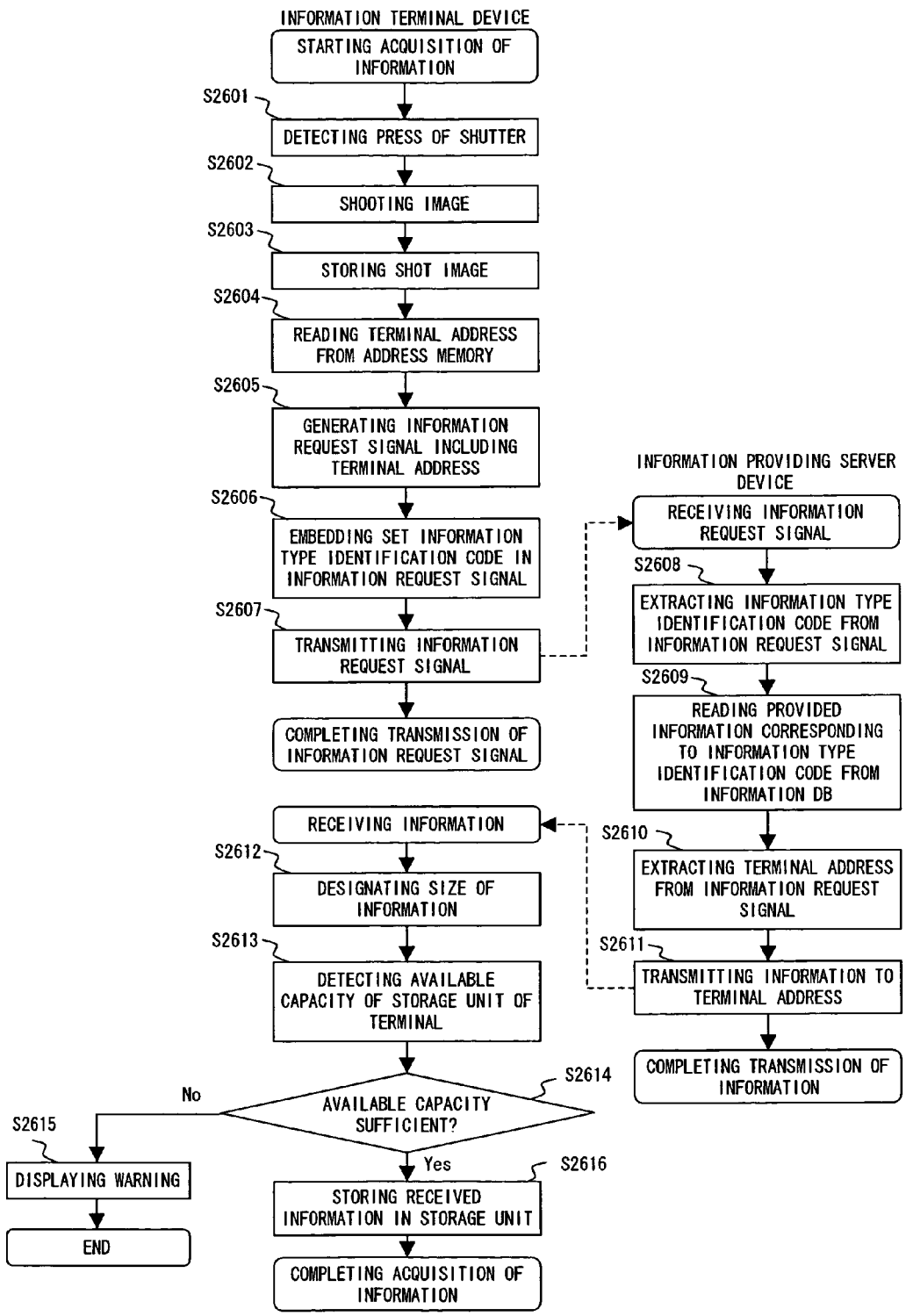
FIG. 25 is a flowchart of an operation example of a terminal device having the function of capturing an image and a server device in the tenth configuration example.

FIG. 25 is a flowchart of the operation example of the communication terminal device 51 with an image capturing function and the server device 2 in the tenth configuration example.

In FIG. 25, the processes in S2601 through S2607 and S2612 through S2616 refer to the operations of the communication terminal device 51, and the processes in S2608 through S2611 refer to the operations of the server device 2.

First, in S2601 through S2605, the processes in S1801 through S1805 in FIG. 17 are performed. Then, in S2606 through S2607, the processes in S2407 through S2408 in FIG. 23 are performed. In the processes in S2601 through S2607, the communication terminal device 51 completes the acquisition of an image and the transmission of an information request signal.

When the reception unit 20 of the server device 2 receives the information request signal transmitted by wireless by the communication terminal device 51, the processes in 2411 through S2414 shown in FIG. 23 are performed in S2608 through S2611. In the processes in S2608 through S2611, the server device 2 completes the transmission of a signal including information to be provided.

Then, when the reception unit 15 of the communication terminal device 51 receives the signal including the provided information transmitted by wireless by the server device 2, the size of the acquired provided information is designated in S2612. Otherwise, when the reception unit 15 of the terminal device 51 starts receiving the signal including the provided information transmitted by wireless by the server device 2, the size of the provided information to be acquired is designated according to the already received header information before the signal including the provided information is completely received in S2612. In S2613, the available capacity of the information memory 16 is detected. In S2614, it is determined whether or not the size of the provided information designated in S2612 is smaller than the available capacity of the information memory 16. If the determination result is YES, control is passed to S2616, and all acquired provided information is stored in the information memory 16. If the determination result is NO, control is passed to S2615, and a warning notifying that the size of the acquired information exceeds the available size of the information memory 16 is given. The communication terminal device 51 completes the acquisition of information in the processes in S2612 through S2616. When it is determined that the information acquired in S2616 exceeds the available capacity in the information memory 16, the acquisition of information is suspended, and the received information is deleted.

In the operation according to the tenth configuration example, a notification (warning) that there is no available capacity in the information memory 16 enough to store the provided information can be issued, and the provided information in which there is lost information can be prevented from being stored in the information memory 16.

In the operation relating to the present configuration example, an upper limit of the size of the information to be received and acquired is predetermined, and the determination unit 71 determined whether or not the size of the information received and acquired by the reception unit 15 is larger than the predetermined capacity. If it is determined that the acquired information is larger, the alarm unit 72 can give a warning.

In the present configuration example, when an information request signal is transmitted, the maximum size of information that can be received and acquired is set, and the information relating to the set maximum size can be added to the information request signal and transmitted. In this case, the maximum size can be automatically set based on the available capacity of the information memory 16. When the maximum size of the information extracted from the received information request signal is smaller than the information to be provided, the server device 2 transmits to the terminal device the information that the size of the provided information exceeds the maximum size of the information included in the information request signal.

Furthermore, before transmitting the providing information from the server device 2, the information including the size information about the information to be provided and transmitted (for example, the index information about the information to be provided) is first transmitted, and the communication terminal device 51 determines according to the size information whether or not the provided information is to be stored. If it is not to be stored, the provided information is not stored in the information memory 16 although it is received. When the provided information can be stored, the command generation unit generates an information acquisition enable signal for notifying that information can be acquired, the transmission unit 14 or another transmission device not shown in the attached drawings transmits the signal to the server device 2, and the server device can start transmitting information to be provided by receiving an information acquisition enable signal by the reception unit 20 or another reception device not shown in the attached drawings. When provided information cannot be stored, the command generation unit generates an information acquisition disable signal for notifying that information cannot be acquired, the transmission unit 14 or another transmission device not shown in the attached drawings transmits the signal to the server device 2, and the server device can stop transmitting the information to be provided by receiving an information acquisition disable signal by the reception unit 20 or another reception device not shown in the attached drawings.

By performing the above-mentioned processes, storing provided information having a size larger than the available capacity of the information memory 16 can be avoided.

Described below is the configuration of the communication terminal device 51 with an image capturing function and the server device 2 in the eleventh configuration example. In the present configuration example, the communication terminal device 51 has the retransmission function in addition to the above-mentioned information type selection function.

FIG. 26 shows the eleventh configuration example.

In FIG. 26, the communication terminal device 51 is different from the communication terminal device 51 relating to the tenth configuration example (FIG. 24) in that the alarm unit 72 is omitted and the 71 is replaced with a retransmission determination unit 76 for determining whether or not an information request signal is to be retransmitted by comparing the available capacity of the information memory 16 with the size of the provided information obtained according to the information designating the size of the provided information such as provided information or header information as a part of the provided information or index information about the provided information, etc. received by the reception unit 15, and other configurations are the same. However, in the communication terminal device 51 relating to the eleventh configuration example, when the retransmission determination unit 76 determines that retransmission is to be performed, an information type identification code corresponding to the information having a smaller size and referring to an already indicated and set information type is set, the command generation unit 13 adds the information type identification code to the information request signal, and the transmission unit 14 retransmits the information request signal.

The server device 2 has the same configuration as the server device 2 relating to the tenth configuration example. However, the information DB 22 stores information of a different size for each information type corresponding to each information type identification code.

Figure 27:
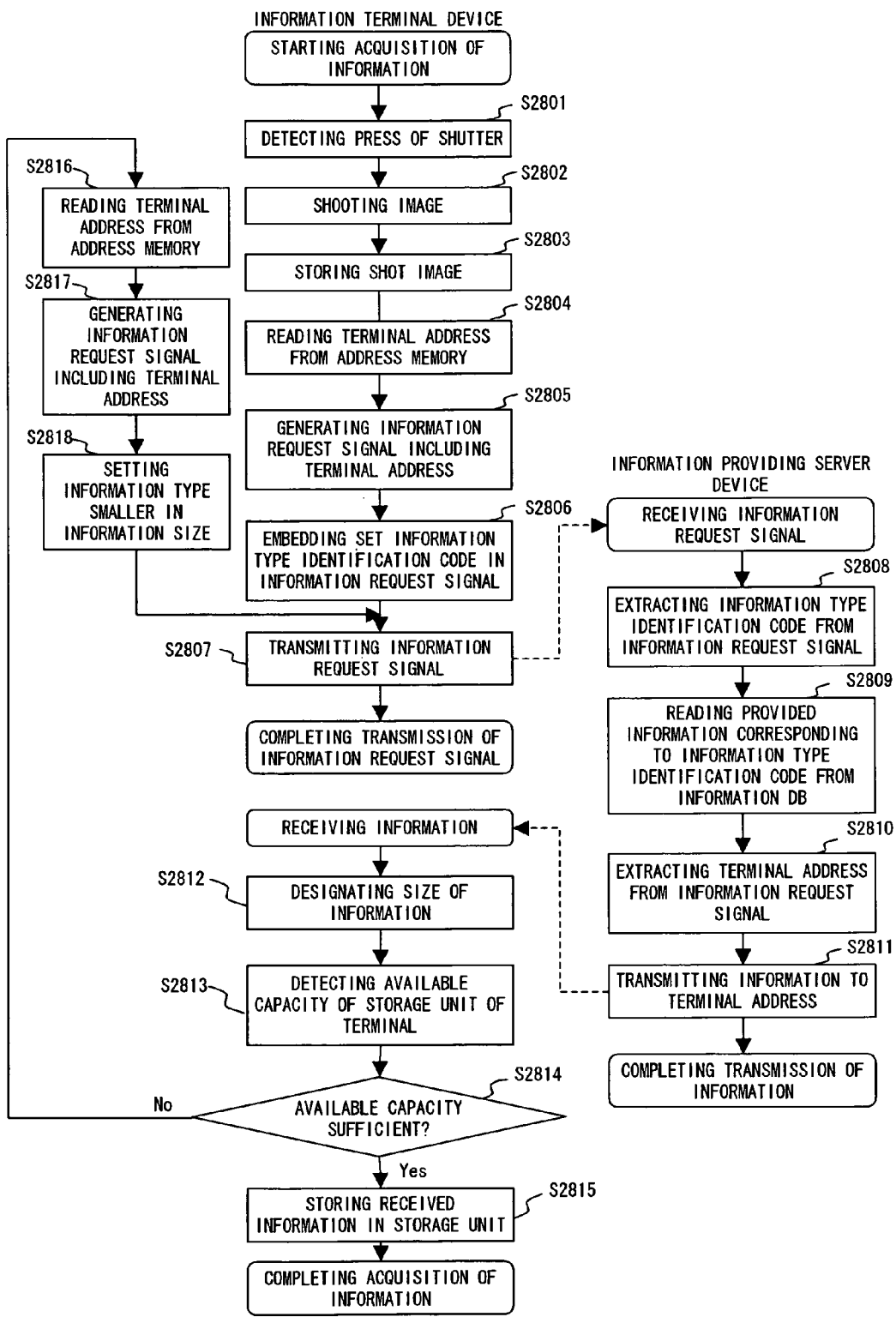
FIG. 27 is a flowchart of an operation example of a terminal device having the function of capturing an image and a server device in the eleventh configuration example.

FIG. 27 is a flowchart of the operation example of the communication terminal device 51 with an image capturing function and the server device 2 in the eleventh configuration example.

In FIG. 27, the processes in S2801 through S2807 and S2812 through S2818 refer to the operations of the communication terminal device 51, and the processes in S2808 through S2811 refer to the operations of the server device 2.

First, in S2801 through S2807, the processes in S2601 through S2607 in FIG. 25 are performed. The communication terminal device 51 completes acquiring an image and transmitting an information request signal in the processes.

When the reception unit 20 of the server device 2 receives the information request signal transmitted by wireless by the communication terminal device 51, the processes in S2608 through S2611 in FIG. 25 are performed in S2808 through S2811. The server device 2 completes transmitting the signal including the information to be provided in the processes in S2808 through S2811.

When the reception unit 15 of the communication terminal device 51 receives the signal including the provided information transmitted by wireless by the server device 2, or the reception unit 15 of the communication terminal device 51 starts receiving the signal including the provided information transmitted by wireless by the server device 2, the processes in S2612 through S2613 in FIG. 25 are performed in S2812 through S2813. In S2814, it is determined whether or not the size of the provided information designated in S2812 is smaller than the available capacity of the information memory 16. If the determination result is YES, control is passed to S2815, and all of the acquired provided information is stored in the information memory 16. The communication terminal device 51 completes acquiring information in the processes in S2812 through S2815. On the other hand, when the determination result is NO, control is passed to S2816, an information type identification code corresponding to the information having a smaller size and referring to an already indicated and set information type is set, and the information is re-requested. In S2816 and S2817, the processes in S2804 and S2805 are repeated, and an information request signal including terminal address information is generated. For example, an information code is set, in stead of the information identification code corresponding to common information, to an information identification code corresponding to the summary information and the address information in the network in which information is stored. That is, the information type identification code is changed to the information type identification code corresponding to the information of a smaller size. In S2818, the controller 18 adds the set information type identification code to the information request signal. In S2805, the communication terminal device 51 retransmits an information request signal, the server device 2 receives the retransmitted information request signal, the information of a smaller size corresponding to the type identification code included in the signal is read, and the information is transmitted to the server device 2. In the above-mentioned processes, retransmitting the above-mentioned information request signal is repeated until the size of the transmitted provided information becomes smaller than the available capacity in the information memory 16.

In S2818, the maximum information size of acquiring information can be specified. That is, the communication terminal device 51 and the server device 2 are configured as shown in FIG. 50, the maximum amount of information that can be acquired is set in S2818, and the maximum information size is embedded in the information request signal and transmitted in S2806. In the server device 2, the command analysis unit 32 extracts the information about the storage size of the information that can be acquired and included in the information request signal received by the reception unit 20, and transmits the information to the information DB 22. The information DB 22 reads the information stored in the storage size of information that can be acquired, and the transmission unit 23 retransmits it. Thus, in the variation of the eleventh configuration example, the server device 2 selects the information that the communication terminal device 51 can acquire.

In the operations of the eleventh configuration example and a variation, the information memory 16 can store the provided information of a size corresponding to the available capacity of the information memory 16.

In the operation relating to the present configuration example, a size that is an upper limit of the information that can be received and acquired is predetermined, and the retransmission determination unit 76 can determine whether or not an information request signal is to be retransmitted by comparing the size of the information received and acquired by the reception unit 15 with the predetermined size. In this case, in S2818, an information type identification code corresponding to the information having a predetermined size as an upper limit or the information of a size smaller than the predetermined size and referring to an already indicated and set information type can be set. That is, the information type identification code can be changed to an information type identification code corresponding to the information of a storage capacity of information that can be received and acquired.

In the present configuration example, the information type SW 66 can be omitted in the communication terminal device 51. However, in this case, when the size of the provided information acquired by the communication terminal device 51 is larger than the available capacity of the information memory 16, the information type identification code corresponding to the information of a smaller size and of the same type as the provided information or the maximum size of information that can be acquired is added to the information request signal and retransmitted.

Described below is the configuration of the communication terminal device 51 with an image capturing function and the server device 2 in the twelfth configuration example. In the present configuration example, the communication terminal device 51 further includes an information selection function.

Figure 28:
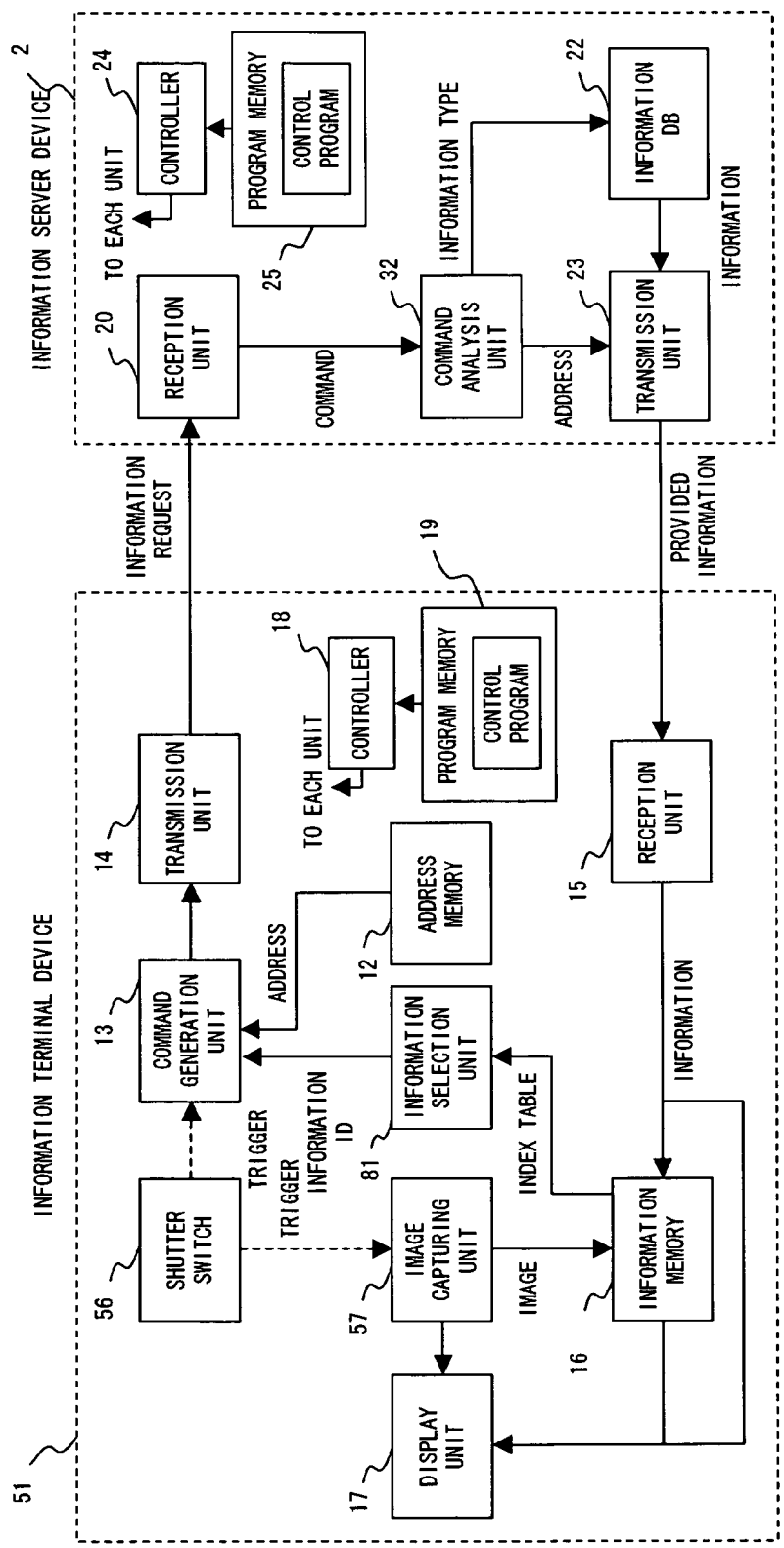
FIG. 28 shows the twelfth example of a configuration.

FIG. 28 shows the twelfth configuration example.

In FIG. 28, the communication terminal device 51 is different from the communication terminal device 51 relating to the seventh configuration example (FIG. 16) in that it newly includes an information selection unit 81 for selecting a predetermined information item from an index table according to the received index information according to the selection instruction of a user (information requester), and other configurations are the same. However, the command generation unit 13 relating to the twelfth configuration example is configured such that an information ID (also referred to as ID information) indicating the ID of the information corresponding to an information item selected from the information selection unit 81 to the generated information request signal. Furthermore, the display unit 17 can display on the display 3 an index of the information that can be provided according to the received index information to allow a user to select and indicate a predetermined information item.

On the other hand, the server device 2 is different from the server device 2 relating to the seventh configuration example in that it further includes a command analysis unit 32 for analyzing a received signal, and extracting a terminal address and an information ID from the signal, but other configurations are the same. However, the information DB 22 stores information corresponding to each information ID and index information as an item listing information about the information stored in the information DB 22 and available, and the transmission unit 23 can transmit the index information or the information corresponding to the information ID extracted by the command analysis unit 32.

Figure 29:
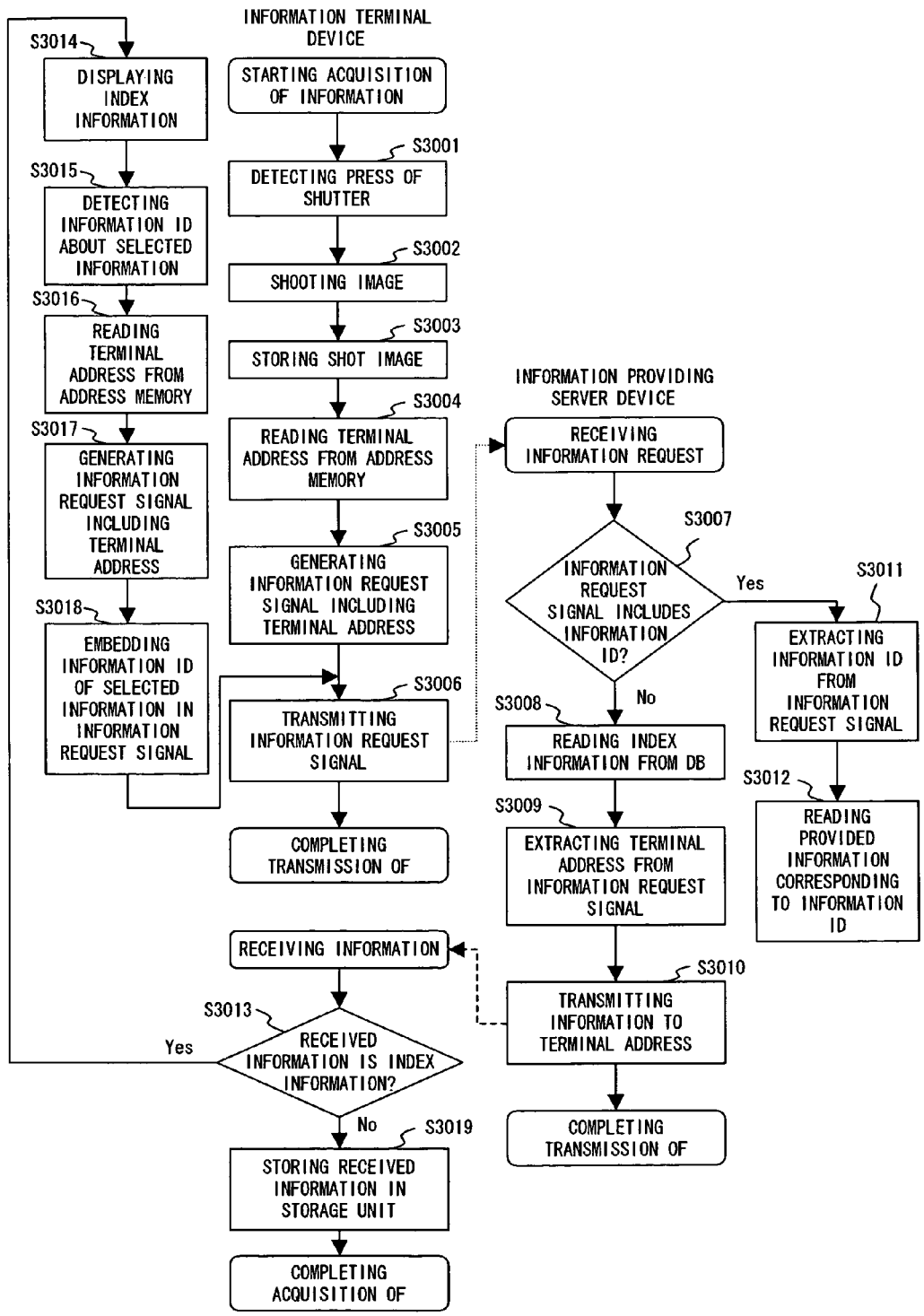
FIG. 29 is a flowchart of an operation example of a terminal device having the function of capturing an image and a server device in the twelfth configuration example.

FIG. 29 is a flowchart of an operation example of the communication terminal device 51 with an image capturing function and the server device 2 in the twelfth configuration example.

In FIG. 29, the processes in S3001 through S3006 and S3013 through S3019 refer to the operations of the communication terminal device 51, and the processes in S3007 through S3012 refer to the operations of the server device 2.

First, the processes in S3001 through S3006 are the same as the processes in S1801 through S1806 in FIG. 17. The communication terminal device 51 completes acquiring an image and transmitting an information request signal in the processes in S3001 through S3006.

When the reception unit 20 of the server device 2 receives the information request signal transmitted by wireless by the communication terminal device 51, it is determined whether or not an information ID is added to the received information request signal in S3007.

When the determination is NO, control is passed to S3008, index information is read from the information DB 22, a terminal address is extracted from the information request signal received in S3009, and index information is transmitted to the terminal address in S3010. In these processes, when no information ID is added to an information request signal, the index information is transmitted. The index information is item listing information about information that can be provided and stored in the information DB 22, and corresponds to an information ID for identification of the information corresponding to at least an item.

When the determination result in S3007 is YES, control is passed to S3011, an information ID is extracted from an information request signal, the information corresponding to the information ID is read from the information DB 22 in S3012, a terminal address is extracted from the received information request signal in S3009, and the information corresponding to the information ID is transmitted to the terminal address in S3010. In these processes, the information corresponding to the information ID is transmitted when an information ID is added to the information request signal.

The server device 2 completes transmitting a signal including index information or information to be provided in the processes in S3007 through S3012.

When the reception unit 15 of the communication terminal device 51 receives a signal transmitted by wireless by the server device 2, it is determined in S3013 whether or not the information contained in the received signal is index information.

When the determination result is YES, control is passed to S3014, and the index screen according to the index information is displayed on the display 3. Thus, a user can obtain the information that can be acquired on the displayed index screen. In S3015, an instruction of the user to select an information item on the index screen being displayed is detected, and the information ID of the information corresponding to the information item indicated in the select instruction is determined. In S3016 and S3017, the processes in S3004 and S3005 are performed, an information request signal including a terminal address is generated, and the information ID of the requested information is added to the information request signal in S3018. In these processes, when index information is included in the received signal, the information request signal to which the information ID based on the select instruction according to the information item selection instruction by the user is transmitted again to the server device 2.

On the other hand, when the determination result in S3013 is NO, control is passed to S3019, and the information contained in the received signal (provided information) is stored in the information memory 16. The communication terminal device 51 completes acquiring information in the processes in S3013 through S3019.

In the operation in the twelfth configuration example, an information requester can obtain the information that can be acquired based on the transmitted index, and only necessary information can be acquired among them. In S3014, when a desired information for a user is not presented, the information selection unit 81 selects cancellation (not shown in the attached drawings), thereby suspending acquiring information.

Described below is the configuration of the terminal device 1*b* (FIG. 48) having no display in the thirteenth configuration example and the server device 2. In the present configuration example, the terminal device 1*b* further includes the function of externally outputting acquired information through a cable, an electrode, etc.

Figure 30:
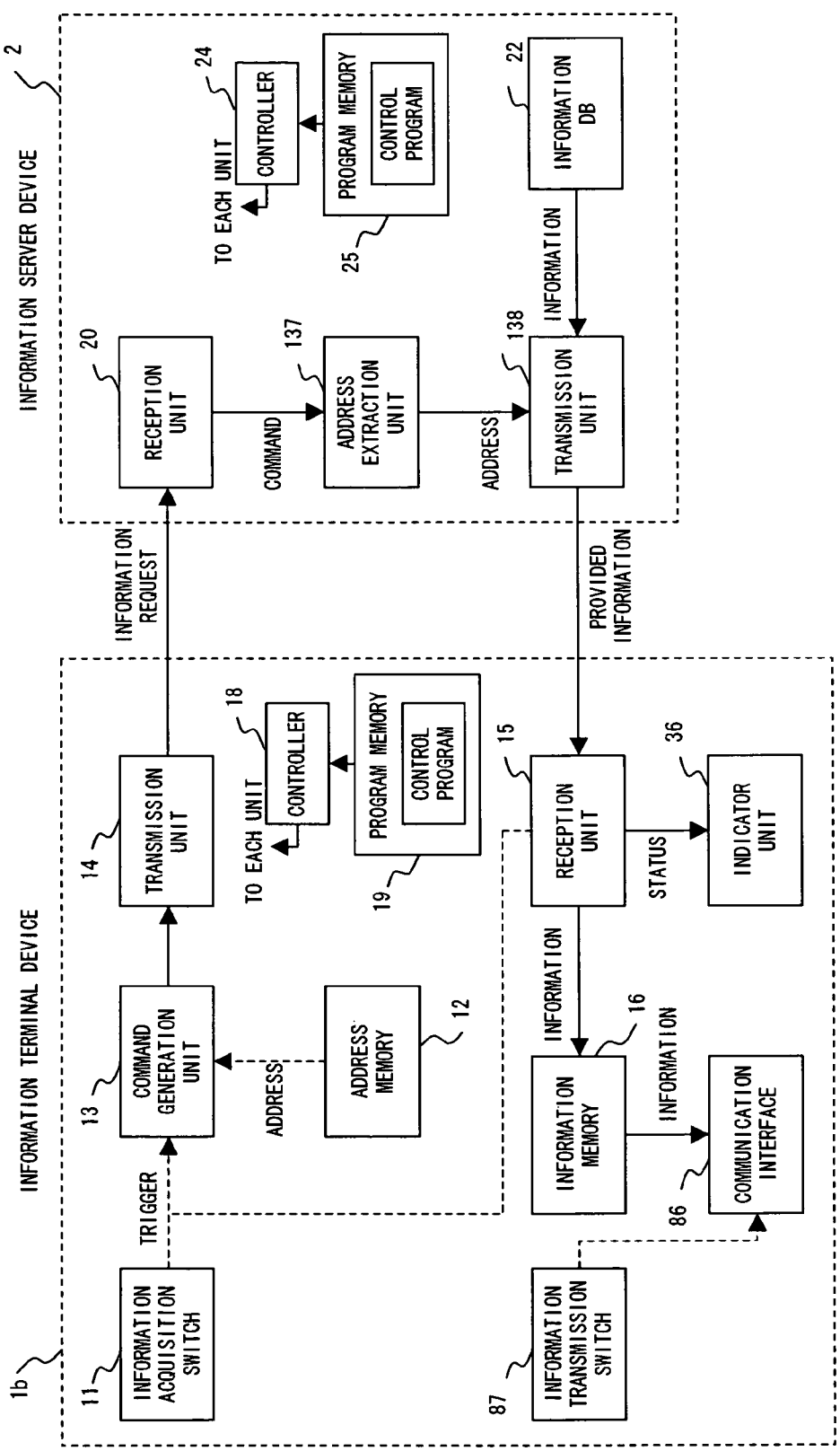
FIG. 30 is a block diagram showing the thirteenth example of a configuration.

FIG. 30 is a block diagram showing the thirteenth configuration example.

In FIG. 30, the terminal device 1*b* is different from the terminal device 1*b* relating to the third configuration example (FIG. 6) in that it newly includes: a communication interface 86 for outputting (transmitting) the information stored in the information memory 16 through a cable, a connector, or a socket to an external unit (external equipment, etc.); and a information transmission switch 87 for outputting an information transmission directive signal to the communication interface 86 when the information transmission button (not shown in the attached drawings) is pressed, but other configurations are the same. The communication interface 86 can be connected through a cable such as a USB interface, a parallel interface, or a serial interface, etc., can be connected like a cradle, etc. directly using a connector to a communication interface of external equipment, or can be connected by wireless in accordance with Bluetooth (wireless communication standard), etc. In the terminal device 1*b*, the communication interface 86 can be configured to output the information received by the reception unit 15 directly to an external equipment without using the information memory 16.

The server device 2 has the same configuration as the server device 2 relating to the third configuration example.

Figure 31:
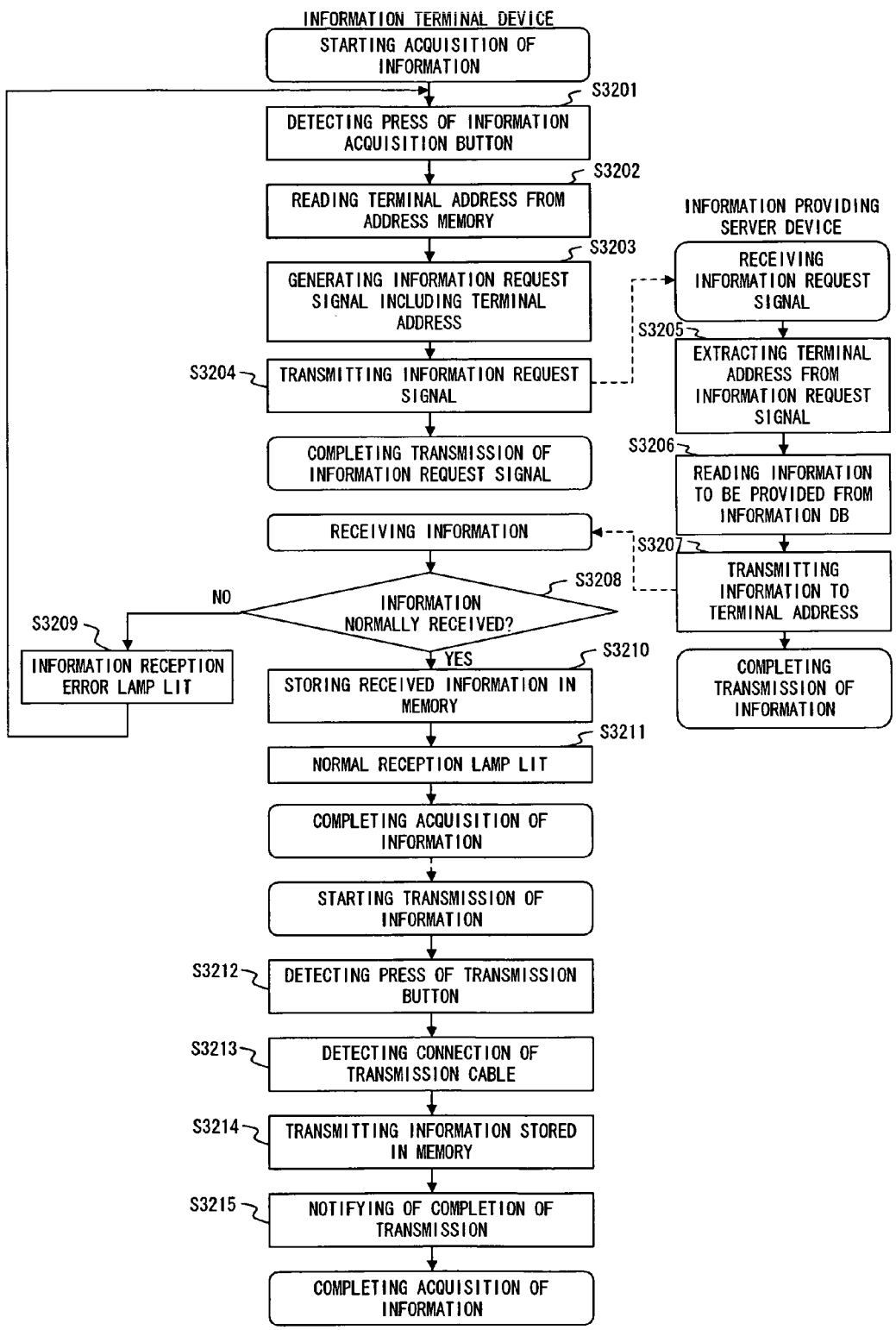
FIG. 31 is a flowchart of an operation example of a terminal device and a server device in the thirteenth configuration example.

FIG. 31 is a flowchart of the operation example of the terminal device 1*b* having no display and the server device 2 in the thirteenth configuration example.

In FIG. 31, the processes in S3201 through S3204, S3208 through S3211, and S3212 through S3215 refer to the operations of the terminal device 1*b*, and the processes in S3205 through S3207 refer to the operations of the server device 2.

First, in S3201 through S3205, the processes in S701 through S704 in FIG. 7 are performed. In these processes, the terminal device 1*b* completes transmitting an information request signal.

When the reception unit 20 of the server device 2 receives an information request signal transmitted by wireless from the terminal device 1*b*, the processes in S705 through S707 in FIG. 7 are performed in S3205 through S3207. The server device 2 completes transmitting a signal including information to be provided in the processes in S3205 through S3207.

The reception unit 15 of the terminal device 1b receives a signal including provided information transmitted by wireless by the server device 2. In S3208, determination on a reception error is performed as in S708, and when the reception unit 15 does not normally receive information, the reception error lamp 9b is lit for a predetermined time as in S709. On the other hand, when information can be normally received, the processes in S3210 and S3211 as in S710 and S711 are performed, thereby completing the acquisition of information. As described above, the flow of the processes of acquiring the information in S3201 through S3211 are the same as the process flow of the third configuration example explained by referring to FIG. 7.

Described below is the process flow relating to the transmission of information stored in the information memory 16. First, in S3212, it is detected that a transmission cable (communication cable) has been connected to the communication interface 86. In S3213, it is detected that an information transmission button provided for the terminal device 1b has been pressed. In S3214, the information stored in the information memory 16 is transmitted through the communication interface 86. In S3215, a notification that the transmission has been completed is issued. The notification is given by, for example, turning on, turning off, and blinking the indicator lamp provided for the terminal device 1b. The terminal device 1b completes transmitting information in the processes in S3212 through S3215.

In the operation according to the thirteenth configuration example, the image data and provided information acquired by the communication terminal device 51 can be externally output.

The transmission of information stored in the information memory 16 can be automatically started by detecting the cable connected to the communication interface 86 without providing the information transmission switch 87.

Described below is the configuration of the communication terminal device 51 with an image capturing function and the server device 2 in the fourteenth configuration example. In the present configuration example, the communication terminal device 51 further has the function of transmitting by wireless a shot image and acquired information to a predetermined terminal device and server device.

Figure 32:
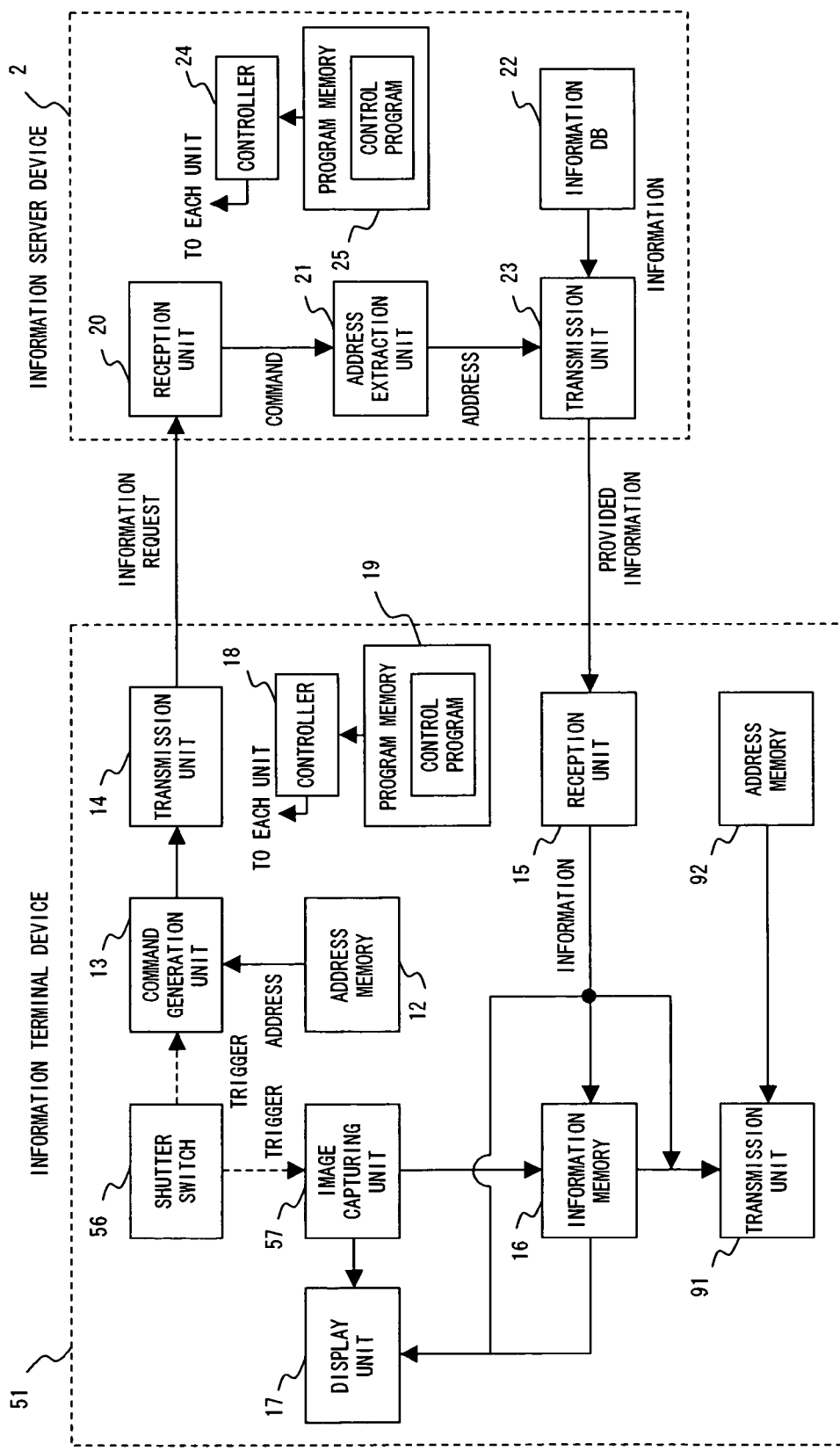
FIG. 32 is block diagram showing the fourteenth example of a configuration.

FIG. 32 is a block diagram of the fourteenth configuration example.

In FIG. 32, the communication terminal device 51 is different from the communication terminal device 51 relating to the seventh configuration example (FIG. 16) in that it newly includes a transmission unit 91 for transmitting by wireless the information stored in the information memory 16, and address memory 92 storing the destination address, and other configurations are the same.

The server device 2 has the same configuration as the server device 2 relating to the seventh configuration example.

Figure 33:
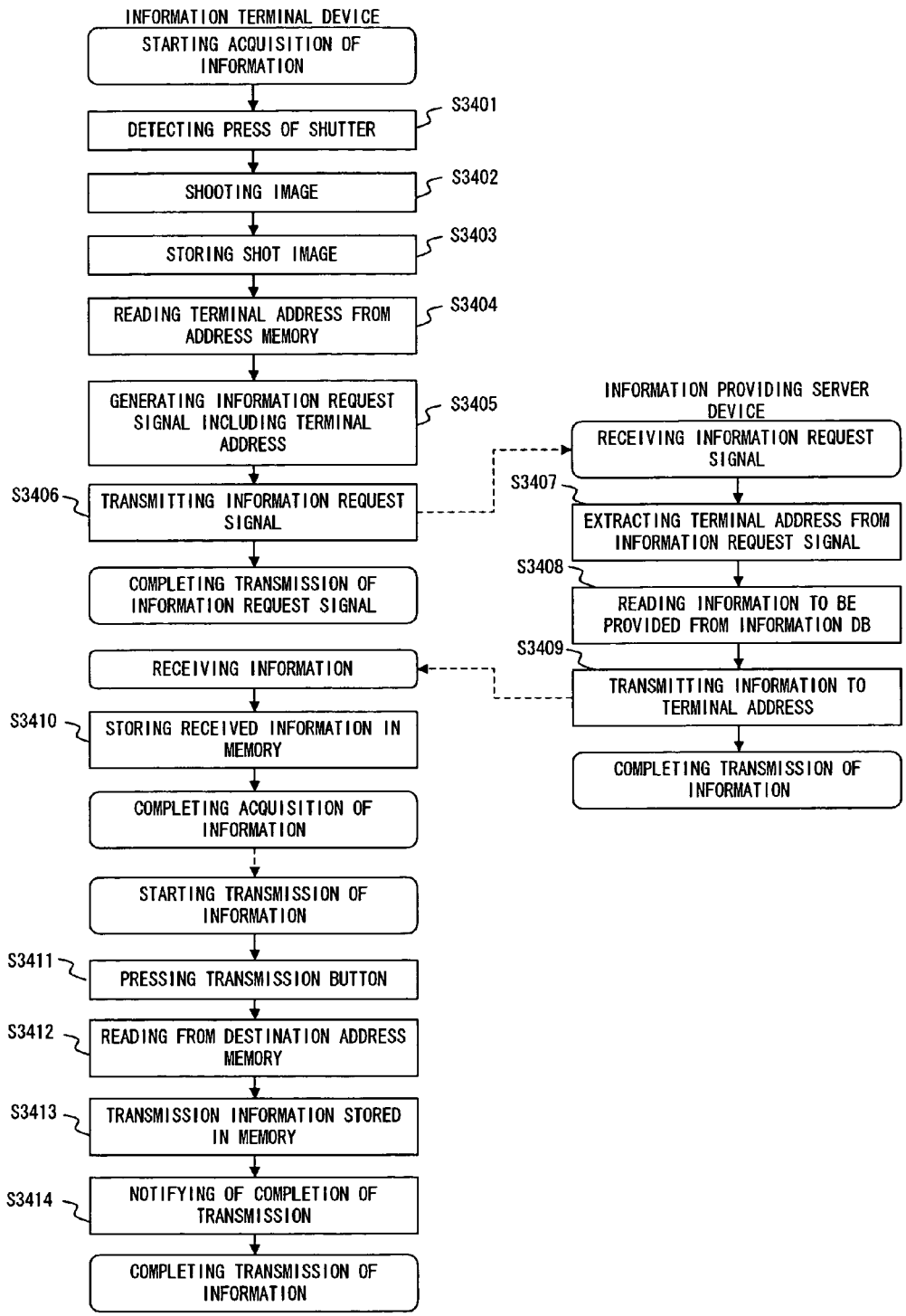
FIG. 33 is a flowchart of an operation example of a terminal device having the function of capturing an image and a server device in the fourteenth configuration example.
Figure 34:
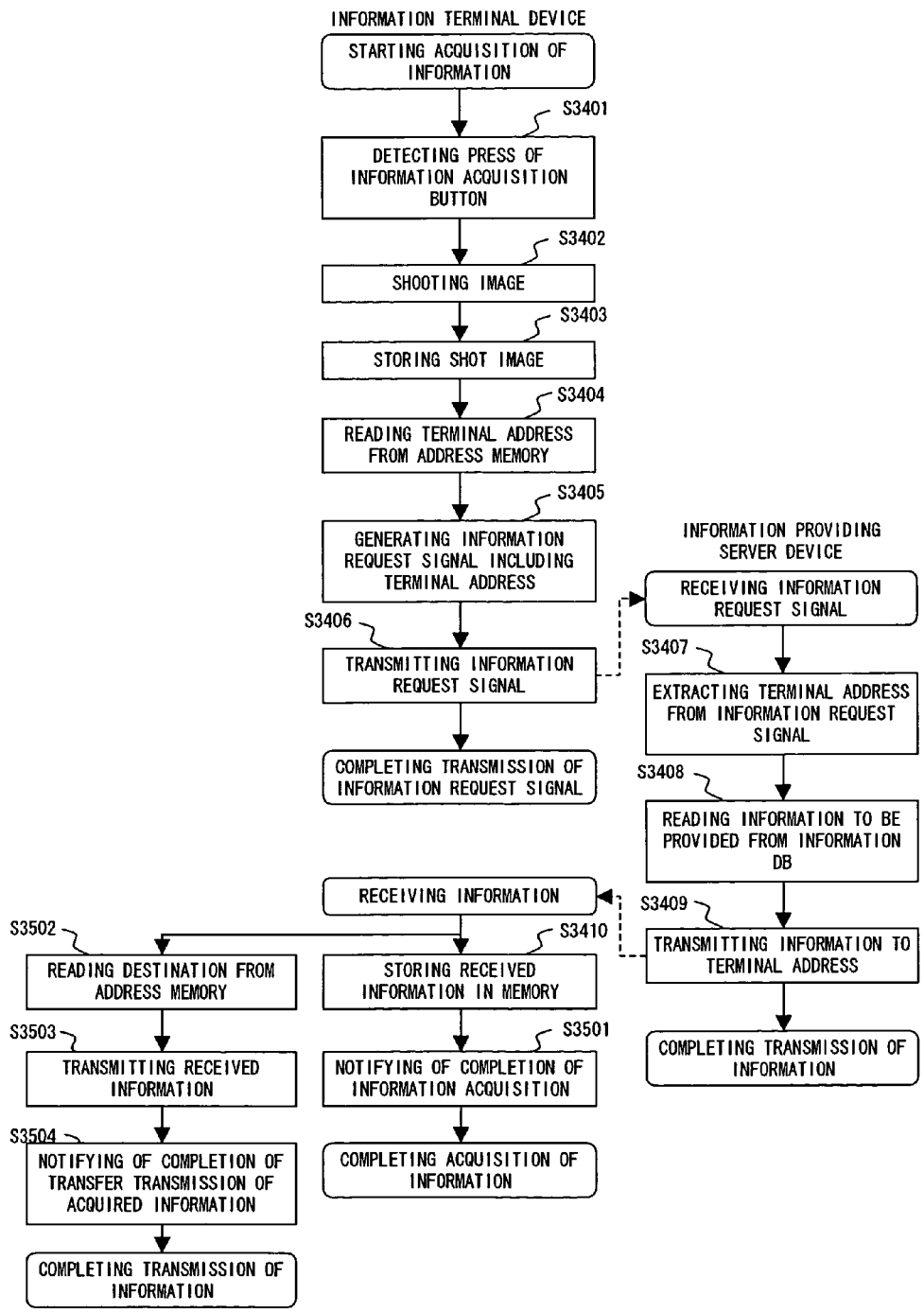
FIG. 34 is a flowchart of an operation example of a terminal device having the function of capturing an image and a server device in the fourteenth configuration example.

FIGS. 33 and 34 are flowcharts of the operation example of the communication terminal device 51 with an image capturing function and the server device 2 in the fourteenth configuration example.

FIG. 33 shows the operation of transmitting acquired information to a predetermined destination as necessary.

In FIG. 33, the processes in S3401 through S3406, S3410, and S3411 through S3414 refer to the operations of the communication terminal device 51, and the processes in S3407 through S3409 refer to the operations of the server device 2.

First, in S3401 through S3406, the processes in S1801 through S1806 in FIG. 17 are performed. In these processes, the communication terminal device 51 completes acquiring an image and transmitting an information request signal.

When the reception unit 20 of the server device 2 receives an information request signal transmitted by wireless by the communication terminal device 51, the processes in S1807 through S1809 in FIG. 17 are performed in S3407 through S3409. The server device 2 completes transmitting a signal including the providing information in the processes in S3407 through S3409.

When the reception unit 15 of the communication terminal device 51 receives a signal including the provided information transmitted by wireless by the server device 2, the process in S1810 in FIG. 17 is performed in S3410. The communication terminal device 51 completes acquiring information in the process in S3410. In the process flow of transmitting the information (acquired image data and provided information, etc.) stored in the information memory 16, a press of a transmission button (not shown in the attached drawings) provided for the communication terminal device 51 is detected in S3411. In S3412, the destination address is read from the address memory 92 in S3412. In S3413, the information stored in the information memory 16 is transmitted to the destination address. The information transmitted at this time can be all or part of the information stored in the information memory 16, or the image data or provided information stored in the information memory 16 selected at an instruction of an information requester before a press of the transmission button. In S3414, the notification that the transmission has been completed is issued. The notification is given by, for example, turning on, turning off or blinking of the LED (not shown in the attached drawings), or indication on the display 3 on the communication terminal device 51. The communication terminal device 51 completes transmitting information in the processes in S3411 through S3414.

In the operation shown in FIG. 33, the acquired information can be transmitted to a predetermined destination as necessary.

FIG. 34 shows the operation of automatically transferring the information to a predetermined destination upon receipt of the information.

In FIG. 34, when the reception unit 15 of the communication terminal device 51 receives a signal including the provided information transmitted by wireless by the server device 2, the processes in S3410 and S3502 are started. That is, in S3410, the acquired information is stored in the information memory 16. In S3501, a notification that information has been completely acquired is issued to an information requester. The communication terminal device 51 completes acquiring information in the processes in S3410 and S3501. The processes in S3502 through S3504 are performed in parallel with the process of storing received information in the information memory 16 in S3410 and S3501. In S3502, the destination address is read from the address memory 92. In S3503, the transmission unit 91 transmits the information received by the reception unit 15 to the address read in S3502. In 3504, the notification that the transmission and transfer of acquired information has been completed is issued. The communication terminal device 51 completes transmitting information in the processes in S3502 through S3504. The notification in S3501 and S3504 is issued by turning on, turning off, blinking of the LED (not shown in the attached drawings), or displaying on the display 3 provided for the communication terminal device 51. Without a notification in S3501, the notification that information is acquired and the acquired information is completely transmitted can be issued when the both processes in S3410 and S3503 are completed. Unlike in FIG. 33, the process of transmitting the information received by the communication terminal device 51 in FIG. 34 is automatically performed without detecting the transmitting operation by a user. To perform the process, the destination address is stored in the address memory 92, and the received information is automatically transmitted to the address stored in the address memory 92.

The address memory 92 stores an Internet address such as a URL, an IP address, etc. and a telephone number.

In the operation shown in FIG. 34, the acquired information is stored in the information memory 16, and automatically transferred to a predetermined destination.

It is not always necessary to store the information received by the reception unit 15 in the information memory 16. At this time, the processes in S3410 and S3501 in FIG. 34 are not performed.

In the operation according to the fourteenth configuration example, the information acquired by the communication terminal device 51 can be automatically transmitted to external equipment.

Figure 35:
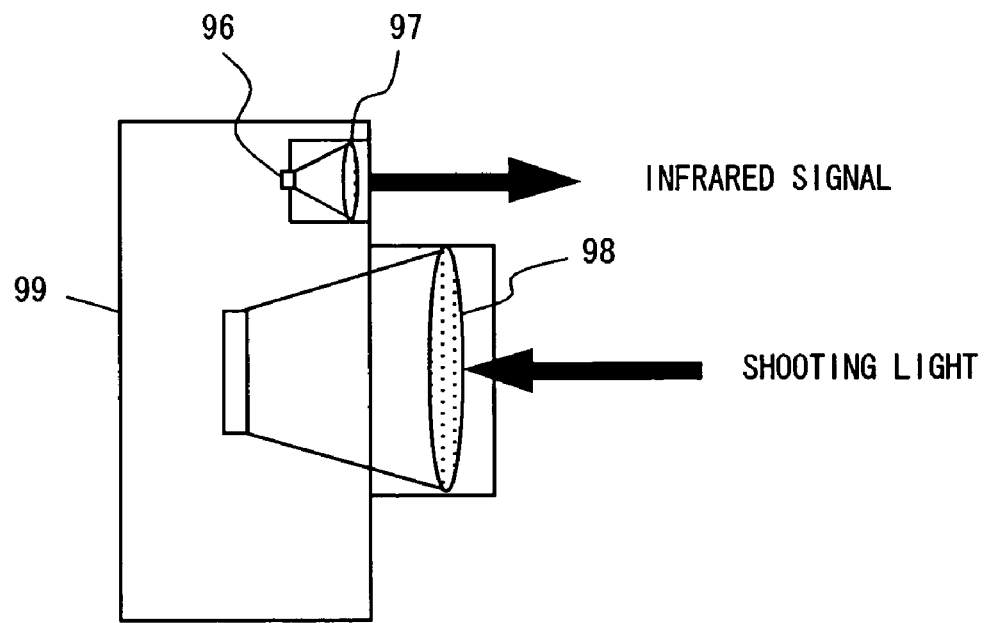
FIG. 35 shows a configuration example of a terminal device having the shape of a camera and the function of capturing an image.

The above-mentioned communication terminal device 51 with an image capturing function can also be configured to have the shape of camera. FIG. 35 shows an example of the communication terminal device 51 having such shape. In FIG. 35, a light-emitting device 96 emits an infrared signal (information request signal) having directivity through a lens 97, and an image capturing device 99 converts a shooting light input through the taking lens 98 during image capturing to an electric signal. In the communication terminal device 51, it is obvious that the direction of the taking lens 98 (optical axis direction of the taking lens 98) matches the directivity direction of the infrared signal output by the light-emitting device 96.

In the above-mentioned configuration examples, with a view of inhibiting the use of provided information by a third party, a terminal device can transmit an encryption key with an information request signal, and a server device can encrypt the information to be provided using the encryption key and transmit the encrypted information. The configuration is explained below as the configuration of the terminal device 1 and the server device 2 in the fifteenth configuration example.

FIG. 36 shows the fifteenth configuration example.

In FIG. 36, the terminal device 1 is different from the terminal device 1 relating to the first configuration example (FIG. 2) in that it newly includes: an encryption key generation unit 101 for generating an encryption key and a decryption key; a decryption key memory 102 storing the decryption key generated by the encryption key generation unit 101; and a decryption unit 103 for decrypting the encrypted provided information received by the reception unit 15 using the decryption key stored in the decryption key memory 102, and other configurations are the same. However, the command generation unit 13 relating to the fifteenth configuration example generates an information request signal including the terminal address read from the address memory 12 when a trigger signal is input, and adds the encryption key generated by the encryption key generation unit 101 to the information request signal.

The server device 2 is different from the server device 2 relating to the first configuration example in that it includes the command analysis unit 32 for analyzing a received signal for the address extraction unit 21 and extracting a terminal address and an encryption key from the signal, and newly includes: encryption key memory 104 storing an encryption key extracted by the 32; and an encryption unit 105 for encrypting the information read from the information DB 22 using an encryption key stored in encryption key memory 104, and outputting the encrypted information to the transmission unit 23, and other configurations are the same FIG. 37 is a flowchart of the operation example of the terminal device 1 and the server device 2 in the fifteenth configuration example.

In FIG. 37, the processes in S3701 through S3707 and S3713 through S3715 refer to the operations of the terminal device 1, and the processes in S3708 through S3712 refer to the operation of the server device 2.

First, in S3701 through S3703, the processes in S301 through S303 in FIG. 3 are performed. In S3704, the encryption key generation unit 101 generates an encryption key and a decryption key. In S3705, the generated decryption key is stored in the decryption key memory 102. In S3706, the encryption key generated in S3704 is added to the information request signal including the terminal address generated in the preceding step. In S3707, the information request signal obtained in the preceding step is transmitted by wireless by the transmission unit 14. In the processes in S3701 through S3707, the terminal device 1 completes transmitting the information request signal.

When the reception unit 20 of the server device 2 receives the information request signal transmitted by wireless from the terminal device 1, the command analysis unit 32 extracts an encryption key from the information request signal in S3708, and the encryption key is stored in the S3708. In S3709, the command analysis unit 32 extracts a terminal address from an information request signal. In S3710, information to be provided is read from the information DB 22. In S3711, the information read in the preceding step is encrypted by the encryption key stored in the encryption key memory 104. In S3712, the transmission unit 23 transmits by wireless the signal including the information encrypted in the preceding step to the terminal address extracted in S3709. The server device 2 completes transmitting the signal including the information to be provided in the processes in S3708 through S3712.

When the reception unit 15 of the terminal device 1 receives the signal including the provided information transmitted by wireless by the server device 2, the decryption unit 103 decrypts the provided information using the decryption key stored in the decryption key memory 102 in S3713. In S3714, the decrypted provided information is stored in the information memory 16. In S3715, the process in S309 shown in FIG. 3 is performed. In these processes in S3713 through 3715, the terminal device 1 completes acquiring information.

In the operation according to the fifteenth configuration example, the information to be provided is encrypted and then transmitted. Therefore, the use of the provided information by the third party can be prohibited.

When the information request signal received by the reception unit 20 does not include an encryption key, the information read from the information DB 22 is not encrypted and transmitted. Thus, the information read from the information DB 22 when no encryption key is included in the information request signal can be different from the information encrypted using an encryption key and then transmitted.

The encryption selection function of selecting encryption/no-encryption depending on the information provided by the server device 2 can be added to encrypt and transmit only the information selected for encryption by the encryption selection function. In this case, in the terminal device 1, the signal received by the reception unit 15 is decrypted by the decryption unit 103 only when it is encrypted. Thus, the information that can be used by the third party is transmitted without encryption, thereby preventing time from being wasted by unnecessary processes by the server device 2.

In the above-mentioned various configuration examples, from the viewpoint of preventing double acquisition of the same information, an information ID for designation of information is added to the information to be provided, and the terminal device stores the information ID added to the received provided information. Thus, the information ID added to the received provided information can be compared with the acquired information ID, thereby preventing the same information from being double acquired. The configuration is explained below as the configuration of the terminal device 1 and the server device 2 in the sixteenth configuration.

FIG. 38 shows the sixteenth configuration example.

In FIG. 38, the terminal device 1 is different from the information acquisition device relating to the first configuration example (FIG. 2) in that it newly includes: information acquisition history memory 111 for storing an information ID added to provided information acquired by the reception unit 15; and an information storage determination unit 112 for determining whether or not the acquired provided information has already been acquired by comparing the information ID added to the provided information with the information ID already stored in the information acquisition history memory 111, and then determining according to the determination result whether or not the received provided information is to be stored in the information memory 16, and other configurations are the same.

The server device 2 has the same configuration as the server device 2 according to the first configuration example. However, each information stored in the information DB 22 is provided with an information ID as information for designation (identification) of the information.

FIG. 39 is a flowchart of an operation example of the terminal device 1 and the server device 2 in the sixteenth configuration example.

In FIG. 39, the processes in S3901 through S3904 and S3908 through S3912 refer to the operations of the terminal device 1, and the processes in S3905 through S3907 refer to the operations of the server device 2.

In the processes in 3901 through S3904, the processes in S301 through S304 shown in FIG. 3 are performed. In the processes in S3901 through S3904, the terminal device 1 completes transmitting an information request signal.

When the reception unit 20 of the server device 2 receives the information request signal transmitted by wireless by the terminal device 1, the process in S305 shown in FIG. 3 is performed in S3905. In S3906, the information provided from the information DB 22 and the information ID added to the information are read. In S3907, the transmission unit 23 transmits by wireless a signal including the read information and the information ID added to the information to the extracted terminal address. In the processes in S3905 through S3907, the server device 2 completes transmitting a signal including information to be provided.

When the reception unit 15 of the terminal device 1 receives the signal including the provided information transmitted by wireless by the server device 2, and the provided information and the information ID added to the information is acquired, it is determined in S3908 whether or not the acquired information ID has already been stored in the information acquisition history memory 111. If the determination result is YES, control is passed to S3912. If the determination result is NO, control is passed to S3909. In S3909, the obtained provided information is stored in the information memory 16. In S3910, the information ID added to the provided information stored in the preceding step is stored in the information acquisition history memory 111. In S3911, the process in S309 shown in FIG. 3 is performed. When the determination result in S3908 is YES, the obtained provided information is not stored in the information memory 16. In S3912, it is notified that the acquired provided information has already been acquired. The notification is issued by turning on, turning off, or blinking the LED (not shown in the attached drawings) provided for the terminal device 1 or displaying the notification on the display 3, etc.

The terminal device 1 completes acquiring information in the processes in S3908 through S3912.

In the operations according to the sixteenth configuration example, if the information ID added to the acquired provided information has already been stored in the information acquisition history memory 111, the acquired provided information is not stored in the information memory 16. Thus, the same information can be prevented from being double acquired.

In the present configuration example, it is determined whether or not the provided information has already been acquired using the above-mentioned information ID. The information ID can be replaced with the address of the device (the server device 2 in the present example) as a source of the information to be provided when the server device 2 provides only one type of information, etc. When many types of information are provided using a plurality of server devices, an information ID and a device address can be used in combination.

In the above-mentioned various configuration examples, from the viewpoint of the security of the information transmitted from the terminal device, the terminal device can encrypt the information and then transmits it. The configuration is explained below as a configuration of the terminal device 1 and the server device 2 in the seventeenth configuration example.

Figure 40:
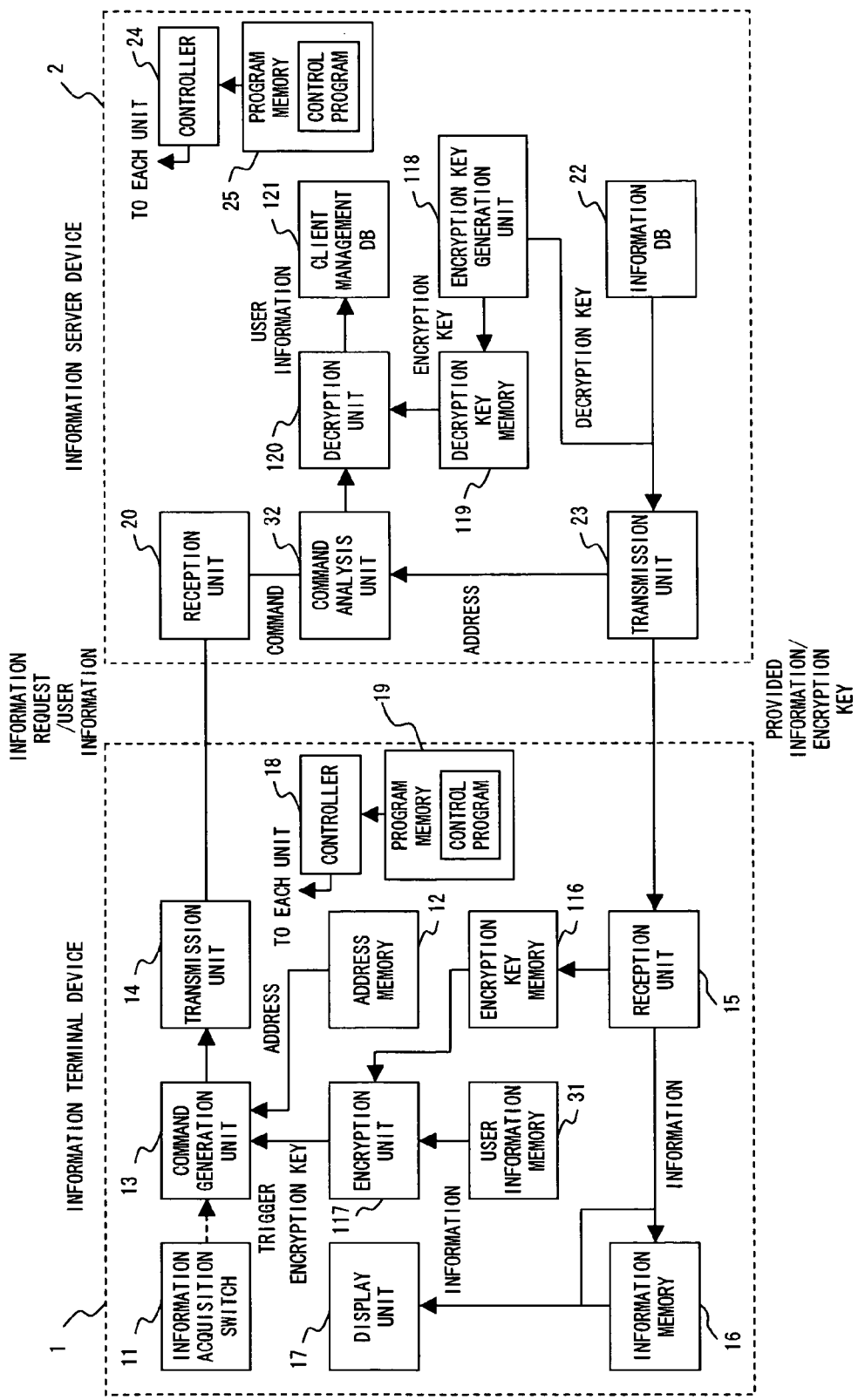
FIG. 40 is a block diagram showing the seventeenth example of a configuration.

FIG. 40 shows the seventeenth configuration example.

In FIG. 40, the terminal device 1 is different from the terminal device 1 relating to the second configuration example (FIG. 4) in that it newly includes: encryption key memory 116 storing an encryption key received and acquired by the reception unit 15; and an encryption unit 117 for encrypting user information stored in user information memory using an encryption key stored in the information memory 16, and other configurations are the same. The command generation unit 13 adds user information encrypted by the encryption unit 117 when adding the user information to the information request signal including a generated terminal address. The present configuration example is an example of adding encrypted user information to an information request signal, but other information can be encrypted and added to an information request signal. All or part of information to be added to an information request signal can be encrypted.

On the other hand, the server device 2 is different from the server device 2 relating to the second configuration example in that it newly includes: a client management DB 121 associating user information with a terminal address and storing it in place of the information selection unit 33; an encryption key generation unit 118 for generating an encryption key and a decryption key; decryption key memory 119 for storing a decryption key generated by the encryption key generation unit 118; and a decryption unit 120 for decrypting encrypted user information using a decryption key stored in the decryption key memory 119, and other configurations are the same. The transmission unit 23 relating to the seventh configuration example also transmits a generated user information request signal including an encryption key.

FIG. 41 is a flowchart of the operation example of the terminal device 1 and the server device 2 in the seventeenth configuration example. In the operation example, it explains the process flow in case that user information is requested by the server device 2 when providing information.

In FIG. 41, the processes in S4101 through S4104 and S4115 through S4125 refer to the operations of the terminal device 1, and the processes in S4105 through S4114 refer to the operations of the server device 2.

First, in S4104 through S4104, the processes in S301 through S304 shown in FIG. 3 are performed. The terminal device 1 completes transmitting an information request signal by the process in S4101 through S4104. Since the terminal device 1 according to the present configuration example encrypts user information using an encryption key transmitted from the server device 2, the encryption key has not been acquired at this point, the user information cannot be transmitted.

When the reception unit 20 of the server device 2 receives the information request signal transmitted by wireless by the terminal device 1, it is determined in S4105 whether or not user information is included in the information request signal. If the determination result is YES, control is passed to S4112. If the determination result is NO, control is passed to S4106.

The case in which the determination result is NO is first explained. In this case, control is passed to S4106, and the command analysis unit 32 extracts a terminal address from the information request signal. In S4107, it is determined whether or not a terminal address extracted in the preceding step has been registered (stored) in the client management DB 121. If the determination result is YES, control is passed to S4114 described later. When the determination result is NO, control is passed to S4108. In S4108, the encryption key generation unit 118 generates an encryption key and a decryption key. In S4109, the decryption key generated in the preceding step is stored in the decryption key memory 119. In S4110, a user information request signal including the generated encryption key is generated. In S4111, the user information request signal is transmitted by wireless to the terminal address extracted in S4106.

On the other hand, when the determination result in S4105 is YES, control is passed to S4112, the user information encrypted is extracted from the information request signal, and the information is decrypted using the decryption key stored in the decryption key memory 119. In S4113, the terminal address extracted from the information request signal is associated with the user information decrypted in the preceding step, and is registered (stored) in the client management DB 121. In S4114, information corresponding to the user information is read from the information DB 22. Then, in S4111, the transmission unit 23 transmits the signal including the information by wireless to the extracted terminal address.

In the processes in S4105 through S4114, the server device 2 completes transmitting a user information request signal including an encryption key or transmitting a signal including providing information.

When the reception unit 15 of the terminal device 1 receives the signal transmitted by wireless from the server device 2, it is determined in S4115 whether the signal is a user information request signal or a signal including provided information. If it is a signal including a user information request signal, control is passed to S4116 and if it is a signal including provided information, control is passed to S4124.

First, when the determination result is a user information request signal, control is passed to S4116, and an encryption key is extracted from the received user information request signal. In S4117, the extracted encryption key is stored in the encryption key memory 116. In S4118, the user information is read from the user information memory 31. In S4119, the read user information is encrypted by an encryption key stored in the encryption key memory 116. In the processes in S4120 and S4121, the above-mentioned processes in S4102 and S4103 are performed. In S4122, the user information encrypted in S4119 is added to the information request signal generated in the preceding step. In S4123, the information request signal obtained in the preceding step is transmitted by wireless by the transmission unit 14. In the processes in S4116 through S4123, the terminal device 1 completes transmitting the user information.

When the determination result in S4115 is a signal including provided information, the processes in S308 and S309 shown in FIG. 3 are performed in S4124 and S4125. In the processes in S4124 and S4125, the terminal device 1 completes acquiring information.

Thus, in the operation relating to the seventeenth configuration example, user information is encrypted and transmitted, thereby the security of the user information can be maintained.

In the information provider according to the present configuration example, at first the terminal device 1 transmits an information request signal including a terminal address, not including user information (S4104). Thus, the server device 2 transmits an encryption key. For example, by the terminal device 1 adding information requesting an encryption key (encryption key request information) to an information request signal including a terminal address, the server device can transmit an encryption key.

The above-mentioned third, tenth through twelfth, and seventh configuration examples, the terminal device 1 or the communication terminal device 51 with an image capturing function transmits a signal two or more times to the server device 2. It is necessary that the first information request signal is to be transmitted from the infrared emitter 5 having the directivity of the transmission unit 14. However, the directivity is not required in the second (or subsequent) transmission. Therefore, the terminal device 1 (or 51) can perform transmission to the antenna 8 of the server device 2 using the built-in antenna 6. In this case, for example, in the twelfth configuration example, the reception unit 15 can be a transmission/reception unit having a transmission function and the transmission unit 23 can be a transmission/reception unit having a reception function, an information request signal including an information ID can be transmitted from the reception unit 15 (having a transmitting function) through the built-in antenna 6, and the signal can be received through the antenna 8 of the transmission unit 23 (having a receiving function). The configuration is explained below as a configuration of the communication terminal device 51 and the server device 2 in the eighteenth configuration example.

Figure 42:
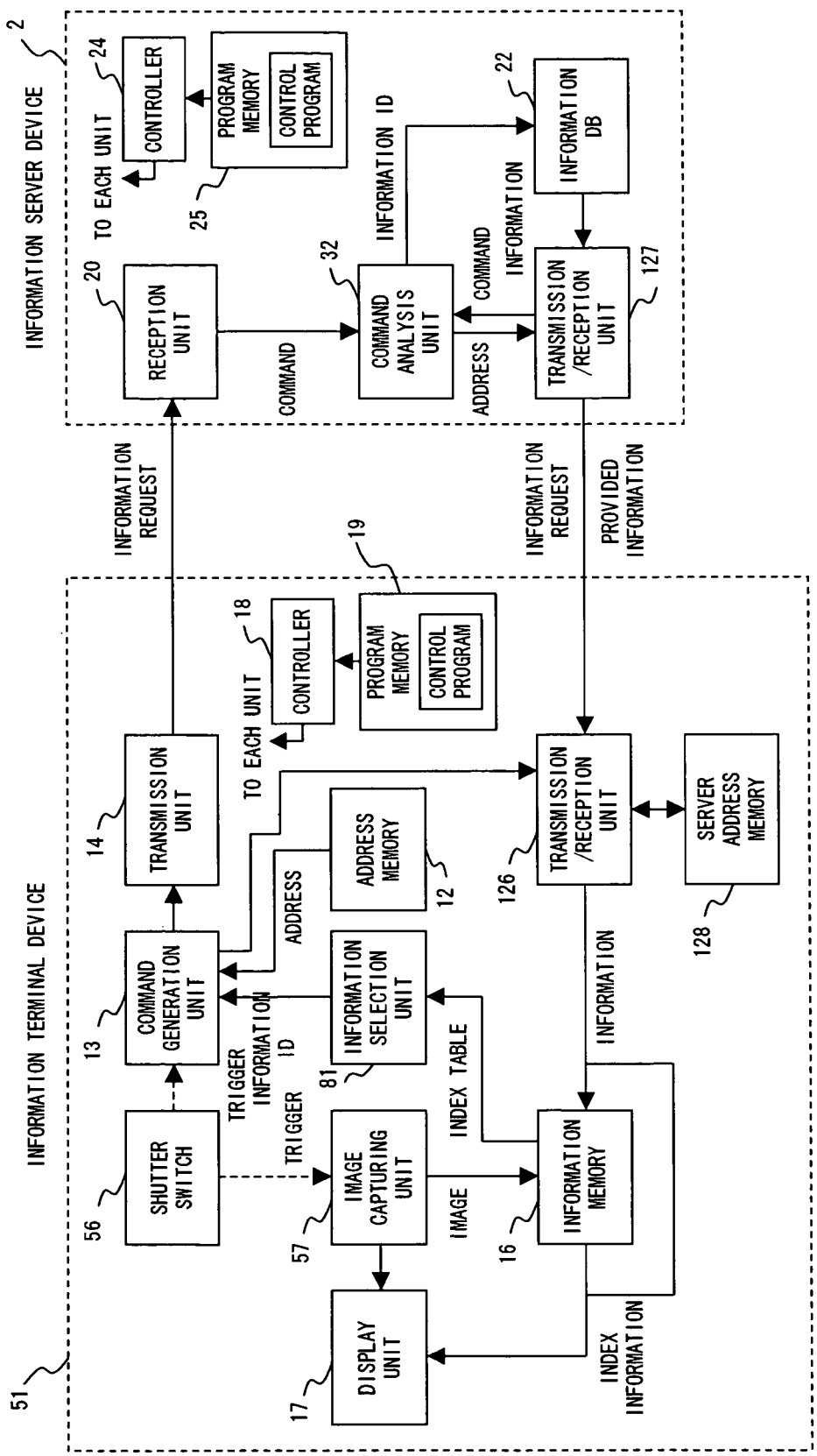
FIG. 42 is a block diagram showing the eighteenth example of a configuration.

FIG. 42 shows the eighteenth configuration example.

In FIG. 42, the communication terminal device 51 is different from the communication terminal device 51 relating to the twelfth configuration example (FIG. 28) in that it includes: a transmission/reception unit 126 having the configuration relating to the transmitting function in addition to the configuration of the reception unit 15 in place of the reception unit 15; and server address memory 128 storing information relating to the address (server address) of the server device 2, and other configurations are the same. However, the communication terminal device 51 relating to the eighteenth configuration example outputs an information request signal obtained by the command generation unit 13 also to the transmission/reception unit 126.

On the other hand, the server device 2 is different from the server device 2 relating to the twelfth configuration example (FIG. 28) in that it includes a transmission/reception unit 127 having the configuration relating to the receiving function in addition to the configuration of the transmission unit 23 in place of the transmission unit 23, and other configurations are the same. The command analysis unit 32 relating to the eighteenth configuration example also analyzes a signal received by the transmission/reception unit 127.

Figure 43:
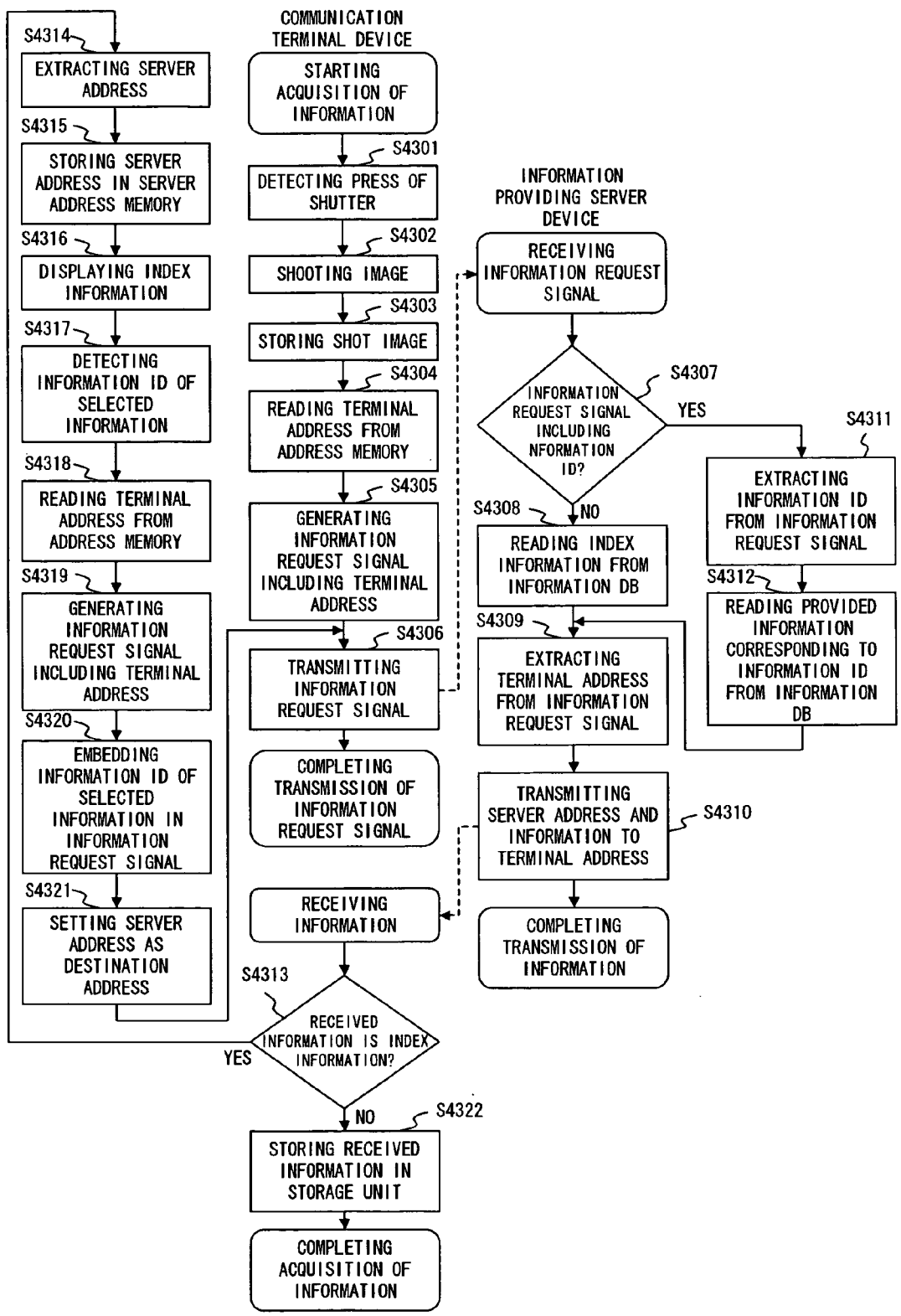
FIG. 43 is a flowchart of an operation example of a terminal device having the function of capturing an image and a server device in the eighteenth configuration example.

FIG. 43 is a flowchart of the operation example of the communication terminal device 51 and the server device 2 in the eighteenth configuration example.

In FIG. 43, the processes in S4301 through S4306 and S4313 through S4322 refer to the operations of the terminal device 1, and the processes in S4307 through S4312 refer to the operations of the server device 2.

In S4301 through S4305, the processes in S3001 through S3005 shown in FIG. 29 are performed. Then, in S4306, an information request signal obtained in the preceding step or in S4319 described later is transmitted. However, when an information request signal obtained in the first transmission, that is, in the preceding step, is transmitted, it is transmitted by wireless by the transmission unit 14. In a second transmitting, that is when a destination address is set in the second transmission in S4321, it is transmitted by wireless by the transmission/reception unit 126. In the processes in S4301 through S4306, the communication terminal device 51 completes acquiring an image and transmitting an information request signal.

When the reception unit 20 or the transmission/reception unit 127 of the server device 2 receives the information request signal transmitted by wireless by the communication terminal device 51, it is determined in S4307 whether or not an information ID has been added to the received information request signal.

If the determination result is NO, control is passed to S4308, and the processes in S3008 and S3009 are performed in S4308 and S4309. In S4310, the transmission/reception unit 127 adds the address (information about a server address) of the server device 2 to the index information read in S4308, and it is transmitted to the terminal address extracted in the preceding step.

When the determination result in S4307 is YES, control is passed to S4311, and the processes in S3011 and S3012 shown in FIG. 29 are performed in S4311 and S4312. Then, the process in S4309 is performed. In S4310, the transmission/reception unit 127 transmits the information corresponding to the information ID read in S4312 to the terminal address extracted in the preceding step.

Thus, the server device 2 completes transmitting a signal including index information to which a server address is added or providing information by the processes of S4307 through S4312.

When the transmission/reception unit 126 of the communication terminal device 51 receives a signal transmitted by wireless by the server device 2, it is determined in S4313 whether or not the information included in the received signal is index information.

If the determination result is YES, control is passed to S4314, a server address is extracted from the received signal, and the server address is stored in the server address memory 128 in S4315. The processes in S3014 through S3018 shown in FIG. 29 are performed in S4316 through S4320. After a server address is set as a destination address in S4321, control is returned to S4306.

When the determination result in S4313 is No, control is passed to S4322, and the process in S3019 is performed.

Thus, the communication terminal device 51 completes acquiring information in the processes S4313 through S4322.

In the operation of the eighteenth configuration example, the first information request signal is transmitted from the infrared emitter 5 having the directivity of the transmission unit 14, and the second information request signal can be transmitted from the built-in antenna 6 of the transmission/reception unit 126.

The transmission/reception units 126 and 127 can be configured such that each transmission unit is separate from a reception unit.

Since a signal having the directivity is used only when the first information request signal is transmitted, the infrared emitter of the information acquisition device is to be directed to the infrared receptor of the server device 2 only when the information acquisition button 4 or a shutter is pressed, thereby improving the operability.

In the above-mentioned various configuration examples, it is also possible to configure the terminal device to have the function of a mobile telephone, and receive information provided by the server device 2 through a public network. The terminal device having the function of a mobile telephone is assigned a reference numeral of 1c, and the configuration of the terminal device 1c and the server device 2 is explained below as the nineteenth configuration example. The terminal device 1c can be a mobile telephone having an information acquiring function.

FIG. 44 shows the nineteenth configuration example.

In FIG. 44, the terminal device 1c having the function of a mobile telephone includes: a terminal number memory 131 storing the telephone number (telephone number information) of the terminal device 1c; an operation unit 132 having a group of various buttons such as the information acquisition button 4, a communication mode switch for issuing a communication mode switch directive, ten keys for inputting a telephone number, etc.; a telephone communication unit 133 for communication (transmitting/receiving a signal) with an external device such as the server device 2, other mobile telephones, etc. through a public network; a microphone unit 134 for converting input voice to voice information and outputting it to the telephone communication unit 133; and a communication mode switch unit 135 for switching a communication mode to "information mode" when the information acquisition button 4 is pressed, and storing the signal received by the telephone communication unit 133 as acquired information in the information memory 16. When information is completely acquired, the communication mode switch unit 135 switches the communication mode to the "telephone mode", and outputs the signal received by the telephone communication unit 133 as a voice signal to the speaker unit 136. The switch of the communication mode can also be performed by a user manual operation using a switch (not shown in the attached drawings) for switching between the "information mode" and the "telephone mode" set in the operation unit 132. The telephone communication unit 133 receives a signal including the signal addressed to the terminal device 1c, that is, the telephone number of the terminal device 1c. The command generation unit 13, the transmission unit 14, the information memory 16, the display unit 17, the controller 18, and the program memory 19 are the same as those explained by referring to the terminal device 1 (FIG. 2) relating to the first configuration example. However, in the terminal device 1c, the command generation unit 13 generates an information request signal including the telephone number read from the terminal number memory 131 when a trigger signal is input by a press of the information acquisition button 4. The controller 18 controls the operation of the entire terminal device 1c by reading the control program stored in the program memory 19. In the terminal device 1c with the above-mentioned configuration, when the communication mode is switched to the "telephone mode" by the communication mode switch unit 135, the voice communication as a function of a mobile telephone can be performed. When the communication mode is switched to the "information mode", provided information can be acquired from a predetermined server device 2.

On the other hand, the server device 2 is different from the server device 2 relating to the first configuration example in that it newly includes: a terminal number extraction unit 137 in place of the address extraction unit 21; and a telephone communication unit 138 for performing communication with a device of the telephone number extracted by the terminal number extraction unit 137 through a public network, and other configurations are the same. However, in the present example, the telephone communication unit 138 transmits predetermined information read from the information DB 22 to the telephone number extracted by the terminal number extraction unit 137 through a public network. The information to be transmitted also includes the telephone number.

Figure 45:
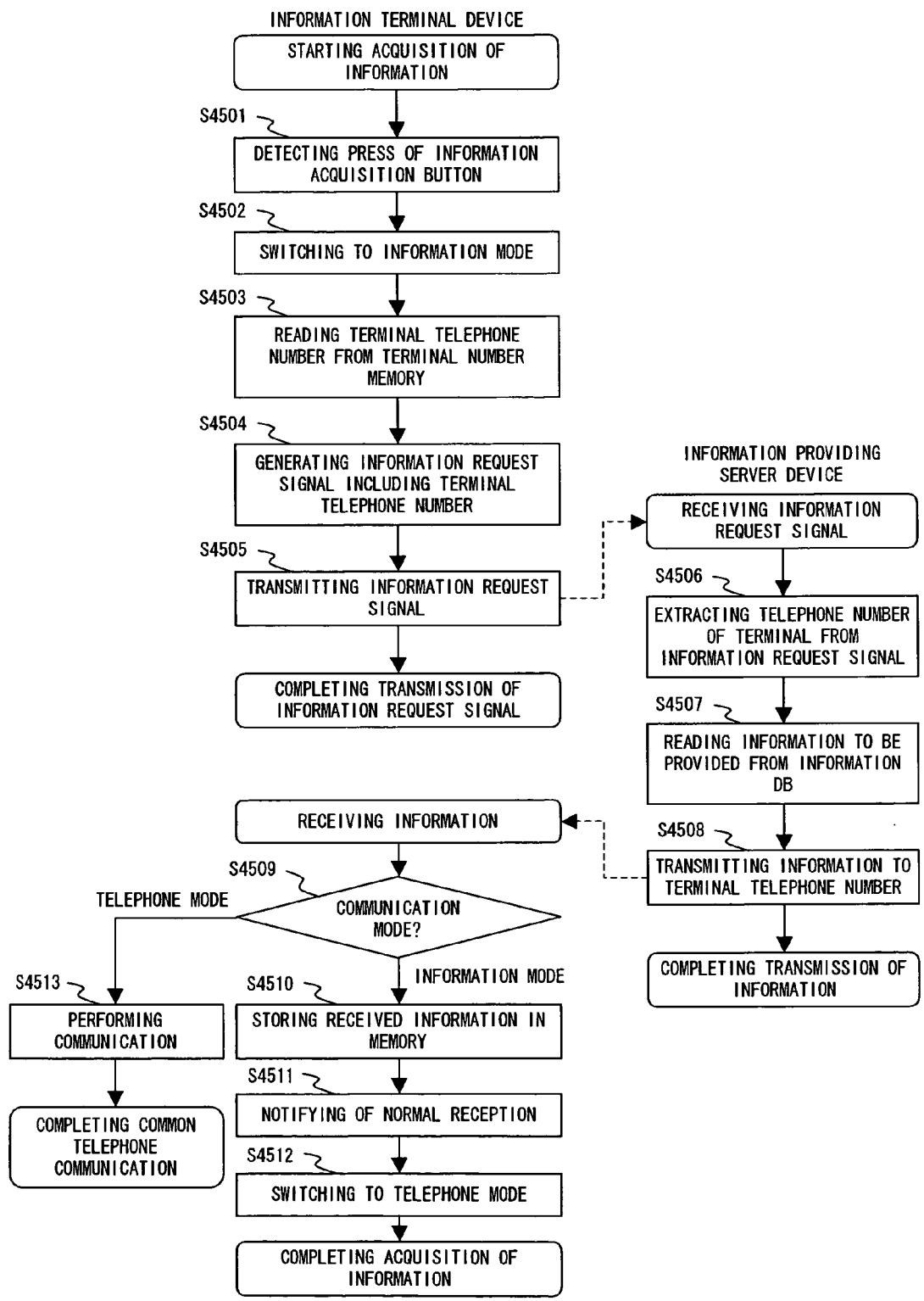
FIG. 45 is a flowchart of an operation example of a terminal device having the function of a mobile telephone and a server device in the nineteenth configuration example.

FIG. 45 is a flowchart showing the operation example of the terminal device 1c and the server device 2 having the function of a mobile telephone in the nineteenth configuration example.

In FIG. 45, the processes in S4501 through S4505 and S4509 through S4513 refer to the operations of the terminal device 1c, and the processes in S4506 through S4508 refer to the operations of the server device 2.

In S4501, the infrared emitter 5 of the transmission unit 14 of the terminal device 1c is directed to the infrared receiver 7 of the server device 2, and a press of the information acquisition button 4 of the operation unit 132 is detected. Thus, a trigger signal is input to the command generation unit 13. In S4502, the communication mode is switched to the "information mode". In S4503, the telephone number of the terminal device 1c is read from the terminal number memory 131. In S4504, an information request signal including the telephone number read in the preceding step is generated. In S4505, the information request signal generated in the preceding step is transmitted by wireless by the transmission unit 14. In the processes in S4501 through S4505, the terminal device 1c completes transmitting an information request signal.

When the reception unit 20 of the server device 2 receives the information request signal transmitted by wireless from the terminal device 1c, the terminal number extraction unit 137 extracts a telephone number from the information request signal in S4506. In S4507, the information to be transmitted is read from the information DB 22. In S4508, the telephone communication unit 138 transmits a signal including the information read in the preceding step to the telephone number extracted in S4506. The server device 2 completes transmitting a signal including the information to be provided in the processes in S4506 through S4508.

When the telephone communication unit 133 of the terminal device 1c receives the signal including the provided information transmitted by the server device 2 through a public network, the set communication mode is determined in S4509. If the determination result is "information mode", control is passed to S4510, and if it is "telephone mode", control is passed to S4513. In the information mode, control is passed to S4510, and the provided information received by the telephone communication unit 133 is stored in the information memory 16. When the normally received information is completely stored, a notification of the normal reception of the provided information is issued in S4511. The notification is performed by display, etc. on the display 3. Otherwise, it can be performed by lighting a lamp such as the normal reception lamp 9a shown in FIG. 48, replaying a confirmation tone by a sound alarm, etc. In S4512, the communication mode of the terminal device 1c is switched to the "telephone mode". The terminal device 1 completes acquiring information in the processes in S4510 through S4512.

In S4513, the terminal device 1c performs normal voice communication with other telephones by the telephone communication unit 133, the microphone unit 134, and the speaker unit 136.

In the "information mode", although information is transmitted from the server device 2 to the terminal device 1c, no incoming call alarm is raised.

When the communication mode is switched to the "information mode", and when a user mistakenly starts making a call, a warning can be issued. If the terminal device 1c is in the communication mode when information is to be received, a warning can be issued as an alarm informing that information is to be transmitted to the terminal device 1c.

By the operation in the nineteenth configuration example, a user can use a telephone function and acquire information using a single device.

In the above-mentioned nineteenth configuration example, the terminal device 1c can automatically determine whether or not a received signal is a communication signal, thereby not requiring the above-mentioned switching operation of the communication mode. The configuration is explained below as the configuration of the terminal device 1c and server device 2 in the twentieth configuration example.

Figure 46:
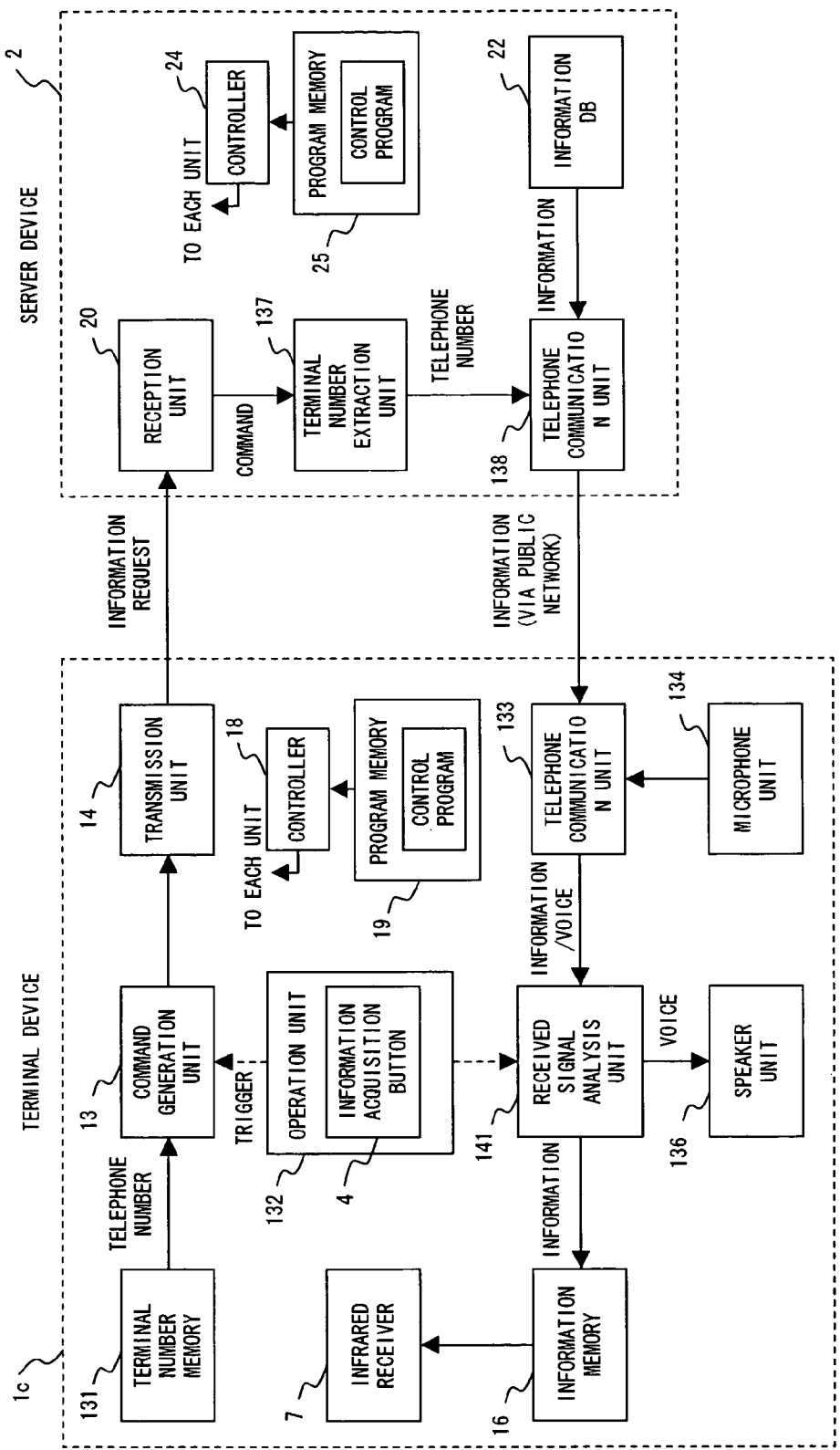
FIG. 46 is a block diagram showing the twentieth example of a configuration.

FIG. 46 shows the twentieth configuration example.

In FIG. 46, the terminal device 1c is different from the terminal device 1c (FIG. 44) relating to the nineteenth configuration example in that the communication mode switch is removed from the operation unit 132 and, in place of the communication mode switch unit 135, it includes a received signal analysis unit 141 for analyzing a signal received by the telephone communication unit 133, outputting sound to the speaker unit 136 if the signal is communication information. If it is not communication information, the information is output to the information memory 16. Other configurations are the same.

On the other hand, the server device 2 has the same configuration as the server device 2 relating to the nineteenth configuration example.

Figure 47:
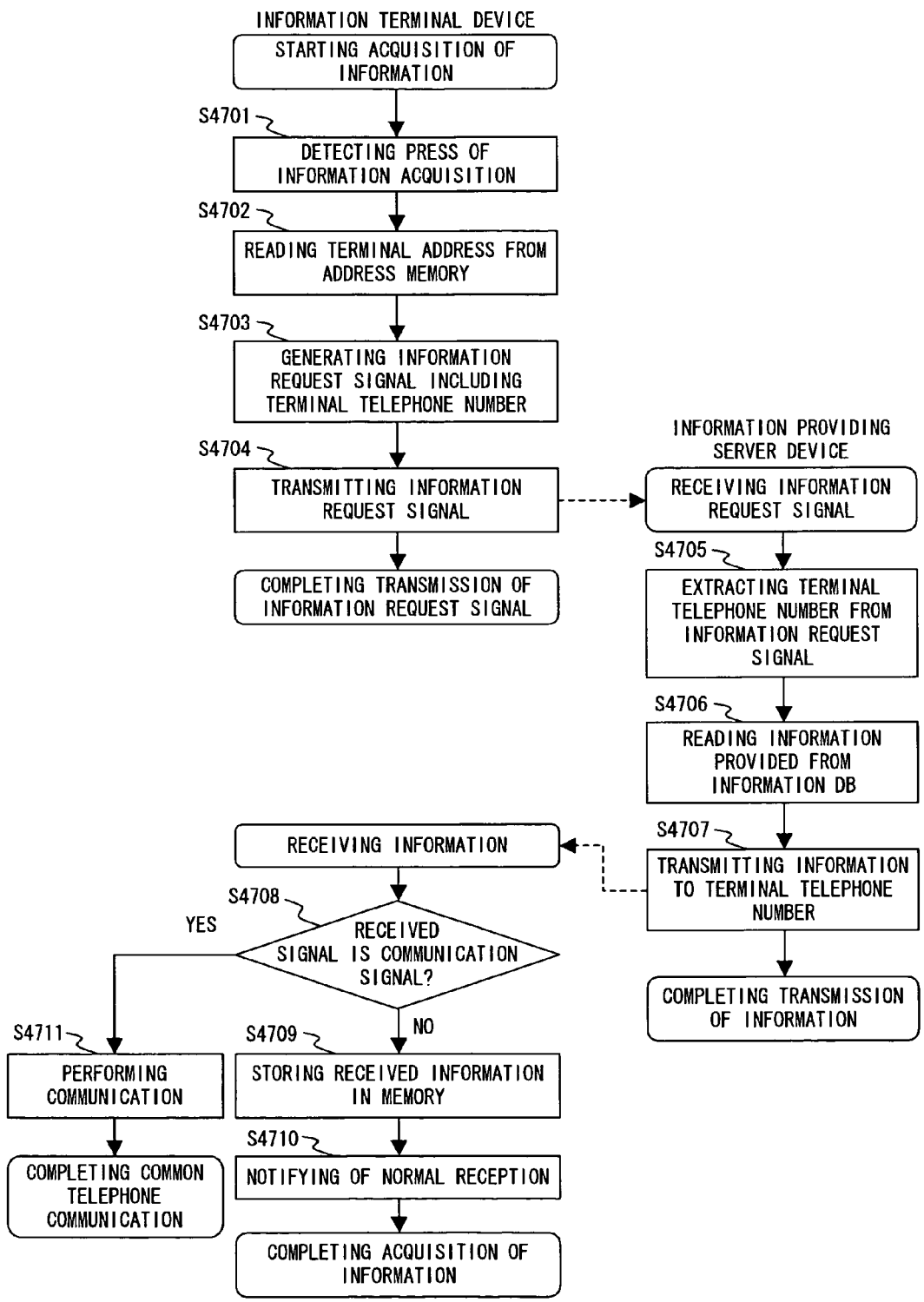
FIG. 47 is a flowchart of an operation example of a terminal device having the function of a mobile telephone and a server device in the twentieth configuration example.

FIG. 47 is a flowchart showing an operation example of the terminal device 1c and the server device 2 provided with the function of a mobile telephone in the twentieth configuration example.

In FIG. 47, the processes in S4701 through S4704 and S4708 through S4711 refer to the operations of the terminal device 1c, and the processes in S4705 through S4707 refer to the operations of the server device 2.

First, in S4701, the process in S4501 is performed. In S4702 through S4704, the processes in S4503 through S4505 shown in FIG. 45 are performed. The terminal device 1c completes transmitting an information request signal in the processes in S4701 through S4707.

When the reception unit 20 of the server device 2 receives an information request signal transmitted by wireless by the terminal device 1c, the processes in S4507 through S4509 shown in FIG. 45 are performed in S4705 through S4707. The server device 2 completes transmitting the signal including the information to be provided in the processes in S4705 through S4707.

When the telephone communication unit 133 of the terminal device 1c receives a signal, it is determined in S4708 whether or not the signal is a communication signal. If the determination result is YES, control is passed to S4711. If the determination result is NO, control is passed to S4709. When the received signal is a signal including the provided information transmitted from the server device 2, control is passed to S4709. In S4709 through S4710, the processes in S4511 through S4512 shown in FIG. 45 are performed. The terminal device 1 completes acquiring information in the processes in S4708 through S4710.

On the other hand, when the signal received by the telephone communication unit 133 is a communication signal in the determining process in S4708, control is passed to S4711, and common communications are performed.

In the above-mentioned operations according to the twentieth configuration example, the terminal device 1c automatically determines whether or not the received signal is a communication signal, thereby improving the operability of the terminal device 1c.

When the terminal device 1c is in communication or receiving information, it cannot be connected when called from any third party except the partner of the communication. For example, if there is an incoming call and a communication starts using a telephone immediately after the terminal device 1c transmits an information request, the server device 2 cannot call up the terminal device 1c. In this case, the server device 2 can call up the terminal device 1c at a predetermined interval.

In the above-mentioned third, eleventh, twelfth, and eighteenth configuration examples, the transmission unit 14 of the terminal devices 1b or 51 performs first and the subsequent transmission of an information request signal after a press of the information acquisition button 4. However, for example, a transmission unit 14b for performing transmission in a style different from that of the transmission unit 14 is newly provided for the terminal device 1 or communication terminal device 51, and the transmission unit 14b can perform the second and the subsequent transmissions. In this case, unlike the transmission unit 14, the transmission unit 14b transmits a non-directive signal, or transmits a signal having the different directivity spread from that of the transmission unit 14 if it has the directivity (for example, a signal having wider directivity than the transmission unit 14). Thus, after the first information request signal is transmitted, the terminal devices 1b or 51 is not to be directed to the server device 2, thereby improving the convenience for a user.

In this case, the server device 2 can newly include in addition to the reception unit 20 a reception unit 20b for receiving an information request signal transmitted from the transmission unit 14b. Thus, the server device 2 can receive a signal from the terminal device 1 independent of the holding direction of the terminal device 1 by a user.

In the above-mentioned various configuration examples, a plurality of reception units can be provided for a server device, information to be provided is assigned to each reception unit, and when an information request signal is received, corresponding information can be provided depending on the reception unit which receives the information request signal. The server device having the above-mentioned configuration is explained below as the server device 2 relating to the twenty-first configuration example.

FIG. 51A shows the server device 2 relating to the twenty-first configuration example. FIG. 51B shows a corresponding example of a reception unit and information to be provided.

In FIG. 51A, the server device 2 is provided with a plurality of reception units 20 (20a, 20b, . . . 20n), and each reception unit is provided with a corresponding reception unit ID. In the present embodiment, the reception units 20a, 20b, . . . , 20n are respectively assigned a reception unit ID=1, a reception unit ID=2, . . . , a reception unit ID=n. When the reception unit 20 receives an information request signal, the command analysis unit 32 acquires the reception unit ID of the reception unit 20 which receives the signal, and extracts the terminal address from the signal received by the reception unit. The information DB 22 stores plural pieces of providing information, and a corresponding providing information ID is assigned to each piece of providing information. An information selection unit 156 selects an associated providing information ID from the reception unit ID acquired by the command analysis unit 32, and selects corresponding providing information stored in the information DB 22. In the present device, a reception unit ID is associated with a providing information ID in advance. For example, the correspondence as shown in FIG. 51B is defined. According to the example shown in FIG. 51B, the reception unit ID=1 and the reception unit ID=2 is associated with the providing information ID=info-1. The transmission unit 23 transmits by wireless a signal including the providing information selected by the information selection unit 156 to the terminal address extracted by the command analysis unit 32. The controller 24 and the program memory 25 are described above.

Figure 52:
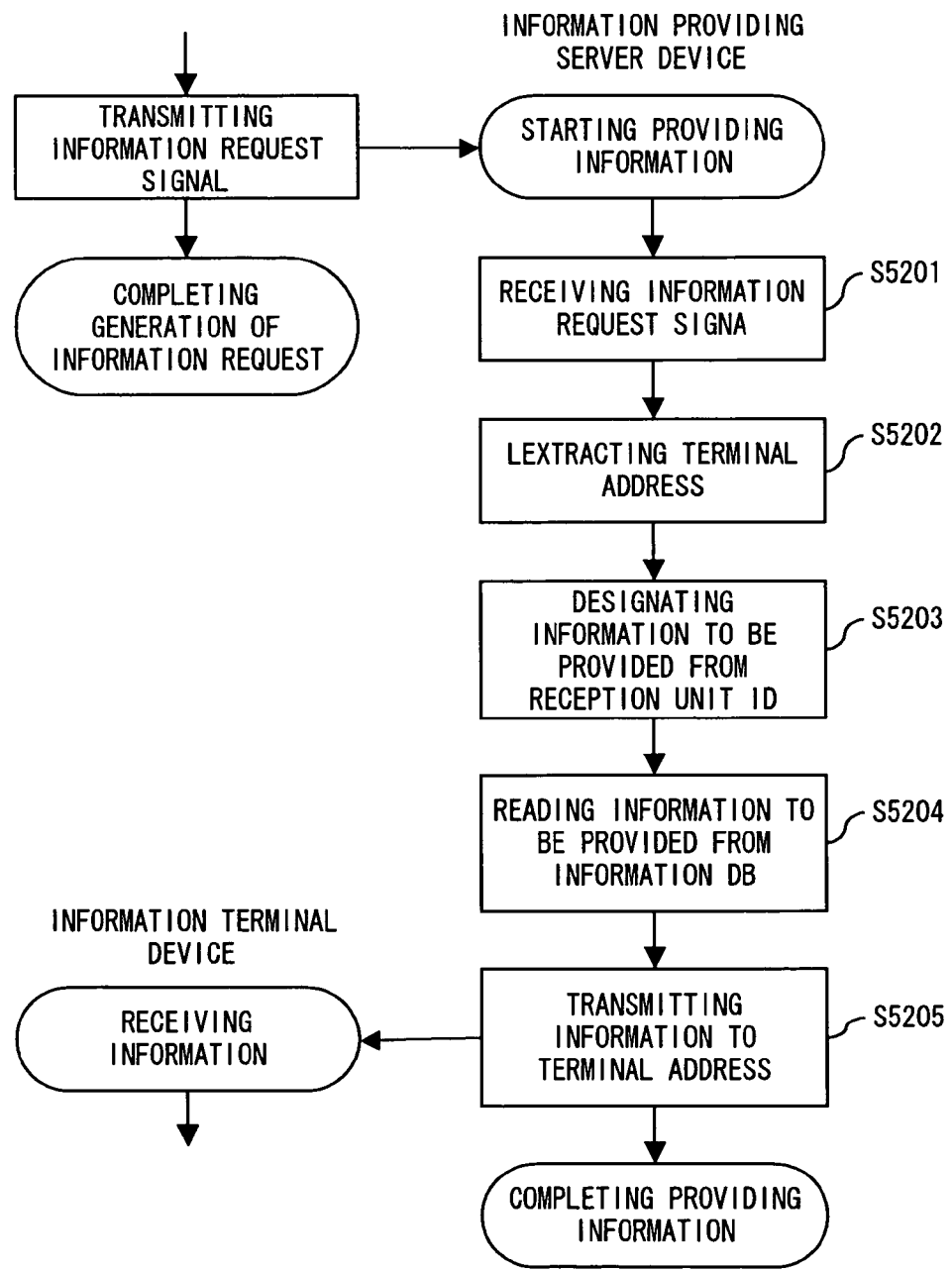
FIG. 52 is a flowchart of an operation example of the server device according to the twenty-first configuration example.

FIG. 52 is a flowchart showing the operation example of the server device 2 relating to the twenty-first configuration example.

In FIG. 52, for example, when the terminal device 1 transmits by wireless an information request signal, any of the reception units 20 receives an information request signal first in S5201, and a reception unit ID is designated. In S5202, the command analysis unit 32 extracts a terminal address from the information request signal. In S5203, the information selection unit 156 selects a providing information ID corresponding to the reception unit ID (the reception unit ID corresponding to the reception unit 20 which has received the information request signal) acquired by the command analysis unit 32, and the providing information corresponding to the providing information ID is designated. Thus, it can be considered that the providing information has been selected. In S5204, the providing information designated in the preceding step is read from the information DB 22. In S5205, the transmission unit 23 transmits by wireless the signal including the providing information read in the preceding step to the terminal address extracted in S5202. The server device 2 completes transmitting the signal including the providing information in the processes in S5201 through S5305.

If the server device 2 relating to the twenty-first configuration example operating as described above provides the above-mentioned reception unit 20 for each exhibited item when, for example, there are a plurality of exhibited items, related information can be provided for each exhibited item.

In each of the above-mentioned configuration examples, the terminal device with an image capturing function can be provided with the information signal sensor 46 and the information signal indicator 47 as with the terminal device 1 relating to the sixth configuration example (FIG. 13) described above. The terminal device with an image capturing function having the above-mentioned configuration is explained below as the communication terminal device 51 relating to the twenty-second configuration example.

FIG. 53 shows the communication terminal device 51 relating to the twenty-second configuration example.

In FIG. 53, the communication terminal device 51 is different from the communication terminal device 51 relating to the eighth configuration example (FIG. 20) in that it newly includes the information signal sensor 46 and the information signal indicator 47 as explained above by referring to FIG. 13, and other configurations are the same.

FIG. 54 is a flowchart of the operation performed until an information request signal is transmitted after the shutter button is pressed as an operation example of the communication terminal device 51 relating to the twenty-second configuration example.

As shown in FIG. 54, in the present flow, the determining process in S5407, that is, the process of determining whether or not an information providing signal from the server device 2 (for example, the server device shown in FIG. 13) is being detected, is added as a step before S5408. If the determination result in S5407 is NO, as in S1503 shown in FIG. 14, the warning that information cannot be acquired is given to a user by the information signal indicator 47 in S5411. Other processes are the same as the processes in S2201 through S2209 shown in FIG. 21. That is, in S5401 through S5402, S5403 through S5404, S5405 through S5406, and S5408 through S5410 shown in FIG. 54, the processes respectively in S2201 through S2202, S2203 through S2204, S2208 through S2209, and S2205 through S2207 shown in FIG. 21 are performed.

Thus, in the present flow, when the information acquisition button 4 also functioning as a shutter button is pressed, and when the "capture & information acquisition mode" or the "information acquisition mode" is set as an information acquisition mode, the process in S5408, that is, the process of reading a terminal address by the command generation unit 13, is preceded by the determining process in S5407, that is, the process of determining whether or not an information providing signal from the server device 2 is being detected. When the determination result is Yes, control is passed to S5408. If the determination result is NO, the warning that information cannot be acquired is given to a user by the information signal indicator 47 in S5411, thereby terminating the present flow.

If the communication terminal device 51 relating to the twenty-second configuration example as described above does not detect an information providing signal when the "capture & information acquisition mode" is set and a shutter button is pressed, only the image capturing process can be performed. In this case, the warning that information cannot be acquired can be displayed.

In the above-mentioned various configuration examples, when the information received from the server device 2 is the address information (for example, a URL) in a network (for example, the Internet) containing information, the terminal device can receive provided information from the server device specified by the address information through the network. The terminal device with the above-mentioned configuration is explained below as the terminal device 1 relating to the twenty-third configuration example.

FIG. 55 shows the terminal device 1 relating to the twenty-third configuration example.

In FIG. 55, the terminal device 1 is different from the terminal device 1 relating to the first configuration example (FIG. 2) in that it includes an information analysis unit 157 for making an analysis for determining whether or not the information acquired by the reception unit 15 is address information (server address) in the Internet about the server device including the information to be acquired; and a transmission/reception unit 158 for transmitting a download request signal (also functioning as an information request signal) to the address according to the address information through the Internet when it is determined according to the analysis of the information analysis unit 157 that received information is the address information about the server device, and receiving provided information from the server device corresponding to the address information in response to the download request signal through the Internet, and other configurations are the same.

FIG. 56 is a flowchart of an operation performed when the terminal device 1 receives information from the server device 2 as a destination of the transmitted information request signal.

In FIG. 56, when the signal transmitted by wireless from the server device 2 is received by the reception unit 15, the analysis of the information received from the information analysis unit 157 is performed in S5601. In S5602, it is determined by the analysis in the preceding step whether or not the received information is the address information in the Internet about the information server device. If the determination result is YES, control is passed to S5605. If the determination result is NO, control is passed to S5603. In S5605, the URL in the address information is specified as an access destination, the transmission/reception unit 158 transmits a download request signal through the Internet, and the provided information according to the received signal is received through the Internet. That is, the provided information is downloaded from the information server device through the Internet. In S5606, the provided information downloaded in the preceding step is stored in the information memory 16. In S5607, the notification that the information has been completely acquired is issued.

On the other hand, in S5603, since the received information is not the address information about the server device, the received information is stored as is in the information memory 16, and the notification that information has been completely acquired is issued in S5604.

When the information received by the terminal device 1 relating to the twenty-third configuration example in the above-mentioned operation from the server device 2 is address information (for example, a URL), provided information can be acquired from the server device indicated by the address information through a network (for example, the Internet).

In the above-mentioned various configuration examples, the terminal device can also include an information screen unit for screening information received from the server device 2, the information screen unit can screen the information to be acquired from the received information, and the screened information can be stored in the information memory 16. For example, the screening standards screened by the information screen unit can be defined as an information type indicated and set by a user, and only the information of the indicated and set information type can be stored in the information memory 16. The terminal device with the above-mentioned configuration is explained as the terminal device 1 relating to the twenty-fourth configuration example.

FIG. 57 shows the terminal device 1 relating to the twenty-fourth configuration example.

In FIG. 57, the terminal device 1 is different from the terminal device 1 relating to the first configuration example (FIG. 2) in that it newly includes an information type SW 66 explained by referring to FIG. 22, and an information analysis unit 157 explained by referring to 55, and other configurations are the same. However, the information analysis unit 157 according to the present configuration example analyzes the received information to determine whether or not the received information is an information type indicated and set by the user, that is, whether or not it is the information type corresponding to the information type identification code selected by the information type SW 66.

Figure 58:
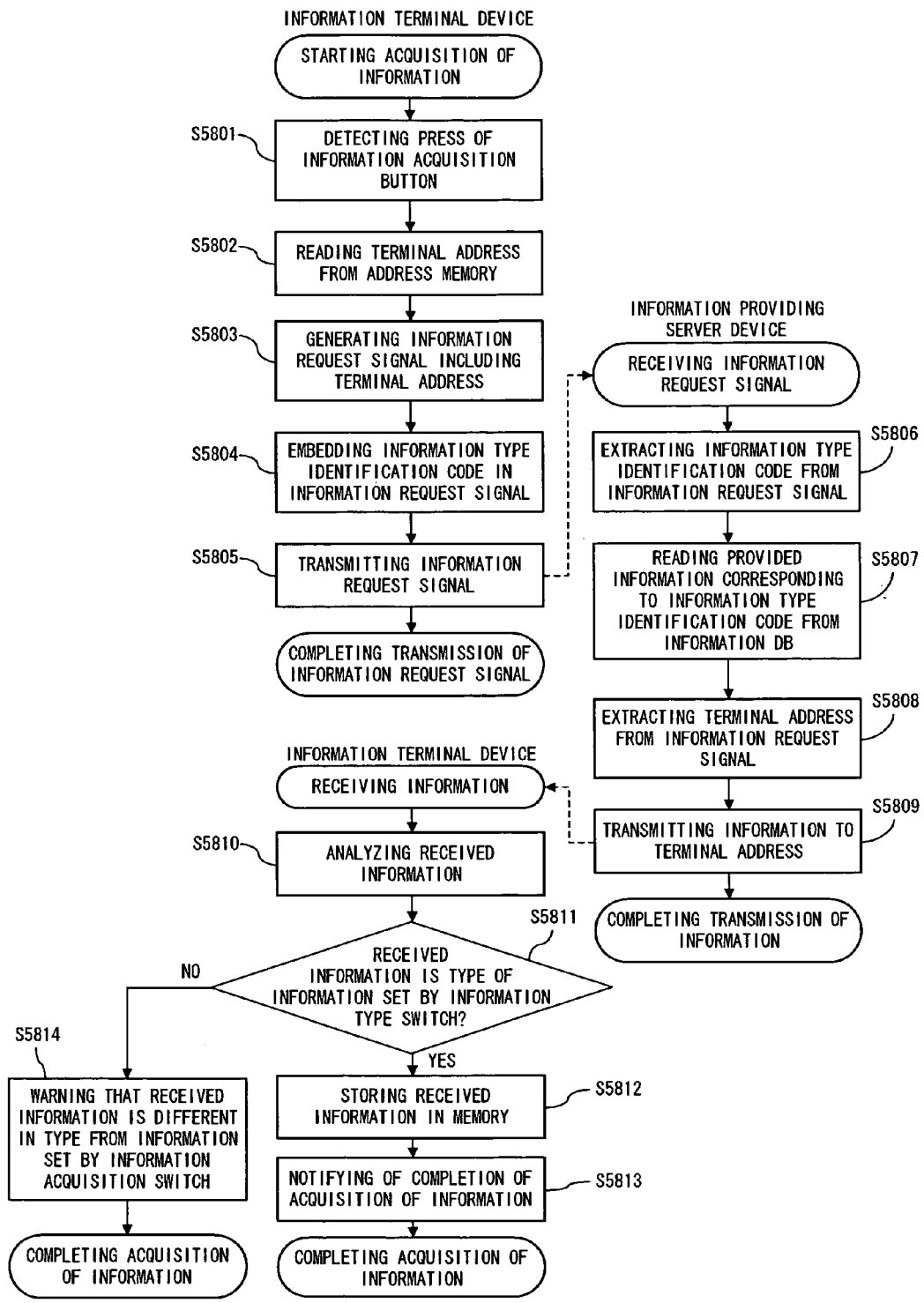
FIG. 58 is a flowchart of an operation example of a terminal device and a server device in the twenty-fourth configuration example.

FIG. 58 is a flowchart showing an operation example of the terminal device 1 and the server device 2 relating to the twenty-fourth configuration example.

In FIG. 58, the processes in S5801 through S5805 and S5810 through S5814 refer to the operations of the terminal device 1, and the processes in S5806 through S5809 refer to the operations of the server device 2 (in this example, the server device 2 relating to the ninth configuration example (FIG. 22)).

First, in S5801, the process in S301 is performed. In S5802 through S5905, the processes in S2405 through S2508 shown in FIG. 23 are performed. In these processes in S5801 through S5905, the processes in S2405 through S2508 shown in FIG. 23 are performed. The terminal device 1 completes transmitting an information request signal in the processes in S5801 through S5805.

When the reception unit 20 of the server device 2 receives an information request signal transmitted by wireless by the terminal device 1, the processes in S2411 through S2412 shown in FIG. 23 are performed in S5806 through S5809. The server device 2 completes transmitting the signal including the providing information.

When the reception unit 15 of the terminal device 1 receives the signal including the provided information transmitted by wireless by the server device 2, the provided information acquired in the preceding step is analyzed in S5810. In S5811, it is determined whether or not the provided information is an information type indicated and set by the user, that is, whether or not the information is the type of information corresponding to the information type selected by the information type SW 66. If the determination result is YES, control is passed to S5812. If the determination result is NO, control is passed to S5814. In S5812 and S5813, the processes in S5603 and S5604 shown in FIG. 56 are performed. On the other hand, in S5814, the warning that the received provided information type is different from the information type indicated and set by the user is issued. The warning is issued by, for example, turning on, turning off, or blinking the LED (not shown in the attached drawings) provided for the terminal device 1 or displaying the notification on the display 3, etc.

The terminal device 1 relating to the twenty-fourth configuration example in the above-mentioned operation analyzes the information received from the server device 2. When the received information type is different from the information type specified and set by a user, the received information can be prevented from being stored.

Although the transmission unit 14 of terminal devices 1, 1b, and 1c, and the communication terminal device 51 with an image capturing function transmits a signal using an infrared, it also can transmit a signal using an electromagnetic wave including light or a sound wave including ultrasonic so far as directive radiation can be realized. The above-mentioned transmission unit 14b can also transmit a signal using an electromagnetic wave including light or a sound wave including ultrasonic. In this case, a unit for providing directivity for a signal can be a lens, a concave mirror, etc. for light, and a phased array antenna having a plurality of oscillators, a parabola antenna, an electromagnetic horn antenna, or a Yagi antenna, etc. for an electromagnetic wave. The unit can also be one provided with a phased array having a plurality of oscillators for a sound wave including ultrasonic.

Figure 49:
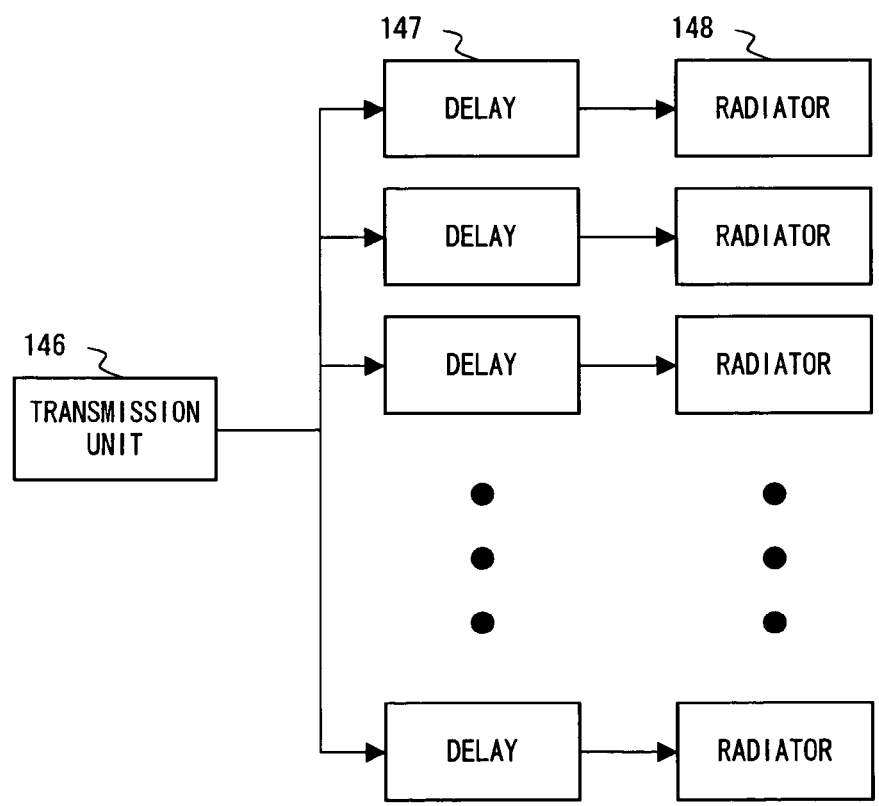
FIG. 49 shows an example of a device for assigning directivity to a signal when the signal is transmitted using an electromagnetic wave or ultrasonic.

FIG. 49 shows an example of a unit for providing directivity for a signal when the signal is transmitted using an electromagnetic wave or ultrasonic. As shown in FIG. 49, the unit is a so-called phased array, and includes a transmission unit 146, a plurality of delay units 147, a plurality of radiators 148 provided corresponding to each delay unit 147, and the like.

The radiator 148 is provided in a form of two-dimensional array, the phase of the pulses emitted by each radiator is adjusted by the delay unit 147, and the composed wave surface of the signal wave emitted by the radiator 148 arranged in array form can be assigned desired directivity. A signal transmitted by wireless by the above unit can be transmitted with predetermined spread in the directivity direction.

In the above-mentioned terminal devices 1, 1b, and the communication terminal device 51 with an image capturing function, the own address stored in the address memory 12 can be, for example, a URL and a telephone number.

The information memory 16 of the above-mentioned terminal devices 1, 1b, and the communication terminal device 51 with an image capturing function is built in the terminal devices 1 and 51, but they can also be removable. Thus, the information stored in the information memory 16 can be read by an external reading device.

The terminal device included in the information providing system relating to the present embodiment is at least one of the terminal devices relating to the first through twentieth configuration examples, and the server device included in the present system is one of the server devices according to the first through twentieth configuration example.

In the terminal devices relating to the first through the twentieth configuration examples and the twenty-second through the twenty-fourth configuration examples, one of the terminal devices can have the function assigned to another terminal device, or the function of other equipment (for example, a mobile telephone, a PDA, etc.), or can have both of the function assigned to another terminal device and the function of other equipment.

In the server device relating to the above-mentioned first through twenty-first configuration examples, one of the server devices can have the function of another server device, or the function of other equipment, or have both of the function of another server device and the function of other equipment.

Embodiment 2

Figure 59:
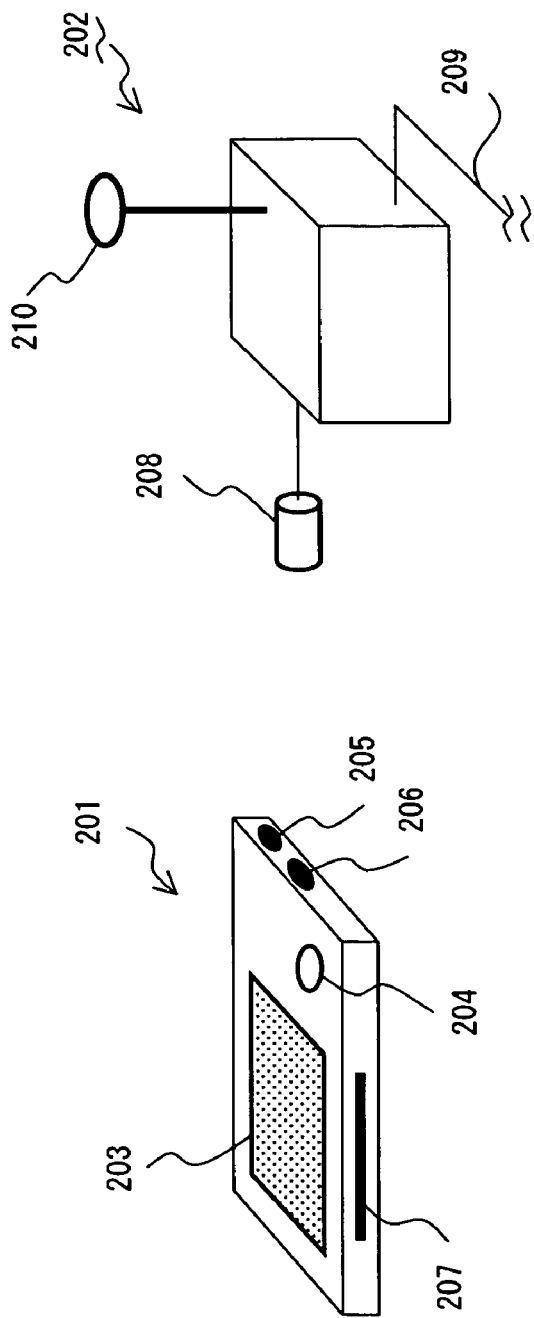
FIG. 59 shows an example of a terminal device and a server device included in the information providing system according to the embodiment 2 of the present invention.

FIG. 59 shows an example of a terminal device with an image capturing function (hereinafter referred to simply as a terminal device) and an information providing server device (hereinafter referred to simply as a server device) included in the information providing system relating to the second embodiment of the present invention.

In FIG. 59, a terminal device 201 requests desired information, and has an image capturing function for capturing static images and moving pictures as necessary. On the top surface of the device, there are a display 203 for displaying a captured image, etc., an information acquisition button 204 for issue of a start instruction of an information acquiring operation, an image capturing operation, or both operations, and the like. The information acquisition button 204 issues an instruction to start an image capturing operation. Therefore, it also functions as a co-called shutter button (release button). On the side of the device, there are an infrared emitter 205 for transmitting by wireless (infrared transmission) an information request signal and a taking lens 206, etc. In the present device, the signal transmitted by wireless from the infrared emitter 205 is configured to have directivity in the direction of the infrared emitter 205, and the signal is transmitted by wireless in the direction of the infrared emitter 205 as the directivity direction. It is also configured such that the directivity direction of the infrared emitter 205 matches the direction of the taking lens 206 (optical axis direction and shooting direction of the taking lens 206). The device includes a built-in antenna 207 for receiving information transmitted by wireless (radio waves) to the terminal device 201, and the like.

In the present specifications, the term "wireless" means no use of a transmission line such as a cable, an optical fiber, etc.

On the other hand, a server device 202 provides corresponding information according to an information request, stores information that can be provided, and includes an infrared receiver 208 for receiving an information request signal having directivity in the direction of the device, a communication cable 209 for transmitting information corresponding to the information request to a predetermined destination, and an antenna 210 for transmitting by wireless (radio waves) transmission result information, etc. relating to the transmission of the information corresponding to the information request. The information corresponding to the information requester transmitted through the above-mentioned communication cable 209 can also be transmitted through the antenna 210. The communication cable 209 is connected to various communication network such as the Internet, the Intranet, etc. via cable, by wireless, or via cable and by wireless. The server device 202 can transmit information corresponding to an information request to a destination device connected to the communication cable 209.

In the present system, the terminal device 201 is carried by a person requesting information (hereinafter referred to as an information requester), and the server device 202 corresponds to a person providing information (hereinafter referred to as an information provider).

An information provider requests to provide information widely for unspecified users such as an exhibitor participating in an exhibition, a lecturer of a seminar, a sponsor of an exhibition or a seminar, etc. In this case, an exhibitor provides information about an exhibited article, etc., a lecturer provides information about the contents of a lecture, etc., a sponsor provides information about the contents of an event, etc.

The basic operations performed when an information requester uses the terminal device 201 to request desired information from the server device 202 provided for an information provider in the present system are described below.

First, the information requester presses the information acquisition button 204 with the infrared emitter 205 of the terminal device 201 directed to the infrared receiver 208 of the server device 202 which provides desired information. Then, an information request signal including a destination address specified (set) by an information requester in advance and the terminal address of the terminal device 201 are transmitted by wireless from the infrared emitter 205 of the terminal device 201 to the server device 202. The destination address is an address specifying the destination of the providing information.

On the other hand, when the information request signal is received by the infrared receiver 208, the server device 202 reads the providing information corresponding to the information request from the information stored in advance, and the providing information is transmitted to the destination address included in the information request signal via the communication cable 209. In addition, the transmission result information relating to the transmission is transmitted by wireless to the terminal address included in the information request signal through the antenna 210.

When the built-in antenna 207 receives the transmission result information, the terminal device 201 issues a notification that the provided information has been transmitted to the destination address according to the transmission result information by regenerating a confirmation tone, etc. by a sound alarm (not shown in the attached drawings). Thus, the information requester can be informed of the transmission of the provided information to the destination address. Later on, the information requester accesses the destination address, thereby acquiring the provided information.

For example, in an exhibition, etc., when the server device 2 for providing information about an exhibited article, etc. is implemented for the exhibition booth of each exhibitor, and when an information requester is acquiring information about an exhibited article at the exhibition booth of a desired exhibitor, the information requester presses the information acquisition button 204 with the infrared emitter 205 of the terminal device 201 carried with the information requester directed to the infrared receiver 208 of the server device 202 provided besides the exhibited article, thereby performing an information acquiring operation. Then, after confirming the notification that the provided information has been transmitted, the specified destination address is accessed, thereby acquiring the provided information.

For example, in place where a seminar is held, when the server device 202 for providing information about the contents of a lecture, etc. is provided, and when an information requester is acquiring information about the contents (for example, OHP data) of a lecture, etc. of a desired lecturer, the information requester only has to press the information acquisition button 204 with the infrared emitter 205 of the terminal device 201 directed to the lecturer stand into which the infrared receiver 208 of the server device 202 is incorporated. Thus, an information acquiring operation is performed, and after confirming the notification that the provided information is transmitted, the specified destination address is accessed, thereby acquiring provided information.

Thus, according to the present system, information can be distributed to unspecified general users close to a specific spot, and it is not necessary for an information requester to be informed in advance of the information designating an information provider such as a URL, a telephone number, etc., and the information can be easily and freely acquired. In the present system, special management such as collectively managing the terminal device 201 and the server device 202 is not required, thereby realizing a system without restrictions on the application.

Described below in detail are the configuration and the operation of the above-mentioned terminal device 201 and the server device 202.

First, the configuration of the terminal device 201 and the server device 202 in the twenty-fifth configuration example is explained. The present configuration example is a basic configuration of the terminal device 201 and the server device 202 in the present system.

Figure 60:
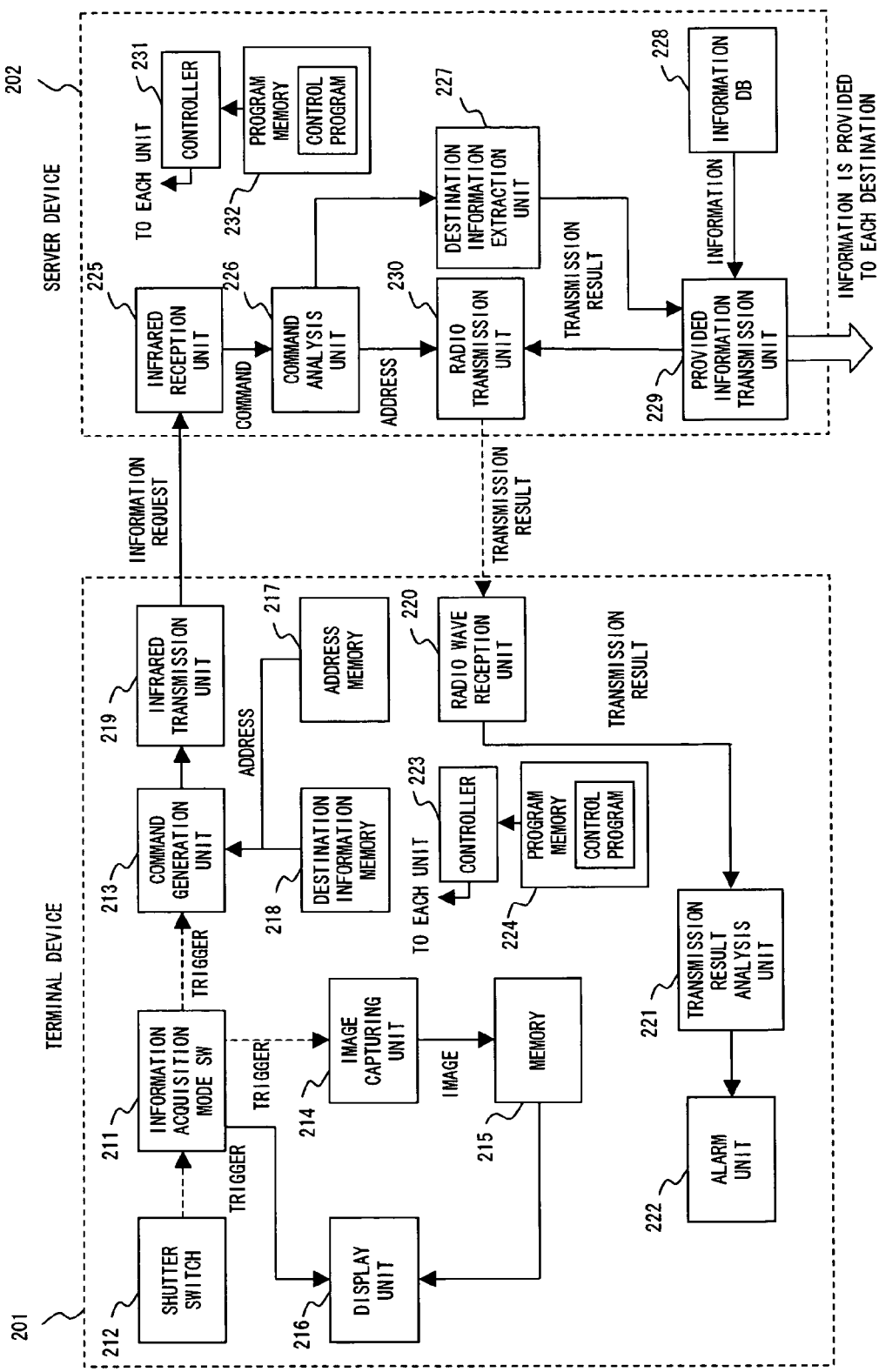
FIG. 60 shows the twenty-fifth configuration example.

FIG. 60 shows the twenty-fifth configuration example.

In FIG. 60, the terminal device 201 includes: a shutter switch 212 for outputting a trigger signal to an information acquisition mode SW 211 after pressing the information acquisition button 204 also functioning as a shutter button; an information acquisition mode SW 211 for outputting a trigger signal depending on the information acquisition mode indicated and set by a user (information requester) when the trigger signal is input to a command generation unit 213, an image capturing unit 214, or both of command generation unit 213 and an image capturing unit 214; an image capturing unit 214 for capturing a subject image through the taking lens 206 when the trigger signal is input and acquiring image data (relating to static images or moving pictures); memory 215 storing the image data obtained by the image capturing unit 214; a display unit 216 for displaying an image, etc. on the display 203 based on the information acquisition mode and the image data obtained by the image capturing unit 214 or based on the image data stored in the memory 215; address memory 217 storing an own address of the terminal device 201 (hereinafter referred to as a terminal address); destination information memory 218 storing one or more destination addresses set by a user in advance; a command generation unit 213 for generating an information request signal including a terminal address read from the address memory 217 when the trigger signal is input and a destination address read from the destination information memory 218; an infrared transmission unit 219 for transmitting by wireless (infrared transmission) an information request signal generated by the command generation unit 213 from the infrared emitter 205; a radio wave reception unit 220 for receiving the signal transmitted by wireless to the own address of the terminal device 201 using the built-in antenna 207, and acquiring the information included in the signal; a transmission result analysis unit 221 for analyzing the transmission result information included in the information acquired by the radio wave reception unit 220; an alarm unit 222 for regenerating a confirmation tone by a sound alarm (not shown in the attached drawings) depending on the analysis result by the transmission result analysis unit 221 or performing other processes, and the like. The infrared transmission unit 219 has directivity, and can transmit by wireless a signal in the directivity direction in which the infrared emitter 205 is directed.

The above-mentioned terminal address can be, for example, a URL or a telephone number, etc. The above-mentioned destination address can be, for example, an e-mail address, a URL, a telephone number, etc.

The terminal device 201 further includes a controller (CPU) 223, and program memory 224 storing a control program. By the controller 223 executing the control program stored in the program memory 224, the entire operation of the terminal device 201 can be controlled.

The server device 202 includes: an infrared reception unit 225 for receiving an information request signal transmitted by wireless (infrared transmission) through the infrared receiver 208; a command analysis unit 226 for analyzing the information request signal received by the infrared reception unit 225 and extracting a terminal address from the information request signal; a destination information extraction unit 227 for extracting a destination address from the information request signal analyzed by the command analysis unit 226; an information DB (database) 228 storing information to be provided; a providing information transmission unit 229 for transmitting a signal including the information read from the information DB 228 according to the information request signal to the destination address extracted by the destination information extraction unit 227 through the communication cable 209 (or the antenna 210 as necessary); a radio transmission unit 230 for transmitting by wireless (radio transmission) the reception result information relating to the transmission of the signal by the providing information transmission unit 229 to the terminal address extracted by the command analysis unit 226 from the antenna 210, and the like.

The server device 202 further includes a controller (CPU) 231 and program memory 232 storing a control program. By the controller 231 executing the control program stored in the program memory 232, the entire operation of the server device 202 can be controlled.

In the server device 202 relating to the present configuration example, the destination information extraction unit 227 can be omitted, and the command analysis unit 226 can be configured to extract the destination address from the information request signal instead of the destination information extraction unit 227.

Figure 61:
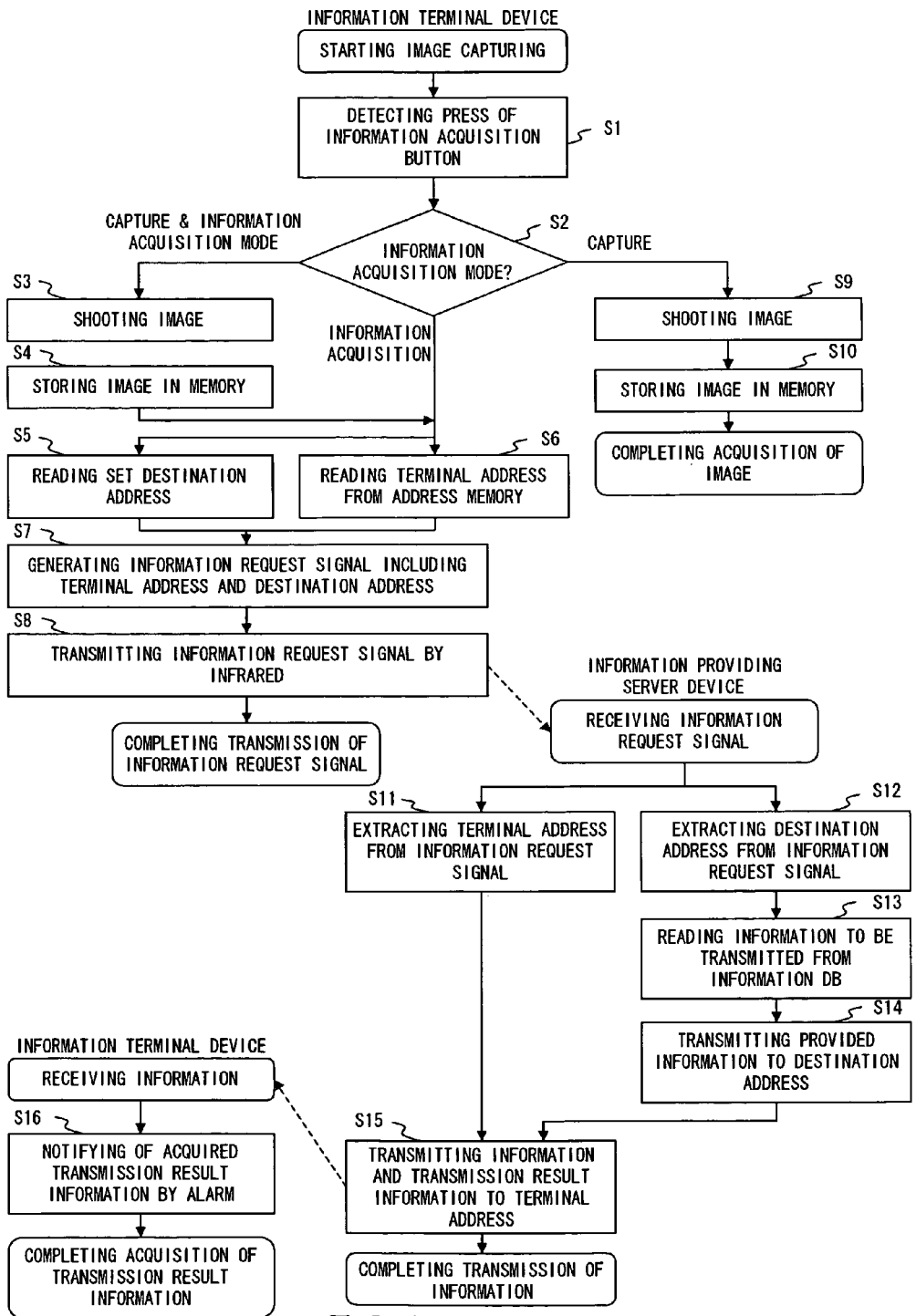
FIG. 61 is a flowchart of an operation example of a terminal device and a server device as the twenty-fifth configuration example.

FIG. 61 is a flowchart showing the operation example of the terminal device 201 and the server device 202 in the twenty-fifth configuration example.

In FIG. 61, the processes in S10 through S16 refer to the operation of the terminal device 201, and the processes in S11 through S15 refer to the operation of the server device 202.

First, in S1, the taking lens 206 of the terminal device 201 is directed to a subject, and the information acquisition button 204 also functioning as a shutter button is pressed. Thus, the shutter switch 212 is turned on, and the trigger signal is input to the information acquisition mode SW 211. In S2, the information acquisition mode which the user (information requester) specified and set is determined. When the determination result is "capture & information acquisition mode" indicating both of an image capturing operation and an information acquiring operation, the information acquisition mode SW 211 inputs a trigger signal to each of the image capturing unit 214 and the command generation unit 213, and control is passed to S3. When the result indicates the "information acquisition mode" specifying an information acquiring operation, the information acquisition mode SW 211 inputs the trigger signal to the command generation unit 213, and control is passed to S5 and S6. When the result indicates the "capturing mode" specifying a capturing operation, the information acquisition mode SW 211 inputs the trigger signal to the image capturing unit 214, and control is passed to S9.

In the case of the "capture & information acquisition mode", a subject image is captured by the image capturing unit 214 in S3, and an image is taken. However, in this example, it is assumed that the server device 202 is set in the direction in which the taking lens 206 is directed, that is, in the directivity direction of the infrared emitter 205. In S4, the image data (image) obtained by capturing the image in the preceding step is stored in the memory 215. However, when image data is stored, corresponding identification information is added and stored so that the image and the information to be acquired can be associated with later. The information relating to the image capturing conditions (shutter speed, white balance value, etc.) when the image data is obtained is also added and stored. The processes in S5 and S6 are performed in parallel. In S5, the destination address set by a user in advance is read from the destination information address 218. In S6, the terminal address is read from the address memory 217. Processes of S5 and S6 can be performed in serial.

In S7, an information request signal including the destination address read in S5 and the terminal address read in S6 is generated. In S8, the information request signal generated in the preceding step is transmitted by wireless (infrared transmission) by the infrared transmission unit 219. The terminal device 201 completes acquiring an image and transmitting the information request signal in the processes in S3 through S8.

In the case of the "information acquisition mode", the processes in S5 through S8 are performed described above. In the processes in S5 through S8, the terminal device 201 completes transmitting the information request signal.

In the case of the "capture mode", a subject image is captured by the image capturing unit 214, and an image is shot. In S10, the image data (image) corresponding to the captured subject image is stored in the memory 215. However, when it is stored, the information relating to the image capturing conditions (shutter speed, white balance value, etc.) when the image data is obtained is also added and stored. In the processes in S9 and S10, the terminal device 201 completes acquiring an image.

When the infrared reception unit 225 of the server device 202 receives the information request signal transmitted by wireless from the terminal device 201, the processes in S11 and S12 through S14 are performed in parallel. In S11, an information request signal is analyzed and a terminal address is extracted from the information request signal. In S12, a destination address is extracted from the analyzed information request signal. In S13, information corresponding to the information request signal is read from the information DB 228. In S14, the providing information transmission unit 229 transmits a signal including the information read in the preceding step to the destination address extracted in S12. When there is a plurality of destination addresses extracted in S12, they are to be transmitted to plural destinations.

The processes of S11 and S12 through S14 can also be performed in series.

In S15, the radio transmission unit 230 transmits by wireless the signal including the transmission result information relating to the transmission of the signal performed in S14 to the terminal address extracted in S11. At this time, the transmission result information is to notify that information to be provided has been transmitted. In the processes of S11 through S15, the server device 202 completes transmitting a signal including the providing information and a signal including transmission result information.

When the radio wave reception unit 220 of the terminal device 201 receives a signal including the transmission result information transmitted by wireless by the server device 202, and the transmission result information is acquired, the transmission result information is analyzed by the transmission result analyzing unit 212 in S16, and depending on the analysis result, the alarm unit 222 issues a notification by a sound alarm by the alarm unit 222. In this example, the notification that provided information has been transmitted is issued. Therefore, a user of the terminal device 201 can confirm that provided information has been transmitted to the destination address specified by the provided information. By the process in S16, the terminal device 201 completes acquiring the transmission result information. The alarm unit 222 can issue a visual alarm using an LCD, etc, and also can display a message on the display unit 216.

In the operation relating to the twenty-fifth configuration example, by pressing the information acquisition button 204 by a user with the infrared emitter 205 of the terminal device 201 directed to the infrared receiver 208 of the server device 202 after the user sets the "capture & information acquisition mode" or the "information acquisition mode", the provided information is transmitted to a specified destination address, and the provided information can be acquired by the user later accessing the destination address.

In the operation relating to the present configuration example, when an information request signal does not include a destination address, the server device 202 can transmit a signal including information to be provided to a terminal address using the terminal address extracted in S11 as a destination address. It is also possible to directly transmit information to be provided to the terminal device 201 with a terminal address included in a destination address. In this case, the information relating to the transmission of provided information can be included in a signal containing provided information and can be transmitted together.

Described below is the configuration of the terminal device 201 and the server device 202 in the twenty-sixth configuration example. The present configuration example prevents the same providing information from being double transmitted to the same destination, and the providing information according to the type of information can be transmitted.

Figure 62:
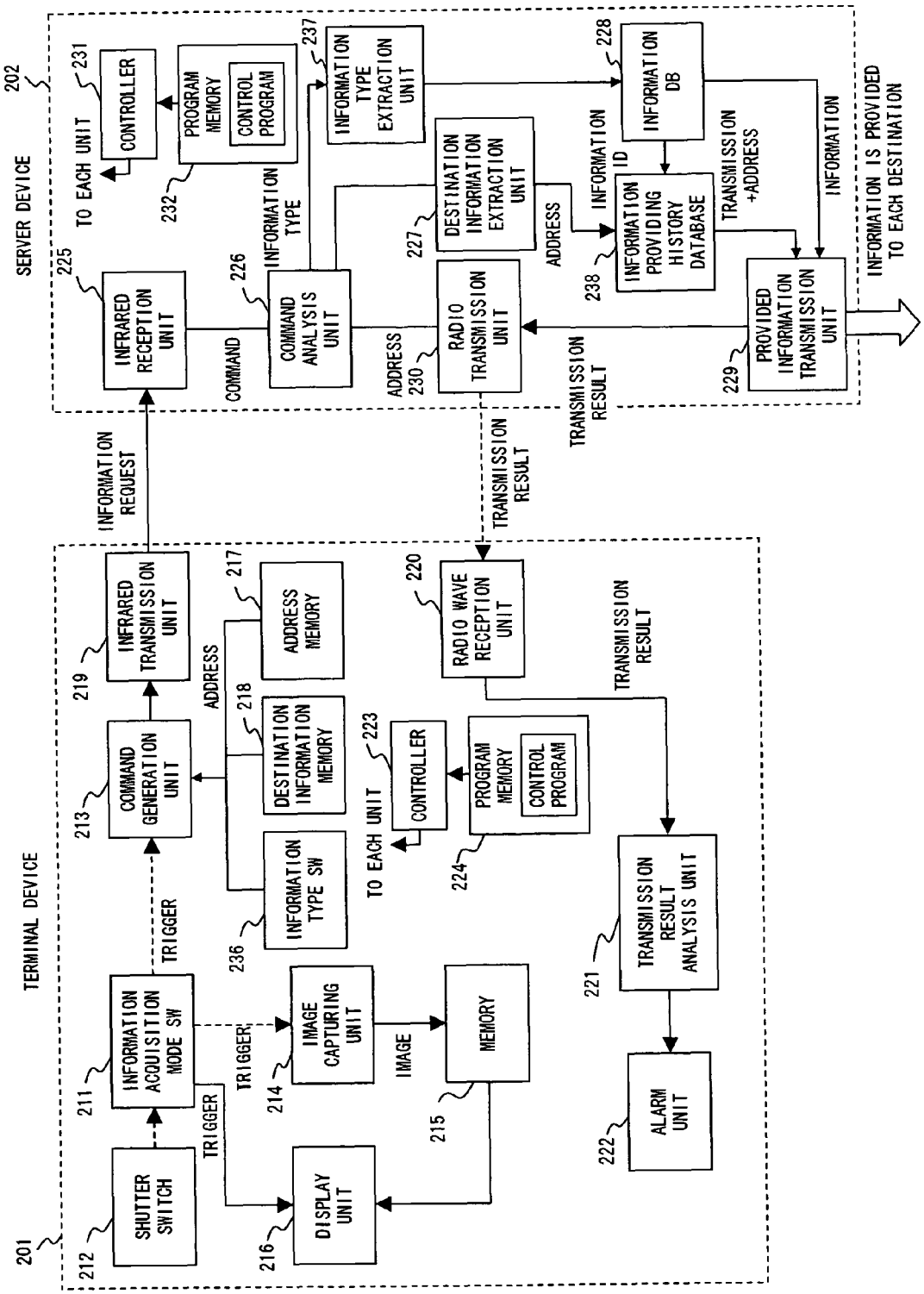
FIG. 62 shows the twenty-sixth configuration example.

FIG. 62 shows the twenty-sixth configuration example.

In FIG. 62, the terminal device 201 is different from the terminal device 201 relating to the twenty-fifth configuration example (FIG. 60) in that it newly includes an information type SW 236 for selecting a corresponding information type identification code (information relating to the type of information) according to the information type indicated and set in advance by a user (information requester), and other configurations are the same. However, the command generation unit 213 relating to the twenty-sixth configuration example generates an information request signal including a terminal address read from the address memory 217, a destination address read from the destination information memory 218, and an information type identification code selected by the information type SW 236 when a trigger signal is input.

The information type can be, for example, (1) a type different in size (data capacity, data size) of information such as common information, summary information, address information on the network containing information (information such as a URL, etc. for access to information), (2) a type different information form such as identification information, picture information, audio information, text information, etc., (3) a type different in file format of information such as JPEG, TEXT, etc., (4) a type different in contents of information such as restaurant menu information, timetable information, etc., (5) a type different in field of information such as technical information, sales information, enterprise information, etc.

The server device 202 is different from the server device 202 according to the twenty-fifth configuration example in that it newly includes: an information type extraction unit 237 for extracting an information type identification code from an information request signal analyzed from the command analysis unit 226; and an information providing history database 238 for associating a destination address with ID information about the information for designating transmitted information when the providing information transmission unit 229 transmits the information to the destination address and storing them, and other configurations are the same. The information providing history database 238 determines whether or not information can be provided based on the associated destination address and the ID information about the information stored as an information providing history, and the information to be provided and its destination address. However, the information DB 228 relating to the twenty-sixth configuration example stores the information corresponding to each information type identification code and the ID information about the information for designation of the information, etc., and the information read from the information DB 228 as the information to be provided is the information corresponding to the information type identification code extracted by the information type extraction unit 237. If the destination address extracted by the destination information extraction unit 227 and the ID information about the information read from the information DB 228 corresponding to the information type identification code are not associated with each other and stored in the information providing history database 238, the transmission is permitted, and the information is transmitted to the destination address. If they are stored, the transmission is inhibited, and the information is not transmitted to the destination address.

In the server device 202, the destination information extraction unit 227 and the information type extraction unit 237 can be omitted, and the command analysis unit 226 can be configured to extract a destination address and an information type identification code from the information request signal for the destination information extraction unit 227 and the information type extraction unit 237.

FIG. 63 is a flowchart of the operation example of the terminal device 201 and the server device 202 in the twenty-sixth configuration example.

In FIG. 63, the processes in S21 through S22 and S31 refer to the operation of the terminal device 201, and the processes in S23 through S30 refer to the operation of the server device 202.

In the present embodiment, the "capture & information acquisition mode" or the "information acquisition mode" is set as an information acquisition mode, a desired information type is specified and set as an information type, and the operation is performed when the information acquisition button 204 is pressed.

First, when the "capture & information acquisition mode" is set, after the processes in S3 through S6 shown in FIG. 61 are performed, or when the "information acquisition mode" is set, the processes in S5 and S6 shown in FIG. 61 are performed, and then in S21, an information request signal including the terminal address read from the address memory 217, the destination address read from the destination information memory 218, and the information type identification code selected by the information type SW 236 according to the specified and set information type is generated. In S22, the information request signal generated in the preceding step is transmitted by wireless (infrared transmission) by the infrared transmission unit 219. In the processes in S21 and S22, the terminal device 201 completes transmitting the information request signal.

When the infrared reception unit 225 of the server device 202 receives the information request signal transmitted by wireless from the terminal device 201, the processes in S23, S24, and S25 through S26 are performed in parallel. First, in S23, the process in S11 shown in FIG. 61 is performed, and control is passed to S30. In S24, the process in S12 shown in FIG. 61 is performed, and control is passed to S27. In S25, an information type identification code is extracted from the analyzed information request signal. In S26, the information corresponding to the information type identification code and its ID information is read as providing information from the information DB 228, and control is passed to S27.

The processes in S23, S24, and S25 through S26 can be performed in series.

Then, the process in S27 is performed. In S27, it is determined whether or not the destination address extracted in S24 is associated with the ID information read in S26, and has already been stored in the information providing history database 238, thus it is determined whether or not the information corresponding to the information type identification code read in S26 has already been transmitted to the destination address read in S24. If the determination result has been transmitted, control is passed to S30. If the determination result has not been transmitted, control is passed to S28.

If the determination result has not been transmitted, first, in S28, the signal including the information corresponding to the information type identification code read in S26 is transmitted to the destination address extracted in S24. The processes in S29 and S30 are performed in parallel. In S29, the destination address and the ID information about the transmitted information are associated with each other and stored in the information providing history database 238. In S30, the signal including the transmission result information notifying that information to be provided has been transmitted is transmitted by wireless to the terminal address extracted in S23. In the process performed when the determination result is "not transmitted" in S27, the server device 202 completes transmitting a signal including providing information and a signal including the transmission result information.

The processes in S29 and S30 can be performed in series.

Otherwise, when the determination result in S27 is "transmitted", in S30, a signal including transmission result information notifying that information to be provided has not been transmitted is transmitted by wireless to the terminal address extracted in S23. Thus, the server device 202 completes transmitting a signal including the transmission result information.

When the radio wave reception unit 220 of the terminal device 201 receives a signal including the transmission result information transmitted by wireless from the server device 202, and acquires the transmission result information, the transmission result analyzing unit 212 analyzes the transmission result information in S31, the alarm unit 222 issues a notification by a sound alarm depending on the analysis result, that is, depending on whether or not providing information has been transmitted. Thus, the user of the terminal device 201 can confirm whether or not the information to be provided has been transmitted to the destination address. By confirming that the provided information has not been acquired, it is confirmed that the provided information has been already acquired. In the process in S31, the terminal device 201 completes acquiring the transmission result information.

In the operation relating to the twenty-sixth configuration example, a user sets the "capture & information acquisition mode" or the "information acquisition mode" as an information acquiring mode, and a desired information type as a type of requested information. Then, the information acquisition button 204 is pressed with the infrared emitter 205 of the terminal device 201 directed to the infrared receiver 208 of the server device 202. Thus, the providing information depending on the information type is transmitted to the specified destination address, and the user later accesses the destination address, thereby successfully acquiring the provided information. Therefore, for example, when the type of requested information is definite, the information type is set to acquire only a target type of information so that unnecessary information cannot be acquired. The set information type is not limited to one, but a plurality of types can be set. Thus, plural pieces of information of plural types can be acquired.

When providing information of set information types is transmitted to a destination address, and if the destination address is associated with the ID information about the providing information and stored in the information providing history database 238, the transmission is prohibited, thereby preventing the same providing information from being double transmitted to the same destination.

In the operation relating to the present configuration example, for example, when the terminal device 201 sets the size of information that can be received as an information type by the terminal device 201, and when an information request signal including the information type identification code corresponding to the information type and a terminal address but not including a destination address is transmitted, the server device 202 can set the terminal address included in the information request signal as a destination address, and transmit the information corresponding to the information type. In this case, for example, the radio transmission unit 230 of the server device 202 transmits information corresponding to the information type, and the radio wave reception unit 220 of the terminal device 201 receives the transmitted information corresponding to the information type, and the information is stored in the memory 215.

The server device 202 according to the present configuration example provides corresponding information depending on the requested information type. Therefore, the information DB 228 is assumed to store plural types of providing information. However, for example, when providing information is of only one type, that is, the information DB 228 stores only one type of information, the determination in S27 as to whether or not the transmission has been completed can be made only depending on the destination address. In this case, when the providing information transmission unit 229 transmits providing information to the destination address, only the destination address is stored in the information providing history database 238, and when the providing information transmission unit 229 transmits information to be provided to the destination address, the transmission is prohibited or permitted depending on whether or not the destination address is stored in the information providing history database 238 or not.

In the server device 202 relating to the present configuration example, for example, the information corresponding to the information type identification code extracted from the information request signal is not stored in the information DB 228, the information corresponding to the information type identification code, and the information designation information as necessary can be acquired from another device that can provide the information corresponding to the information type identification code. In this case, the server device 202 can newly include a device designation unit for designating the above-mentioned other device, and a transmission unit and a reception unit relating to the information type so that the transmission unit relating to the information type can transmit a signal including the information type identification code to another device designated by a device designation unit and the reception unit relating to the information type can receive the information corresponding to the information type identification code and the information designation information as necessary from the designated other device. The above-mentioned transmission and reception are performed through the antenna 210 or the communication cable 209.

Described below is the configuration of the terminal device 201 and the server device 202 in the twenty-seventh configuration example. The present configuration example is configured to transmit corresponding providing information depending on the disclosure level, etc. of user information.

Figure 64:
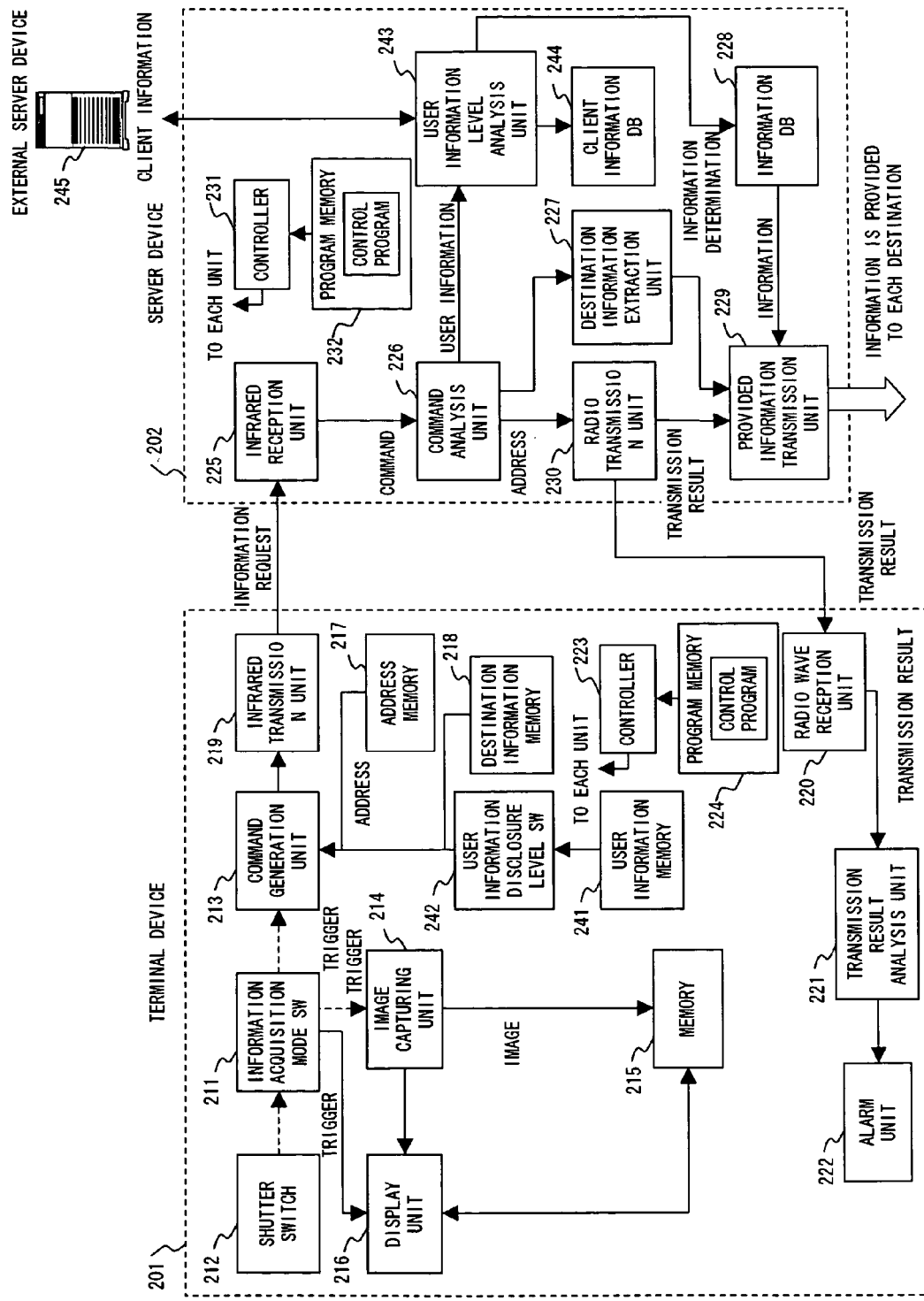
FIG. 64 shows the twenty-seventh configuration example.

FIG. 64 shows the twenty-seventh configuration example.

In FIG. 64, the terminal device 201 is different from the terminal device 201 relating to the twenty-fifth configuration example (FIG. 60) in that it includes: a user information memory 241 storing the information about a user (information requester) of the terminal device 201; and a user information disclosure level SW 242 for setting a disclosure level, instructed by the user, of the user information read from the user information memory 241, and other configurations are the same. However, when a trigger signal is input, the command generation unit 213 relating to the twenty-seventh configuration example generates an information request signal including: a terminal address read from the address memory 217; a destination address read from the destination information memory 218; and user information read from the user information memory 241 according to the user information disclosure level set by the user information disclosure level SW 242. At this time, from the viewpoint of the security, it is possible to encrypt the user information included in the information request signal. The user information refers to the information including the name of a user, the name of a corporation, an e-mail address, the membership number of a corporation (for example, an academy, a member group, etc.) to which a user belong, the user number of electronic equipment of a user, etc. The server device 202 is different from the server device 202 relating to the twenty-fifth configuration example in that it is newly includes: a user information level analysis unit 243 for analyzing the level of user information according to the user information extracted from an information request signal; and a client information DB 244 for storing user information, etc. extracted from an information request signal, and other configurations are the same. In the server device 202 relating to the twenty-seventh configuration example, the information read as the information to be provided from the information DB 228 is the information depending on the level of the user information analyzed by the user information level analysis unit 243.

The level of the user information is determined based on the disclosure level (disclosed contents) of the user information extracted from the information request signal, the frequency of issues of information requests in the past by a user designated by the user information, the registration of a user designated by the user information as a special person (for example, a member of a membership group, etc.) in the client information DB 244, etc. For example, when a user designated according to the user information is not registered in the client information DB 244, that is, if the user has first issued an information request, etc., the user information level is low, and the information read from the information DB 228 as the information to be provided is rough data. Otherwise, when a user designated by the user information is registered as a special person, or if the user has issued a number of information requests in the past, the user information level is high, and the information read from the information DB 228 is more detailed. At this time, if the information to be provided is confidential, the information to be provided can be encrypted as necessary.

Furthermore, the server device 202 according to the present configuration example can communicate with an external server device (for example, a external server device 245 shown in FIG. 64) having the same function as the client information DB 244 as necessary, and the same operation performed onto the client information DB 244 can also be performed onto the external server device 245. The communication of the information between the server device 202 and the external server device 245 is performed through the communication cable 209 or the antenna 210.

FIG. 65 is a flowchart showing the operation example of the server device 202 in the twenty-seventh configuration example.

In FIG. 65, the processes in S41 through S51 and S60 refer to the operations of the 201, and the processes in S52 through S59 refer to the operations of the server device 202.

First, in S41 and S42, the processes in S1 and S2 shown in FIG. 61 are performed. When the information acquisition mode is the "capture & information acquisition mode", control is passed to S43. When the mode is the "information acquisition mode", control is passed to S45. When it is the "capture mode", control is passed to S50. In the "capture & information acquisition mode", the processes in S3 through S6 shown in FIG. 61 are performed in S43 through S46. In S47, the user information corresponding to the disclosure level of the user information set by the user information disclosure level SW 242 at an instruction of a user is read from the user information memory 241.

In the present example, the processes in S45, S46, and S47 are performed in parallel, but the processes can also be performed in series.

In S48, an information request signal including the destination address read in S45, the terminal address read in S46, and the user information read in S47 is generated. In S49, the process in S8 shown in FIG. 61 is performed. In the processes in S43 through S49, the terminal device 201 completes acquiring an image and transmitting an information request signal.

In the "information acquisition mode", the processes in S45 through S49 are described above. In the processes in S45 through S49, the terminal device 201 completes transmitting an information request signal.

In the "capture mode", the processes in S9 and S10 shown in FIG. 61 are performed in S50 and S51. The terminal device 201 completes acquiring an image in the processes in S50 and S51.

When the infrared reception unit 225 of the server device 202 receives the information request signal transmitted by wireless, the processes in S52, S53, S54, and S57 are performed in parallel. First, in S52, the process in S11 shown in FIG. 61 is performed, and control is passed to S59. In S53, the process in S12 shown in FIG. 61 is performed, and control is passed to S58. In S54, the command analysis unit 226 extracts user information from the information request signal. In S55, the user information is registered in the client information DB 244 (or possibly the external server device 245). If the user information has already been registered, that is, if the user designated by the user information issues the second and subsequent information requests, etc., the registration is not performed, and the information request of the user designated by the user information is recorded as a history. In S56, the user information level analysis unit 243 analyzes the user information, and the disclosure level of the user information is determined, and the determined level of the information to be provided for the user is selected from the information stored in the information DB 228. In S57, the information selected in the preceding step as the providing information to be transmitted is read from the information DB 228, and control is passed to S58.

The processes in S52, S53, and S54 through S57 can also be performed in series.

In S58, the providing information transmission unit 229 transmits the signal including the information read in S57 to the destination address extracted in S53. Thus, the server device 202 completes transmitting the signal including information to be provided. In S59, the radio transmission unit 230 transmits by wireless a signal including the transmission result information about the transmission of a signal performed in S58 to the terminal address extracted in S52. The transmission result information is the information for notification that the information to be provided has been transmitted. Thus, the server device 202 completes transmitting the signal including the transmission result information.

When the radio wave reception unit 220 of the terminal device 201 receives the signal including the transmission result information transmitted by wireless by the server device 202, and the transmission result information is acquired, the process in S16 shown in FIG. 61 is performed in S60. The terminal device 201 completes acquiring the transmission result information in the process in S60.

In the operation relating to the twenty-seventh configuration example, after the user sets the "capture & information acquisition mode" or the "information acquisition mode" as an information acquisition mode, and after the user sets a desired disclosure level as the disclosure level of the user information, the infrared emitter 205 of the terminal device 201 is directed to the infrared receiver 208 of the server device 202 and the information acquisition button 204 is pressed, thereby transmitting the information to be provided according to the user information corresponding to the disclosure level to the specified destination address. Thus, the provided information can be acquired when the user later accesses the destination address.

Described below is the configuration of the terminal device 201 and the server device 202 in the twenty-eighth configuration example. In the present configuration example, when information to be provided is transmitted, additional information (for example, an update program, etc.) relating to the terminal device 201 is transmitted together.

Figure 66:
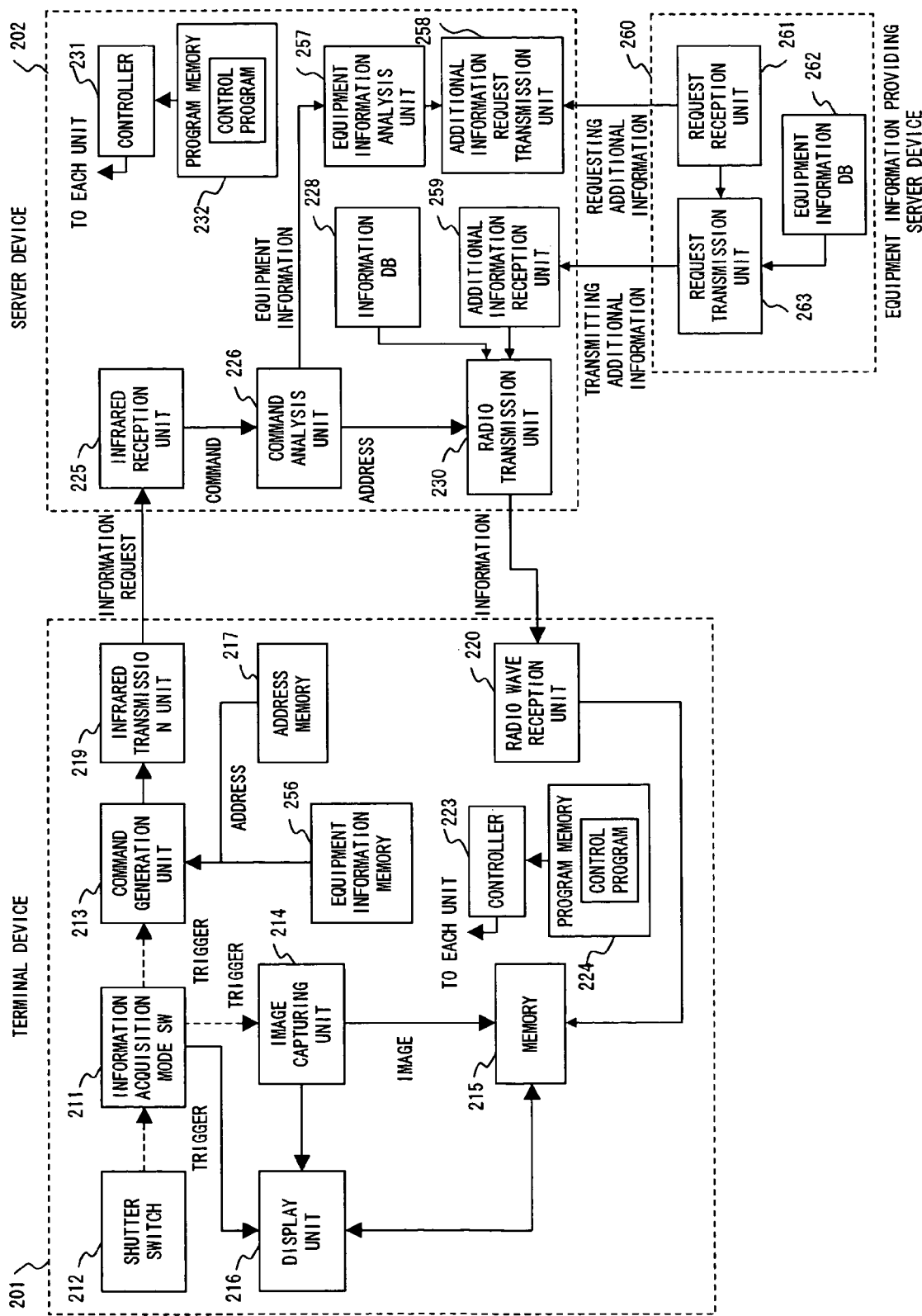
FIG. 66 shows the twenty-eighth configuration example.

FIG. 66 shows the twenty-eighth configuration example.

In FIG. 66, the terminal device 201 is different from the terminal device 201 relating to the twenty-fifth configuration example (FIG. 60) in that it newly includes an equipment information memory 256 storing the equipment information about the terminal device 201, and omits the destination information memory 218, the transmission result analysis unit 221, and the alarm unit 222, and other configurations are the same. However, the command generation unit 213 relating to the twenty-eighth configuration example generates an information request signal including a terminal address read from the address memory 217 and the equipment information read from the equipment information memory 256. The information received by the radio wave reception unit 220 is stored in the memory 215. The equipment information includes one or more of the name of the maker of the terminal device 201, the model number, the product serial number, or the version information about the firmware.

The server device 202 is different from the server device 202 relating to the twenty-fifth configuration example in that it newly includes: an equipment information analysis unit 257 for analyzing extracted equipment information and designating an equipment information providing server device that provides additional information relating to the equipment information; an additional information request transmission unit 258 for transmitting an address information request signal including equipment information for requesting for additional information about the equipment information to the equipment information providing server device (for example, the server device 60 shown in FIG. 66) designated by the equipment information analysis unit 257; and an additional information reception unit 259 for receiving the additional information in response to the address information request signal from the equipment information providing server device, and omits the destination information extraction unit 227 and the radio transmission unit 230, and other configurations are the same. However, in the server device 202 relating to the twenty-eighth configuration example, the command analysis unit 226 further extracts the equipment information from the information request signal. The providing information transmission unit 229 also transmits the additional information received by the additional information reception unit 259 together with the providing information to the terminal device 201.

The server device 60 shown as an example of an equipment information providing server device for providing the additional information relating to equipment information includes: a request reception unit 261 for receiving an address information request signal; an equipment information DB 262 storing the additional information corresponding to various types of equipment information; a request transmission unit 263 for transmitting additional information read from the equipment information DB 262 according to the equipment information extracted from the address information request signal to the requester (the transmitter of the address information request signal), etc.

Figure 67:
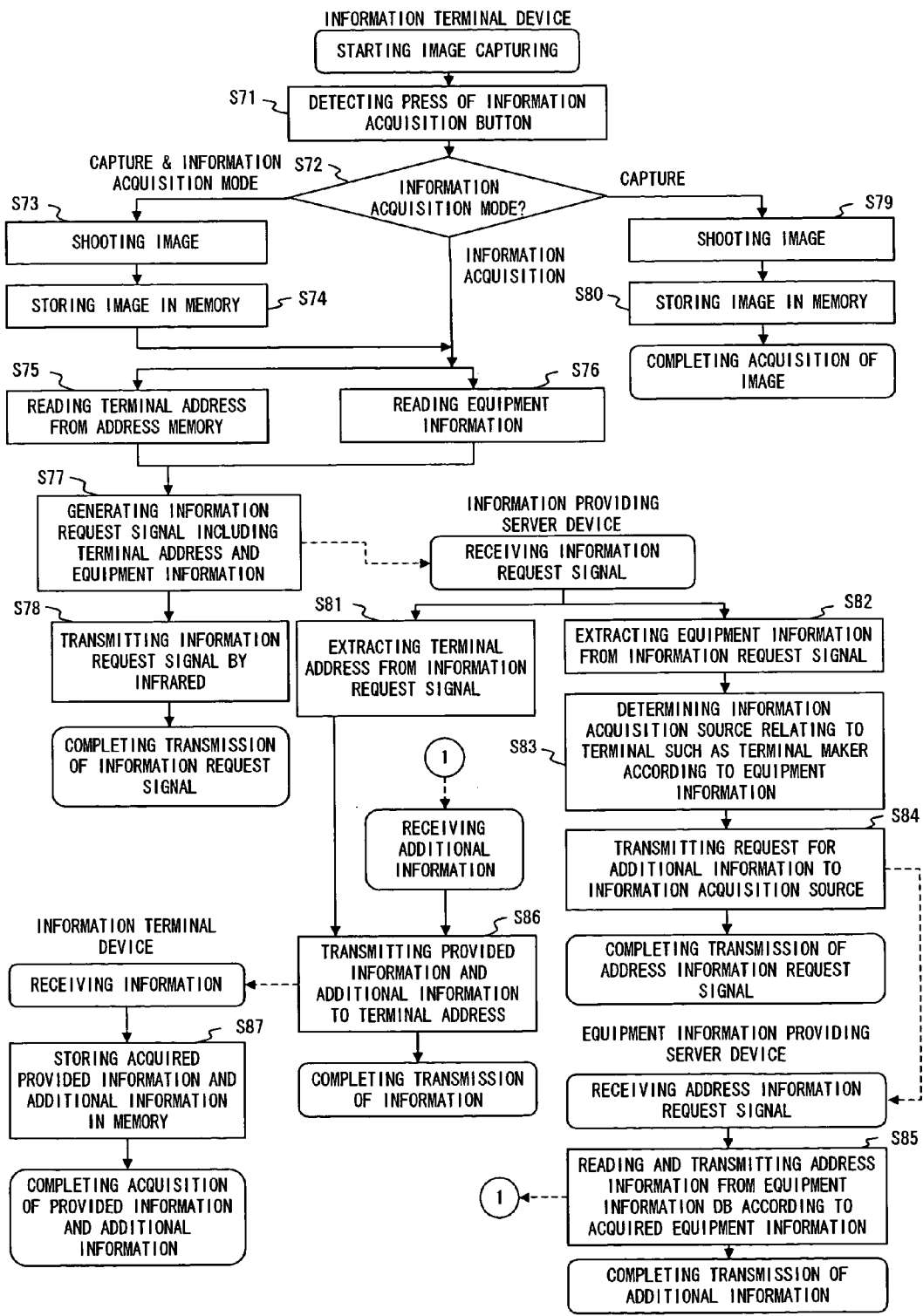
FIG. 67 is a flowchart of an operation example of a terminal device and a server device as the twenty-eighth configuration example.

FIG. 67 is a flowchart of an operation example of the terminal device 201 and the server device 202 in the twenty-eighth configuration example.

In FIG. 67, the processes in S71 through S80, and S87 refer to the operations of the 201, the processes in S81 through S84 and S86 refer to the operations of the server device 202, and the process in S85 refer to the operation of the equipment information providing server device (the server device 60 shown in FIG. 66 in the present flow).

First, in S71 and S72, the processes in S1 and S2 shown in FIG. 61 are performed. When the information acquisition mode is the "capture & information acquisition mode", control is passed to S73. When it is the "information acquisition mode", control is passed to S75. When it is the "capture mode", control is passed to S79.

When it is the "capture & information acquisition mode", the processes in S3 and S4 and S6 shown in FIG. 61 are performed in S73 through S75. In S76, equipment information is read from the equipment information memory 256.

In the present embodiment, the processes in S75 and S76 are performed in parallel, yet the processes can also be performed in series.

In S77, an information request signal including the terminal address read in S75 and the equipment information read in S76 is generated. In S78, the process in S8 shown in FIG. 61 is performed. In the processes in S73 through S78, the terminal device 201 completes acquiring an image and transmitting the information request signal.

In the "information acquisition mode", the processes in S75 through S78 are described above. In the processes in S75 through S78, the terminal device 201 completes transmitting the information request signal.

In the "capture mode", the processes in S9 and S10 shown in FIG. 61 are performed in S79 and S80. In the processes in S79 and S80, the terminal device 201 completes acquiring an image.

When the infrared reception unit 225 of the server device 202 receives the information request signal transmitted by wireless by the terminal device 201, the processes in S81 and S82 through S83 are performed in parallel. First in S81, the process is S11 shown in FIG. 61 is performed, and control is passed to S86. In S82, the command analysis unit 226 extracts the equipment information from the information request signal. In S83, the equipment information analysis unit 257 analyzes the equipment information extracted in the preceding step, and the equipment information providing server device 260 which is providing additional information about the equipment information is designated (determined). The server device 60 is, for example, a device provided by a maker, etc. of the terminal device 201.

The processes in S81 and S82 through S83 can also be performed in series.

Then, control is passed to S84, and an address information request signal including the equipment information extracted in S82 is transmitted to the equipment information providing server device 260 determined in S83. Thus, the server device 202 completes transmitting the address information request signal.

When the request reception unit 261 of the equipment information providing server device 260 receives the address information request signal including the equipment information transmitted from the server device 202, the equipment information is acquired. In S85, the additional information read from the equipment information DB 262 according to the equipment information is transmitted. In the process in S85, the equipment information providing server device 260 completes transmitting the additional information.

When the additional information reception unit 259 of the server device 202 receives the additional information transmitted by the equipment information providing server device 260, control is passed to S86, and the signal including the information read from the information DB 228 and the additional information received as described above according to the information request signal is transmitted by wireless by the providing information transmission unit 229 to the terminal address extracted in S81. Thus, the server device 202 completes transmitting the signal including the equipment information and the additional information.

In the operation relating to the twenty-eighth configuration example, a user sets the "capture & information acquisition mode" or the "information acquisition mode" as an information acquisition mode, and presses the information acquisition button 204 with the infrared emitter 205 of the terminal device 201 directed to the infrared receiver 208 of the server device 202. Thus, the additional information relating to the equipment information about the terminal device 201 obtained from the equipment information providing server device can be transmitted together with the providing information to the terminal device 201, and the providing information and the additional information about the terminal device 201 can be acquired.

For example, when the additional information is an update program of the terminal device 201, the user can update the control program stored in the 224 of the terminal device 201 using the update program.

In the operation relating to the present configuration example, for example, when the information corresponding to the equipment information is stored in the information DB 228, the information read from the information DB 228 corresponding to the equipment information can be additional information to be transmitted by the providing information transmission unit 229, and when the information corresponding to the equipment information is not stored in the information DB 228, the process can also be performed as shown in FIG. 67.

In the twenty-fifth through twenty-eighth configuration examples, the terminal device 201 transmits an information request signal using infrared rays, but the signal can also be transmitted using electromagnetic waves including light and sound waves including ultrasonic other than the infrared rays. In this case, means for assigning directivity to a signal can be a lens, a concave mirror, etc. as the optical means, and can be a phased array antenna using a plurality of oscillators, a parabola antenna, an electromagnetic wave horn antenna, etc. as electromagnetic wave means. In the case of a sound wave including ultrasonic, there is a means with a phased array having a plurality of oscillators.

In the above-mentioned twenty-fifth through twenty-eighth configuration examples, the terminal device 201 can also be configured without an image capturing function. The terminal device included in the information providing system relating to the present embodiment refers to one or more of the terminal devices relating to the twenty-fifth through twenty-eighth configuration examples, or one or more of the terminal devices relating to the twenty-fifth through twenty-eighth configuration examples without the above-mentioned image capturing function, and the server device included in the present system is at least one or more of the server device 202.

In the terminal device relating to the twenty-fifth through twenty-eighth configuration examples without the above-mentioned image capturing function, one of the terminal devices can also function as another terminal device or another device (for example, a mobile telephone, a PDA, etc.), or can has both functions of another terminal device and another device.

In the server device relating to the twenty-fifth through twenty-eighth configuration examples, one of the server devices can have the function of another server device or the one of other devices, or have both functions of another server device and other devices.

The information acquisition device, the information acquiring method, the information acquisition program, the information providing device, and the information providing system according to the present invention have been described above. However, the present invention is not limited to the above-mentioned embodiments, but can be improved and changed within the scope of the gist of the present invention.

According to the present invention, information can be easily and freely acquired by an information requester without information for designation of an information source such as a URL, a telephone number, etc. In addition, since special management is not required, a system that can be utilized in wide application fields can be realized. Furthermore, information can be provided for one or more unspecified information requesters located in a small area.

The invention claimed is:

1. An information acquisition device which acquires digital information from a server, the information acquisition device comprising:
   an image capturing unit shooting a subject and capturing image data of a subject image formed by a taking lens;
   an information request creation unit creating an information request that includes an address specifying the information acquisition device;
   a first transmission unit transmitting, wirelessly, an information request signal that includes the information request, without specifying any destination address of the information request signal;
   a reception unit receiving a radio signal addressed to the information acquisition device and transmitted wirelessly from the server in response to the information request signal transmitted by the first transmission unit, and acquiring information contained in the radio signal;
   an information storage unit storing the image data captured by the image capturing unit in addition to the information acquired by the reception unit;
   an operation unit detecting one user operation of a shutter switch for issuing an instruction to transmit the information request signal by the first transmission unit or to capture image data by the image capturing unit; and
   a mode selecting unit selecting a mode from (1) an information acquisition mode, (2) an image capture mode and (3) a mix mode,
   wherein when the operation unit detects the user operation of the shutter switch, then issues an instruction (A) to transmit the information request signal to the server only during the information acquisition mode, (B) to capture image data only during the image acquisition mode, or (C) to transmit the information request signal to the server and to capture image data during the mix mode, and
   wherein the first transmission unit has directivity and radiates the information request signal in a direction through an optical axis of the taking lens, and the reception unit has one of (A) no directivity and (B) broader directivity than the first transmission unit.

2. The information acquisition device according to claim 1, further comprising:
   an information transmission unit externally transmitting the information or the image data stored in the information storage unit, the information acquired by the reception unit, or the image data captured by the image capturing unit.

3. The information acquisition device according to claim 2, further comprising:
   a selection unit selecting the information or the image data stored in the information storage unit,
   wherein the information transmission unit externally transmits the information or the image data selected by the selection unit.

4. The information acquisition device according to claim 3, wherein the information transmission unit transmits information to an address indicating a predetermined destination.

5. The information acquisition device according to claim 1, further comprising:
   a setting unit setting information relating to a type of information received and acquired by the reception unit,
   wherein the information request creation unit further includes information relating to a type of information set by the setting unit in the information request signal.

6. The information acquisition device according to claim 5, further comprising:
   an information screen unit screening the information received by the reception unit,
   wherein information to be acquired is selected by the information screen unit from the information received by the reception unit, and the screened information is stored in the information storage unit.

7. The information acquisition device according to claim 6, wherein screening standards of the information screened by the information screen unit designate a type of information set by the setting unit, and only the information of the type set by the setting unit is stored in the information storage unit.

8. The information acquisition device according to claim 5, wherein the information relating to the type of identification relates to at least one of a size of information, a type of information, a style of information, a file format of information, a content of information, and a field of information.

9. The information acquisition device according to claim 5, wherein the information relating to a type of information refers to information indicating a same target and a different type of information size.

10. The information acquisition device according to claim 9, wherein the information relating to a type of information includes information relating to at least one type of common information, summary information obtained by summarizing the common information, and address information in a network containing information.

11. The information acquisition device according to claim 1, further comprising:
    a server address extraction unit extracting a server address designating an information providing source contained in the information acquired by the reception unit; and
    a second transmission unit transmitting a signal in a style different from a style of the first transmission unit.

12. The information acquisition device according to claim 11, wherein the second transmission unit transmits by wireless a signal using an electromagnetic wave including light and a sound wave including ultrasonic, and the signal transmitted by wireless from the second transmission unit has no directivity or has broader directivity than the signal transmitted by the first transmission unit.

13. The information acquisition device according to claim 12, wherein when the information received by the reception unit is address information in a network in which the information exists, the second transmission unit transmits an information request signal to the server address extracted by the server address extraction unit.

14. The information acquisition device according to claim 12, further comprising:
an information presentation unit presenting all or a part of the information acquired by the reception unit, or the image data captured by the image capturing unit;
a selection unit selecting at least an information item from the information presented by the information presentation unit; and
an ID information addition unit adding information ID designating information corresponding to the information item selected by the selection unit to the signal to be transmitted, wherein the first transmission unit or the second transmission unit transmits the signal to be transmitted.

15. The information acquisition device according to claim 12, wherein the first transmission unit or the second transmission unit retransmits the signal to be transmitted when the information acquired by the reception unit is incomplete or when it is determined that information cannot be completely acquired.

16. The information acquisition device according to claim 1, further comprising:
a warning unit giving a warning when the information acquired by the reception unit is incomplete or when it is determined that information cannot be completely acquired.

17. The information acquisition device according to claim 16, wherein the warning unit gives a warning when a size of the information acquired by the reception unit exceeds a predetermined size or a free storage capacity of the information storage unit.

18. The information acquisition device according to claim 16, wherein the warning unit gives a warning when the information received and acquired by the reception unit relates to a size of continually transmitted information, and the size of the information exceeds a predetermined size or a free storage capacity of the information storage unit.

19. The information acquisition device according to claim 18, wherein when the size of the information acquired by the reception unit exceeds a predetermined size or a free storage capacity of the information storage unit, the information is automatically changed to the information relating to a type of information of a smaller size, the information request creation unit creates a second information request including the information relating to the type of information, and the first transmission unit or the second transmission unit retransmits the information request signal.

20. The information acquisition device according to claim 1, further comprising:
an information size setting unit setting a maximum value of a size of information that can be received and acquired by the reception unit,
wherein the information request creation unit further includes information relating to the maximum value of the size of the information that can be acquired and is set by the information size setting unit to the information request signal.

21. The information acquisition device according to claim 20, wherein the information size setting unit automatically sets the maximum value of the size of the information that can be acquired into the free storage capacity of the information storage unit.

22. The information acquisition device according to claim 1, further comprising:
an equipment information storage unit storing equipment information about the information acquisition device,
wherein the information request creation unit further includes the equipment information stored in the equipment information storage unit in the information request signal.

23. The information acquisition device according to claim 22, wherein the equipment information contains at least one or more of a maker name, a model number, a product serial number, and version information about firmware of the information acquisition device.

24. The information acquisition device according to claim 1, further comprising:
an information acquisition history storage unit storing information designation information designating the information received and acquired by the reception unit; and
an acquired information determination unit determining whether or not information newly received by the reception unit has been acquired before according to the information designation information about the newly received information,
wherein the information storage unit stores information determined by the acquired information determination unit that the information has not been acquired in the information received by the reception unit.

25. The information acquisition device according to claim 24, wherein the information designation information stored in the information acquisition history storage unit is information containing either one of an address of a device which transmits the signal received by the reception unit or the information ID assigned to the information received by the reception unit.

26. The information acquisition device according to claim 1, further comprising:
a detection unit detecting that there is an information providing device capable of providing information for the information acquisition device in the direction of the directivity.

27. The information acquisition device according to claim 26, wherein the detection unit further comprises:
an issued signal reception unit receiving an issued signal from the information providing device; and
a notification unit notifying that there is the information providing device detected when the issued signal is received by the issued signal reception unit.

28. The information acquisition device according to claim 26, wherein when the detection unit does not detect presence of the information providing device, an information acquiring operation is not performed.

29. The information acquisition device according to claim 26, wherein when the detection unit does not detect existence of the information providing device, and when the mode selecting unit selects the mix mode, an image is captured only as in the mode of acquiring only an image.

30. The information acquisition device according to claim 1, further comprising:
a program update unit extracting a control program, and updating all or a part of the control program stored in the program memory to be updated based on the control program when the control program of the information acquisition device is contained in the signal received by the reception unit.

31. The information acquisition device according to claim 30, further comprising:

an unreasonable program check unit detecting whether or not an unreasonable program is contained in the information acquired by the reception unit;

an unreasonable program warning unit giving a warning when it is detected by the unreasonable program check unit that an unreasonable program is contained in the information acquired by the reception unit; and an unreasonable program deletion unit deleting acquired information when it is detected by the unreasonable program check unit that an unreasonable program is contained in the information acquired by the reception unit.

32. The information acquisition device according to claim 1, further comprising:

an encryption unit encrypting all or a part of the information included by the information request creation unit in the information request signal [using an encryption key contained in the information received and acquired by the reception unit.

33. The information acquisition device according to claim 32, wherein the information request creation unit further includes the encryption key request information in the information request signal.

34. The information acquisition device according to claim 1, further comprising:

an encryption key generation unit generating an encryption key and a decryption key; and a decryption unit decrypting encrypted information contained in the signal received by the reception unit using the decryption key, wherein the information request creation unit includes an encryption key generated by the encryption key information generation unit in the information request signal.

35. The information acquisition device according to claim 1, wherein the reception unit further comprises a communication unit using a public network and receiving, regenerating, and communicating common voice through the public network.

36. An information providing method in an information providing system having an information acquisition device which acquires digital information and shoots an image, and an information providing device capable of providing information at an information request from the information acquisition device, wherein the information acquisition device performs:

a selecting step to select a mode from (1) an information acquisition mode, (2) an image capture mode and (3) a mix mode;

a detection step to detect one user operation of a shutter switch for capturing image data and acquiring information;

an image capture and information reception step to capture image data of a subject image formed by a taking lens, and to receive by a reception unit the information transmitted, wirelessly, from the information providing device, when the mix mode is selected; and a storage step to store the received information and the captured image in an information memory of the information acquisition device, wherein the information reception in the image capture and information reception step is performed, at the information acquisition device as a step to create an information request signal that includes an address specifying a reception unit of the information acquisition device and a step to transmit wirelessly the information request signal from a transmission unit without specifying any destination address of the information request signal, and at the information providing device as a step to receive the information request signal from the information acquisition device, a step to extract the address of the reception unit of the information acquisition device from the received information request signal and a step to transmit wirelessly information read from an information database to the extracted address, wherein when the information acquisition mode is selected then the image capture in the image capture and information reception step is not performed and only the received information is saved in the information memory in the storage step, when the image capture mode is selected then the information reception in the image capture and information reception step is not performed and the captured image is saved in the information memory in the storage step; and wherein the transmission unit has directivity and radiates the information request signal in a direction through an optical axis of the taking lens, and the reception unit has no directivity or has broader directivity than the first transmission unit.

37. An information acquisition device which acquires digital information from a server, the information acquisition device comprising:

an image capturing unit shooting a subject and capturing image data of a subject image formed by a taking lens;

an information request creation unit creating an information request that includes an address specifying the information acquisition device;

a first transmission unit radiating an information request signal that includes the information request, without specifying any destination address of the information request signal;

a reception unit receiving a radio signal addressed to the information acquisition device and transmitted wirelessly from the server in response to the information request signal transmitted by the first transmission unit, and acquiring information contained in the radio signal;

an information storage unit storing the image data captured by the image capturing unit in addition to the information acquired by the reception unit;

an operation unit detecting one user operation of a shutter switch for issuing an instruction to transmit the information request signal by the first transmission unit or to capture image data by the image capturing unit; and a mode selecting unit selecting a mode from (1) an information acquisition mode, (2) an image capture mode and (3) a mix mode, wherein the first transmission unit has directivity and radiates the information request signal in a direction through an optical axis of the taking lens, and the reception unit has one of (a) no directivity and (b) broader directivity than the first transmission unit, and wherein (A) when the operation unit detects the user operation of the shutter switch in the mix mode, the image capture unit captures image data of the subject image formed by the taking lens and the first transmission unit radiates the information request signal in the direction through the optical axis of the taking lens, and both the captured image and the acquired information are stored in the information storage unit, (B) when the operation unit detects the user operation of the shutter switch in the image capture mode, the image capture unit captures the image data of the subject image formed by the taking lens but the first transmission unit does not radiate the information request signal, and only the captured image is stored in the information storage unit, and (C) when the operation unit detects the user operation of the shutter switch in the information acquisition mode, the first transmission unit radiates the information request signal in the direction through the optical axis of the taking lens but the image capture unit does not capture the image data of the subject image, and only the acquired information is stored in the information storage unit.

* * * * *